United States Patent [19]

Yauk et al.

[11] Patent Number: 5,153,825
[45] Date of Patent: Oct. 6, 1992

[54] PAINT FORMULA RETRIEVAL AND MANAGEMENT SYSTEM AND METHOD

[75] Inventors: Robert H. Yauk, White Bear Lake; Frank D. Damon, Coon Rapids; Guy N. Rydberg, Arden Hills; Peter A. Santrach, South St. Paul, all of Minn.

[73] Assignee: Yada Systes, Inc., Circle Pines, Minn.

[21] Appl. No.: 443,084

[22] Filed: Nov. 27, 1989

Related U.S. Application Data

[63] Continuation of Ser. No. 122,321, Nov. 18, 1987, abandoned.

[51] Int. Cl.⁵ .................. G06F 15/21; G06F 15/24
[52] U.S. Cl. .................. 364/401; 364/403; 235/385
[58] Field of Search .................. 235/385; 340/712; 364/401, 403, 188

[56] References Cited

U.S. PATENT DOCUMENTS

| | | | |
|---|---|---|---|
| Re. 32,253 | 9/1986 | Bartulis et al. | 340/712 X |
| 4,204,204 | 5/1980 | Pitstick | 340/712 |
| 4,383,298 | 5/1983 | Huff et al. | 364/403 X |
| 4,459,663 | 7/1984 | Dye | 364/200 |
| 4,646,238 | 2/1987 | Carlson, Jr. et al. | 364/403 |
| 4,656,591 | 4/1987 | Goldberg | 364/403 X |
| 4,737,910 | 4/1988 | Kimbrow | 364/403 |
| 4,878,175 | 10/1989 | Norden-Paul et al. | 364/413.01 |

FOREIGN PATENT DOCUMENTS 0084170  4/1987  Japan .

OTHER PUBLICATIONS

Hewlett Packard 78707A PDMS Clincial User's Guide, Jan. 1982, pp. i-1 thru 2-23.

Hewlett Packard PDMS System Description, 1982, pp. i-1 thru 1-34, 10-1 thru 10-5, 15-1, 2.

Hall, J. D. "Implementation of laboratory paint formula calculations on on an Apple II microcomputer", *J. Coatings Tech.*, vol. 59, No. 749, Jun. 1987, 31-36.

Reitter, C. "Buying software for paintmaking", *Am. Paint J.*, vol. 69, No. 57, Jul. 1985, 14, 16, 18.

Banov, A. et al. "Computers", *Am. Paint J.*, vol. 67, No. 5, Aug. 1982, 45-64.

2-page brochure entitled BASF & Counter Point Computer Systems Presents the Color Information System R—M Diamont System 88 (brochure ID AD-508 40188PCC) (Exhibit A & B), date unknown.

Brochure entitled Data Track Color Information System R-M (Exhibit C), date unknown.

Sample printout of BASF Corporation INMONT Division for ABC Body Shop dated Apr. 19, 1988 (Exhibit D).

*Primary Examiner*—Clark A. Jablon
*Attorney, Agent, or Firm*—Merchant, Gould, Smith, Edell, Welter & Schmidt

[57] ABSTRACT

A formula retrieval and management system (200) for retrieving paint formulas, creating paint formulas, updating paint inventory, and providing miscellaneous reports. The system presents a' ruled scale representation of actual sizes on a display, including a bar portion extendable along the ruled scale representation. User movement of the bar portion selects the desired paint size. Furthermore, multiple variants of a formula can be stored and selected from a special menu. When the system program is used for the first time in a given day, various types of reports of the previous day's paint usage are made available.

11 Claims, 178 Drawing Sheets

DDL24159

'75 INTERNATIONAL TRUCK

BUCKSKIN 4408

| CODE | COLOR | PINT | 1 QUART | 2 QUART | 3 QUART | GALLON |
|---|---|---|---|---|---|---|
| DMA315 | BROWN | 4 | 8 | 12 | 16 | 20 |
| 329 | YELLOW | 304 | 608 | 912 | 1216 | 1520 |
| 346 | BLACK | 584 | 1168 | 1752 | 2336 | 2920 |
| 311 | WHITE | 964 | 1928 | 2892 | 3856 | 4820 |
| 310 | CLEAR | 1044 | 2088 | 3132 | 4176 | 5220 |

DDL24162

'75 SAAB

SEPIA CRYSTAL YR-05

| CODE | COLOR | PINT | 1 QUART | 2 QUART | 3 QUART | GALLON |
|---|---|---|---|---|---|---|
| DMA309 | GREEN | 24 | 48 | 72 | 96 | 120 |
| 358 | BLACK | 104 | 208 | 312 | 416 | 520 |
| 316 | POLY | 224 | 448 | 672 | 896 | 1210 |
| 315 | BROWN | 664 | 1328 | 1992 | 2656 | 3320 |
| 310 | CLEAR | 994 | 1988 | 2982 | 3976 | 4970 |

DDL24165

FIG. 5

```
11/05/87                CoverUP (c) System              12:47 pm
                           CATFRAMS
┌─[ Master Menu ]─────────────────────────────────────────────┐
│                                                             │
│  ) CATFRAMS                                                 │
│  RESET DATE/TIME                                            │
│  UTILITY MENU                                               │
│  INSTALL CATFRAMS UPDATES                                   │
│  EXIT to the Operating System                               │
│                                                             │
└─────────────────────────────────────────────────────────────┘
```

F1  —  Item Notes                    SPACE BAR  —  Select Item
                                     RETURN     —  Execute Item
                                     ESCAPE     —  Previous Menu
                                                   Num Cap ———— YOUR COMPANY NAME ————
COMPUTERIZED AUTOMOTIVE TOPCOAT FORMULA RETRIEVAL AND MANAGEMENT SYSTEM

M A I N   M E N U

<1> PAINT FORMULA RETRIEVAL                <7>  MIXING COLOR INVENTORY STATUS LIST
<2> SPECIAL COLOR LIBRARY                  <8>  MIXING COLOR MOVEMENT REPORT
<3> PAINT AND MATERIAL COSTING             <9>  DAILY FORMULA FREQUENCY REPORT
<4> PRINT MIXING COLOR LABELS              <10> MONTHLY FORMULA FREQUENCY REPORT
<5> MIXING COLOR INVENTORY                 <11> SPECIAL COLOR LIBRARY REPORT
    MANAGEMENT                             <12> SYSTEM UTILITIES AND CONFIGURATION
<6> MIXING COLOR REORDER REPORT

<0>  EXIT C A T F R A M  SYSTEM

Enter menu selection

———————————————VERSION 1.0F———————————————

© 1986 YADA SYSTEMS INC.

FIG. 6

=== DAILY FORMULA FREQUENCY REPORT ===

The data in the daily formula frequency file is from 10/22/87 and is at least one working day old.

Please specify what should be done with the data:

<1> Print and empty the daily formula frequency file.
<2> Print the daily formula frequency file and keep the daily formula frequency data.
<3> Keep but do not print the formula frequency data file.
<4> Empty the formula frequency file.

Enter daily summary report option (1-4):

© 1986 YADA SYSTEMS INC.

FIG. 7

```
==================== C A T F R A M S ====================
              VENDOR FORMULA RETRIEVAL

FORMULA #   COST ALT   QTY    SIZE          ADDITIONAL INFO

COLOR                                 RUSH (Y/N)
CAR                                      CODE
MESSAGE-1         ┌──────── SELECT VENDOR ────────┐
MESSAGE-2         │                               │    STANDARD SIZES
MESSAGE-3         │  1 — DUPONT FORMULA RETRIEVAL │  ┌────────┬─────────┐
                  │  2 — PPG INDUSTRIES FORMULA RETRIEVAL │ 3 QT │ GALLON │
MIX BASE          │  3 — ACME FORMULA RETRIEVAL   │  ├────────┼─────────┤
                  │  4 — R-M FORMULA RETRIEVAL    │  │        │         │
                  │  5 — GLASURIT FORMULA RETRIEVAL│ │        │         │
                  │  6 — SHERWIN-WILLIAMS FORMULA RETRIEVAL │
                  │  7 — SEM FORMULA RETRIEVAL    │
                  │                               │
                  │       SELECTION:              │
                  └───────────────────────────────┘
```

© 1986 YADA SYSTEMS INC.

FIG. 8

VENDOR FORMULA RETRIEVAL

FORMULA #  COST ALT  QTY  SIZE  P/R PO/RO #  ADDITIONAL INFO

CUSTOMER ──── 260
COLOR
CAR                           RUSH (Y/N)
MESSAGE-1                     CODE
MESSAGE-2                     YEAR
MESSAGE-3

STANDARD SIZES

| MIX BASE | MIX BASE COLOR | PINT | QUART | 2 QT | 3 QT | GALLON |
|---|---|---|---|---|---|---|
|  |  |  |  |  |  |  |
|  |  |  |  |  |  |  |

© 1986 YADA SYSTEMS INC.

FIG. 9

```
═══════════ MULTIPLE FORMULAS DETECTED ═══════════
FORMULA #   ALT COST TYPE        COLOR              CAR

[1] FOR1234                      HOLLY GREEN        FORD
    MESSAGE #1 MUST BE CLEARCOATED                  CODE L,7D
    MESSAGE #2                                      YEAR
    MESSAGE #3

[2] FOR1234      ALT1            HOLLY GREEN        FORD
ST  MESSAGE #1 MUST BE CLEARCOATED                  CODE L,7D
    MESSAGE #2                                      YEAR
    MESSAGE #3

Enter Formula Number 1-2 [ ]          ESC TO EXIT
```

© 1986 YADA SYSTEMS INC.

FIG. 10

VENDOR FORMULA RETRIEVAL

```
FORMULA #    COST  ALT  QTY        SIZE    P/R  PO/RO #       ADDITIONAL INFO
FOR1234      [  ]  [ ]  [ 1 ]~260  [  ]    [P]  [      ]~260  [              ]
CUSTOMER     [              ]~260                 RUSH (Y/N) [N]
COLOR        [HOLLY GREEN   ]                     CODE [L, 7D]~260
CAR          [FORD          ]              ~260   YEAR [     ]
MESSAGE-1    MUST BE CLEARCOATED
MESSAGE-2    [                          ]
MESSAGE-3    [                          ]
```

STANDARD SIZES
[Pt, Qt, 2Qt, 3Qt, Gallon]

| MIX BASE | MIX BASE COLOR | PINT | 1 QT | 2 QT | 3 QT | GALLON |
|---|---|---|---|---|---|---|
| MT-60 | MIXING CLEAR | 119.0 | 238.5 | 477.5 | 716.0 | 955.0 |
| MT-70 | ACTIVATOR | 139.5 | 280.0 | 560.5 | 840.5 | 1121.0 |
| MB-351 | YELLOW GREEN | 307.5 | 1200.0 | 1234.0 | 1850.5 | 2468.0 |
| MB-212 | INDO BLUE | 369.5 | 1300.0 | 1483.0 | 2224.0 | 2966.5 |
| MB-961 | WHITE | 396.0 | 1400.0 | 1590.0 | 2384.5 | 3181.0 |
| MB-451 | BLACK | 404.5 | 1500.0 | 1624.5 | 2436.0 | 3250.0 |

© 1986 YADA SYSTEMS INC.

FIG. 11

VENDOR FORMULA RETRIEVAL

| FORMULA # | COST | ALT | QTY | SIZE | P/R | PO/RO # | ADDITIONAL INFO |
|---|---|---|---|---|---|---|---|
| [ 301 ] | [302] | [303] | [304] [ ] | 305 [ ] | [306] | [ 307 ] | 308 [310] |
| CUSTOMER | [ ] | | | [ ] | | | RUSH (Y/N) [ ] |
| COLOR | [ ] | | | [ ] | | | CODE 312 [ ] |
| CAR | [ ] | | | | | | YEAR 314 [ ] |
| MESSAGE-1 309 | | | | | | | |
| MESSAGE-2 311 | | | | | | | |
| MESSAGE-3 313 | | | | | | | |
| 315 | | | | | | | |
| 316 | | | | | | | |
| 317 | | | | | | | STANDARD SIZES 318 [ ] |

| MIX BASE | MIX BASE COLOR | PINT | QUART | 2 QT | 3 QT | GALLON |
|---|---|---|---|---|---|---|
| [319] | [320] | [321] | [322] | [323] | [324] | [325] |

© 1986 YADA SYSTEMS INC.

FIELD LEGEND

301 FORMULA NUMBER
302 FORMULA COST CODE
303 FORMULA ALTERNATIVE NUMBER
304 NUMBERS OF LABELS TO PRINT
305 AMOUNT OF PAINT TO MIX
306 PURCHASE OR REPAIR ORDER
307 PURCHASE OR REPAIR ORDER NUMBER
308 FORMULA ADDITIONAL INFORMATION ABOUT THE FORMULA
309 CUSTOMER NAME
310 RUSH ORDER
311 FORMULA COLOR OF PAINT
312 FORMULA OEM PAINT CODE NUMBER
313 FORMULA MAKE OF CAR
314 FORMULA YEAR OF CAR
315 FORMULA MESSAGE 1
316 FORMULA MESSAGE 2
317 FORMULA MESSAGE 3
318 FORMULA STANDARD SIZES FROM VENDOR
319 FORMULA MIXING BASE COLORS
320 FORMULA MIXING BASE COLOR DESC.
321 FORMULA PINT QUANTITY AMOUNTS
322 FORMULA QUART QUANTITY AMOUNTS
323 FORMULA 2-QUART QUANTITY AMOUNTS
324 FORMULA 3-QUART QUANTITY AMOUNTS
325 FORMULA GALLON QUANTITY AMOUNTS
326 MESSAGE STATUS AREA

© 1986 YADA SYSTEMS INC.

VENDOR FORMULA RETRIEVAL

```
FORMULA #    COST ALT   QTY  SIZE       P/R  PO/RO #   ADDITIONAL INFO
FOR1234      [ALT1]     1    [PINT   ]  ]P   [                        ]
CUSTOMER     [HOLLY GREEN              RUSH (Y/N) N
COLOR        FORD                      CODE L,7D
CAR                                    YEAR
MESSAGE-1 MUST BE CLEARCOATED
MESSAGE-2                                      STANDARD SIZES
MESSAGE-3                                 [Pt,Qt,2Qt,3Qt,Gallon]
```

| MIX BASE | MIX BASE COLOR | PINT  | MIX BASE | MIX BASE COLOR | PINT |
|----------|----------------|-------|----------|----------------|------|
| MT-60    | MIXING CLEAR   | 119.0 |          |                |      |
| MT-70    | ACTIVATOR      | 139.5 |          |                |      |
| MB-351   | YELLOW GREEN   | 307.5 |          |                |      |
| MB-212   | INDO BLUE      | 369.5 |          |                |      |
| MB-961   | WHITE          | 396.0 |          |                |      |
| MB-451   | BLACK          | 404.5 |          |                |      |
| MB-451   | BLACK          | 10.0  |          |                |      |

F10 TO PRINT LABEL

© 1986 YADA SYSTEMS INC.

FIG. 13

VENDOR FORMULA RETRIEVAL

FORMULA #   COST ALT   QTY      SIZE      P/R  PO/RO #      ADDITIONAL INFO
FOR1234         [    ]    1              ]P                [                        ]
CUSTOMER   [HOLLY GREEN                RUSH (Y/N) N
COLOR          FORD                     CODE L,7D
CAR                                     YEAR
MESSAGE-1  MUST BE CLEARCOA
MESSAGE-2
MESSAGE-3

```
          SELECT SIZE
          1 - PINT
          2 - QUART
          3 - 2 QUART
          4 - 3 QUART
          5 - GALLON
          6 - SPECIAL
          7 - BULK MIX

SELECTION < >
```

STANDARD SIZES
[Pt,Qt,2Qt,3Qt,Gallon]

| MIX BASE | MIX BASE COLOR | | 2 QT | 3 QT | GALLON |
|---|---|---|---|---|---|
| MT-60 | MIXING CLEAR | 396.0 | 477.5 | 716.0 | 955.0 |
| MT-70 | ACTIVATOR | 404.5 | 560.5 | 840.5 | 1121.0 |
| MB-351 | YELLOW GREEN | 1400.0 | 1234.0 | 1850.5 | 2468.0 |
| MB-212 | INDO BLUE | 1500.0 | 1483.0 | 2224.0 | 2966.5 |
| MB-961 | WHITE | | 1590.0 | 2384.5 | 3181.0 |
| MB-451 | BLACK | | 1624.5 | 2436.0 | 3250.0 |

© 1986 YADA SYSTEMS INC.

FIG. 14

Ref. Cost = 10.83          VENDOR FORMULA RETRIEVAL

```
FORMULA #      COST ALT   QTY      SIZE         P/R  PO/RO #    ADDITIONAL INFO
FOR1234        [     ]    1        [SPECIAL     ]P              [                ]
CUSTOMER       [HOLLY GREEN               PINT (+)          RUSH (Y/N) N
COLOR          FORD                       ]                 CODE L,7D
CAR            MUST BE CLEARCOATED                          YEAR
MESSAGE-1                                                              260
MESSAGE-2                                             STANDARD SIZES
MESSAGE-3                                          [Pt,Qt,2Qt,3Qt,Gallon]
```

| MIX BASE | MIX BASE COLOR | PINT | 1 QT | 2 QT | 3 QT | [* SPCL *] |
|---|---|---|---|---|---|---|
| MT-60  | MIXING CLEAR  | 119.0 | 238.5  | 477.5  | 716.0  | 142.8 |
| MT-70  | ACTIVATOR     | 139.5 | 280.0  | 560.5  | 840.5  | 167.4 |
| MB-351 | YELLOW GREEN  | 307.5 | 1200.0 | 1234.0 | 1850.5 | 369.0 |
| MB-212 | INDO BLUE     | 369.5 | 1300.0 | 1483.0 | 2224.0 | 443.4 |
| MB-961 | WHITE         | 396.0 | 1400.0 | 1590.0 | 2384.5 | 475.2 |
| MB-451 | BLACK         | 404.5 | 1500.0 | 1624.5 | 2436.0 | 485.4 |

F10 TO PRINT LABEL

© 1986 YADA SYSTEMS INC.

```
Ref. Cost = 10.83              VENDOR FORMULA RETRIEVAL

FORMULA #   COST  ALT   QTY    SIZE    P/R  PO/RO #    ADDITIONAL INFO
MU1245      [    ]     1     [SPECIAL  ] P            [                    ]
CUSTOMER
COLOR
CAR
MESSAGE-1            ┌─────────────────────────────────────┐
MESSAGE-2            │         B U L K   M I X             │
MESSAGE-3            │                                     │
                     │  ENTER NUMBER OF GALLONS TO MIX 0.15│         RD SIZES
                     │                                     │        [ ,3Qt,Gallon]
MIX BASE             │  SPECIAL MIX INSTRUCTIONS:          │    QT  | * SPCL *
                     │    MIX THIS IN A PINT CAN.          │
MT-60                │                                     │   6.0  |  142.8
MT-70                │                                     │   0.5  |  167.4
MB-351               │          PRESS F10 TO CONTINUE      │   0.5  |  369.0
MB-212               └─────────────────────────────────────┘   4.0  |  443.4
MB-961                                                         4.5  |  475.2
MB-451                                                         6.0  |  485.4

F10 TO PRINT LABEL

© 1986 YADA SYSTEMS INC.
```

Ref. Cost = 9.42    VENDOR FORMULA RETRIEVAL

FORMULA #   COST ALT    QTY    SIZE        P/R  PO/RO #    ADDITIONAL INFO
FOR1234                 1      [BULK MIX ]  ] P             [              ]
CUSTOMER    [HOLLY GREEN              ]              RUSH (Y/N) N
CAR         FORD                                     CODE L,7D
COLOR                                                YEAR
MESSAGE-1   MUST BE CLEARCOATED
MESSAGE-2
MESSAGE-3

STANDARD SIZES
[Pt,Qt,2Qt,3Qt,Gallon]

| MIX BASE | MIX BASE COLOR | PINT | 1 QT | 2 QT | 3 QT | * BULK * |
|----------|----------------|------|------|------|------|----------|
| MT-60    | MIXING CLEAR   | 119.0 | 238.5 | 477.5 | 716.0 | 143.3 |
| MT-70    | ACTIVATOR      | 139.5 | 280.0 | 560.5 | 840.5 | 168.2 |
| MB-351   | YELLOW GREEN   | 307.5 | 1200.0 | 1234.0 | 1850.5 | 370.2 |
| MB-212   | INDO BLUE      | 369.5 | 1300.0 | 1483.0 | 2224.0 | 445.0 |
| MB-961   | WHITE          | 396.0 | 1400.0 | 1590.0 | 2384.5 | 477.2 |
| MB-451   | BLACK          | 404.5 | 1500.0 | 1624.5 | 2436.0 | 487.5 |

F10 TO PRINT LABEL

© 1986 YADA SYSTEMS INC.

FIG. 18

C A T F R A M S
SPECIAL TINTING OF FORMULAS

FORMULA #   COST ALT   QTY   SIZE          ADDITIONAL INFO

COLOR
CAR                                RUSH (Y/N)
MESSAGE-1                          CODE
MESSAGE-2
MESSAGE-3

┌─────────── SELECT VENDOR ───────────┐
│                                     │
│   1 – DUPONT SPECIAL TINT           │
│   2 – PPG INDUSTRIES SPECIAL TINT   │
│   3 – ACME SPECIAL TINT             │
│   4 – R-M SPECIAL TINT              │
│   5 – GLASURIT SPECIAL TINT         │
│   6 – SHERWIN-WILLIAMS SPECIAL TINT │
│   7 – SEM SPECIAL TINT              │
│                                     │
│            SELECTION:               │
│                                     │
└─────────────────────────────────────┘

MIX BASE    MIX          STANDARD SIZES
                         3 QT    GALLON

© 1986 YADA SYSTEMS INC.

FIG. 21

VENDOR SPECIAL FORMULA TINTING

FORMULA #   COST   ALT   SIZE   CODE
                                YEAR

COLOR
CAR
MESSAGE-1
MESSAGE-2
MESSAGE-3                       STANDARD SIZES

| MIX BASE | MIX BASE COLOR | | MIX BASE | MIX BASE COLOR | |
|---|---|---|---|---|---|
|  |  |  |  |  |  |
|  |  |  |  |  |  |
|  |  |  |  |  |  |

© 1986 YADA SYSTEMS INC.

FIG. 22

VENDOR SPECIAL FORMULA TINTING

FORMULA #   COST  ALT     SIZE
FOR1234           [              ]

COLOR      HOLLY GREEN           CODE L,7D
CAR        FORD                  YEAR
MESSAGE-1  MUST BE CLEARCOATED         STANDARD SIZES
MESSAGE-2                        [Pt,Qt,2Qt,3Qt,Gallon]
MESSAGE-3

| MIX BASE | MIX BASE COLOR | MIX BASE | MIX BASE COLOR |
|---|---|---|---|
|  |  |  |  |
|  |  |  |  |

© 1986 YADA SYSTEMS INC.

FIG. 23

VENDOR SPECIAL FORMULA TINTING

FORMULA #    COST   ALT'    SIZE

═══ CREATE/EDIT/DELETE SPECIAL TINT FORMULA RECORDS ═══

CO    The formula specified is already a special tint formula.
CA    Do you want to edit the specified formula, create a new
ME    special tint formula, or delete the special tint formula?
ME
ME    Enter 'E' for edit, 'N' for create new record, or 'D'
       for delete special tint record (E/N/D) E

MIX B                                                PINT

MT-60    YELLOW GREEN
MT-70    INDO BLUE
MB-351    WHITE          307.5
MB-212    BLACK          369.5
MB-961                    396.0
MB-451                    404.5
MB-451                     10.0

© 1986 YADA SYSTEMS INC.

FIG. 24

VENDOR SPECIAL FORMULA TINTING

FORMULA #   COST   ALT   SIZE
FOR9999

COLOR
CAR
MESSAG      ═══════ FORMULA NOT FOUND ═══════
MESSAG         The specfied formula number FOR9999 was not found
MESSAG         in the R-M or special tint database file.

SHOULD THE FORMULA BE ADDED AS A SPECIAL TINT? (Y/N)  N

MIX BASE

FIG. 25

VENDOR SPECIAL FORMULA TINTING

FORMULA #     COST  ALT     SIZE              CODE
FOR9999                     [        ]        YEAR

COLOR
CAR
MESSAGE-1
MESSAGE-2                                     STANDARD SIZES
MESSAGE-3                                     [Not specified]

| MIX BASE | MIX BASE COLOR | | MIX BASE | MIX BASE COLOR |
|---|---|---|---|---|
|  |  |  |  |  |
|  |  |  |  |  |
|  |  |  |  |  |

© 1986 YADA SYSTEMS INC.

FIG. 26

VENDOR SPECIAL FORMULA TINTING

FORMULA #  COST  ALT        SIZE        CODE  [ 356 ]
[ 351 ]    [352] [353]      [ 354 ]     YEAR  [ 358 ]
                                         STANDARD SIZES
COLOR      [                          ]  [ 362 ]
CAR        [ 355                      ]
MESSAGE-1  [ 357                      ]
MESSAGE-2  [ 359                      ]
MESSAGE-3  [ 360                      ]
           [ 361                      ]

| MIX BASE | MIX BASE COLOR | MIX BASE | MIX BASE COLOR |
|---|---|---|---|
| [363] | [364] | [365] | |

[366]   © 1986 YADA SYSTEMS INC.

FIELD LEGEND

351 FORMULA NUMBER
352 FORMULA COST CODE
353 FORMULA ALTERNATIVE NUMBER
354 FORMULA SIZE
355 FORMULA COLOR
356 FORMULA COLOR CODE
357 FORMULA MAKE OF CAR
358 FORMULA YEAR OF CAR
359 FORMULA MESSAGE 1
360 FORMULA MESSAGE 2
361 FORMULA MESSAGE 3
362 FORMULA STANDARD SIZES FROM VENDOR
363 FORMULA MIXING BASE COLORS
364 FORMULA MIXING BASE COLOR DESC.
365 FORMULA MIXING BASE COLOR AMOUNTS
366 MESSAGE STATUS AREA

© 1986 YADA SYSTEMS INC.

```
VENDOR SPECIAL FORMULA TINTING

FORMULA #        COST    ALT       SIZE                      CODE L,7D
FOR1234                                                       YEAR
COLOR     HOLLY GREEN                                         STANDARD SIZES
CAR       FORD                                                [Pt,Qt,2Qt,3Qt,Gallon]
MESSAGE-1 MUST BE CLEAR         ┌──────────────────┐
MESSAGE-2                       │ [ SELECT SIZE  ] │
MESSAGE-3                       │  1 - PINT        │
                                │  2 - QUART       │
                                │  3 - 2 QUART     │
                                │  4 - 3 QUART     │
                                │  5 - GALLON      │
                                │  6 - SPECIAL     │
                                │  7 - NO FORMULA  │
                                │                  │
                                │  SELECTION < >   │
                                └──────────────────┘

MIX BASE      MIX BASE COLOR                              MIX BASE COLOR
```

© 1986 YADA SYSTEMS INC.

FIG. 28

VENDOR SPECIAL FORMULA TINTING

FORMULA #    COST   ALT    SIZE
FOR1234                   [PINT    ]

COLOR       HOLLY GREEN                   CODE L,7D
CAR         FORD                          YEAR
MESSAGE-1   MUST BE CLEARCOATED
MESSAGE-2                                 STANDARD SIZES
MESSAGE-3                                 [Pt,Qt,2Qt,3Qt,Gallon]

| MIX BASE | MIX BASE COLOR | PINT  | MIX BASE | MIX BASE COLOR | PINT |
|----------|----------------|-------|----------|----------------|------|
| MT-60    | MIXING CLEAR   | 119.0 |          |                |      |
| MT-70    | ACTIVATOR      | 139.5 |          |                |      |
| MB-351   | YELLOW GREEN   | 307.5 |          |                |      |
| MB-212   | INDO BLUE      | 369.5 |          |                |      |
| MB-961   | WHITE          | 396.0 |          |                |      |
| MB-451   | BLACK          | 404.5 |          |                |      |

F10 TO SAVE SPECIAL TINT

© 1986 YADA SYSTEMS INC.

FIG. 29

VENDOR SPECIAL FORMULA TINTING

FORMULA #    COST    ALT      SIZE                       D SIZES  
FOR1234                 [SPECIAL    ]                  3Qt,Gallon]  
                              QUART (+)                R         SPECIAL COLOR      HOLLY GREEN              CODE L,7D  
CAR         FORD                          YEAR  
MESSAGE-1   MUST BE CLEARCOATED  
MESSAGE-2  
MESSAGE-3

```
┌─────────────────────────────────────────────────┐
│        SPECIAL FORMULA TINT MIXTURE SCALE       │
│                                                 │
│    0       25        50        75       100     │
│    |███████|─────────|─────────|─────────|      │
│    331↗   ↖329                         330↘     │
│         332                                     │
│                                          27.50  │
│     PT    QT         2QT       3QT      GAL     │
│     QUART (+)        PERCENT OF GALLON          │
└─────────────────────────────────────────────────┘
```

| MIX BASE |   |
|---|---|
| MT-60 | M |
| MT-70 | A |
| MB-351 | Y |
| MB-212 | I |
| MB-961 | W |
| MB-451 | B |

F10 TO SAVE SPECIAL TINT

© 1986 YADA SYSTEMS INC.

FIG. 30

VENDOR SPECIAL FORMULA TINTING

FORMULA #   COST   ALT   SIZE
FOR1234               [SPECIAL   ]
                     QUART (+)

COLOR    HOLLY GREEN         CODE L,7D
CAR      FORD                YEAR
MESSAGE-1 MUST BE CLEARCOATED
MESSAGE-2                        STANDARD SIZES
MESSAGE-3               [Pt,Qt,2Qt,3Qt,Gallon]

| MIX BASE | MIX BASE COLOR | SPECIAL | MIX BASE | MIX BASE COLOR | SPECIAL |
|---|---|---|---|---|---|
| MT-60 | MIXING CLEAR | 262.4 | | | |
| MT-70 | ACTIVATOR | 308.0 | | | |
| MB-351 | YELLOW GREEN | 1320.0 | | | |
| MB-212 | INDO BLUE | 1430.0 | | | |
| MB-961 | WHITE | 1540.0 | | | |
| MB-451 | BLACK | 1650.0 | | | |

F10 TO SAVE SPECIAL TINT
© 1986 YADA SYSTEMS INC.

FIG. 31

VENDOR SPECIAL FORMULA TINTING

FORMULA #   COST   ALT   SIZE
MU1245                    [SPECIAL   ]
                         QUART (+)

COLOR    HOLLY GREEN          CODE L,7D
CAR      FORD                   YEAR
MESSAGE-1 MUST BE CLEARCOATED
MESSAGE-2                          STANDARD SIZES
MESSAGE-3                      [Pt,Qt,2Qt,3Qt,Gallon]

| MIX BASE | MIX BASE COLOR | SPECIAL | MIX BASE | MIX BASE COLOR | SPECIAL |
|---|---|---|---|---|---|
| MT-60  | MIXING CLEAR | 262.4  | | | 0.0 |
| MT-70  | ACTIVATOR    | 308.0  | | | 0.0 |
| MB-351 | YELLOW GREEN | 1320.0 | | | 0.0 |
| MB-212 | INDO BLUE    | 1430.0 | | | 0.0 |
| MB-961 | WHITE        | 1540.0 | | | 0.0 |
| MB-451 | BLACK        | 1660.0 | | | 0.0 |
| MB-961 | WHITE        | 1700.0 | | | 0.0 |
|        |              | 0.0    | | | 0.0 |
|        |              | 0.0    | | | 0.0 |

F10 TO SAVE SPECIAL TINT
© 1986 YADA SYSTEMS INC.

FIG. 32

VENDOR SPECIAL FORMULA TINTING

FORMULA #    COST · ALT    SIZE
MU1245                [SPECIAL    ]
                            QUART (+)

COLOR     HOLLY GREEN              CODE L,7D
CAR       FORD                       YEAR
MESSAGE-1 MUST BE CLEARCOATED
MESSAGE-2                              STANDARD SIZES
MESSAGE-3                         [Pt,Qt,2Qt,3Qt,Gallon]

| MIX BASE | MIX BASE COLOR | SPECIAL | MIX BASE | MIX BASE COLOR | SPECIAL |
|---|---|---|---|---|---|
| MT-60 | MIXING CLEAR | 262.4 | | | 0.0 |
| MT-70 | ACTIVATOR | 308.0 | | | 0.0 |
| MB-351 | YELLOW GREEN | 1320.0 | | | 0.0 |
| MB-212 | INDO BLUE | 1430.0 | | | 0.0 |
| MB-961 | WHITE | 1540.0 | | | 0.0 |
| MB-451 | BLACK | 1650.0 | | | 0.0 |
| MB-961 | WHITE | 1700.0 | | | 0.0 |
| MB-351 | YELLOW GREEN | 20.0 | | | 0.0 |
| | | 0.0 | | | |

F10 TO SAVE SPECIAL TINT
© 1986 YADA SYSTEMS INC.

FIG. 33

YOUR COMPANY NAME
COMPUTERIZED AUTOMOTIVE TOPCOAT FORMULA RETRIEVAL AND MANAGEMENT SYSTEM

PAINT/MATERIAL COSTING MENU

<0> RETURN TO C A T F R A M S MENU
<1> PAINT/MATERIAL COST CALCULATIONS
<2> PAINT ADDITIVES & CLEAR COAT MAINTENANCE
<3> PAINT & BODY SUPPLIES MAINTENANCE
<4> REFINISHER PRICE LIST MAINTENANCE
<5> PAINT/MATERIAL COST PER LABOR HOUR REPORT
<6> COST CALCULATION REPORT

Enter menu selection

© 1986 YADA SYSTEMS INC.

FIG. 34

PAINT/MATERIAL COSTING

| REF. # | FORMULA # | ALT | COST | SIZE | TYPE | OUNCES | COST |
|--------|-----------|-----|------|------|------|--------|------|
|        |           | [ ] | [ ]  | [ ]  |      |        |      |

```
SELECT PAINT/MATERIAL COST CALCULATION
     COST #    RO#      CUSTOMER NAME
  1.
  2.
  3.
  4.
  5.
  6.
  7.
  8.

N - NEW COST CALC.  #        R - FIND RO#
C - FIND CUSTOMER            D - DELETE COST CALC.

ENTER SELECTION : :
```

TOTAL COST       $
DESIRED MARKUP
SELL PRICE       $

© 1986 YADA SYSTEMS INC.

FIG. 35

CATFRAMS
PAINT FORMULA AND MATERIAL COSTING

FORMULA #   COST ALT   QTY   SIZE              ADDITIONAL INFO

COLOR
CAR                                     RUSH (Y/N)
MESSAGE-1                               CODE
MESSAGE-2
MESSAGE-3

———— SELECT VENDOR ————
1 – DUPONT PRODUCTS USED
2 – PPG INDUSTRIES PRODUCTS USED
3 – ACME PRODUCTS USED
4 – R-M PRODUCTS USED
5 – GLASURIT PRODUCTS USED
6 – SHERWIN-WILLIAMS PRODUCTS USED

SELECTION:

STANDARD SIZES

MIX BASE   MI          3 QT   GALLON

© 1986 YADA SYSTEMS INC.

FIG. 36

PAINT FORMULA AND MATERIAL COSTING

| FORMULA # | COST | ALT | QTY | SIZE | | ADDITIONAL INFO |

C  NAME
C  ADDRESS
M  CITY, ST ZIP                    BUS PHONE    (   )   -
M  COMMENT                         HOME PHONE   (   )   -
M
                                   CALC. DATE  11/06/87
RO#
MIX  COST #    2008        BODY SHOP HOURS  0.00  CLEANUP HOURS  0.00
                           PAINT HOURS      0.00  OTHER HOURS    0.00      4.70

AUTO MAKE             STATUS [O] (O/W/C) [ORIGINAL CALC.   ]          ----
     AUTO MODEL            CALCULATED BY                                   4.70
     AUTO YEAR             ESTIMATE TOTAL         0.00
                           START DATE             /  /
                           COMPLETION DATE        /  /

F10 TO CLOSE WINDOW

© 1986 YADA SYSTEMS INC.

FIG. 37

```
========== DUPONT PAINT/MATERIAL COSTING ==========
REF. #    FORMULA #    ALT      COST       SIZE        TYPE       OUNCES        COST
 2008                  [    ]   [    ]     [      ]                  0.0     $   0.00

PAINT CATALYST         NONE                                          0.0         0.00
PAINT REDUCER          NONE                                          0.0         0.00
CLEAR COAT             NONE                                          0.0         0.00
CLEAR COAT CATALYST    NONE                                          0.0         0.00
CLEAR COAT REDUCER     NONE                                          0.0         0.00

PAINT AND BODY SUPPLIES
P W/GREASE, METAL COND.        P    0.00      P FLEX-ADD,FISH EYE ADD.   P    0.00
P PRIMER SURFACER              P    0.00      P COMP-GLAZE,BUFF PAD      P    0.00
P THINNER FOR PRIMER           P    0.00      B BONDO,DURAGLASS          F    0.00
P 80D-GREEN,180A-GOLD 6"       P    0.00      B GRINDING DISCS           F    0.00
P TAPE 3/4"                    P    0.00      B 8" DISC, 3X17 ABRASIVE   F    0.00
P MASKING PAPER,12"-750'       P    0.00      O WELDING SUPPLIES         F    0.00
P SEALER- READY TO SPRAY       P    0.00      B ROCKER SCHUTZ, U/COAT    F    0.00
P ACRLY-RED PUTTY              P    0.00      C RAG,RAZOR BL,CAR COVER   F    3.20
P TACK CLOTH                   P    0.00      O SPRAY GUN CLEAN UP       F    1.50

TOTAL COST     $     4.70
                                    DESIRED MARKUP         0.0%
                                    SELL PRICE     $     4.70
```

© 1986 YADA SYSTEMS INC.

FIG. 38

```
======= DUPONT PAINT/MATERIAL COSTING =======
REF. #   FORMULA #    ALT      COST       SIZE   TYPE    OUNCES        COST
2008     31L          [    ]   [    ]                      0.0    $    0.00
                                      ┌─── SELECT SIZE ───┐
                                      │  1 - PINT         │
                                      │  2 - QUART        │
                                      │  3 - 2 QUART      │
                                      │  4 - 3 QUART      │
                                      │  5 - GALLON       │
                                      │  6 - SPECIAL      │
                                      │                   │
                                      │  SELECTION < >    │
                                      └───────────────────┘
                          PAINT A
PAINT CATALYST        NONE    P   0.                       E ADD.   P      0.00
PAINT REDUCER         NONE    P   0.                       PAD      P      0.00
CLEAR COAT            NONE    P   0.                                F      0.00
CLEAR COAT CATALYST   NONE    P   0.                                F      0.00
CLEAR COAT REDUCER    NONE    P   0.                                F      0.00
                                                       ASIVE        F      0.00
P W/GREASE, METAL COND.       P      0.00                           F      0.00
P PRIMER SURFACER             P      0.00    O WELDING SUPPLIES     F      0.00
P THINNER FOR PRIMER          P      0.00    B ROCKER SCHUTZ, U/COAT F     0.00
P 80D-GREEN,180A-GOLD 6"      P      0.00    C RAG,RAZOR BL,CAR COVER F    3.20
P TAPE 3/4"                   P      0.00    O SPRAY GUN CLEAN UP   F      1.50
P MASKING PAPER,12"-750'      P      0.00
P SEALER- READY TO SPRAY      P      0.00
P ACRLY-RED PUTTY             P      0.00           TOTAL COST  $   4.70
P TACK CLOTH                  P      0.00        DESIRED MARKUP     0.0%
                                                     SELL PRICE $   4.70

© 1986 YADA SYSTEMS INC.
```

FIG. 39

```
═══════════ DUPONT PAINT/MATERIAL COSTING ═══════════
REF. #   FORMULA #   ALT    COST    SIZE      TYPE      OUNCES     COST
2008     31L         [    ] [    ]  [QUART ]                        32.0   $   9.59
                                          ══════ SELECT TYPE ══════
PAINT CATALYST           NONE         1.   USE 2000   CENTARI POLYURETHANE
PAINT REDUCER            NONE         2.   USE A      CENTARI ACRYL ENAMEL
CLEAR COAT               NONE         3.   USE A-B/C  CENTARI BASECOAT
CLEAR COAT CATALYST      NONE         4.   USE C-B/C  CRONAR BASECOAT
CLEAR COAT REDUCER       NONE         5.   USE C-S/S  CRONAR SINGLE STAGE
                                      6.   USE D      DULUX ALKYD ENAMEL
                         PAINT        7.   USE L      LUCITE ACRYLIC LACQR
P  W/GREASE, METAL COND.    P    0    8.   USE L-B/C  LUCITE BASECOAT
P  PRIMER SURFACER          P    0    9.   USE U      IMRON POLYRTHN ENAML
P  THINNER FOR PRIMER       P    0
P  80D-GREEN,180A-GOLD 6"   P    0              SELECTION <   >
P  TAPE 3/4"                P    0
P  MASKING PAPER,12"-750'   P    0
P  SEALER- READY TO SPRAY   P    0.00  C RAG,RAZOR BL,CAR COVER F    3.20
P  ACRLY-RED PUTTY          P    0.00  O SPRAY GUN CLEAN UP       F    1.50
P  TACK CLOTH               P

TOTAL COST      $   14.29
                                             DESIRED MARKUP       0.0%
                                             SELL PRICE      $   14.29
```

© 1986 YADA SYSTEMS INC.

FIG. 40

```
══════════════ DUPONT PAINT/MATERIAL COSTING ══════════════
REF. #   FORMULA #   ALT   COST   SIZE      TYPE   OUNCES   COST
2008     31L         [  ]  [  ]   [QUART]   ] L    32.0   $ 9.59

PAINT CATALYST          NONE                        0.0     0.00
PAINT REDUCER           NONE                        0.0     0.00
CLEAR COAT              NONE                        0.0     0.00
CLEAR COAT CATALYST     NONE                        0.0     0.00
CLEAR COAT REDUCER      NONE                        0.0     0.00
════ F10 TO SKIP TO PAINT & BODY SUPPLIES ════
         ┌──── CATALYST SELECTION MENU ────┐
P W/GREASE, MET                              ADD. P    1.88
P PRIMER SURFAC │ 0. NO CATALYST USED       D    P    2.40
P THINNER FOR P │ 1. NONE                        F    0.00
P 80D-GREEN,180 │                                F    0.00
P TAPE 3/4"     │        SELECT CATALYST    IVE  F    0.00
P MASKING PAPER │                                F    0.00
P SEALER- READY │                           OAT  F    0.00
P ACRLY-RED PUT └─────────────────────────┘ OVER F    3.20
P TACK CLOTH             P     0.14    O SPRAY GUN CLEAN UP  1.50

TOTAL COST    $  32.79
                                    DESIRED MARKUP    0.0%
                                    SELL PRICE    $  32.79

© 1986 YADA SYSTEMS INC.
```

FIG. 41

```
DUPONT PAINT/MATERIAL COSTING
REF. #   FORMULA #    ALT      COST    SIZE     TYPE    OUNCES      COST
2008    31L          [    ]   [ ]    [QUART]   ]L       32.0    $   9.59

PAINT CATALYST           NONE                            0.0         0.00
PAINT REDUCER            NONE                            0.0         0.00
CLEAR COAT               NONE                            0.0         0.00
CLEAR COAT CATALYST      NONE                            0.0         0.00
CLEAR COAT REDUCER       NONE                            0.0         0.00
       F10 TO SKIP TO PAINT & BODY SUPPLIES
              ┌─ REDUCER SELECTION MENU ──────────────┐
P W/GREASE, MET│                                       │ADD.  P     1.88
P PRIMER SURFAC│  0. NO REDUCER USED                   │ D    P     2.40
P THINNER FOR P│  1. 3608S                             │      F     0.00
P 80D-GREEN,180│  2. 3613S                             │      F     0.00
P TAPE 3/4"    │  3. 3661S                             │IVE   F     0.00
P MASKING PAPER│  4. 3602S                             │      F     0.00
P SEALER- READY│  5. 3696S                             │OAT   F     0.00
P ACRLY-RED PUT│  6. 3979S                             │OVER  F     3.20
P TACK CLOTH   │                                       │      F     1.50
               │        SELECT REDUCER                 │
               └───────────────────────────────────────┘  $  32.79
                                                             0.0%
                                                          $  32.79

© 1986 YADA SYSTEMS INC.
```

FIG. 42

```
┌─────────────────────────────────────────────────────────────────────┬──────────────────────┐
│              DUPONT PAINT/MATERIAL COSTING                          │                      │
│ REF. #   FORMULA #    ALT   COST   SIZE    TYPE   OUNCES    COST    │                      │
│ 2008  31L             [  ]  [  ]  [QUART]  ] L     32.0  $   9.59   │                      │
│                                                                     │                      │
│   PAINT CATALYST     NONE                           0.0      0.00   │                      │
│   PAINT REDUCER      3608S                         48.0      2.62   │                      │
│   CLEAR COAT         NONE                           0.0      0.00   │                      │
│   CLEAR COAT CATALYST NONE                          0.0      0.00   │                      │
│   CLEAR COAT REDUCER NONE                           0.0      0.00   │                      │
│        F10 TO SKIP TO PAINT & BODY SUPPLIES                         │                      │
│   ┌──────── CLEAR COAT SELECTION MENU ────────┐                     │                      │
│ P W/GREASE, MET │                             │          ADD.  P   1.88 │                 │
│ P PRIMER SURFAC │ 0.  NO CLEAR COAT USED      │               P   2.40 │                 │
│ P THINNER FOR P │ 1.  380S                    │               F   0.00 │                 │
│ P 80D-GREEN,180 │ 2.  580S                    │               F   0.00 │                 │
│ P TAPE 3/4"     │              SELECT CLEAR COAT│       IVE   F   0.00 │                 │
│ P MASKING PAPER │                             │          OAT  F   0.00 │                 │
│ P SEALER- READY │                             │          OVER F   3.20 │                 │
│ P ACRLY-RED PUT └─────────────────────────────┘               F   1.50 │                 │
│ P TACK CLOTH                                                        │                      │
│                                                     TOTAL COST   $  35.42 │               │
│                                                   DESIRED MARKUP     0.0%│               │
│                                                      SELL PRICE  $  35.42 │               │
└─────────────────────────────────────────────────────────────────────┴──────────────────────┘
```

© 1986 YADA SYSTEMS INC.

FIG. 43

```
╔══════════════════ DUPONT PAINT/MATERIAL COSTING ══════════════════╗
  REF. #   FORMULA #    ALT    COST   SIZE      TYPE   OUNCES    COST
  2008       31L                [ ]  [ ] [QUART]  ] L    32.0  $  9.59

PAINT CATALYST      NONE                                0.0     0.00
  PAINT REDUCER       3608S                               48.0     2.62
  CLEAR COAT          380S                                32.0     7.87
  CLEAR COAT CATALYST NONE                                 0.0     0.00
  CLEAR COAT REDUCER  NONE                                 0.0     0.00
 ═══════ F10 TO SKIP TO PAINT & BODY SUPPLIES ═══════
  ┌─────── CLEAR COAT CATALYST SELECTION MENU ───────┐ ADD.  P   1.88
 P W/GREASE, MET                                      D     P   2.40
 P PRIMER SURFAC │ 0.  NO CLEAR COAT CATALYST USED  │       F   0.00
 P THINNER FOR P │ 1.  NONE (380S)                  │       F   0.00
 P 80D-GREEN,180 │ 2.  582S (580S)                  │ IVE   F   0.00
 P TAPE 3/4"     │                                  │       F   0.00
 P MASKING PAPER │      SELECT CLEAR COAT CATALYST  │ OAT   F   0.00
 P SEALER- READY │                                  │ OVER  F   3.20
 P ACRLY-RED PUT └──────────────────────────────────┘       F   1.50
 P TACK CLOTH

TOTAL COST   $    43.29
                                       DESIRED MARKUP      0.0%
                                       SELL PRICE   $    43.29

© 1986 YADA SYSTEMS INC.

FIG. 44
```

```
═════════════ DUPONT PAINT/MATERIAL COSTING ═════════════
REF. #   FORMULA #    ALT    COST   SIZE        TYPE    OUNCES       COST
2008      31L         [   ]  [   ]  [QUART   ]  ] L      32.0     $   9.59

PAINT CATALYST         NONE                               0.0         0.00
PAINT REDUCER          3608S                             48.0         2.62
CLEAR COAT             380S                              32.0         7.87
CLEAR COAT CATALYST    NONE (380S)                        0.0         0.00
CLEAR COAT REDUCER     NONE                               0.0         0.00
      F10 TO SKIP TO PAINT & BODY SUPPLIES
  ┌─────── CLEAR COAT REDUCER SELECTION MENU ───────┐
P W/GREASE, MET                                     │ ADD.  P    1.88
P PRIMER SURFAC │ 0.  NO CLEAR COAT REDUCER USED    │   D   P    2.40
P THINNER FOR P │ 1.  3608S  (380S)                 │       F    0.00
P 80D-GREEN,180 │ 2.  3661S  (380S)                 │       F    0.00
P TAPE 3/4"     │ 3.  3602S  (380S)                 │ IVE   F    0.00
P MASKING PAPER │ 4.  8575S  (580S)                 │       F    0.00
P SEALER- READY │ 5.  8585S  (580S)                 │ OAT   F    0.00
P ACRLY-RED PUT │ 6.  8100S  (580S)                 │ OVER  F    3.20
P TACK CLOTH    │                                   │       F    1.50
                │      SELECT CLEAR COAT REDUCER    │
                └───────────────────────────────────┘  $  43.29
                                                          0.0%
                                                       $  43.29

© 1986 YADA SYSTEMS INC.

FIG. 45
```

```
         DUPONT PAINT/MATERIAL COSTING
REF. #  FORMULA #     ALT    COST    SIZE        TYPE     OUNCES    COST
2008    31L           [   ] [   ]  [QUART  ]  L            32.0   $  9.59

PAINT CATALYST        NONE                                  0.0      0.00
PAINT REDUCER         3608S                                48.0      2.62
CLEAR COAT            380S                                 32.0      7.87
CLEAR COAT CATALYST   NONE (380S)                           0.0      0.00
CLEAR COAT REDUCER    3608S (380S)                         72.0      3.94

PAINT AND BODY SUPPLIES
P W/GREASE, METAL COND.      P 0.98   P FLEX-ADD,FISH EYE ADD.  P    1.88
P PRIMER SURFACER            P 3.88   P COMP-GLAZE, BUFF PAD    P    2.40
P THINNER FOR PRIMER         P 0.85   B BONDO, DURAGLASS        F    0.00
P 80D-GREEN,180A-GOLD 6"     P 2.64   B GRINDING DISCS          F    0.00
P TAPE 3/4"                  P 1.19   B 8" DISC,3X17 ABRASIVE   F    0.00
P MASKING PAPER,12"-750'     P 0.82   O WELDING SUPPLIES        F    0.00
P SEALER- READY TO SPRAY     P 3.16   B ROCKER SCHUTZ, U/COAT   F    0.00
P ACRLY-RED PUTTY            P 0.57   C RAG,RAZOR BL,CAR COVER  F    3.20
P TACK CLOTH                 P 0.14   O SPRAY GUN CLEAN UP      F    1.50

TOTAL COST    $      47.23
                                          DESIRED MARKUP            0.0%
     F10 TO SAVE AND/OR PRINT                   SELL PRICE  $      47.23
```

© 1986 YADA SYSTEMS INC.

FIG. 46

DUPONT PAINT/MATERIAL COSTING

| REF. # | FORMULA # | ALT | COST | SIZE | TYPE | OUNCES | COST |
|---|---|---|---|---|---|---|---|
| 2008 | 31L | | [ ] | [ ] [QUART] | ] L | | $ 9.59 |
| PAINT CATALYST | | NONE | | | | 0.0 | 0.00 |
| PAINT REDUCER | | 3608S | | | | 48.0 | 2.62 |
| CLEAR COAT | | 380S | | | | 32.0 | 7.87 |
| CLEAR COAT CATALYST | | NONE (380S) | | | | 0.0 | 0.00 |
| CLEAR COAT REDUCER | | 3608S (380S) | | | | 72.0 | 3.94 |

PAINT AND BODY SUPPLIES

| | | | | | | |
|---|---|---|---|---|---|---|
| P | W/GREASE, METAL COND. | P | 0.98 | P | FLEX-ADD,FISH EYE ADD. | P | 1.88 |
| P | PRIMER SURFACER | P | 3.88 | P | COMP-GLAZE,BUFF PAD | P | 2.40 |
| P | THINNER FOR PRIMER | P | 0.85 | B | BONDO,DURAGLASS | F | 0.00 |
| P | 80D-GREEN,180A-GOLD 6" | P | 2.64 | B | GRINDING DISCS | F | 0.00 |
| P | TAPE 3/4" | P | 1.19 | B | 8" DISC, 3X17 ABRASIVE | F | 0.00 |
| P | MASKING PAPER,12"-750' | P | 0.82 | O | WELDING SUPPLIES | F | 0.00 |
| P | SEALER- READY TO SPRAY | P | 3.16 | B | ROCKER SCHUTZ, U/COAT | F | 0.00 |
| P | ACRLY-RED PUTTY | P | 0.57 | C | RAG,RAZOR BL,CAR COVER | F | 3.20 |
| P | TACK CLOTH | P | 0.14 | O | SPRAY GUN CLEAN UP | F | 1.50 |

|  |  |
|---|---|
| TOTAL COST | $ 47.23 |
| DESIRED MARKUP | 10 . % |
| SELL PRICE | $ 47.23 |

F10 TO SAVE AND/OR PRINT

© 1986 YADA SYSTEMS INC.

FIG. 47

```
═══════════════ DUPONT PAINT/MATERIAL COSTING ═══════════════
REF. #   FORMULA #    ALT     COST    SIZE     TYPE   OUNCES     COST
2008     31L          [   ] [   ]    [QUART ]   L      32.0    $  9.59

PAINT CATALYST    NONE                                  0.0       0.00
PAINT REDUCER     3608S                                48.0       2.62
C ┌─────── SAVE AND PRINT INFORMATION? ───────┐
C │                                            │
C │   Permanently save to disk this cost calculation? (Y/N) : Y
  │                                            │
P │                                            │
P │   Print this cost calculation? (Y/N) : Y  │
P │                                            │
P └────────────────────────────────────────────┘
P  TAPE 3/4"                     P   1.19    B  8" DISC,3X17 ABRASIVE   F   0.00
P  MASKING PAPER,12"-750'        P   0.82    O  WELDING SUPPLIES        F   0.00
P  SEALER- READY TO SPRAY        P   3.16    B  ROCKER SCHUTZ, U/COAT   F   0.00
P  ACRLY-RED PUTTY               P   0.57    C  RAG,RAZOR BL,CAR COVER  F   3.20
P  TACK CLOTH                    P   0.14    O  SPRAY GUN CLEAN UP      F   1.50

TOTAL COST    $  47.23
                                              DESIRED MARKUP   10.0%
                                              SELL PRICE    $  51.96
═══════════════════════════════════════════════════════════════
F10 TO SAVE AND/OR PRINT
© 1986 YADA SYSTEMS INC.
```

FIG. 48

ELIZABETH REICHEL
4553 35TH AVE N
MINNEAPOLIS, MN 55414
HOME (612) 854-6960
WORK (612) 925-8874
AUTO: HONDA CIVIC 83
CUST CALC#: 1017  RO# : 2017

— 341

ELIZABETH REICHEL
4553 35TH AVE N
MINNEAPOLIS, MN 55414
HOME (612) 854-6960
WORK (612) 925-8874
AUTO: HONDA CIVIC 83
CUST CALC#: 1017  RO# : 2017

— 341

ELIZABETH REICHEL
4553 35TH AVE N
MINNEAPOLIS, MN 55414
HOME (612) 854-6960
WORK (612) 925-8874
AUTO: HONDA CIVIC 83
CUST CALC#: 1017  RO# : 2017

— 341

YOUR COMPANY NAME

| REF# | TYPE FORMULA# | ALT | COST SIZE | OUNCES | COST |
|---|---|---|---|---|---|
| 2017 | 84- 84-33905 | Y | 2 QUART | 64.0 | $ 36.30 |
| PAINT CATALYST | 696 | | | 8.0 | 10.07 |
| PAINT REDUCER | 307 | | | 96.0 | 5.02 |
| CLEAR COAT | 697 | | | 144.0 | 36.11 |
| CLEAR COAT CATALYST | 696 (697) | | | 9.0 | 11.33 |
| CLEAR COAT REDUCER | 273 (697) | | | 2.0 | 0.32 |

PAINT AND BODY SHOP SUPPLIES

| | | | |
|---|---|---|---|
| P SEALER [GAL] | 6.31 | P FLEX-ADD,FISH EYE ADD. | 2.51 |
| P PRIMER [GAL] | 7.76 | C COMP-GLAZE,BUFF PAD | 4.80 |
| P PRIMER THINNER [GAL] | 1.70 | B BONDO,DURAGLASS | |
| P W/GREASE,METAL COND | 1.96 | B GRINDING DISCS | |
| P TACK RAG | 0.27 | B 8" DISC,3X17 ABRASIVE | |
| P 3/4" TAPE [60' ROLL] | 3.28 | O WELDING SUPPLIES | |
| P 12" MASK PAPER [750'] | 1.63 | B ROCKER SCHUTZ,U/COAT | |
| P 80D-GREEN 180A-GOLD 6" | 5.28 | C RAG,RAZOR BL,CAR COVER | 3.20 |
| P ACRLY-RED PUTTY | 1.15 | O SPRAY GUN CLEAN UP | 1.50 |

TOTAL COST 139.63
DESIRED MARKUP 0.0%
SELL PRICE 139.63

— 343

© 1986 YADA SYSTEMS INC.

FIG. 49

PAINT/MATERIAL COSTING

| REF. # | FORMULA # | ALT | COST | SIZE | TYPE | OUNCES | COST |
|--------|-----------|-----|------|------|------|--------|------|
|        |           | [ ] | [ ]  | [ ]  |      |        |      |

SELECT PAINT/MATERIAL COST CALCULATION

| | COST # | RO# | CUSTOMER NAME |
|--|--------|-----|---------------|
|1.| 2006 | 123 | JOHN SMITH |
|2.| 2007 | | |
|3.| | | |
|4.| | | |
|5.| | | |
|6.| | | |
|7.| | | |
|8.| | | |

FIND CUSTOMER

ENTER CUSTOMER NAME: JOHN

TOTAL COST      $
DESIRED MARKUP
SELL PRICE      $

© 1986 YADA SYSTEMS INC.

FIG. 50

```
============================================================
                  PAINT/MATERIAL COSTING
============================================================
REF. #   FORMULA #   ALT   COST   SIZE   TYPE   OUNCES   COST
                     [ ]   [ ]    [ ]
         ┌─ SELECT PAINT/MATERIAL COST CALCULATION ─┐
         │           CUSTOMER NOT FOUND             │
         │ No cost calculations with                │
         │ customer SAM were                        │
         │ found in the job cost database.          │
         │ PRESS ANY KEY TO CONTINUE.               │
         └──────────────────────────────────────────┘

7.
   8.

N - NEW COST CALC.  #       R - FIND RO#
C - FIND CUSTOMER           D - DELETE COST CALC.

ENTER SELECTION :C:    (1-2, N/R/C/D)

TOTAL COST      $
                                   DESIRED MARKUP     $
                                      SELL PRICE      $
============================================================
```

© 1986 YADA SYSTEMS INC.

FIG. 51

```
═══════════ PAINT/MATERIAL COSTING ═══════════
REF. #   FORMULA #   ALT   COST   SIZE   TYPE   OUNCES   COST

FOUND CORRECT CUSTOMER? (Y/N)  Y

NAME          JOHN SMITH                BUS PHONE   (   )   -
ADDRESS       123 Any Street            HOME PHONE  (   )   -
CITY,ST ZIP   Any Town, ST   12345
COMMENT                                 CALC. DATE  11/06/87

RO#       123          BODY SHOP HOURS   0.00   CLEANUP HOURS   0.00
COST #    2006         PAINT HOURS       0.00   OTHER HOURS     0.00

AUTO MAKE              STATUS [O] (O/W/C) [ORIGINAL CALC. ]
AUTO MODEL             CALCULATED BY
AUTO YEAR              ESTIMATE TOTAL           0.00
                       START DATE           /   /
                       COMPLETION DATE      /   /

TOTAL COST      $
                                    DESIRED MARKUP
                                    SELL PRICE      $
```

© 1986 YADA SYSTEMS INC.

FIG. 52

```
============================ PAINT/MATERIAL COSTING ============================
REF. #   FORMULA #   ALT   COST   SIZE   TYPE   OUNCES   COST
                     [  ]  [   ]  [   ]

SELECT PAINT/MATERIAL COST CALCULATION
        COST #   RO#      CUSTOMER NAME
   1.   2006    123      JOHN SMITH
   2.   2007
   3.
   4.
   5.
   6.
   7.
   8.
                                                  TOTAL COST     $
   ================ FIND RO# ================   DESIRED MARKUP   $
                                                   SELL PRICE    $
   ENTER RO# TO FIND:
```

FIG. 53

PAINT/MATERIAL COSTING

| REF. # | FORMULA # | ALT | COST | SIZE | TYPE | OUNCES | COST |
|--------|-----------|-----|------|------|------|--------|------|
|        |           | [ ] | [ ]  | [ ]  |      |        |      |

─── SELECT PAINT/MATERIAL COST CALCULATION ───
            RO# NOT FOUND

No cost calculations with
RO# 1342332 were
found in the job cost database.
PRESS ANY KEY TO CONTINUE.

7.
8.

N - NEW COST CALC.    #        R - FIND RO#
C - FIND CUSTOMER              D - DELETE COST CALC.

ENTER SELECTION :R:    (1-2, N/R/C/D)

TOTAL COST    $
DESIRED MARKUP $
SELL PRICE    $

© 1986 YADA SYSTEMS INC.

FIG. 54

```
─────────────── PAINT/MATERIAL COSTING ───────────────
REF. #   FORMULA #   ALT   COST   SIZE   TYPE   OUNCES   COST
```

FOUND CORRECT RO# ? (Y/N) Y

NAME        JOHN SMITH                    BUS PHONE    (   )    -
ADDRESS     123 Any Street                HOME PHONE   (   )    -
CITY,ST ZIP Any Town, ST   12345
COMMENT                                   CALC. DATE   11/06/87

RO#      123           BODY SHOP HOURS    0.00   CLEANUP HOURS   0.00
COST #   2006          PAINT HOURS        0.00   OTHER HOURS     0.00

AUTO MAKE              STATUS  [O] (O/W/C)  [ORIGINAL CALC.  ]
AUTO MODEL             CALCULATED BY
AUTO YEAR              ESTIMATE TOTAL            0.00
                       START DATE              /   /
                       COMPLETION DATE         /   /

TOTAL COST       $
                                          DESIRED MARKUP   $
                                          SELL PRICE       $

© 1986 YADA SYSTEMS INC.

FIG. 55

```
┌─────────────────────────────────────────────────────────────────┐
│                    PAINT/MATERIAL COSTING                        │
│                                                                  │
│  REF. #   FORMULA #   ALT   COST   SIZE   TYPE   OUNCES   COST  │
│                       [  ]  [   ]  [   ]                         │
│                                                                  │
│    ┌─ SELECT PAINT/MATERIAL COST CALCULATION ─┐                  │
│    │  COST #    RO#      CUSTOMER NAME        │                  │
│    │                                          │                  │
│    │ 1.  2006   123    JOHN SMITH             │                  │
│    │ 2.  2007                                 │                  │
│    │ 3.                                       │                  │
│    │ 4.                                       │                  │
│    │ 5.                                       │                  │
│    │ 6.                                       │                  │
│    │ 7.                                       │                  │
│    │ 8.                                       │                  │
│    └──────────────────────────────────────────┘                  │
│    ┌─ DELETE COST CALCULATION ────────────────┐                  │
│    │                                          │                  │
│    │ ENTER COST CALC. #:                      │        TOTAL COST    $      │
│    │                                          │     DESIRED MARKUP   $      │
│    └──────────────────────────────────────────┘        SELL PRICE    $      │
│                                                                  │
└─────────────────────────────────────────────────────────────────┘
© 1986 YADA SYSTEMS INC.
```

FIG. 56

PAINT/MATERIAL COSTING

| REF. # | FORMULA # | ALT | COST | SIZE | TYPE | OUNCES | COST |
|--------|-----------|-----|------|------|------|--------|------|
|        |           | [ ] | [ ]  | [ ]  | [ ]  |        |      |

─── SELECT PAINT/MATERIAL COST CALCULATION ───
─── NO COST CALCULATIONS FOUND ───

No cost calculations with
cost # 432234 were
found in the job cost database.
PRESS ANY KEY TO CONTINUE.

7.
8.

TOTAL COST $
DESIRED MARKUP
SELL PRICE $

N - NEW COST CALC.   #           R - FIND RO#
C - FIND CUSTOMER                D - DELETE COST CALC.

ENTER SELECTION :D:   (1-2, N/R/C/D)

© 1986 YADA SYSTEMS INC.

FIG. 57

PAINT/MATERIAL COSTING

REF. #   FORMULA #   ALT   COST   SIZE   TYPE   OUNCES   COST

DELETE THIS COST CALC. #? (Y/N)   Y

NAME         JOHN SMITH                          BUS PHONE   ( )    -
ADDRESS      123 Any Street                      HOME PHONE  ( )    -
CITY,ST ZIP  Any Town, ST   12345
COMMENT                                          CALC. DATE   11/06/87

RO#    123              BODY SHOP HOURS   0.00   CLEANUP HOURS   0.00
COST # 2006              PAINT HOURS       0.00   OTHER HOURS     0.00

AUTO MAKE               STATUS  [O]  (O/W/C)  [ORIGINAL CALC.  ]
AUTO MODEL              CALCULATED BY
AUTO YEAR               ESTIMATE TOTAL           0.00
                        START DATE               / /
                        COMPLETION DATE          / /

TOTAL COST      $
                                           DESIRED MARKUP
                                           SELL PRICE      $

© 1986 YADA SYSTEMS INC.

FIG. 58

```
TYPE [   ]      % [1]      ══════ DUPONT PAINT ADDITIVES ══════
  D              SELECT TYPE         COST /                        COST /
                                    RIPTION              OZS.     GALLON
        <CREATE/DELETE TYPE>
     0. EDIT 2000  CENTARI POLYURETHANE   S T
1.   1. EDIT A     CENTARI ACRYL ENAMEL                   0.0      0.00
2.   2. EDIT A-B/C CENTARI BASECOAT                       0.0      0.00
3.   3. EDIT C-B/C CRONAR  BASECOAT          R            0.0      0.00
     4. EDIT C-S/S CRONAR  SINGLE STAGE
1.   5. EDIT D     DULUX ALKYD ENAMEL                     0.0      0.00
2.   6. EDIT L     LUCITE ACRYLIC LACQR                   0.0      0.00
3.   7. EDIT L-B/C LUCITE  BASECOAT                       0.0      0.00
     8. EDIT U     IMRON POLYRTHN ENAML
1.                                                L Y S T 0.0      0.00
2.      SELECTION <   >                                   0.0      0.00
3.                                                        0.0      0.00

1.                          0.0  0.00  4.                 0.0      0.00
2.                          0.0  0.00  5.                 0.0      0.00
3.                          0.0  0.00  6.                 0.0      0.00
                     C L E A R   C O A T   R E D U C E R
1.                          0.0  0.00  4.                 0.0      0.00
2.                          0.0  0.00  5.                 0.0      0.00
3.                          0.0  0.00  6.                 0.0      0.00
```

© 1986 YADA SYSTEMS INC.

FIG. 59

DUPONT PAINT ADDITIVES

TYPE [L  ]    % [1]          COST /              COST /
   D                                             GALLON

PAINT SUPPLIES RATE METHOD

1. NON    Since half as much mix is prepared when using basecoat           0.00
2.        mixes than is prepared when using normal mixes, the              0.00
3.        SUPPLIES RATE must be doubled.                                   0.00

1. 360         Enter method of computing SUPPLIES RATE                     8.80
2. 361                                                                     9.75
3. 366              1. Normal rate. (NON Basecoat)                        20.70
                    2. Twice the normal rate. (Basecoat)
1. 380                                                                     0.00
2. 580         ENTER SELECTION <1>   (1 or 2)                              0.00
3.                                                                         0.00

1. NONE (380S)        0.0      0.00     4.                   0.0         0.00
2. 582S (580S)       64.0    110.00     5.                   0.0         0.00
3.                    0.0      0.00     6.                   0.0         0.00

C L E A R   C O A T    R E D U C E R
1. 3608S (380S)     288.0      7.00     4. 8575S (580S)     32.0        11.45
2. 3661S (380S)     288.0      7.95     5. 8585S (580S)     32.0        12.85
3. 3602S (380S)     288.0      8.80     6. 8100S (580S)     32.0        15.95

© 1986 YADA SYSTEMS INC.

FIG. 60

DUPONT PAINT ADDITIVES

| TYPE [L] DESCRIPTION | % [1] | OZS. | COST / GALLON | DESCRIPTION | | OZS. | COST / GALLON |
|---|---|---|---|---|---|---|---|
| | | | | PAINT CATALYST | | | |
| 1. NONE | | 0.0 | 0.00 | 4. | | 0.0 | 0.00 |
| 2. | | 0.0 | 0.00 | 5. | | 0.0 | 0.00 |
| 3. | | 0.0 | 0.00 | 6. | | 0.0 | 0.00 |
| | | | | PAINT REDUCER | | | |
| 1. 3608S | | 192.0 | 7.00 | 4. 3602S | | 192.0 | 8.80 |
| 2. 3613S | | 192.0 | 7.40 | 5. 3696S | | 192.0 | 9.75 |
| 3. 3661S | | 192.0 | 7.95 | 6. 3979S | | 192.0 | 20.70 |
| | | | | CLEAR COAT | | | |
| 1. 380S | | 128.0 | 31.50 | 4. | | 0.0 | 0.00 |
| 2. 580S | | 256.0 | 38.00 | 5. | | 0.0 | 0.00 |
| 3. | | 0.0 | 0.00 | 6. | | 0.0 | 0.00 |
| | | | | CLEAR COAT CATALYST | | | |
| 1. NONE (380S) | | 0.0 | 0.00 | 4. | | 0.0 | 0.00 |
| 2. 582S (580S) | | 64.0 | 110.00 | 5. | | 0.0 | 0.00 |
| 3. | | 0.0 | 0.00 | 6. | | 0.0 | 0.00 |
| | | | | CLEAR COAT REDUCER | | | |
| 1. 3608S (380S) | | 288.0 | 7.00 | 4. 8575S (580S) | | 32.0 | 11.45 |
| 2. 3661S (380S) | | 288.0 | 7.95 | 5. 8585S (580S) | | 32.0 | 12.85 |
| 3. 3602S (380S) | | 288.0 | 8.80 | 6. 8100S (580S) | | 32.0 | 15.95 |

F10 TO SAVE AND/OR PRINT

© 1986 YADA SYSTEMS INC.

FIG. 61

DUPONT PAINT ADDITIVES

TYPE [L ] % [1]

| | DESCRIPTION | OZS. | COST / GALLON |
|---|---|---|---|
| | P A I N T   C A T A L Y S T | | |
| 1. | NONE | 0.0 | 0.00 |
| 2. | | 0.0 | 0.00 |
| 3. | | 0.0 | 0.00 |

┌─────────────────────────────────────────────┐
│         PAINT ADDITIVE & CLEAR COAT LISTING │
│                                             │
│    Type L  has been saved.                  │
│                                             │
│ PRINT THIS PAINT ADDITIVE & CLEAR COAT LIST? (Y/N)  Y │
└─────────────────────────────────────────────┘

| | | | | |
|---|---|---|---|---|
| | C L E A R   C O A T   C A T A L Y S T | | | |
| 1. | 380S | | 0.0 | 0.00 |
| 2. | 580S | | 64.0 | 110.00 |
| 3. | | | 0.0 | 0.00 |

| | C L E A R   C O A T   R E D U C E R | | | |
|---|---|---|---|---|
| 1. | 3608S (380S) | 4. 8575S (580S) | 288.0 | 7.00 |
| 2. | 3661S (380S) | 5. 8585S (580S) | 288.0 | 7.95 |
| 3. | 3602S (380S) | 6. 8100S (580S) | 288.0 | 8.80 |

F10 TO SAVE AND/OR PRINT

© 1986 YADA SYSTEMS INC.

FIG. 62

(Right column values, top to bottom):

PAINT CATALYST OZS. / COST/GALLON:
1. NONE — 0.0 / 0.00
2. 3608S — 0.0 / 0.00
3. 3613S — 0.0 / 0.00
   3661S — 8.80 / 9.75 / 20.70

CLEAR COAT CATALYST:
1. NONE (380S) — 0.0 / 0.00
2. 582S (580S) — 0.0 / 0.00
3. — 0.0 / 0.00

CLEAR COAT REDUCER:
1. 3608S (380S) — 32.0 / 11.45
2. 3661S (380S) — 32.0 / 12.85
3. 3602S (380S) — 32.0 / 15.95

PAINT & BODY SUPPLIES MAINTENANCE

| EXPENSE TYPE | DESCRIPTION | % OF UNIT USED PER GALLON OF PAINT | FLAT RATE OR PERCENT | UNIT COST |
|---|---|---|---|---|
| 1. P | W/GREASE, METAL COND. | 15.0% | P | 26.15 |
| 2. P | PRIMER SURFACER | 50.0% | P | 31.05 |
| 3. P | THINNER FOR PRIMER | 50.0% | P | 6.80 |
| 4. P | 80D-GREEN,180A-GOLD 6" | 12.0% | P | 87.99 |
| 5. P | TAPE 3/4" | 266.0% | P | 1.79 |
| 6. P | MASKING PAPER,12"-750' | 20.0% | P | 16.31 |
| 7. P | SEALER- READY TO SPRAY | 50.0% | P | 25.25 |
| 8. P | ACRLY-RED PUTTY | 33.0% | P | 6.94 |
| 9. P | TACK CLOTH | 100.0% | P | 0.55 |
| 10. P | FLEX-ADD,FISH EYE ADD. | 30.0% | P | 25.10 |
| 11. P | COMP-GLAZE, BUFF PAD | 25.0% | P | 38.42 |
| 12. B | BONDO,DURAGLASS | 0.0% | F | 0.00 |
| 13. B | GRINDING DISCS | 0.0% | F | 0.00 |
| 14. B | 8" DISC, 3X17 ABRASIVE | 0.0% | F | 0.00 |
| 15. O | WELDING SUPPLIES | 0.0% | F | 0.00 |
| 16. B | ROCKER SCHUTZ, U/COAT | 0.0% | F | 0.00 |
| 17. C | RAG,RAZOR BL,CAR COVER | 0.0% | F | 3.20 |
| 18. O | SPRAY GUN CLEAN UP | 0.0% | F | 1.50 |

F10 TO SAVE AND/OR PRINT
© 1986 YADA SYSTEMS INC.

FIG. 63

PAINT & BODY SUPPLIES MAINTENANCE

| EXPENSE TYPE | | DESCRIPTION | % OF UNIT USED PER GALLON OF PAINT | FLAT RATE OR PERCENT | UNIT COST |
|---|---|---|---|---|---|
| 1. | P | W/GREASE, METAL COND. | 15.0% | P | 26.15 |
| 2. | P | PRIMER SURFACER | 50.0% | P | 31.05 |
| 3. | P | THINNER FOR PRIMER | 50.0% | P | 6.80 |
| 4. | P | | | | 87.99 |
| 5. | P | PAINT & BODY SUPPLIES LISTING | | | 1.79 |
| 6. | P | | | | 16.31 |
| 7. | P | PRINT THE PAINT & BODY SUPPLIES LISTING? (Y/N) Y | | | 25.25 |
| 8. | P | | | | 6.94 |
| 9. | P | | | | 0.55 |
| 10. | P | | | | 25.10 |
| 11. | P | | | | 38.42 |
| 12. | B | | | | 0.00 |
| 13. | B | GRINDING DISCS | 0.0% | F | 0.00 |
| 14. | B | 8" DISC,3X17 ABRASIVE | 0.0% | F | 0.00 |
| 15. | O | WELDING SUPPLIES | 0.0% | F | 0.00 |
| 16. | B | ROCKER SCHUTZ, U/COAT | 0.0% | F | 3.20 |
| 17. | C | RAG,RAZOR BL,CAR COVER | | F | |
| 18. | O | SPRAY GUN CLEAN UP | 0.0% | F | 1.50 |

F10 TO SAVE AND/OR PRINT
© 1986 YADA SYSTEMS INC.

FIG. 64

REFINISHER PRICE LIST MAINTENANCE

SELECT PRODUCT USED

MASTER
PRE/SFX     REFINISHER COST TYPE DESCRIPTION

1. A    CENTARI ACRYLIC ENAMEL COLORS
2. D    DULUX ALKYD ENAMEL COLORS
3. J    CRONAR POLYOXITHANE ENAMEL
4. L    LUCITE ACRYLIC LACQUER COLORS
5. U    IMRON POLYURETHANE ENAMEL COLORS
6.     ADD/EDIT/DELETE REFINISHER COST TYPES
7.     ADD/EDIT/DELETE EQUIVALENT REFINISHER COST TYPES

SELECTION (1-7) < >

© 1986 YADA SYSTEMS INC.

FIG. 65

REFINISHER PRICE LIST MAINTENANCE

DUPONT REFINISHER PRICE LIST
LUCITE ACRYLIC LACQUER COLORS

| COST CODE | PINT | QUART | GALLON |
|---|---|---|---|
| NONE | 7.75 | 12.30 | 42.45 |
| H | 9.55 | 15.75 | 56.25 |
| M | 11.00 | 19.20 | 68.45 |
| W | 12.95 | 22.60 | 82.70 |
| K | 20.00 | 37.45 | 0.00 |
| T | 30.00 | 57.25 | 0.00 |

[F10 TO SAVE AND/OR PRINT]

MIX BAS    GALLON

© 1986 YADA SYSTEMS INC.

FIG. 66

REFINISHER PRICE LIST MAINTENANCE

DUPONT REFINISHER PRICE LIST REPORT

PRINT DUPONT'S PRICE LIST? (Y/N)  Y

MIX BAS                                                    GALLON

© 1986 YADA SYSTEMS INC.

FIG. 67

REFINISHER PRICE LIST MAINTENANCE

ADD/EDIT/DELETE REFINISHER PAINT LINES

Enter master paint line type:

THE FOLLOWING MASTER PREFIXES ARE DEFINED:

A
D
J
L
U

GALLON

MIX BAS

© 1986 YADA SYSTEMS INC.

FIG. 68

REFINISHER PRICE LIST MAINTENANCE

ADD/EDIT/DELETE REFINISHER PAINT LINES

Enter master paint line type: L
Edit or Delete master prefix? (E/D) E

THE FOLLOWING MASTER PREFIXES ARE DEFINED:

A
D
J
L
U

MIX BAS    GALLON

© 1986 YADA SYSTEMS INC.

FIG. 69

REFINISHER PRICE LIST MAINTENANCE

ADD/EDIT/DELETE REFINISHER PAINT LINES

REFINISHER TYPE DESCRIPTION

LUCITE ACRYLIC LACQUER COLORS

COST CODES

1. NO  7.
2. H   8.
3. M   9.
4. W   10.
5. K   11.
6. T   12.

Enter "NO" for a blank or no cost code.

PRESS F10 TO SAVE RECORD

GALLON

MIX BAS

© 1986 YADA SYSTEMS INC.

FIG. 70

REFINISHER PRICE LIST MAINTENANCE

ADD/EDIT/DELETE EQUIVALENT REFINISHER PAINT LINES

Enter master paint line type:

THE FOLLOWING MASTER PREFIXES ARE DEFINED:

A
D
J
L
U

MIX BAS    GALLON

© 1986 YADA SYSTEMS INC.

FIG. 71

REFINISHER PRICE LIST MAINTENANCE

ADD/EDIT/DELETE EQUIVALENT REFINISHER PAINT LINES

REFINISHER TYPE DESCRIPTION

[LUCITE ACRYLIC LACQUER COLORS       ]

| | TYPE | PRE/SUFFIX | | TYPE | PRE/SUFFIX |
|---|---|---|---|---|---|
| 1. | L | S | 7. | | S |
| 2. | | P | 8. | | S |
| 3. | | P | 9. | | S |
| 4. | | P | 10. | | S |
| 5. | | P | 11. | | S |
| 6. | | P | 12. | | S |

One entry must have the equivalent the same as master.

MASTER PREFIX/SUFFIX = L

PRESS F10 TO SAVE RECORD

MIX BAS                                                      GALLON

© 1986 YADA SYSTEMS INC.

FIG. 72

YOUR COMPANY NAME
COMPUTERIZED AUTOMOTIVE TOPCOAT FORMULA RETRIEVAL AND MANAGEMENT SYSTEM

PAINT/MATERIAL COSTING MENU

```
┌─ PAINT/MATERIAL COST PER LABOR HOUR REPORT WINDOW ──────────┐
│                                                              │
│   Date Range   From:   /  /     To: 11/06/87                │
│                                                              │
│   Print Report for cost calcs. with status of:    (Y/N)     │
│                                                              │
│   O - Original Calculation?  Y                               │
│   W - Work in Progress?      Y                               │
│   C - Completed?             Y                               │
│                                                              │
└──────────────────────────────────────────────────────────────┘
```

© 1986 YADA SYSTEMS INC.

FIG. 73

```
―――――――――― YOUR COMPANY NAME ――――――――――
COMPUTERIZED AUTOMOTIVE TOPCOAT FORMULA RETRIEVAL AND MANAGEMENT SYSTEM

PAINT/MATERIAL COSTING MENU

<0>   RETURN TO C A T F R A M S MENU
       <1>   PAINT/MATERIAL COST CALCULATIONS
            ┌─── CHECK PAPER ALIGNMENT ───┐
            │                             │
            │ Make sure paper has been loaded into the │
            │ printer and the Top of Form has been set.│
            │                             │
            │   PRESS ANY KEY TO START PRINTING        │
            │                             │
            └─────────────────────────────┘

© 1986 YADA SYSTEMS INC.

© 1986 YADA SYSTEMS INC.

REPORT DATE: 03/05/87

PAINT/MATERIAL COST PER LABOR HOUR
REPORTING COST CALCULATIONS WITH STATUS OF ( C )
REPORTING COST CALCULATIONS DATA 01/01/87 THROUGH: 03/05/87

PAGE NO. 1

| RO# | NAME | BODY SHOP | | | PAINT | | | CLEANUP | | | OTHER | | |
|---|---|---|---|---|---|---|---|---|---|---|---|---|---|
| | | HOURS | MATS. | RATE | HOURS | MATS. | RATE | HOURS | MATS. | RATE | HOURS | MATS. | RATE |
| None | BOB PHILLIPS | 0.00 | 0.00 | 0.00 | 6.00 | 41.04 | 6.84 | 0.50 | 3.20 | 6.40 | 0.00 | 0.50 | 0.00 |
| None | WRBB WEBSTER | 2.00 | 7.50 | 3.75 | 5.50 | 128.41 | 23.35 | 1.00 | 9.20 | 9.20 | 0.50 | 0.50 | 1.00 |
| 1234 | DEBBIE JONES | 1.30 | 0.00 | 0.00 | 2.30 | 19.43 | 8.45 | 0.75 | 4.40 | 4.40 | 0.50 | 1.50 | 3.00 |
| 1254 | FRANK DAMONSKI | 4.40 | 16.00 | 3.64 | 4.00 | 47.47 | 11.87 | 0.50 | 7.70 | 10.27 | 0.00 | 0.50 | 0.00 |
| 1255 | JOHN DOE | 5.00 | 13.33 | 2.67 | 14.00 | 142.02 | 10.14 | 0.50 | 3.20 | 6.40 | 0.00 | 3.00 | 0.00 |
| 1256 | TOM JONES | 1.00 | 3.94 | 3.94 | 7.50 | 43.58 | 5.81 | 0.50 | 3.20 | 6.40 | 0.00 | 0.50 | 0.00 |
| 1257 | TIM HANSON | 2.00 | 3.10 | 1.55 | 4.00 | 21.81 | 5.45 | 0.50 | 6.70 | 13.40 | 0.00 | 0.50 | 0.00 |
| B3456 | MR. JONES | 4.50 | 0.00 | 0.00 | 8.20 | 112.80 | 13.76 | 1.00 | 8.00 | 8.00 | 0.50 | 1.50 | 3.00 |

LABOR ANALYSIS SUMMARY

| | HOURS | MATERIALS | AVG. RATE |
|---|---|---|---|
| BODY SHOP | 20.20 | 43.87 | 2.17 |
| PAINT | 51.50 | 556.55 | 10.81 |
| CLEANUP | 5.75 | 45.60 | 7.93 |
| OTHER | 1.50 | 8.50 | 6.67 |

YOUR COMPANY NAME
COMPUTERIZED AUTOMOTIVE TOPCOAT FORMULA RETRIEVAL AND MANAGEMENT SYSTEM
PAINT/MATERIAL COSTING MENU

COST CALCULATIONS REPORT WINDOW

Date Range    From:  /  /      To: 11/06/87

Print Report for cost calcs. with status of:    (Y/N)

O - Original Calculation?Y
W - Work in Progress?    Y
C - Completed?           Y 1 - Customer Name
2 - Cost Calculation Number
3 - RO#

Print in which order (1-3)  3

© 1986 YADA SYSTEMS INC.

REPORT DATE: 03/06/87

COST CALCULATIONS
REPORTING COST CALCULATIONS WITH STATUS OF ( C )
REPORTING COST CALCULATIONS DATED 01/02/87 THROUGH 03/06/87
SORTED BY: CUSTOMER

PAGE NO. 1

| RO# | COST CALC.# | STATUS O/W/C | CALC. DATE | CUSTOMER | AUTO MAKE | AUTO MODEL | AUTO YEAR | CALC. FORMULA | ALT | COST CODE | CALC. SIZE | PAINT COST | OTHER COSTS | TOTAL COST |
|---|---|---|---|---|---|---|---|---|---|---|---|---|---|---|
| None | 1010 | C | 02/21/87 | BOB PHILLIPS | DATSUN | B210 | 86 | DAT929 | | | QUART | 29.49 | 15.25 | 44.74 |
| 1234 | 1074 | C | 03/04/87 | DEBBIE JONES | GM | CUTLASS | 86 | A2080 | | | PINT | 11.69 | 13.64 | 25.33 |
| 1254 | 1001 | C | 02/21/87 | FRANK DAMONSKI | G.M. | VETTE | 81 | C8508L | | W | QUART | 46.48 | 25.19 | 71.67 |
| 1234 | 203 | C | 03/05/87 | JOHN DOE | CHRY. | LEBARON | 86 | 85-33904 | | X | QUART | 48.95 | 40.46 | 89.41 |
| 1255 | 1002 | C | 02/21/87 | JOHN DOE | FORD | T-BIRD | 82 | 85-32250 | | Y | GALLON | 138.03 | 23.52 | 161.55 |
| B3456 | 202 | C | 03/05/87 | MR. JONES | FORD | LINC,FDTRK | 84 | B8417A | | K | 2 QUART | 81.84 | 40.46 | 122.30 |
| 1257 | 1006 | C | 02/21/87 | TIM HANSON | CHRYS. | LEBARON | 82 | A2080 | | | QUART | 17.82 | 14.29 | 32.11 |
| 1256 | 1005 | C | 02/21/87 | TOM JONES | CHRY. | NEWPORT | 85 | STARS23 | | S | SPECIAL | 42.59 | 8.63 | 51.22 |
| None | 1013 | C | 02/12/87 | WEBB WEBSTER | G.M. | PNOT | 87 | 85-35028 | | | 2 QUART | 94.18 | 51.43 | 145.61 |

© 1986 YADA SYSTEMS INC.

C A T F R A M S
PRINT MIX BASE COLOR LABELS

FORMULA #   COST ALT   QTY   SIZE         ADDITIONAL INFO

COLOR
CAR                          RUSH (Y/N)
MESSAGE-1                    CODE
MESSAGE-2
MESSAGE-3

```
┌─────────────── SELECT VENDOR ───────────────┐
│                                             │
│   1 - DUPONT MIXING COLOR                   │
│   2 - PPG INDUSTRIES MIXING COLOR           │
│   3 - ACME MIXING COLOR                     │
│   4 - R-M MIXING COLOR                      │
│   5 - GLASURIT MIXING COLOR                 │
│   6 - SHERWIN-WILLIAMS MIXING COLOR         │
│                                             │
│             SELECTION:                      │
│                                             │
└─────────────────────────────────────────────┘
```

MIX BASE    MIX        STANDARD SIZES    3 QT    GALLON

© 1986 YADA SYSTEMS INC.

FIG. 77

PRINT DUPONT MIXING COLOR LABELS

| NUMBER SUFFIX | DESCRIPTION | GRAMS PER GALLON |

COLOR

NUMBER OF LABELS
TYPE OF COLOR AMOUNT (G/Z/S)
   G - GRAMS
   Z - OUNCES
   S - STANDARD SIZES

QUANTITY ON HAND
STOCK SIZE

MIXING COLOR AMOUNT

© 1986 YADA SYSTEMS INC.

FIG. 78

PRINT DUPONT MIXING COLOR LABELS

NUMBER SUFFIX        DESCRIPTION         GRAMS PER GALLON
COLOR    45443

═══ MIXING COLOR NOT FOUND IN MIXING COLOR DATABASE ═══

Color number 45443 was not found in the DUPONT
database of colors.

PRESS ANY KEY TO CONTINUE

© 1986 YADA SYSTEMS INC.

FIG. 79

```
           PRINT DUPONT MIXING COLOR LABELS

NUMBER  SUFFIX    DESCRIPTION      GRAMS PER GALLON
COLOR     401      L       WHITE                  3738

NUMBER OF LABELS           1
TYPE OF COLOR AMOUNT (G/Z/S)   Z         QUANTITY ON HAND    0.00
     G - GRAMS                           STOCK SIZE         32.0
     Z - OUNCES
     S - STANDARD SIZES

MIXING COLOR AMOUNT        0    OUNCES
```

© 1986 YADA SYSTEMS INC.

FIG. 80

```
PRINT DUPONT MIXING COLOR LABELS

NUMBER SUFFIX    DESCRIPTION      GRAMS PER GALLON
COLOR  401    L        WHITE                 3738

NUMBER OF LABELS       1
TYPE OF COLOR AMOUNT (G/Z/S) Z        QUANTITY ON HAND   0.00
   G  - GRAMS                         STOCK SIZE        32.0
   Z  - OUNCES
   S  - STANDARD SIZES

MIXING COLOR AMOUNT       0     OUNCES
```

© 1986 YADA SYSTEMS INC.

FIG. 81

```
PRINT DUPONT MIXING COLOR LABELS

NUMBER SUFFIX      DESCRIPTION         GRAMS PER GALLON
COLOR    401     L         WHITE                     3738

NUMBER OF LABELS           1
TYPE OF COLOR AMOUNT (G/Z/S)  S      QUANTITY ON HAND    0.00
    G - GRAMS                        STOCK SIZE         32.0
    Z - OUNCES
    S - STANDARD SIZES

MIXING COLOR AMOUNT        0         STANDARD SIZES
                                     1 - PINT
                                     2 - QUART
                                     3 - 2 QUARTS
                                     4 - GALLON
```

© 1986 YADA SYSTEMS INC.

FIG. 82

C A T F R A M S
MIXING COLOR INVENTORY MANAGEMENT

FORMULA #    COST ALT    QTY    SIZE    P/R PO/RO #    ADDITIONAL INFO

CUSTOMER                                 RUSH (Y/N)
COLOR                                    CODE
CAR
MESSAGE-1
MESSAGE-2
MESSAGE-3

―――――― SELECT VENDOR ――――――

1 – DUPONT MIXING COLOR
2 – PPG INDUSTRIES MIXING COLOR
3 – ACME MIXING COLOR
4 – R-M MIXING COLOR
5 – GLASURIT MIXING COLOR
6 – SHERWIN-WILLIAMS MIXING COLOR

SELECTION:

| MIX BASE | MIX | | STANDARD SIZES | | |
|---|---|---|---|---|---|
| | | | | 3 QT | GALLON |

© 1986 YADA SYSTEMS INC.

FIG. 84

DUPONT MIXING COLOR INVENTORY MANAGEMENT

| COLOR | NUMBER SUFFIX | DESCRIPTION | GRAMS PER GALLON |
|---|---|---|---|
| | | | 0 |

| STOCK SIZE | 0.0 | IN OUNCES | LAST ORDER DATE | / / |
| STOCK COST | 0.00 | | LAST ORDER QTY | 0.00 |
| REORDER LEVEL | 0.00 | IN UNITS | PHYSCL CNT. DATE | / / |
| REORDER QTY | 0.00 | IN UNITS | PHYSCL CNT. QTY | 0.00 |
| QTY ON HAND | 0.00 | IN UNITS | | |

HISTORICAL COLOR USAGE

| | FORMULA | MIX SOLD | | FORMULA | MIX SOLD |
|---|---|---|---|---|---|
| JANUARY | 0.0 | 0.0 | JULY | 0.0 | 0.0 |
| FEBRUARY | 0.0 | 0.0 | AUGUST | 0.0 | 0.0 |
| MARCH | 0.0 | 0.0 | SEPTEMBER | 0.0 | 0.0 |
| APRIL | 0.0 | 0.0 | OCTOBER | 0.0 | 0.0 |
| MAY | 0.0 | 0.0 | NOVEMBER | 0.0 | 0.0 |
| JUNE | 0.0 | 0.0 | DECEMBER | 0.0 | 0.0 |
| TOTALS | 0.0 | 0.0 | | 0.0 | 0.0 |

UNITS ARE: G - GALLON   Q - QUART   P - PINT   Z - OUNCES   * - GRAMS

© 1986 YADA SYSTEMS INC.

FIG. 85

DUPONT MIXING COLOR INVENTORY MANAGEMENT

NUMBER SUFFIX    DESCRIPTION    GRAMS PER GALLON

COLOR  33333                                          0

STOCK SIZE    0.0    IN OUNCES    LAST ORDER DATE    / /
STOCK COST    0.00                LAST ORDER QTY       0.00

MIXING COLOR RECORD DOES NOT EXIST

Mixing color number 33333 was not found in the mixing color
database. Verify that the mixing color number entered is correct
before adding the color to the mixing color database.

OK to add mixing color 33333 to the mixing color database? (Y/N) N

| | | | | | |
|---|---|---|---|---|---|
| APRIL | 0.0 | 0.0 | OCTOBER | 0.0 | 0.0 |
| MAY | 0.0 | 0.0 | NOVEMBER | 0.0 | 0.0 |
| JUNE | 0.0 | 0.0 | DECEMBER | 0.0 | 0.0 |
| TOTALS | 0.0 | 0.0 | | 0.0 | 0.0 |

UNITS ARE: G - GALLON   Q - QUART   P - PINT   Z - OUNCES   * - GRAMS

© 1986 YADA SYSTEMS INC.

FIG. 86

DUPONT MIXING COLOR INVENTORY MANAGEMENT

NUMBER SUFFIX    DESCRIPTION    GRAMS PER GALLON

COLOR 401                                      0

STO _____
STO _____   ── EDIT OR DELETE MIXING COLOR ──
REO           Enter 'E' to Edit the mixing color record or
REO           'D' to Delete the mixing color record? (E/D) E
QTY

|           | FORMULA | MIX SOLD |           | FORMULA | MIX SOLD |
|-----------|---------|----------|-----------|---------|----------|
| JANUARY   | 0.0     | 0.0      | JULY      | 0.0     | 0.0      |
| FEBRUARY  | 0.0     | 0.0      | AUGUST    | 0.0     | 0.0      |
| MARCH     | 0.0     | 0.0      | SEPTEMBER | 0.0     | 0.0      |
| APRIL     | 0.0     | 0.0      | OCTOBER   | 0.0     | 0.0      |
| MAY       | 0.0     | 0.0      | NOVEMBER  | 0.0     | 0.0      |
| JUNE      | 0.0     | 0.0      | DECEMBER  | 0.0     | 0.0      |
| TOTALS    | 0.0     | 0.0      |           | 0.0     | 0.0      |

UNITS ARE: G – GALLON   Q – QUART   P – PINT   Z – OUNCES   * – GRAMS

© 1986 YADA SYSTEMS INC.

FIG. 87

```
            DUPONT MIXING COLOR INVENTORY MANAGEMENT

NUMBER SUFFIX      DESCRIPTION       GRAMS PER GALLON
COLOR     11111                                       0

──── EDIT OR DELETE MIXING COLOR ────
STO                                                           00
STO                                                           00
REO       Enter 'E' to Edit the mixing color record or
REO       'D' to Delete the mixing color record? (E/D)  D
QTY
              ──── DELETION OF MIXING COLOR IS IRREVERSIBLE ────

WARNING - The deletion of a mixing color
              record is irreversible.

O.K. to delete the mixing color record? (N/Y)  N

JANUAR                      0.0              0.0              0.0
FEBRUA
MARCH
APRIL
MAY
JUNE
TOTALS                      0.0              0.0              0.0
UNITS ARE:  G - GALLON   Q - QUART   P - PINT   Z - OUNCES   * - GRAMS

© 1986 YADA SYSTEMS INC.
```

FIG. 88

DUPONT MIXING COLOR INVENTORY MANAGEMENT

| COLOR | NUMBER | SUFFIX | DESCRIPTION | | GRAMS PER GALLON |
|---|---|---|---|---|---|
| | 401 | L | WHITE | | 3738 |

| STOCK SIZE | 32.0 | IN OUNCES | LAST ORDER DATE | / / | 0.00 |
| STOCK COST | 9.45 | | LAST ORDER QTY | | 0.00 |
| REORDER LEVEL | 9.00 | IN UNITS | PHYSCL CNT. DATE | / / | |
| REORDER QTY | 2.00 | IN UNITS | PHYSCL CNT. QTY | | 0.00 |
| QTY ON HAND | 0.00 | IN UNITS | | | |

HISTORICAL COLOR USAGE

| | FORMULA | MIX SOLD | | FORMULA | MIX SOLD |
|---|---|---|---|---|---|
| JANUARY | 0.0 | 0.0 | JULY | 0.0 | 0.0 |
| FEBRUARY | 0.0 | 0.0 | AUGUST | 0.0 | 0.0 |
| MARCH | 0.0 | 0.0 | SEPTEMBER | 0.0 | 0.0 |
| APRIL | 0.0 | 0.0 | OCTOBER | 0.0Q | 0.8Q |
| MAY | 0.0 | 0.0 | NOVEMBER | 0.0 | 0.0 |
| JUNE | 0.0 | 0.0 | DECEMBER | 0.0 | 0.0 |
| TOTALS | 0.0 | 0.0 | | 0.0Q | 0.8Q |

UNITS ARE: G - GALLON   Q - QUART   P - PINT   Z - OUNCES   * - GRAMS
PRESS F10 TO SAVE COLOR RECORD

© 1986 YADA SYSTEMS INC.

FIG. 89

```
═══════════ C A T F R A M S ═══════════
        MIXING COLOR REORDER REPORT

FORMULA #   COST ALT   QTY   SIZE         ADDITIONAL INFO

COLOR
CAR                                 RUSH (Y/N)
MESSAGE-1                           CODE
MESSAGE-2
MESSAGE-3
             ┌─────── SELECT VENDOR ───────┐
             │  1 - DUPONT MIXING COLORS   │
             │  2 - PPG INDUSTRIES MIXING COLORS │
             │  3 - ACME MIXING COLORS     │
             │  4 - R-M MIXING COLORS      │
             │  5 - GLASURIT MIXING COLORS │
             │  6 - SHERWIN-WILLIAMS MIXING COLORS │
             │                             │
             │      SELECTION:             │
             └─────────────────────────────┘
                                    STANDARD SIZES

MI  MIX BASE                        3 QT        GALLON
```

© 1986 YADA SYSTEMS INC.

FIG. 90

MIXING COLOR REORDER REPORT

FORMULA #   COST ALT   QTY   SIZE               ADDITIONAL INFO

===== PRINT FULL OR SUMMARY REPORT =====

COLO
CAR    Do you want to print the mixing color reorder report for
MESS   all mixing colors (F) or only those mix colors in which
MESS   the quantity on hand is less than or equal to the reorder
MESS   level and the reorder level is not zero (S)? (S/F) S

MIX BA

© 1986 YADA SYSTEMS INC.

FIG. 91

MIXING COLOR REORDER REPORT

FORMULA #   COST ALT   QTY   SIZE                    ADDITIONAL INFO

COLOR                          RUSH (Y/N)
CAR                            CODE
MESSAGE-1                      YEAR
MESSAGE-2           ┌─────── CHECK PAPER ALIGNMENT ───────┐         SIZES
MESSAGE-3           │                                     │
                    │   Make sure paper has been loaded into the   │
MIX BASE            │   printer and the Top of Form has been set.  │    GALLON
                    │                                     │
                    │      PRESS ANY KEY TO START PRINTING         │
                    └─────────────────────────────────────┘

© 1986 YADA SYSTEMS INC.

DUPONT

MIXING COLOR REORDER REPORT

PAGE NO. 1

| COLOR# | DESCRIPTION | QUANTITY ON HAND | STOCK SIZE | REORDER LEVEL | REORDER QUANTITY | STOCK COST | ORDER COST | AMOUNT TO ORDER |
|---|---|---|---|---|---|---|---|---|
| 700 A | WHITE (HH) | 0.00G | 1G | 0.00G | 0.00G | 33.10 | 0.00 | — |
| 701 A | WHITE | 0.00G | 1G | 0.00G | 0.00G | 30.90 | 0.00 | — |
| 705 A | BLACK (HS) | 0.00G | 1G | 0.00G | 0.00G | 30.90 | 0.00 | — |
| 706 A | BLACK | 0.00G | 1G | 0.00G | 0.00G | 30.90 | 0.00 | — |
| 708 A | BLACK | 0.00G | 1G | 0.00G | 0.00G | 30.90 | 0.00 | — |
| 710 A | MEDIUM ALUMINUM | 0.00G | 1G | 0.00G | 0.00G | 30.90 | 0.00 | — |
| 711 A | COARSE ALUMINUM | 0.00G | 1G | 0.00G | 0.00G | 30.90 | 0.00 | — |
| 712 A | ALUMINUM(DISTCONT.) | 0.00Q | 1Q | 0.00Q | 0.00Q | 18.15 | 0.00 | — |
| 713 A | BRIGHT ALUMINUM | 0.00G | 1G | 0.00G | 0.00G | 32.15 | 0.00 | — |
| 715 A | RED (HS) | 0.00G | 1G | 0.00G | 0.00G | 42.95 | 0.00 | — |
| 716 A | RED | 0.00G | 1G | 0.00G | 0.00G | 37.50 | 0.00 | — |
| 717 A | RED OXIDE | 0.00G | 1G | 0.00G | 0.00G | 30.90 | 0.00 | — |
| 718 A | MONASTRAL MAROON | 0.00G | 1G | 0.00G | 0.00G | 45.10 | 0.00 | — |
| 719 A | RED | 0.00G | 1G | 0.00G | 0.00G | 115.55 | 0.00 | — |
| 720 A | PHTHALO BLUE | 0.00G | 1G | 0.00G | 0.00G | 33.55 | 0.00 | — |

© 1986 YADA SYSTEMS INC.

FIG. 94

03/06/87  DITZLER MIXING COLOR INVENTORY STATUS FOR THE MONTH OF JANUARY

© 1986 YADA SYSTEMS INC.  PAGE NO. 4

| COLOR# | DESCRIPTION | QUANTITY ON HAND | STOCK SIZE | STOCK COST | STOCK VALUE | WT/ GAL | REORDER LEVEL | REORDER QUANTITY | LAST PURCHASE DATE | LAST PURCHASE QUANTITY | LAST PHYSICAL INVENTORY DATE | COUNT | SHORT |
|---|---|---|---|---|---|---|---|---|---|---|---|---|---|
| DMV 24 | TRANS IRON YELLOW | 0.00G | 1Q | 8.85 | 0.00 | 3680 | 2.00Q | 2.00Q | 02/21/87 | 0.00 | 02/21/87 | 0.00 | 0.00 |
| DMV 25 | THALO GREEN | 2.54Q | 1Q | 10.50 | 22.67 | 3680 | 2.00Q | 2.00Q | 02/21/87 | 0.00 | 02/21/87 | 0.00 | 0.00 |
| DMV 26 | IRON RED | 0.00G | 1Q | 8.85 | 0.00 | 3680 | 2.00Q | 2.00Q | 02/21/87 | 0.00 | 02/21/87 | 0.00 | 0.00 |
| DMV 27 | MED ORG TRANS RED | 2.71Q | 1Q | 12.50 | 33.87 | 3680 | 2.00Q | 2.00Q | 02/21/87 | 0.00 | 02/21/87 | 0.00 | 0.00 |
| DMV 28 | THALO BLUE/RED | 2.68Q | 1Q | 10.50 | 28.14 | 3680 | 2.00Q | 2.00Q | 02/21/87 | 0.00 | 02/21/87 | 0.00 | 0.00 |
| DMV 29 | MED ORGANIC MAROON | 0.00G | 1Q | 12.50 | 0.00 | 3680 | 2.00Q | 2.00Q | 02/21/87 | 0.00 | 02/21/87 | 0.00 | 0.00 |
| DMV 30 | MED YELLOW GREEN | 0.00G | 1Q | 12.50 | 0.00 | 3680 | 2.00Q | 2.00Q | 02/21/87 | 0.00 | 02/21/87 | 0.00 | 0.00 |
| DMX 210 | YELLOW | 0.00G | 1Q | 70.40 | 0.00 | 3680 | 2.00Q | 2.00Q | 02/21/87 | 0.00 | 02/21/87 | 0.00 | 0.00 |
| DMX 211 | ORANGE | 0.00G | 1Q | 70.85 | 0.00 | 3680 | 2.00Q | 2.00Q | 02/21/87 | 0.00 | 02/21/87 | 0.00 | 0.00 |
| DMX 212 | RED | 0.00G | 1Q | 85.30 | 0.00 | 3680 | 2.00Q | 2.00Q | 02/21/87 | 0.00 | 02/21/87 | 0.00 | 0.00 |
| DMX 213 | RED | 0.00G | 1Q | 90.65 | 0.00 | 3680 | 2.00Q | 2.00Q | 02/21/87 | 0.00 | 02/21/87 | 0.00 | 0.00 |
| DMX 214 | RED | 0.00G | 1Q | 75.05 | 0.00 | 3680 | 2.00Q | 2.00Q | 02/21/87 | 0.00 | 02/21/87 | 0.00 | 0.00 |
| DMX 215 | VIOLET | 0.00G | 1Q | 52.75 | 0.00 | 3680 | 2.00Q | 2.00Q | 02/21/87 | 0.00 | 02/21/87 | 0.00 | 0.00 |
| DMX 216 | BLUE | 0.00G | 1Q | 64.80 | 0.00 | 3680 | 2.00Q | 2.00Q | 02/21/87 | 0.00 | 02/21/87 | 0.00 | 0.00 |
| DMX 217 | GREEN | 0.00G | 1Q | 69.05 | 0.00 | 3680 | 2.00Q | 2.00Q | 02/21/87 | 0.00 | 02/21/87 | 0.00 | 0.00 |
| DMX 218 | BROWN | 0.00G | 1Q | 58.65 | 0.00 | 3680 | 2.00Q | 2.00Q | 02/21/87 | 0.00 | 02/21/87 | 0.00 | 0.00 |
| DMX 219 | BLACK | 0.00G | 1Q | 50.55 | 0.00 | 3680 | 2.00Q | 2.00Q | 02/21/87 | 0.00 | 02/21/87 | 0.00 | 0.00 |
| DNA 8575 | CUST ALUMINUM | 0.00G | 1G | 51.05 | 0.00 | 4000 | 2.00G | 2.00G | 02/21/87 | 0.00 | 02/21/87 | 0.00 | 0.00 |
| DTX 300 | BLENDER | 0.00G | 1G | 15.00 | 0.00 | 3500 | 2.00G | 2.00G | 02/21/87 | 0.00 | 02/21/87 | 0.00 | 0.00 |
| DXR 495 | KATALYST | 2.11G | 1G | 35.05 | 73.96 | 3784 | 2.00G | 2.00G | 02/21/87 | 0.00 | 02/21/87 | 0.00 | 0.00 |
| DXR 497 | STARTHANE KATALYST | 2.61G | 1G | 51.60 | 134.68 | 3428 | 2.00G | 2.00G | 02/21/87 | 0.00 | 02/21/87 | 0.00 | 0.00 |

TOTAL VALUE OF MIXING COLOR INVENTORY  9397.84

CATFRAMS
MIXING COLOR INVENTORY LIST

FORMULA #   COST ALT   QTY   SIZE         ADDITIONAL INFO

CUSTOMER
COLOR                                     RUSH (Y/N)
CAR                                       CODE
MESSAGE-1
MESSAGE-2   ─────────── SELECT VENDOR ───────────
MESSAGE-3
            1 — DUPONT MIXING COLOR LIST
            2 — PPG INDUSTRIES MIXING COLOR LIST
            3 — ACME MIXING COLOR LIST
            4 — R-M MIXING COLOR LIST
            5 — GLASURIT MIXING COLOR LIST
            6 — SHERWIN-WILLIAMS MIXING COLOR LIST

SELECTION:

MIX BASE                              STANDARD SIZES
                                      3 QT    GALLON

© 1986 YADA SYSTEMS INC.

FIG. 95

MIXING COLOR INVENTORY LIST

| FORMULA # | COST | ALT | QTY | SIZE | ADDITIONAL INFO |
|---|---|---|---|---|---|

CUSTO
COLOR
CAR
MESSA
MESSA
MESSA

MIX BAS

```
┌─ SET FILTER FOR MIXING COLOR INVENTORY REPORT ─┐
│                                                 │
│  Do you want to print the mixing color inventory report
│  for all mix colors (F) or only those mix colors with
│  an order quantity greater than zero (S)? (S/F)  F
│                                                 │
└─────────────────────────────────────────────────┘
```

GALLON

© 1986 YADA SYSTEMS INC.

FIG. 96

MIXING COLOR INVENTORY LIST

| FORMULA # | COST ALT | QTY | SIZE | ADDITIONAL INFO |

CUSTOMER
COLOR
CAR          RUSH (Y/N)
MESSAGE-1    CODE
MESSAGE-2    YEAR
MESSAGE-3

——————— CHECK PAPER ALIGNMENT ———————

Make sure paper has been loaded into the
printer and the Top of Form has been set.

PRESS ANY KEY TO START PRINTING

MIX BASE                    SIZES

GALLON

© 1986 YADA SYSTEMS INC.

© 1986 YADA SYSTEMS INC.

DUPONT

11/08/87     FULL MIXING COLOR MOVEMENT FOR THE MONTH OF OCTOBER     PAGE NO. 1

| COLOR | DESCRIPTION | JAN | FEB | MAR | APR | MAY | JUN | JUL | AUG | SEP | OCT | NOV | DEC | TOTAL |
|---|---|---|---|---|---|---|---|---|---|---|---|---|---|---|
| 700 A | WHITE(HH) | | | | | | | | | | | | | |
| | USED IN FORMULAS | 0.0 | 0.0 | 0.0 | 0.0 | 0.0 | 0.0 | 0.0 | 0.0 | 0.0 | 0.0 | 0.0 | 0.0 | 0.0 |
| | SOLD AS MIX COLORS | 0.0 | 0.0 | 0.0 | 0.0 | 0.0 | 0.0 | 0.0 | 0.0 | 0.0 | 0.0 | 0.0 | 0.0 | 0.0 |
| | TOTAL | 0.0 | 0.0 | 0.0 | 0.0 | 0.0 | 0.0 | 0.0 | 0.0 | 0.0 | 0.0 | 0.0 | 0.0 | 0.0 |
| 701 A | WHITE | | | | | | | | | | | | | |
| | USED IN FORMULAS | 0.0 | 0.0 | 0.0 | 0.0 | 0.0 | 0.0 | 0.0 | 0.0 | 0.0 | 0.0 | 0.0 | 0.0 | 0.0 |
| | SOLD AS MIX COLORS | 0.0 | 0.0 | 0.0 | 0.0 | 0.0 | 0.0 | 0.0 | 0.0 | 0.0 | 0.0 | 0.0 | 0.0 | 0.0 |
| | TOTAL | 0.0 | 0.0 | 0.0 | 0.0 | 0.0 | 0.0 | 0.0 | 0.0 | 0.0 | 0.0 | 0.0 | 0.0 | 0.0 |
| 705 A | BLACK (HS) | | | | | | | | | | | | | |
| | USED IN FORMULAS | 0.0 | 0.0 | 0.0 | 0.0 | 0.0 | 0.0 | 0.0 | 0.0 | 0.0 | 0.0 | 0.0 | 0.0 | 0.0 |
| | SOLD AS MIX COLORS | 0.0 | 0.0 | 0.0 | 0.0 | 0.0 | 0.0 | 0.0 | 0.0 | 0.0 | 0.0 | 0.0 | 0.0 | 0.0 |
| | TOTAL | 0.0 | 0.0 | 0.0 | 0.0 | 0.0 | 0.0 | 0.0 | 0.0 | 0.0 | 0.0 | 0.0 | 0.0 | 0.0 |
| 706 A | BLACK | | | | | | | | | | | | | |
| | USED IN FORMULAS | 0.0 | 0.0 | 0.0 | 0.0 | 0.0 | 0.0 | 0.0 | 0.0 | 0.0 | 0.0 | 0.0 | 0.0 | 0.0 |
| | SOLD AS MIX COLORS | 0.0 | 0.0 | 0.0 | 0.0 | 0.0 | 0.0 | 0.0 | 0.0 | 0.0 | 0.0 | 0.0 | 0.0 | 0.0 |
| | TOTAL | 0.0 | 0.0 | 0.0 | 0.0 | 0.0 | 0.0 | 0.0 | 0.0 | 0.0 | 0.0 | 0.0 | 0.0 | 0.0 |
| 708 A | BLACK | | | | | | | | | | | | | |
| | USED IN FORMULAS | 0.0 | 0.0 | 0.0 | 0.0 | 0.0 | 0.0 | 0.0 | 0.0 | 0.0 | 0.0 | 0.0 | 0.0 | 0.0 |
| | SOLD AS MIX COLORS | 0.0 | 0.0 | 0.0 | 0.0 | 0.0 | 0.0 | 0.0 | 0.0 | 0.0 | 0.0 | 0.0 | 0.0 | 0.0 |
| | TOTAL | 0.0 | 0.0 | 0.0 | 0.0 | 0.0 | 0.0 | 0.0 | 0.0 | 0.0 | 0.0 | 0.0 | 0.0 | 0.0 |

```
       C A T F R A M S
   MIXING COLOR MOVEMENT REPORT

FORMULA #   COST ALT   QTY   SIZE                    ADDITIONAL INFO

CUSTOMER                           RUSH (Y/N)
COLOR                              CODE
CAR
MESSAGE-1                ┌─── SELECT VENDOR ───┐
MESSAGE-2                │                     │
MESSAGE-3                │  1 - DUPONT MIXING COLORS
                         │  2 - PPG INDUSTRIES MIXING COLORS
                         │  3 - ACME MIXING COLORS
                         │  4 - R-M MIXING COLORS
                         │  5 - GLASURIT MIXING COLORS
                         │  6 - SHERWIN-WILLIAMS MIXING COLORS
                         │
                         │        SELECTION:
                         └─────────────────────┘

MIX BASE   MI                              STANDARD SIZES

3 QT        GALLON
```

© 1986 YADA SYSTEMS INC.

FIG. 99

MIXING COLOR MOVEMENT REPORT

FORMULA #     COST ALT     QTY     SIZE                ADDITIONAL INFO

─────────── PRINT FULL OR SUMMARY REPORT ───────────

CUS
COL    Do you want to print the Full list of mixing colors
CAR    or a Summary of only those mixing colors used? (F/S)  F
MES
MES
MES

| MIX BASE | MIX BASE COLOR | PINT | QUART | 2 QT | 3 QT | GALLON |
|---|---|---|---|---|---|---|
|  |  |  |  |  |  |  |

© 1986 YADA SYSTEMS INC.

FIG. 100

MIXING COLOR MOVEMENT REPORT

| FORMULA # | COST ALT | QTY | SIZE | RUSH (Y/N) | ADDITIONAL INFO |

CUSTOMER
COLOR
CAR
MESSAGE-1
MESSAGE-2
MESSAGE-3

RUSH (Y/N)
CODE
YEAR

─── CHECK PAPER ALIGNMENT ───

Make sure paper has been loaded into the
printer and the Top of Form has been set.

PRESS ANY KEY TO START PRINTING

| MIX BASE | SIZES | | | GALLON |

© 1986 YADA SYSTEMS INC.

YOUR COMPANY NAME © 1986 YADA SYSTEMS INC.

11/15/87  DAILY FORMULA SIZE FREQUENCY  PAGE NO. 1

| VENDOR | PINT | QT | 2-QT | 3-QT | GAL | SPCL | TOT | GALS | %VOL | %MIX |
|---|---|---|---|---|---|---|---|---|---|---|
| DUPONT | 1 | 0 | 1 | 0 | 0 | 0 | 2 | 0.6 | 9.2 | 16.7 |
| PPG INDU | 1 | 0 | 0 | 1 | 1 | 0 | 3 | 1.9 | 27.6 | 25.0 |
| R-M | 0 | 0 | 0 | 1 | 0 | 1 | 2 | 1.4 | 21.0 | 16.7 |
| GLASURIT | 1 | 0 | 0 | 1 | 0 | 1 | 3 | 1.6 | 23.9 | 25.0 |
| SHERWIN- | 0 | 0 | 1 | 0 | 0 | 1 | 2 | 1.3 | 18.4 | 16.7 |
| TOTALS | 3 | 0 | 2 | 3 | 1 | 3 | 12 | 6.8 | | |

FIG. 109

DUPONT

SPECIAL TINT FORMULA REPORT

11/08/87  PAGE NO. 1

| FORMULA # | ALT | COLOR | CAR | YEAR | CODE |
|---|---|---|---|---|---|
| N8329L | ST1 | LT BLUE MET B/C | NISSAN,D | 85 | 229 |
| MSGS: B/C--TWO STAGE SYSTEM | | USE LUCITE BASECOAT LABEL | | | |
| 45416A | ST1 | SILVER MET B/C-LEAD FR | FIAT X-19 | | 656 |
| MSGS: COST CODE INCORRECT- | | SHOULD BE BLANK COST CODE | | | |

DAILY FORMULA FREQUENCY REPORT

═══ DAILY FORMULA FREQUENCY REPORT ═══

The data in the daily formula frequency file is from 11/03/87 and is at least one working day old.

Please specify what should be done with the data:

<1> Print and empty the daily formula frequency file.
<2> Print the daily formula frequency file and keep the daily formula frequency data.
<3> Keep but do not print the formula frequency data file.
<4> Empty the formula frequency file.

Enter daily summary report option (1-4):

© 1986 YADA SYSTEMS INC.

© 1986 YADA SYSTEMS INC.

03/06/87     ACME FREQUENCY OF FORMULAS MIXED FOR THE MONTH OF JANUARY     PAGE NO. 1

| FORMULA # | ALT | COST | PINT | QUART | 2-QUART | 3-QUART | GALLON | SPECIAL | TOTAL |
|---|---|---|---|---|---|---|---|---|---|
| 3-92277 |  | Y | 0 | 0 | 0 | 0 | 0 | 1 | 1 |
| 6-92371 | ST1 |  | 0 | 0 | 0 | 0 | 1 | 0 | 1 |
| 6-92371 |  | Y | 1 | 0 | 0 | 0 | 0 | 1 | 2 |
| 84-32021 |  |  | 0 | 1 | 0 | 0 | 0 | 0 | 1 |
| 84-32957 |  |  | 2 | 0 | 0 | 0 | 0 | 0 | 1 |
| 85-31137 |  | Y | 0 | 0 | 1 | 0 | 0 | 1 | 2 |
| 85-32816 |  |  |  |  |  |  |  |  |  |
| 85-34207 |  | Y | 0 | 0 | 0 | 0 | 0 | 0 | 1 |
| 85-34307 |  | E | 0 | 0 | 1 | 0 | 0 | 0 | 1 |

03/06/87     ACME FREQUENCY OF FORMULAS MIXED FOR THE MONTH OF JANUARY

|  | TOTALS | GALLONS |
|---|---|---|
| PINT | 11 | 1.37 |
| QUART | 37 | 9.25 |
| 2-QUART | 25 | 12.50 |
| 3-QUART | 11 | 8.25 |
| GALLON | 35 | 35.00 |
| SPECIAL | 5 | 1.64 |
| TOTALS | 124 | 72.26 |

FORMULAS FOR SPECIAL SIZES ARE BASED ON 4000 GRAMS PER GALLON

=== C A T F R A M S ===
MONTHLY FREQUENCY OF FORMULAS MIXED REPORT

FORMULA #   COST ALT   QTY   SIZE                ADDITIONAL INFO

CUSTOMER                           RUSH (Y/N)
COLOR                              CODE
CAR
MESSAGE-1
MESSAGE-2          ─── SELECT VENDOR ───
MESSAGE-3
            1 — DUPONT FORMULA FREQUENCY REPORT
            2 — PPG INDUSTRIES FORMULA FREQUENCY REPORT
            3 — ACME FORMULA FREQUENCY REPORT
            4 — R-M FORMULA FREQUENCY REPORT
            5 — GLASURIT FORMULA FREQUENCY REPORT
            6 — SHERWIN-WILLIAMS FORMULA FREQUENCY REPORT

SELECTION:

MIX BASE                                          QT        GALLON

ARD SIZES

© 1986 YADA SYSTEMS INC.

FIG. 106

MONTHLY FREQUENCY OF FORMULAS MIXED REPORT

FORMULA #   COST ALT   QTY   SIZE   ADDITIONAL INFO

PRINT FULL OR SUMMARY REPORT

Do you want to print a Full or Summary report? (F/S) F

CUSTO...
COLOR
CAR
MESSA...
MESSA...
MESSA...

| MIX BASE | MIX BASE COLOR | PINT | QUART | 2 QT | 3 QT | GALLON |
|---|---|---|---|---|---|---|
| | | | | | | |

© 1986 YADA SYSTEMS INC.

FIG. 107

MONTHLY FREQUENCY OF FORMULAS MIXED REPORT

FORMULA #  COST ALT  QTY  SIZE           ADDITIONAL INFO

CUSTOMER                      RUSH (Y/N)
COLOR                         CODE
CAR                           YEAR
MESSAGE-1
MESSAGE-2         ———— CHECK PAPER ALIGNMENT ————
MESSAGE-3
                  Make sure paper has been loaded into the
MIX BASE          printer and the Top of Form has been set.

PRESS ANY KEY TO START PRINTING

SIZES

GALLON

© 1986 YADA SYSTEMS INC.

FIG. 108

C A T F R A M S
SPECIAL TINT FORMULA REPORT

FORMULA #   COST ALT   QTY   SIZE   P/R PO/RO #   EFFECTIVE DATE

CUSTOMER
COLOR                                RUSH (Y/N)
CAR                                  CODE
MESSAGE-1
MESSAGE-2
MESSAGE-3

```
━━━━━━━━━━━━ SELECT VENDOR ━━━━━━━━━━━━
  1 - DUPONT SPECIAL FORMULA REPORT
  2 - PPG INDUSTRIES SPECIAL FORMULA REPORT
  3 - ACME SPECIAL FORMULA REPORT
  4 - R-M SPECIAL FORMULA REPORT
  5 - GLASURIT SPECIAL FORMULA REPORT
  6 - SHERWIN-WILLIAMS SPECIAL FORMULA REPORT
  7 - ALL

SELECTION:
```

MIX BASE                  STANDARD SIZES    3 QT    GALLON

© 1986 YADA SYSTEMS INC.

FIG. 110

SPECIAL TINT FORMULA REPORT

FORMULA #    COST ALT    QTY    SIZE    P/R PO/RO #    EFFECTIVE DATE

CUSTOMER                                RUSH (Y/N)
COLOR                                   CODE
CAR                                     YEAR
MESSAGE-1           ─── CHECK PAPER ALIGNMENT ───
MESSAGE-2           Make sure paper has been loaded into the
MESSAGE-3           printer and the Top of Form has been set.

PRESS ANY KEY TO START PRINTING

MIX BASE                                               SIZES
                                                       GALLON

© 1986 YADA SYSTEMS INC.

FIG. 111

DUPONT FORMULA RETRIEVAL

| FORMULA # | COST ALT | QTY | SIZE | P/R PO/RO # | CUSTOMER | RUSH Y/N |
|---|---|---|---|---|---|---|
| 31A | | | | | | |

CUSTOMER
COLOR
CAR
MESSAGE-1
MESSAGE-2
MESSAGE-3

```
┌─── REQUIRED SYSTEM FILE MISSING ───┐
│                                    │
│   A required system file is missing. The
│   file name is FDTZ.dbf. Call the
│   CATFRAMS 800 support line for help.
│
│        PRESS ANY KEY TO CONTINUE
│                                    │
└────────────────────────────────────┘
```

SIZES     GALLON

© 1986 YADA SYSTEMS INC.

FIG. 112

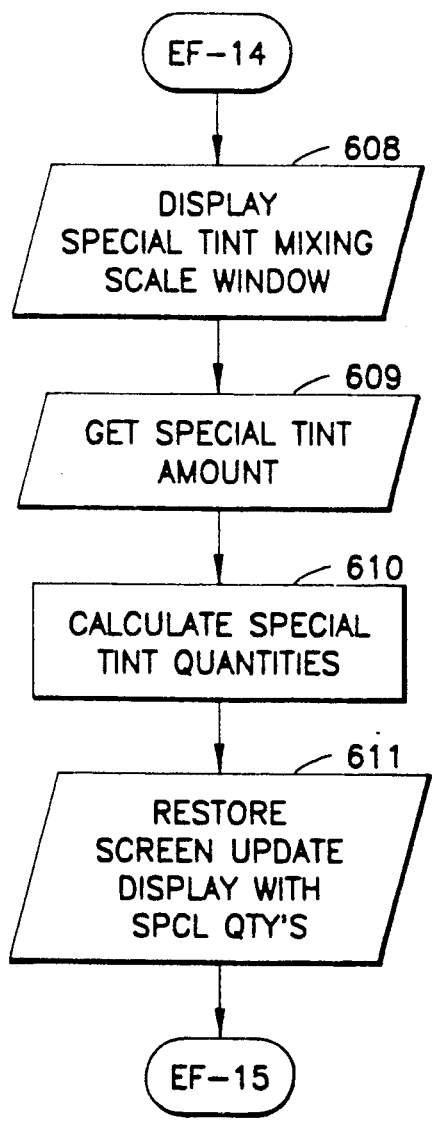
FIG. 1191

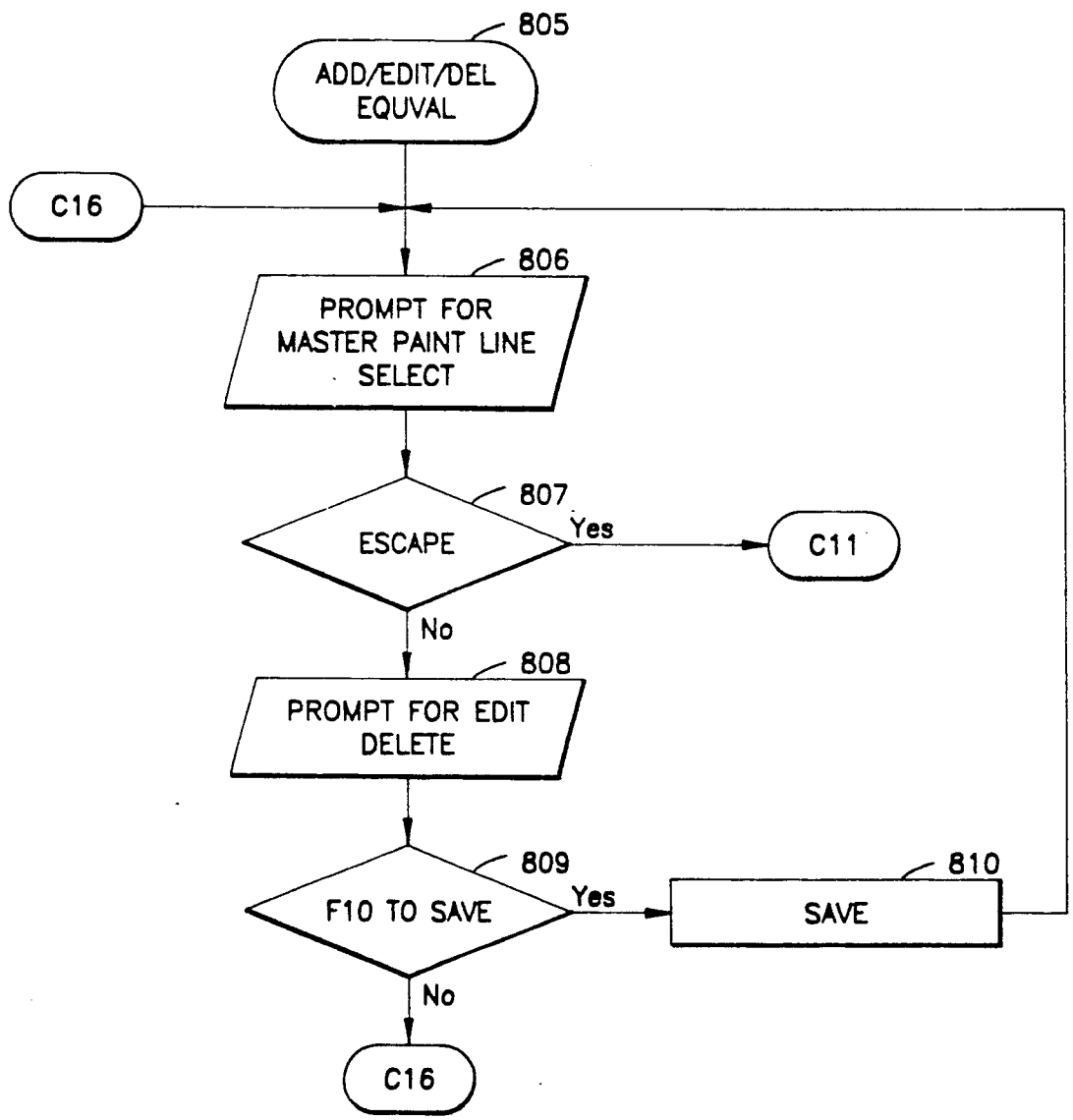
FIG. 1210

PAINT FORMULA RETRIEVAL AND MANAGEMENT SYSTEM AND METHOD

This is a continuation of application Ser. No. 122,321, filed Nov. 18, 1987, now abandoned.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a computerized system and method for paint formula retrieval and management.

Paint vendors provide body shops and jobbers with microfiche containing their paint formulas which identify the paints the vendors sell. Whenever the body shop or the jobber wishes to retrieve a paint formula of a vendor, the user will read the vendor's microfiche by use of a microfiche reader. Once the formula is located on the microfiche, the color mixing formula is written on a piece of paper for use by the mixer when mixing the paint. During this transcribing process, the paint formula can be erroneously written down or can be misread by the mixer. Moreover, if the user wishes to mix a non-standard size of color, the user must determine the formula for the non-standard size based on the formula for a standard size. This can often be time consuming and is very difficult, if not impossible to do. As a result, the user will typically use the next largest standard size so as to avoid this type of calculation. This results in a lot of paint being left over which results in a hazardous waste which must be suitably disposed of.

Yet another problem frequently encountered by a user in a body shop or jobbing operation, is that colors will fade with time and exposure to the elements. As a result, even though the user is able to locate on the microfiche the original paint formula used, the new paint may not match the old faded paint. As a result, the user will have to experiment with variants of the paint formula to derive as close a match as possible. This is a vary time consuming process. Moreover, the customer may have occasion to require the same variant. For example; an entire fleet of cars may have a certain variant color or a single user may want a spot touch-up of his/her automobile. Unless the formula variant has been written down, the user will have to attempt to recreate the formula variant and may never be able to derive the same color variant.

The microfiche provided by the paint vendors come in all types of formats and contain varying types of information in addition to the paint formula itself. Additionally, the paint formulas themselves may appear different. As a result, it can be difficult for the user to immediately recognize and interpret the data which results in interpretation errors.

Another problem which body shops encounter is justifying their charges to insurance companies. Automobile collision insurance carriers typically set a range of costs which they will pay to have an automobile repaired. The body shop's costs often are greater than this established amount. Unless the body shop can itemize in detail the basis for its charges, it will only be compensated the amount the insurance company is willing to pay.

Still another problem encountered by body shops and jobbers alike, is inventory control and management. It is difficult to monitor and manage inventory in view of the numerous sizes and quantities of paints used. Moreover, some paint colors move much faster than others and are used in different container sizes.

Also, there is the problem of providing appropriate labelling on the paint cans. In particular, regulatory and material data safety labelling is often required.

The present invention solves these and other problems associated with paint formula retrieval and management.

SUMMARY OF THE INVENTION

The present invention relates to a computerized system for managing automotive paint formulas. The system provides the capability to retrieve paint formulas by paint vendor and formula number. Paint formulas are presented to users in a standard screen presentation format that is vendor independent while maintaining pertinent information.

An advantageous feature of one embodiment of the present invention is the provision for printing custom labels which provide mix formulation, tinting, paint identification, and information related to material data safety and regulatory information.

Yet another advantageous feature of one embodiment of the present invention is that custom paint formulas can be created and archived. Also provided is custom tinting of existing formulas so as to create variants of an existing formula which can be archived for future use.

Still another advantageous feature of one embodiment of the present invention is the ability to track inventory usage and provide reports thereof.

Another advantage of one embodiment of the present invention is the ability to calculate and print the paint and material costs related to auto body repair based on paint type and quantity.

In one embodiment of the present invention, the method of retrieving a paint formula includes the steps of selecting the vendor whose paint is being used and selecting the paint formula identifying number. Once the paint formula is retrieved and displayed, the user is able to edit various information fields which are later printed on paint labels.

One embodiment of the present invention provides for printing the following labels:
1. A paint can identification label.
2. A paint can formula tinting guide.
3. A regulatory label or touch-up bottle identification label.
4. A mix operator formulation label.

One embodiment of the present invention provides inventory control based on formula mix quantity and sales of base mixing colors.

Yet another embodiment of the present invention provides for computerized mixing color retrieval.

One advantage of yet another embodiment of the present invention provides paint and material costing with predetermined figures being provided as a costing guide but which are editable by the user as required in any given job and provides for printing of a paint and material cost label itemizing the costs involved.

Still another embodiment of the present invention provides a clear/catalyst/reducer reduction guide.

Another embodiment of the present invention provides for tracking formula frequency usage based on formula retrieval.

Another embodiment tracks daily formula size frequency based on formula retrieval.

Yet another embodiment provides for calculation of non-standard mix size which a given vendor may not provide.

These and various other advantages and features of novelty which characterize the present invention are pointed out with particularity in the claims annexed hereto and forming a part hereof. However, for a better understanding of the invention, its advantages and objects obtained by its use, reference should be had to the drawings which form a further part hereof, and to the accompanying descriptive matter in which there is illustrated and described a preferred embodiment of the invention.

BRIEF DESCRIPTION OF THE DRAWINGS In the drawings, in which like reference numerals and letters indicate corresponding parts throughout the several views;

FIG. 5 is a master menu screen presentation;

FIG. 6 is a main menu screen presentation;

FIG. 7 is a daily formula frequency report screen presentation;

FIG. 8 is a vendor formula retrieval select vendor screen presentation;

FIG. 9 is a vendor formula retrieval screen presentation;

FIG. 10 is a multiple formulas detected screen presentation;

FIG. 11 is a vendor formula retrieval screen presentation;

FIGS. 12A and 12B are a field definition of the vendor formula retrieval screen presentation shown in FIG. 11;

FIG. 13 is a vendor formula retrieval screen presentation;

FIG. 14 is a select vendor size screen presentation;

FIG. 16 is an embodiment of a vendor formula retrieval screen presentation illustrating a special size formula;

FIG. 17 is an embodiment of a bulk mix screen presentation;

FIG. 18 is an embodiment of a vendor formula retrieval screen presentation;

FIG. 21 is an embodiment of a special tinting of formulas screen presentation;

FIG. 22 is an embodiment of a vendor special formula tinting screen presentation;

FIG. 23 is an embodiment of a vendor special formula tinting screen presentation;

FIG. 24 is an embodiment of a create/edit/delete special tint formula records screen presentation;

FIG. 25 is an embodiment of a formula not found screen presentation;

FIG. 26 is an embodiment of a vendor special formula tinting screen presentation;

FIGS. 27A and 27B are a field definition of the vendor special formula tinting screen presentation embodiment shown in FIG. 26;

FIG. 28 is an embodiment of the select size screen presentation;

FIG. 29 is an embodiment of the vendor special formula tinting screen presentation illustrating a pint size selected;

FIG. 30 is an embodiment of a special formula tint mixture scale screen presentation;

FIG. 31 is an embodiment of a vendor special formula tinting screen presentation illustrating selection of a special size;

FIG. 32 is an embodiment of a vendor special formula tinting screen presentation;

Figure 1:
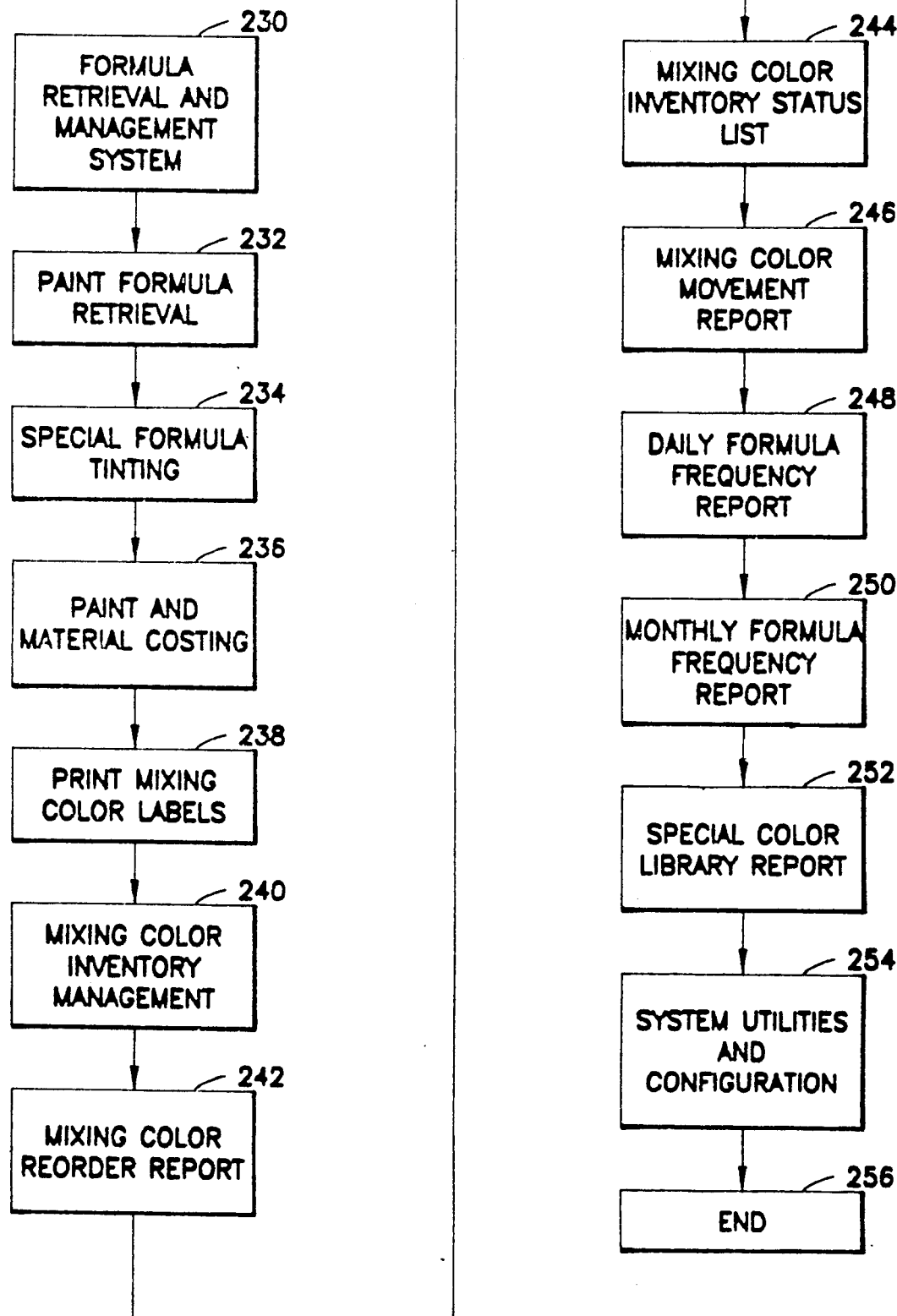
FIG. 1 is a block diagram illustrating the functions present in a preferred embodiment of the present invention.
Figure 76:
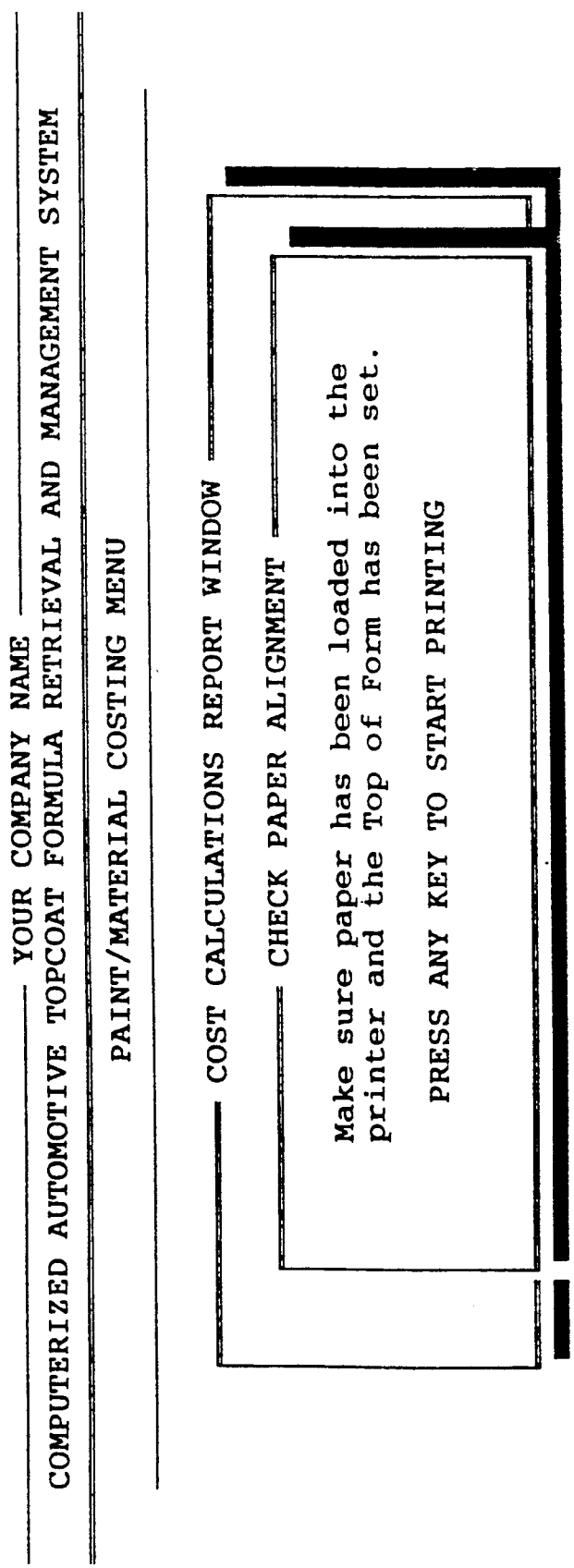
Figure 83:
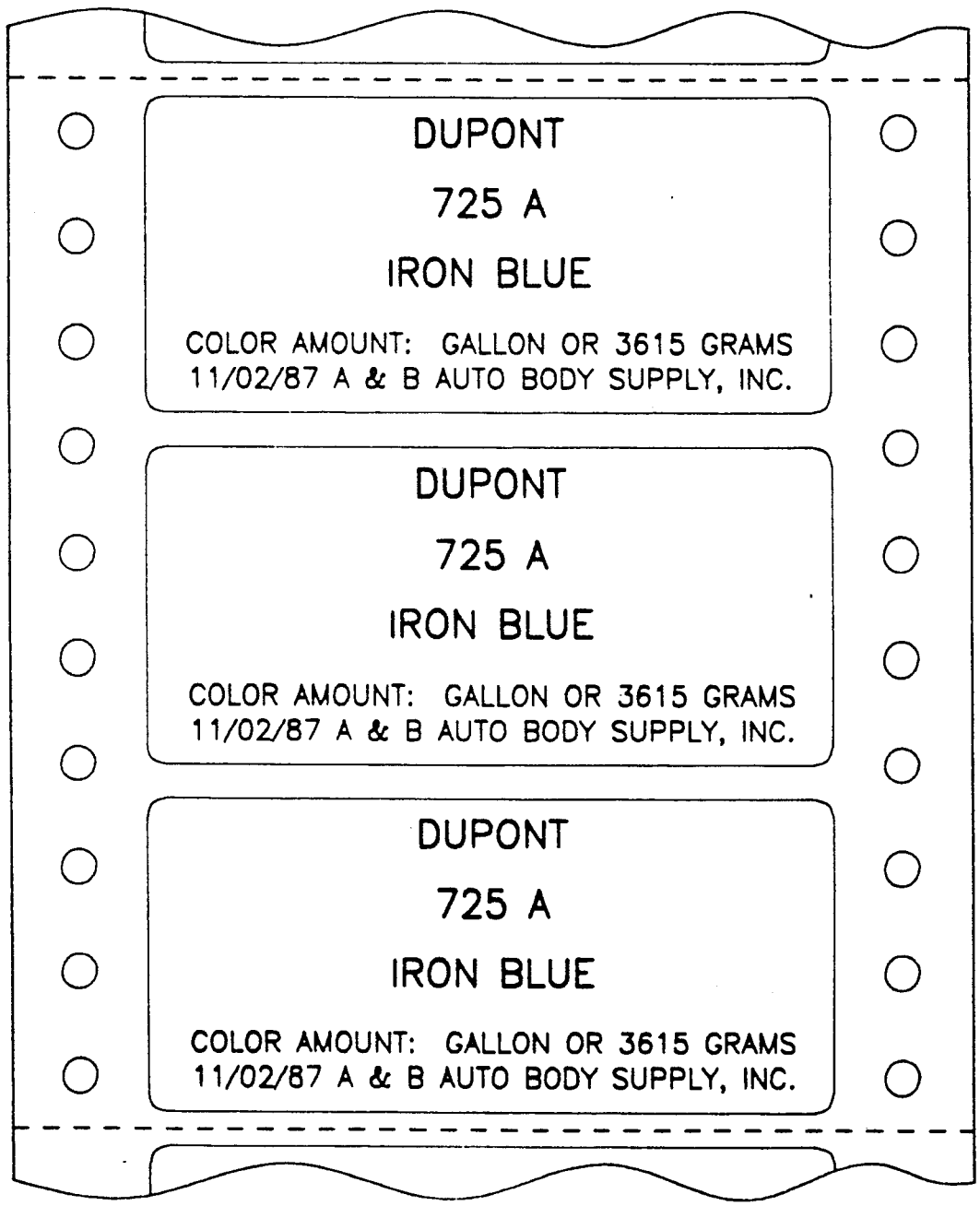
Figure 104:
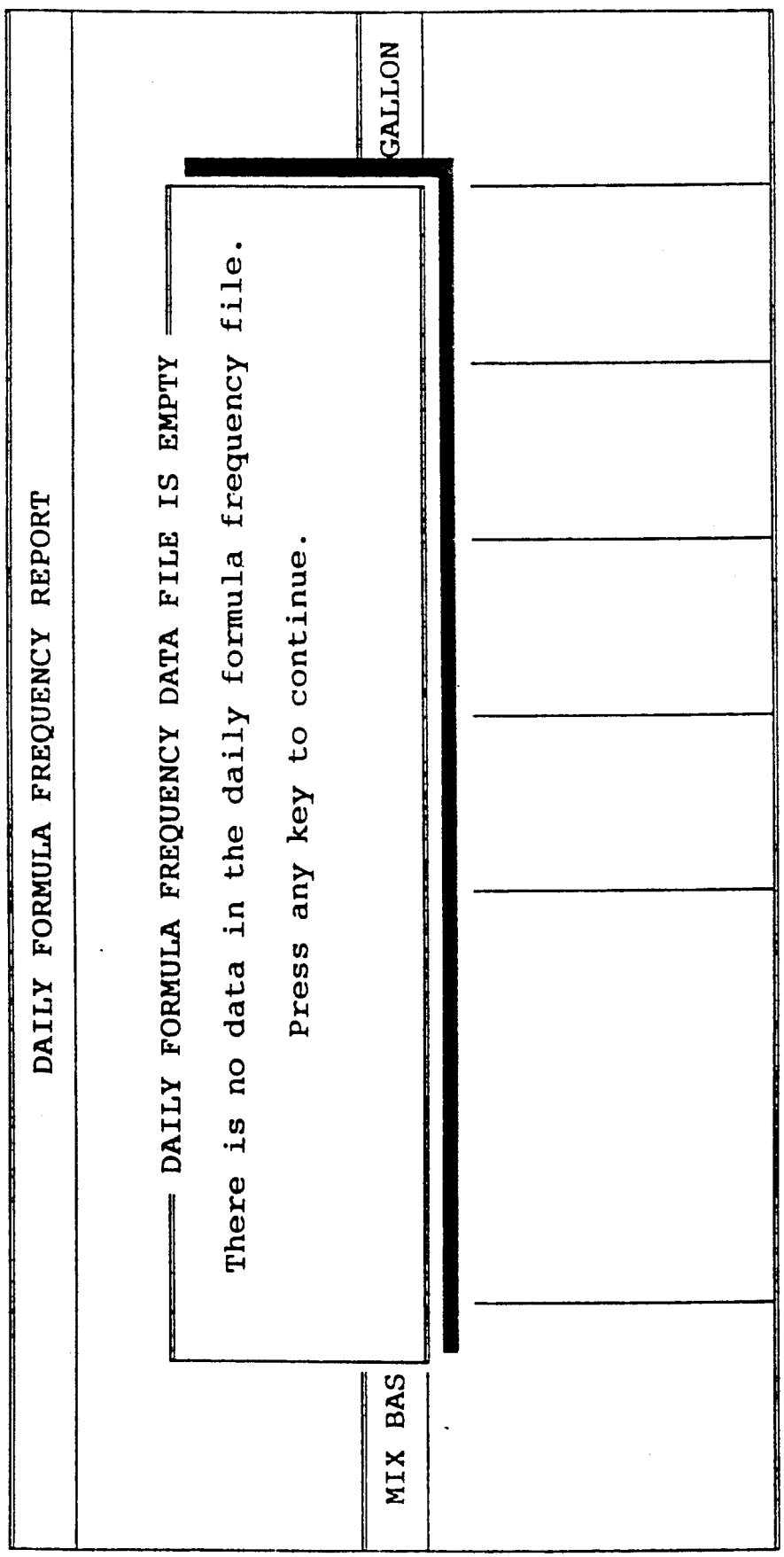
Figure 113:
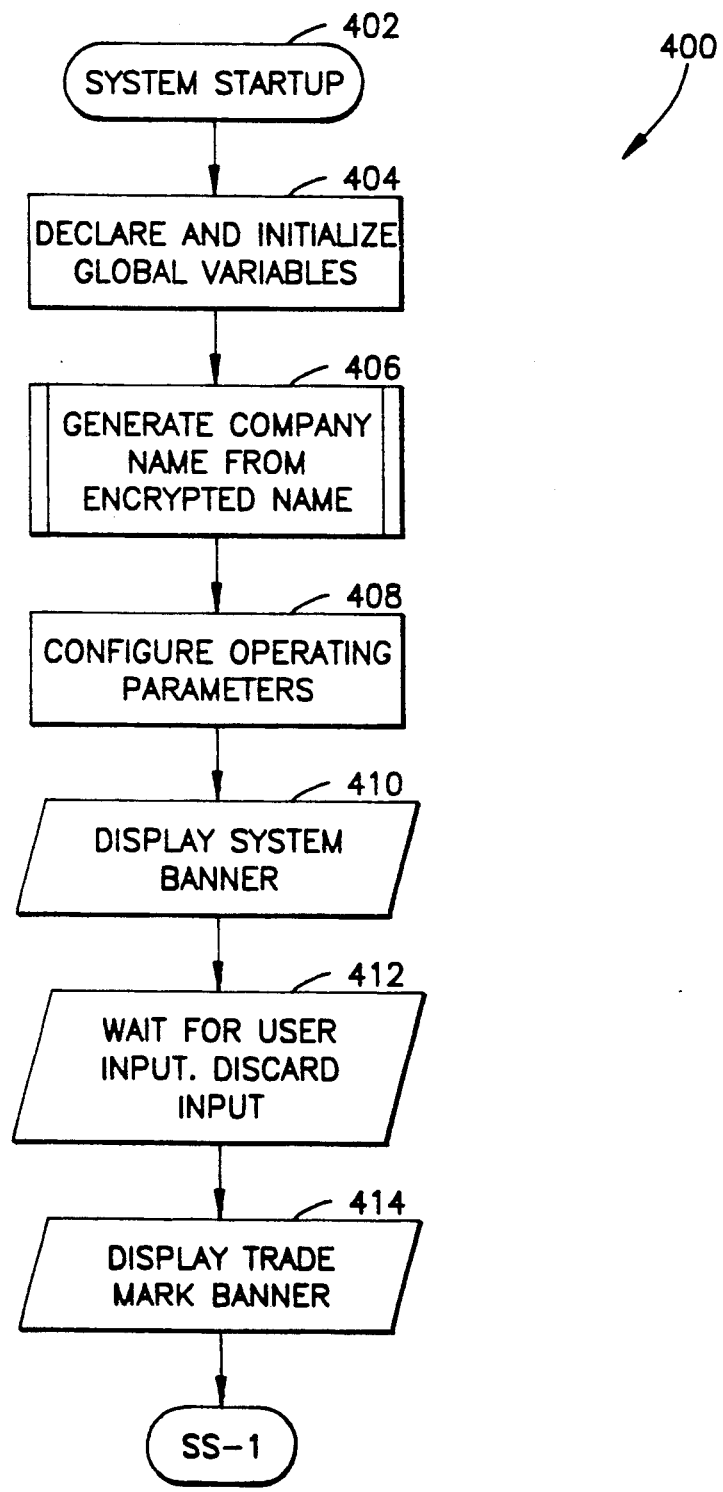
Figure 114:
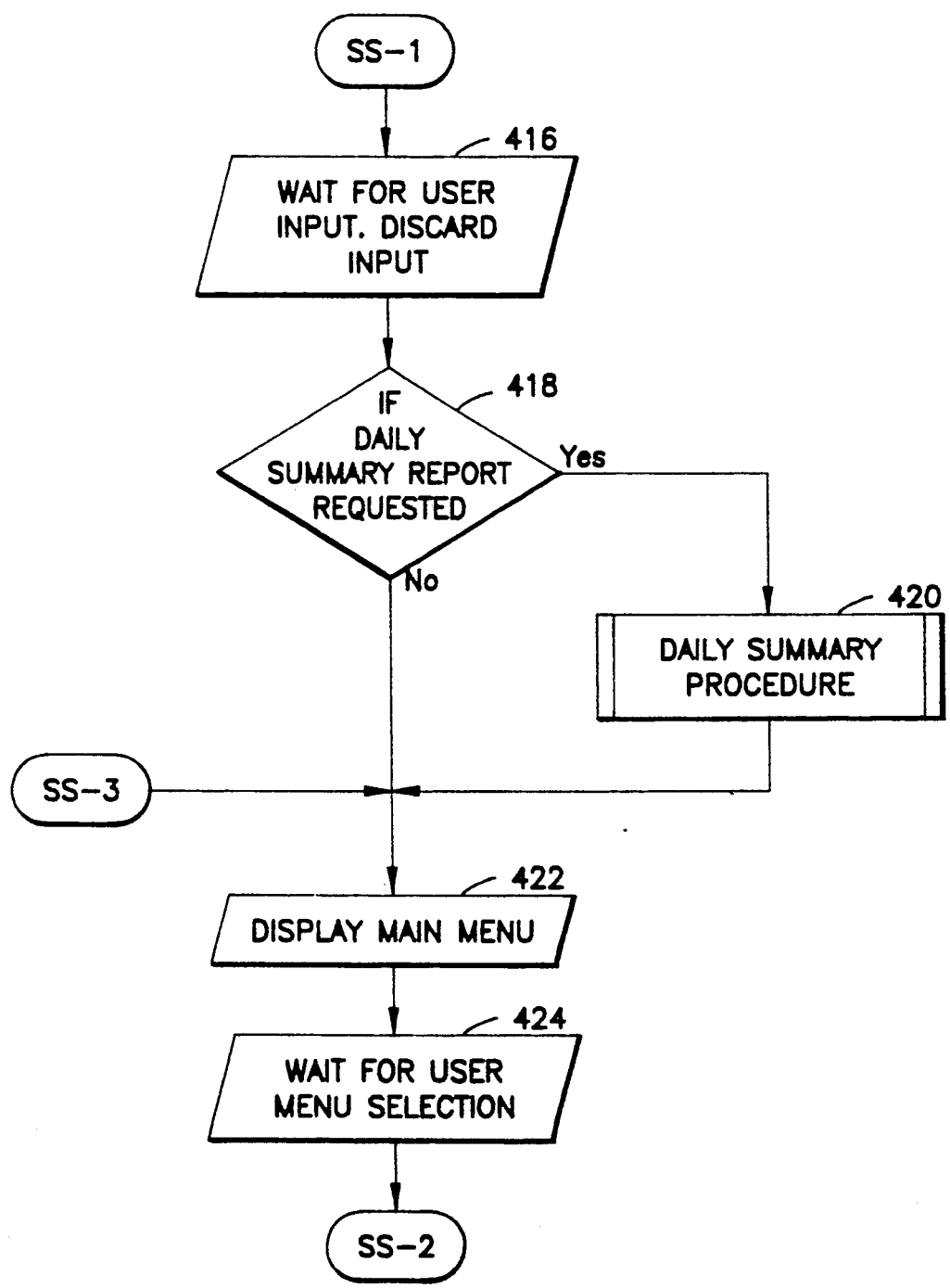
Figure 115:
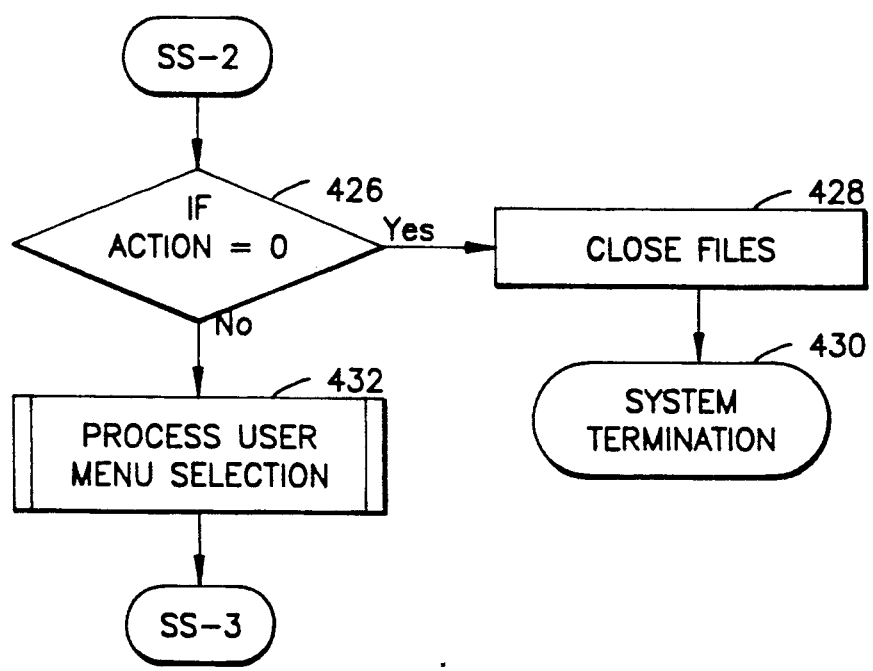
Figure 115A:
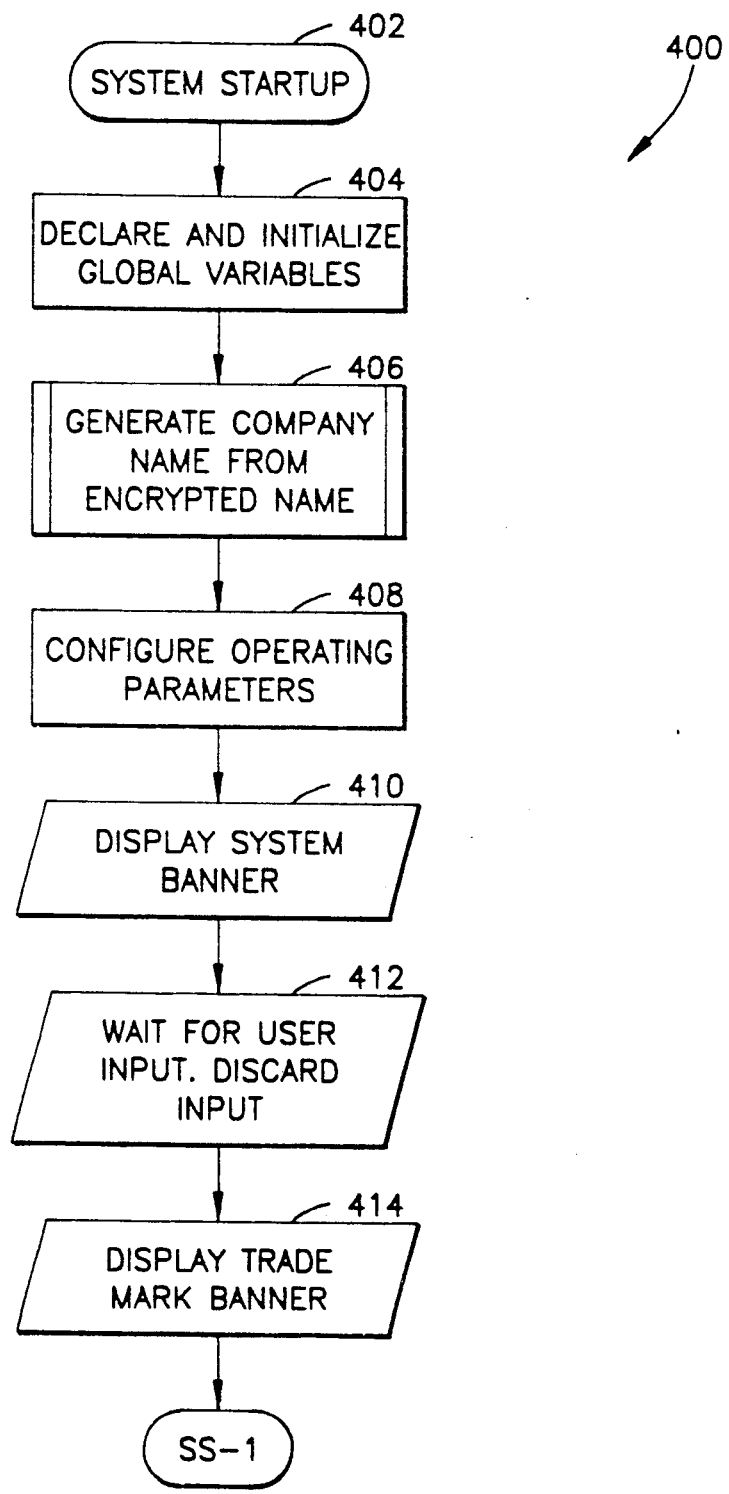
Figure 115B:
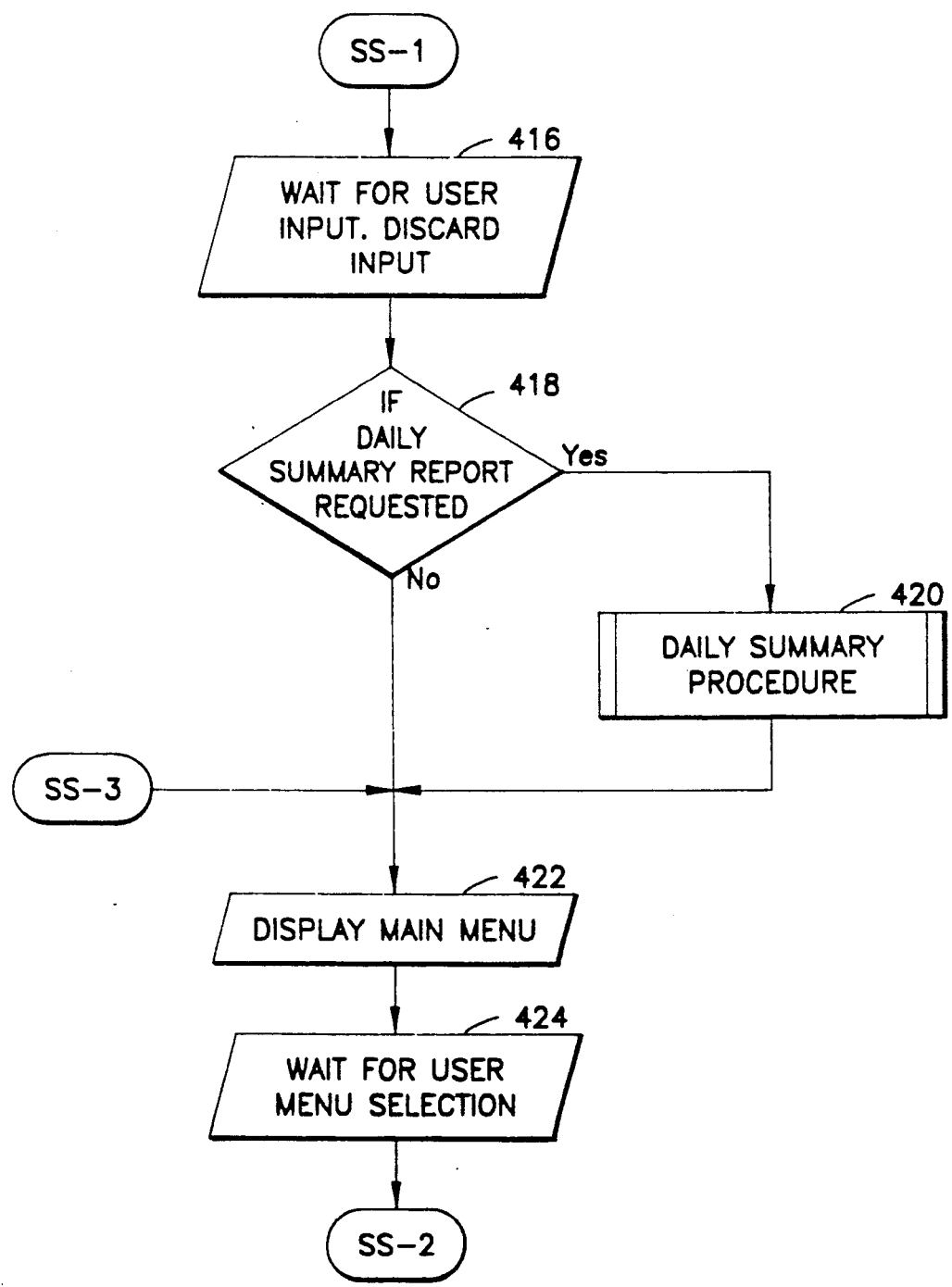
Figure 115C:
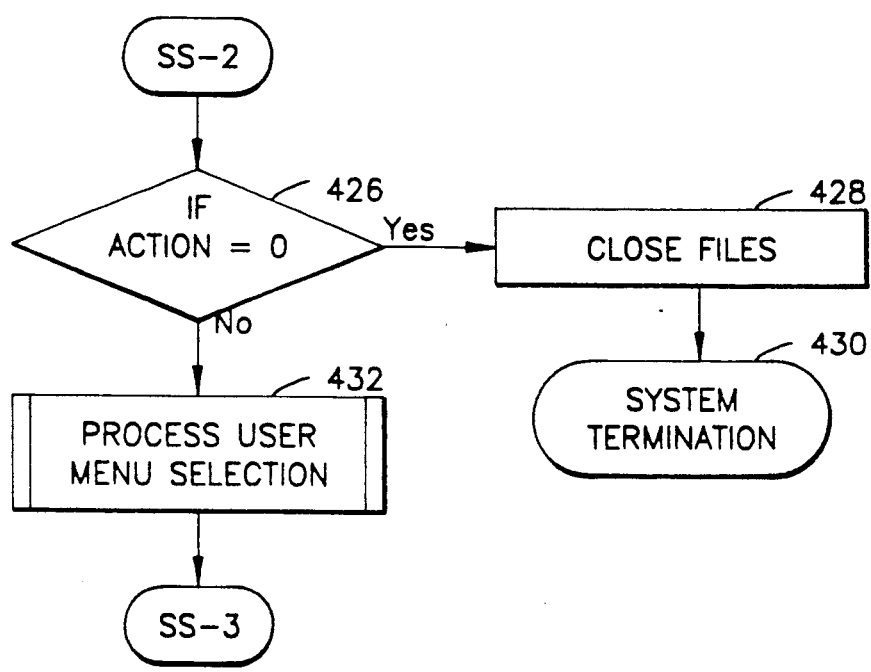
Figure 116A:
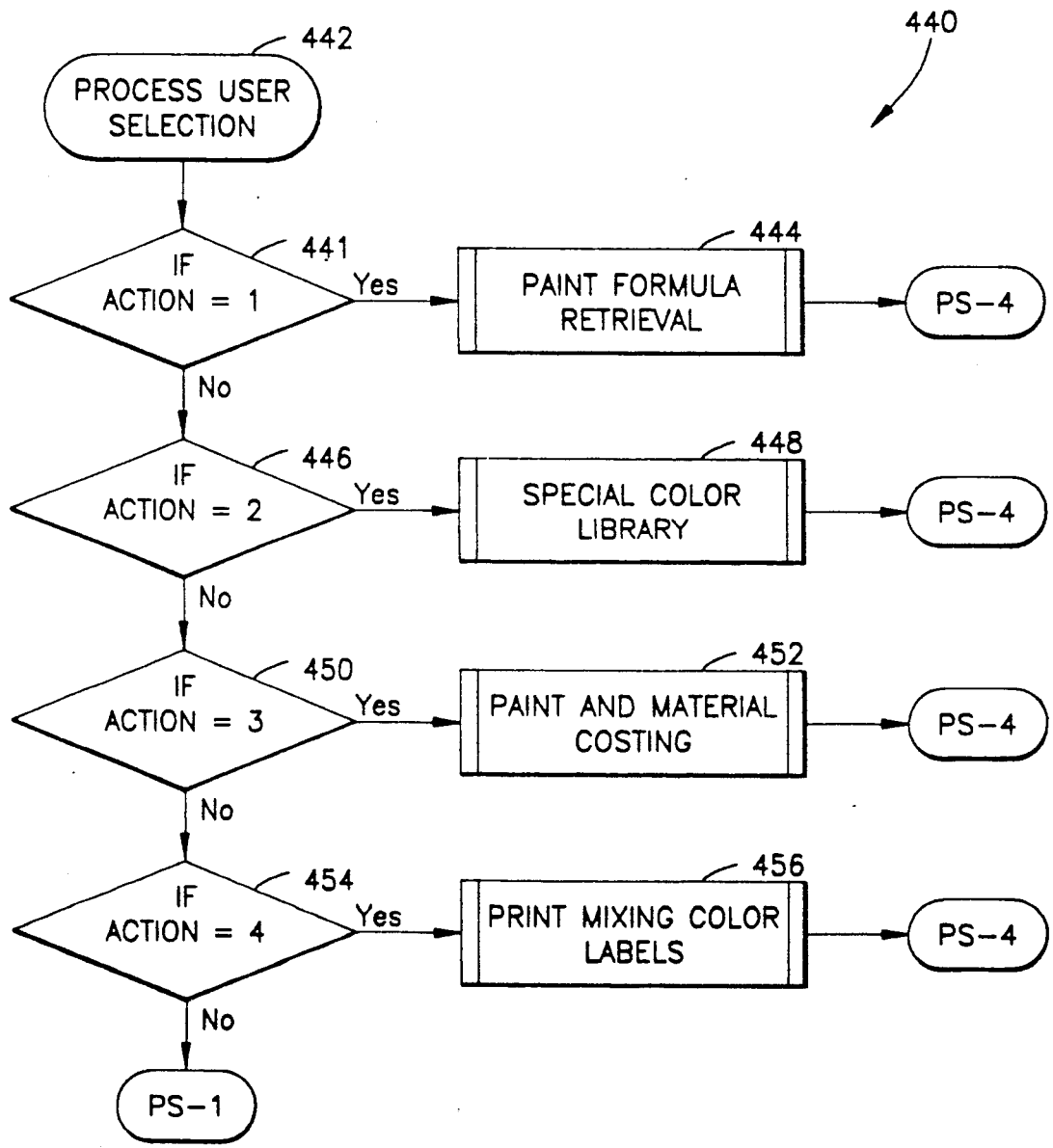
Figure 116B:
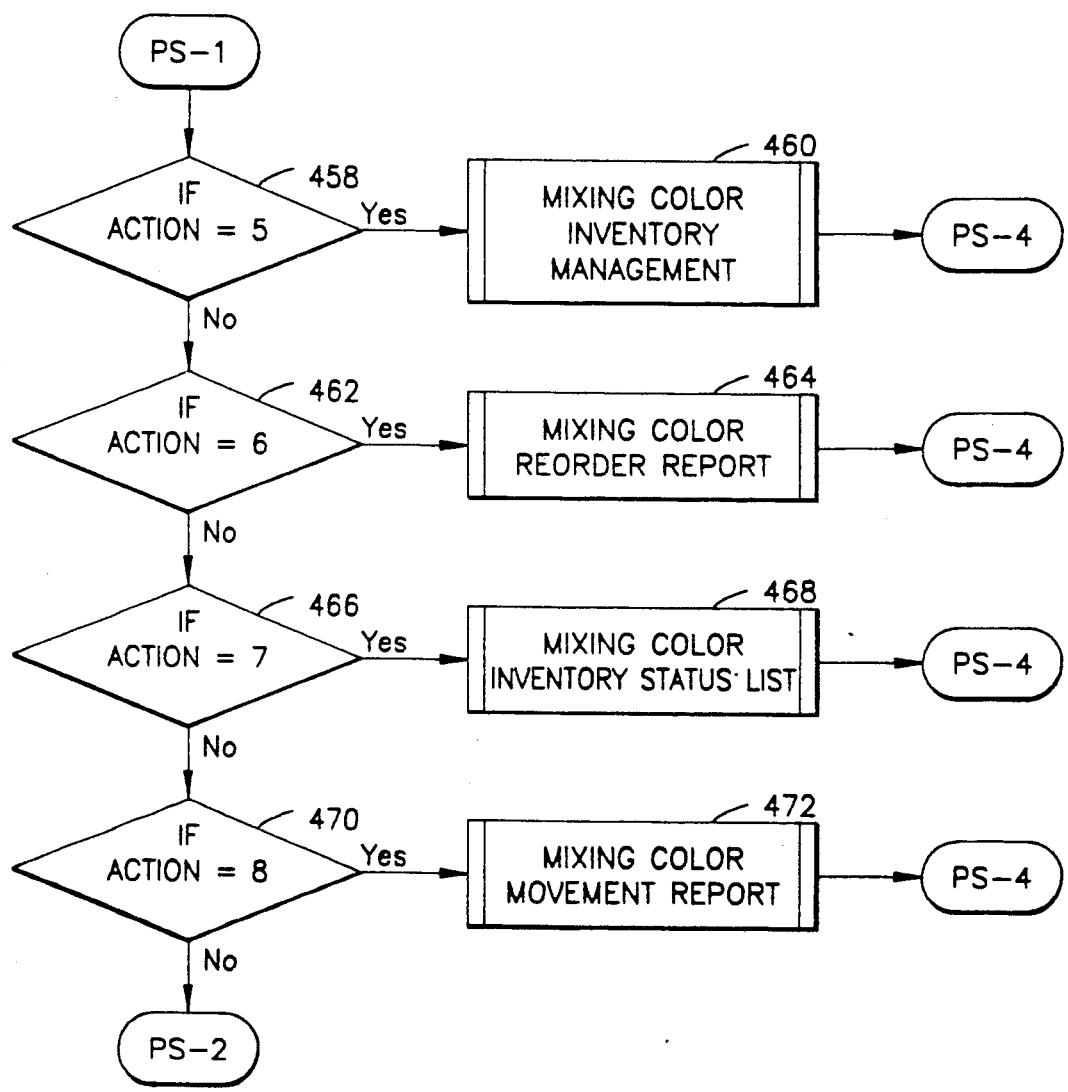
Figure 116C:
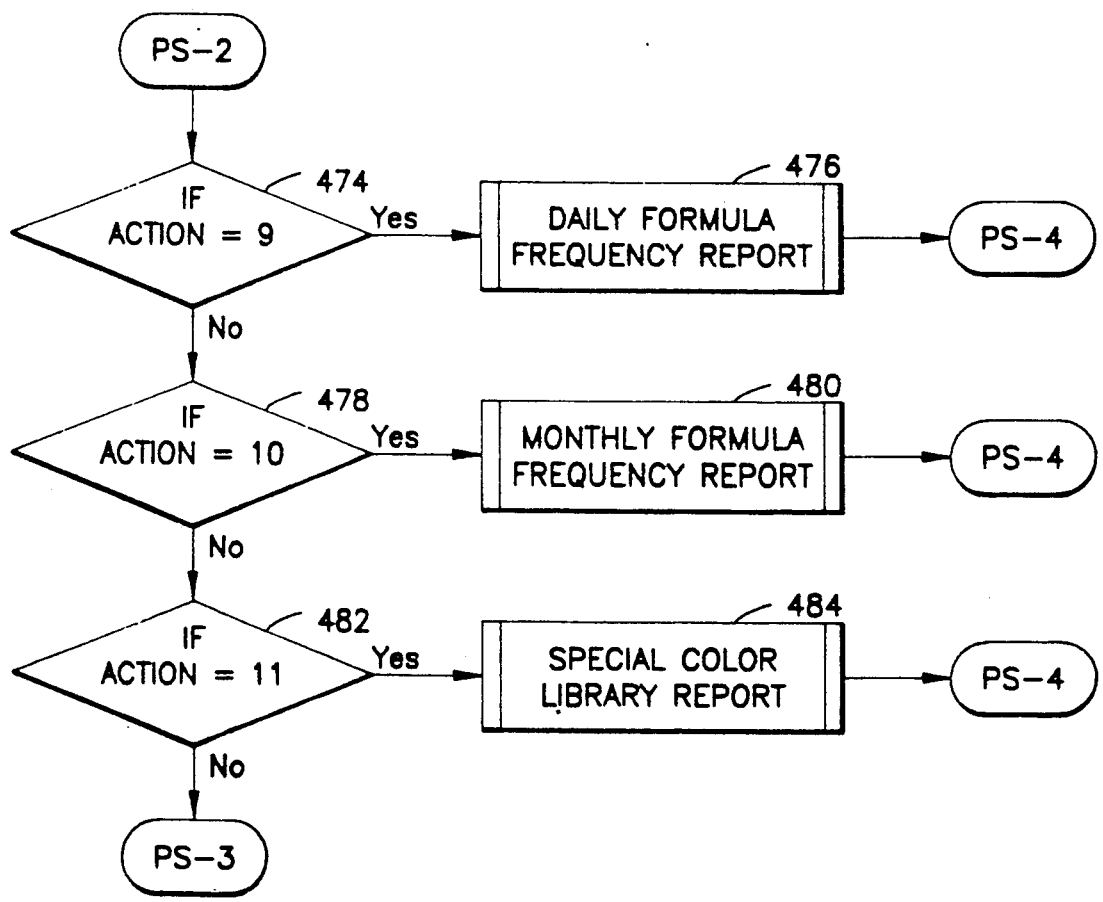
Figure 116D:
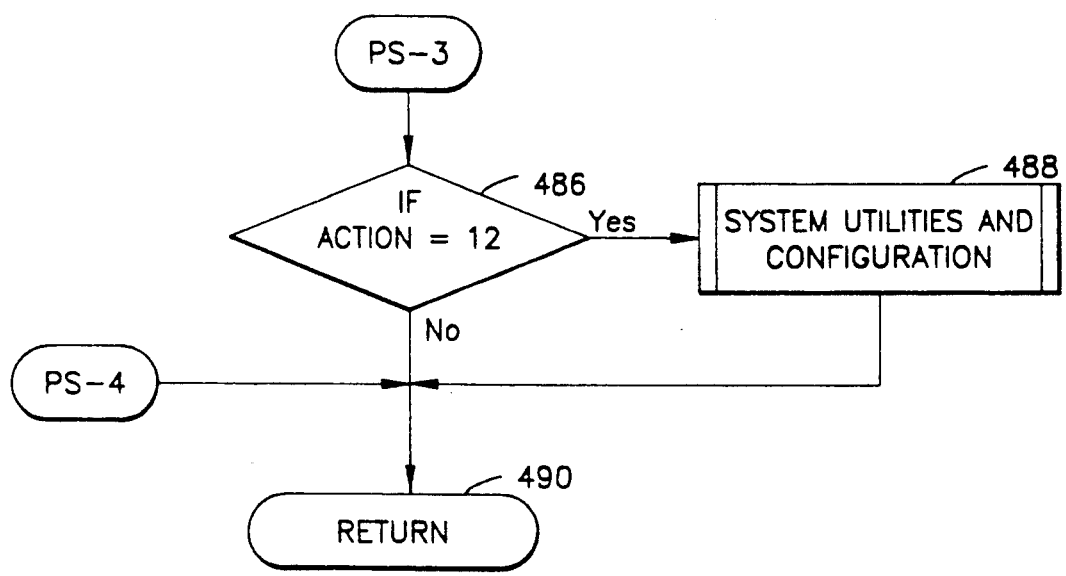
Figure 117A:
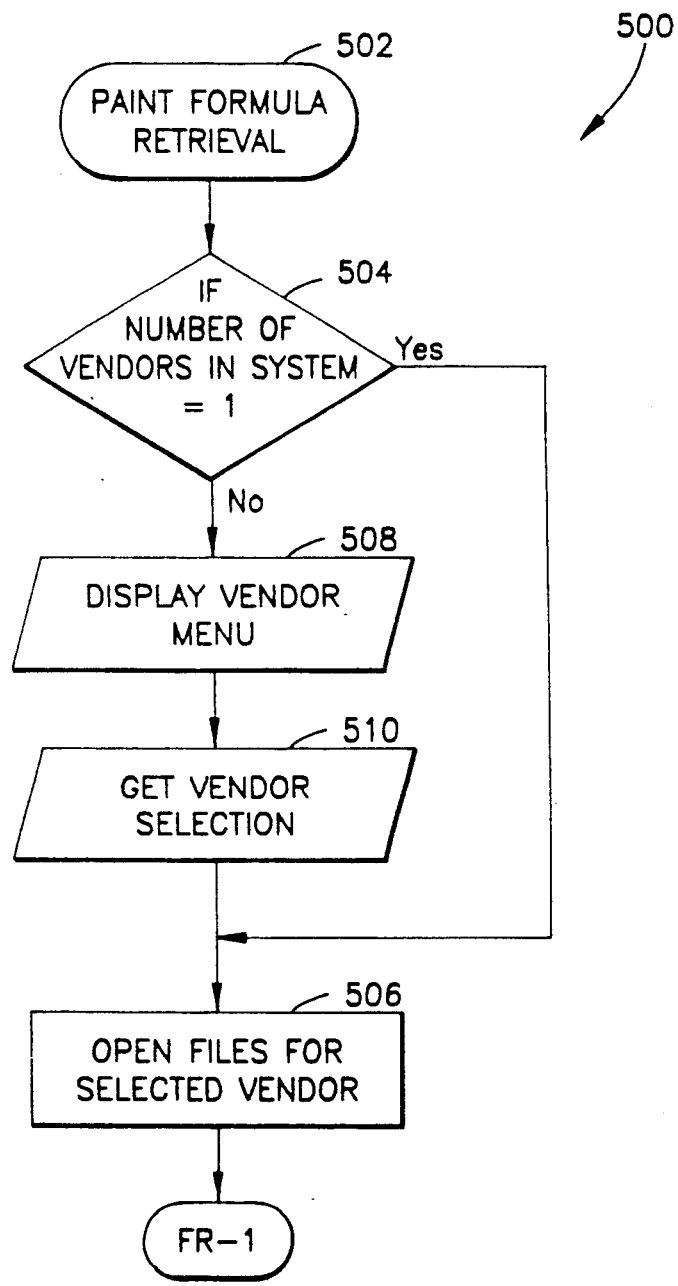
Figure 117B:
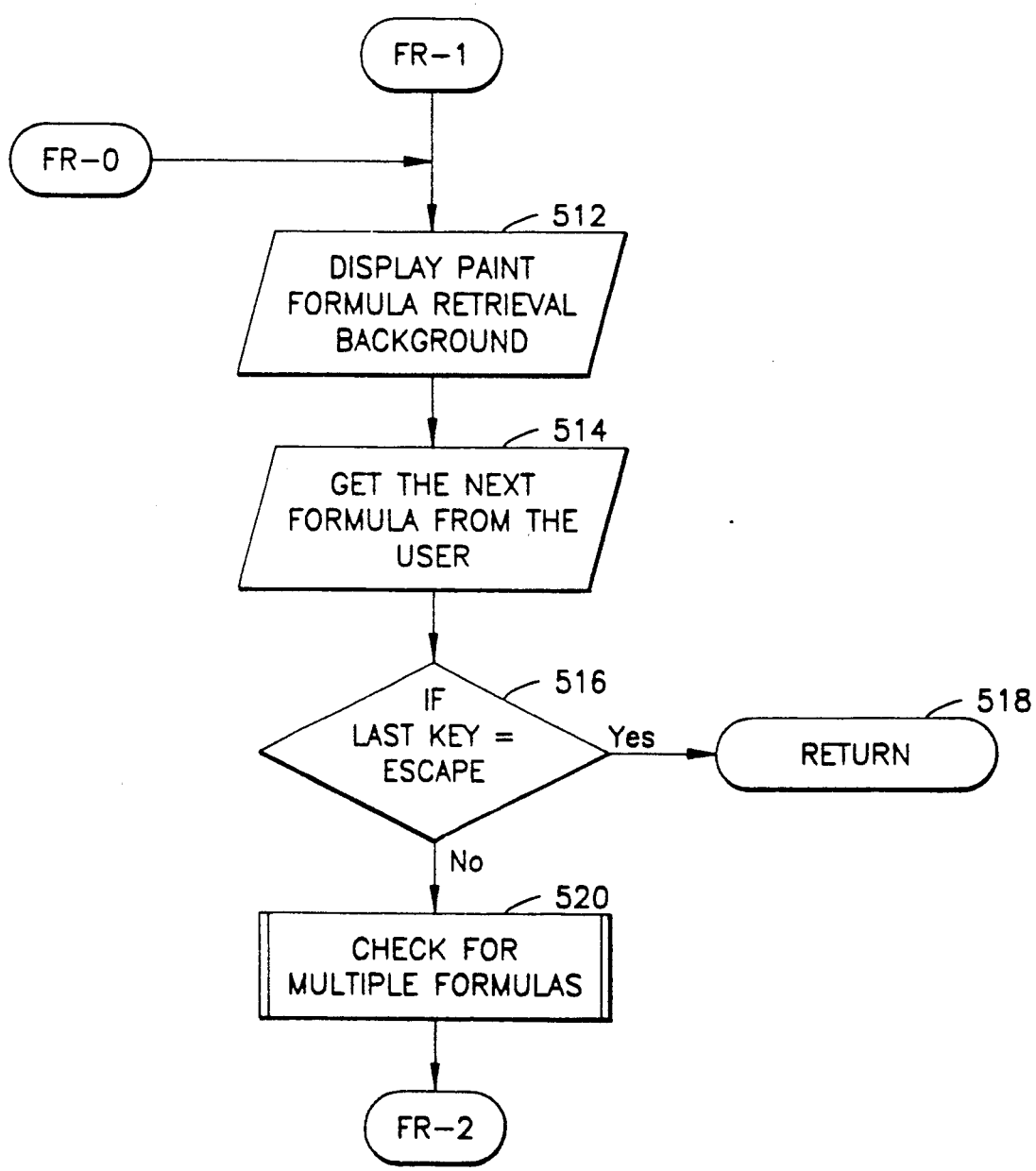
Figure 117C:
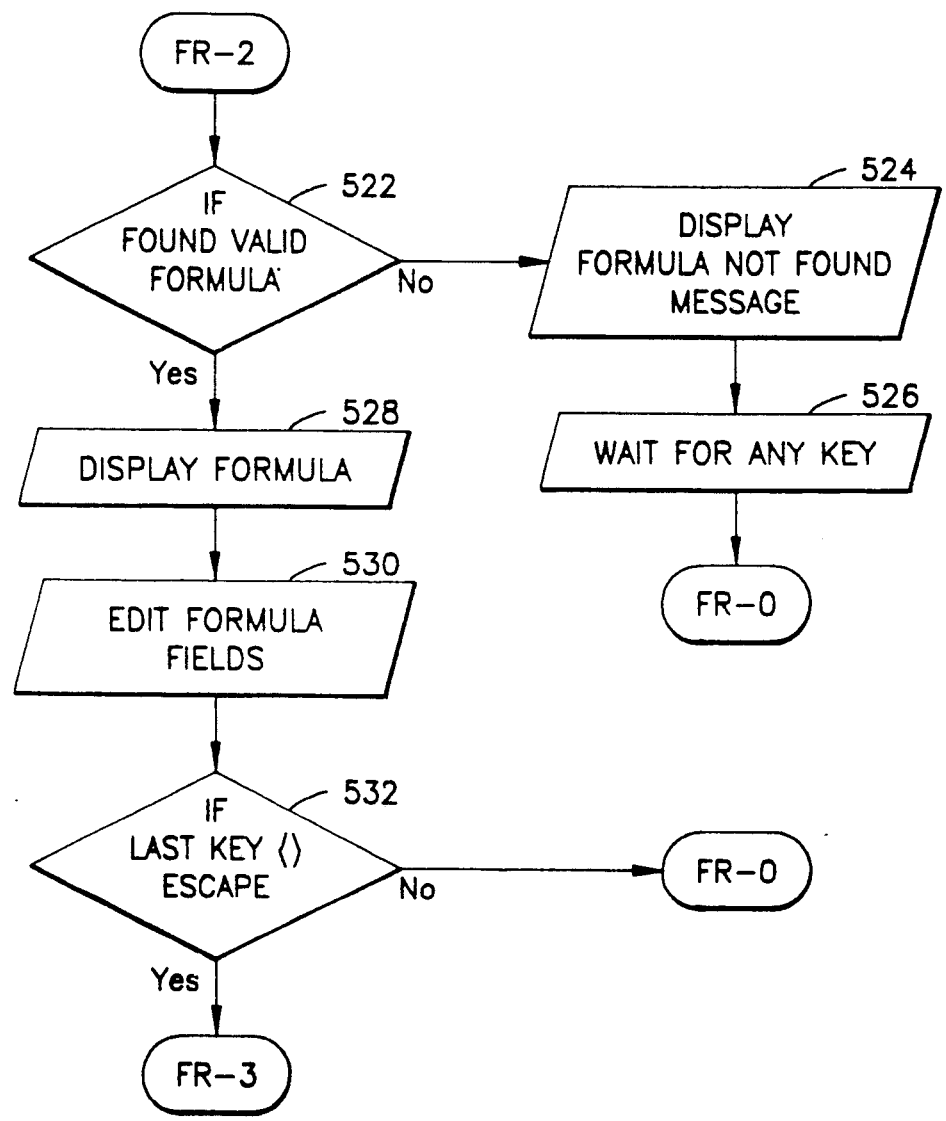
Figure 117D:
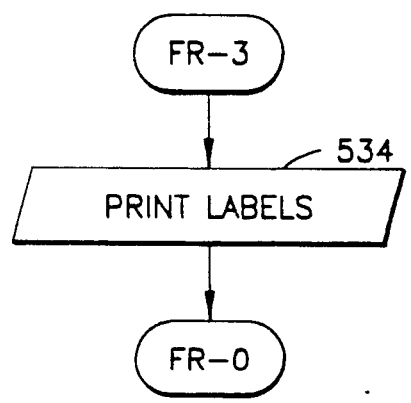
Figure 118A:
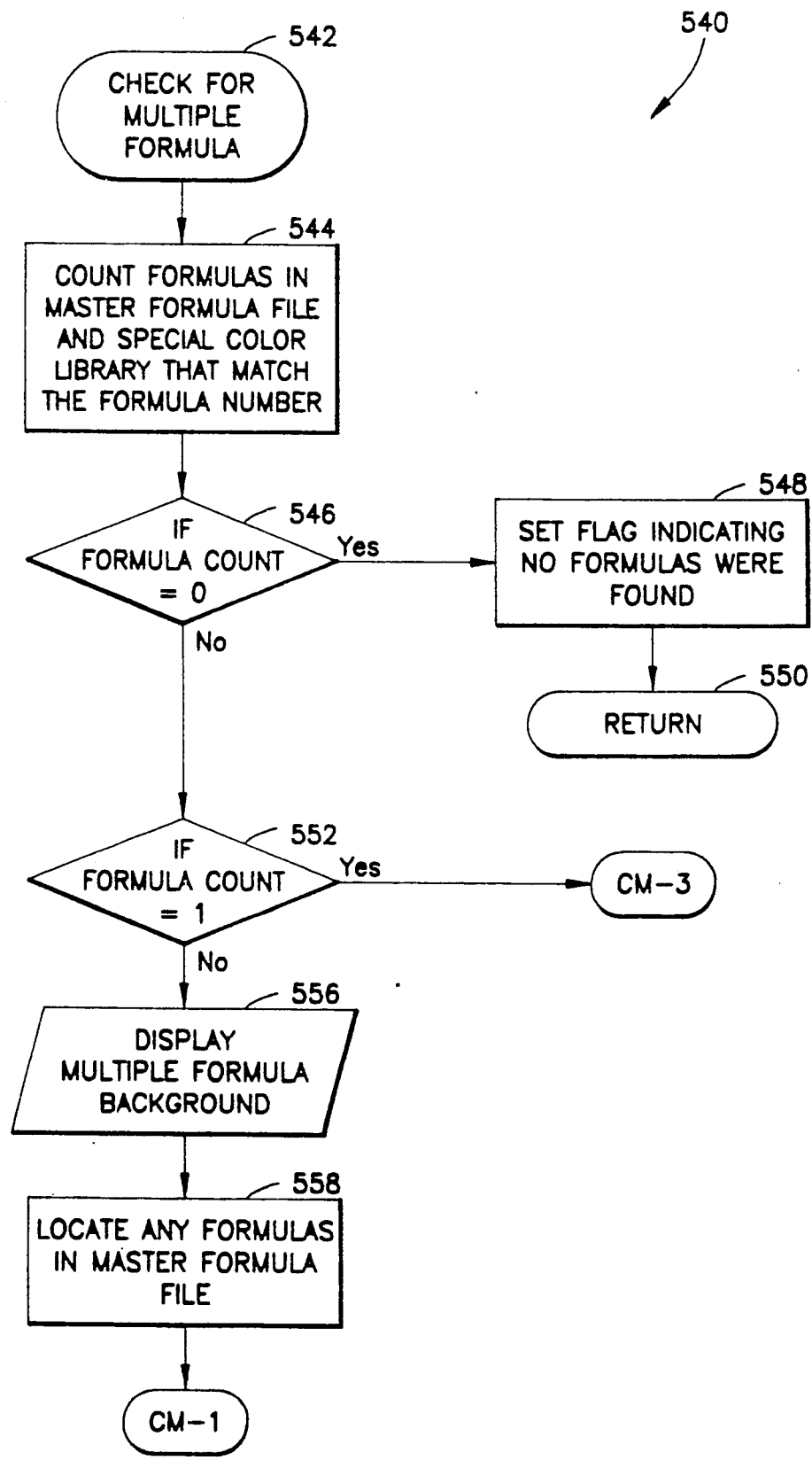
Figure 118B:
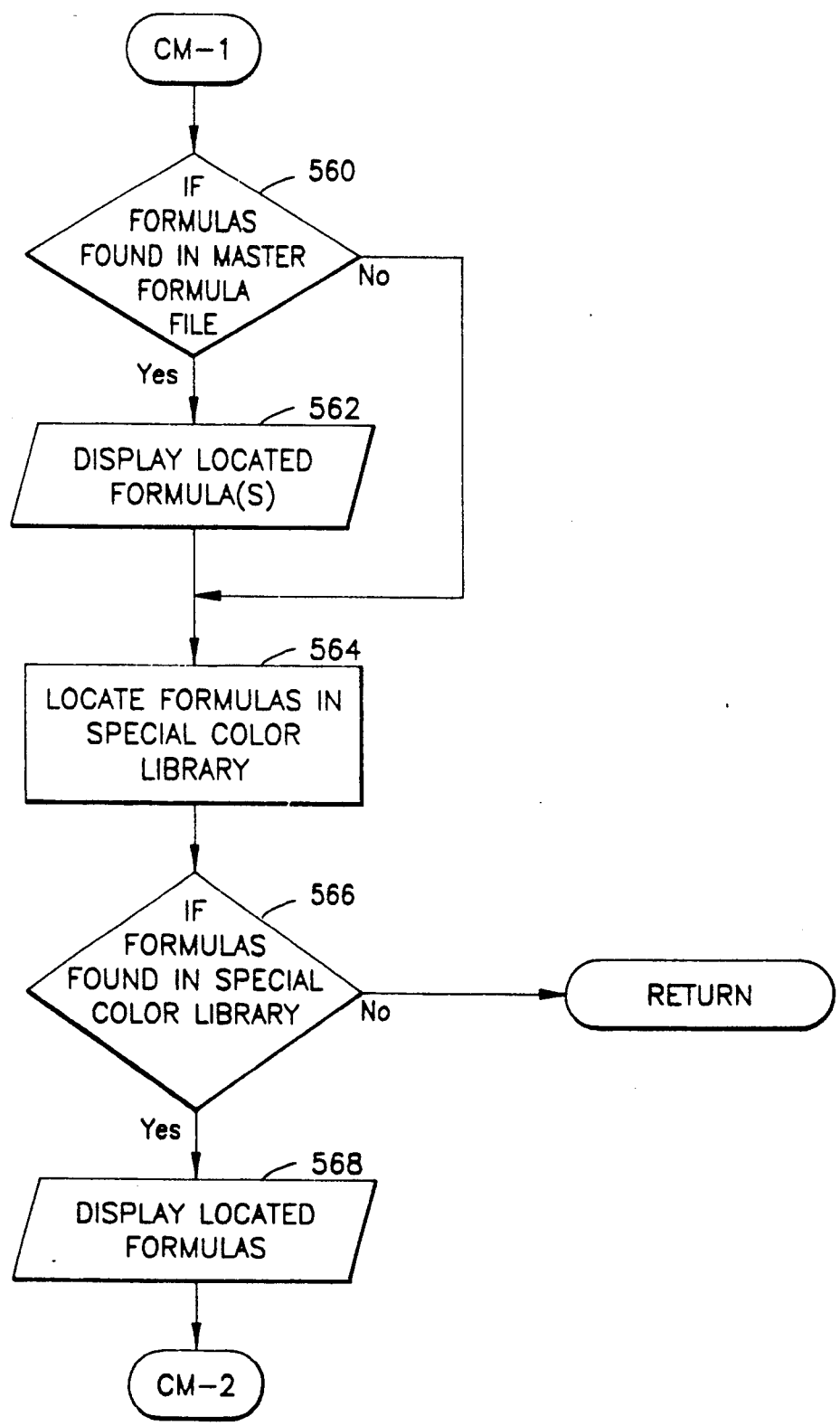
Figure 118C:
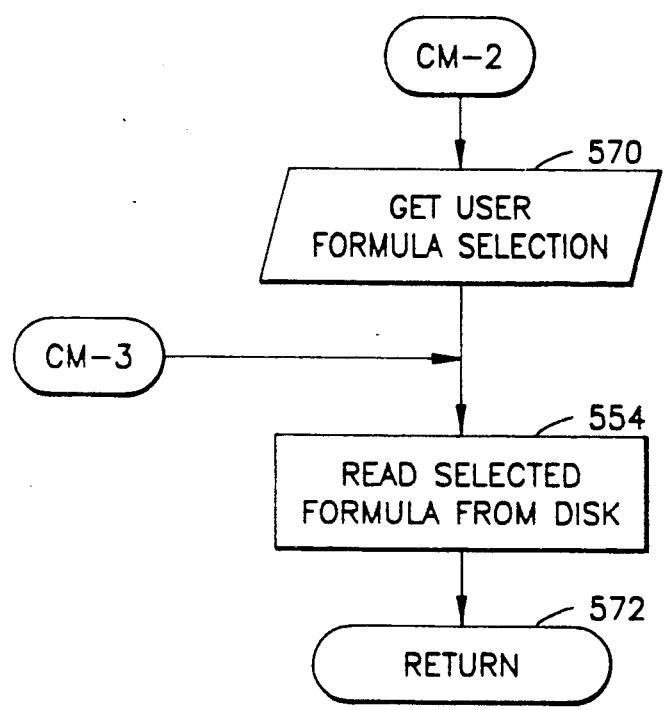
Figure 119A:
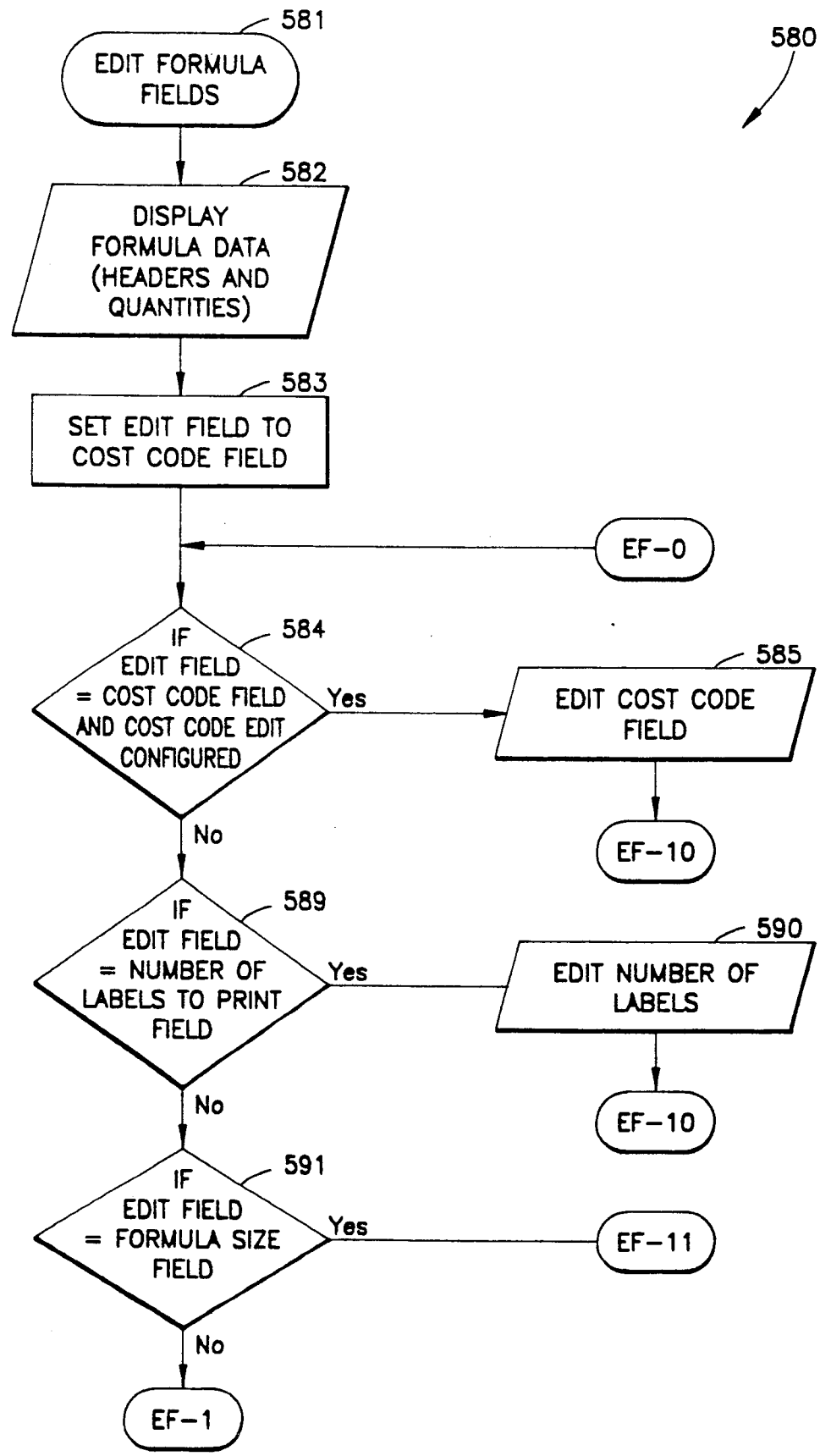
Figure 119B:
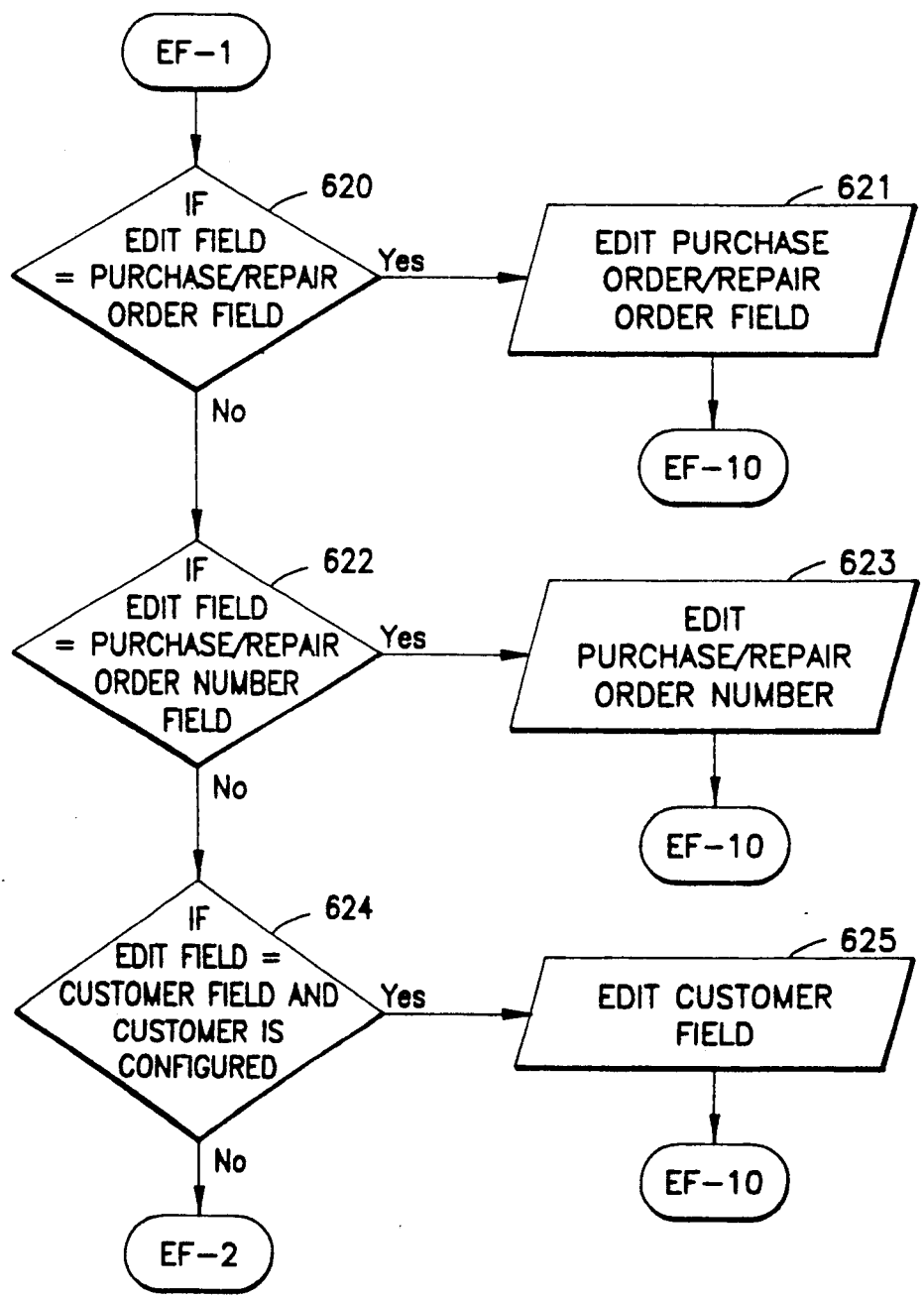
Figure 119C:
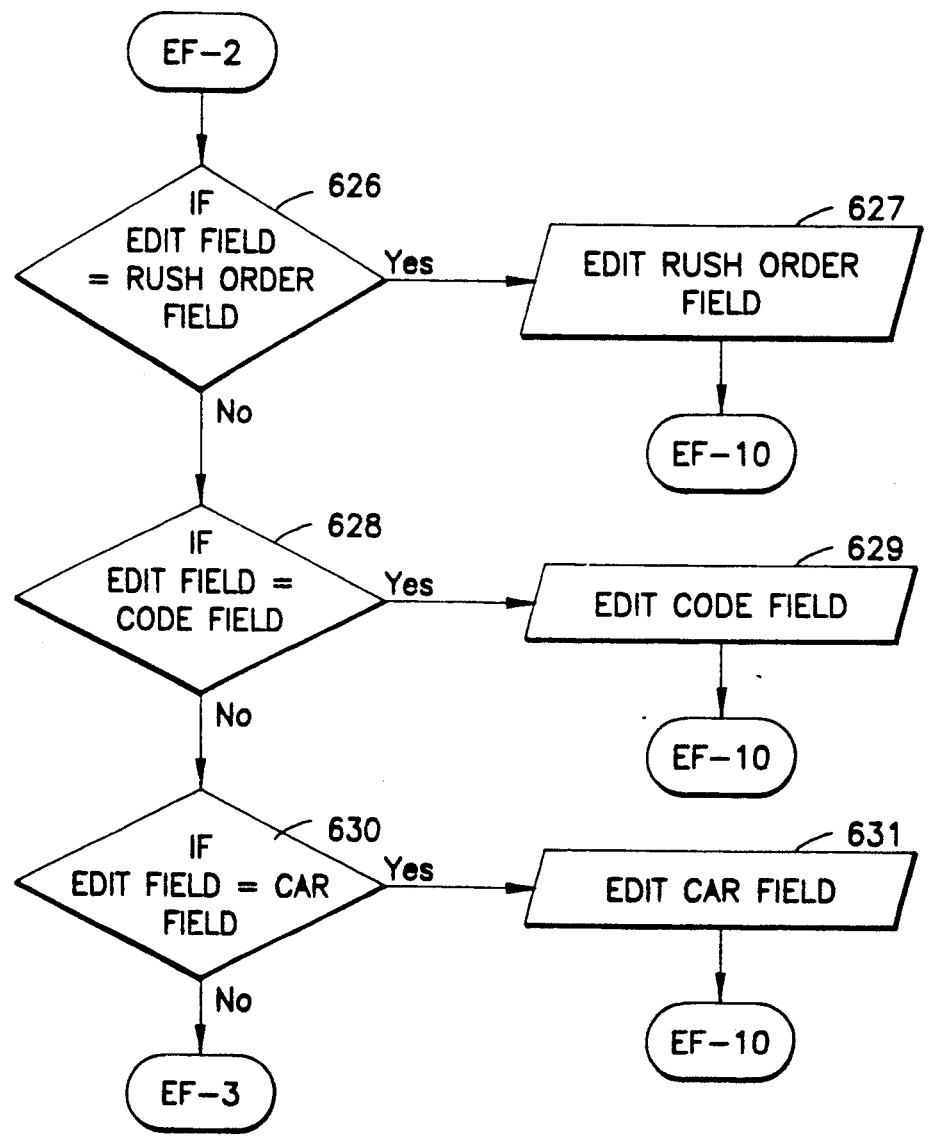
Figure 119D:
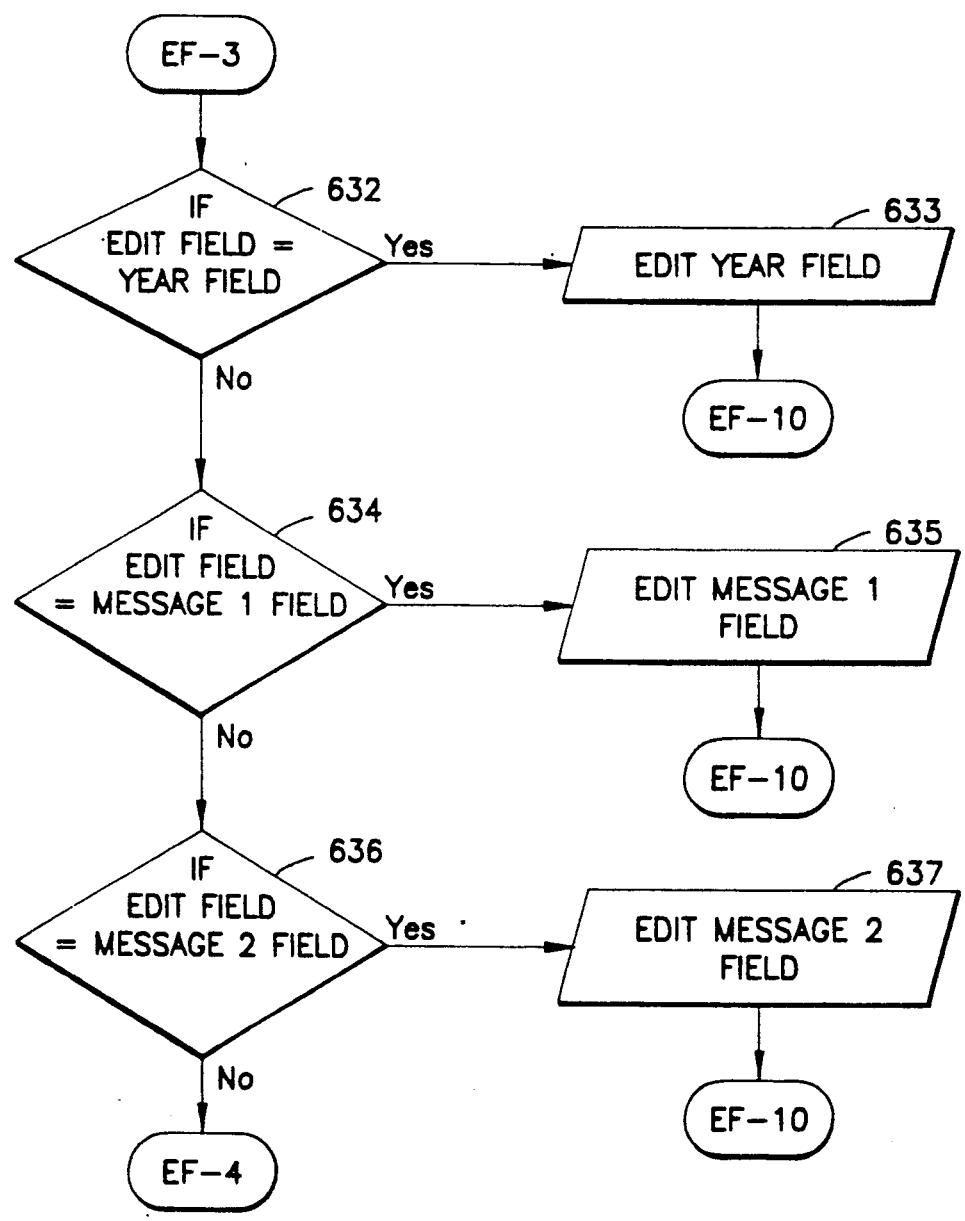
Figure 119E:
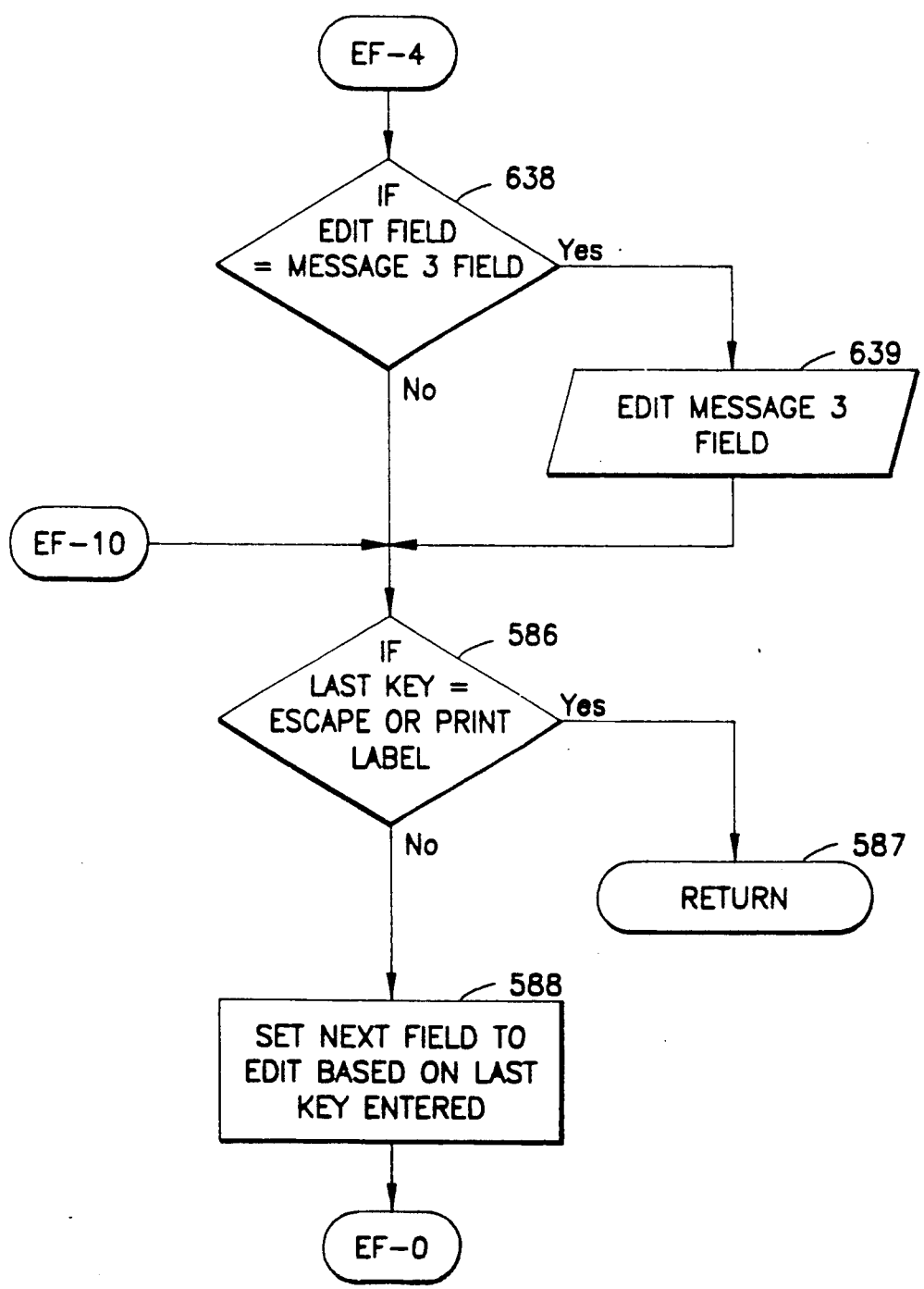
Figure 119F:
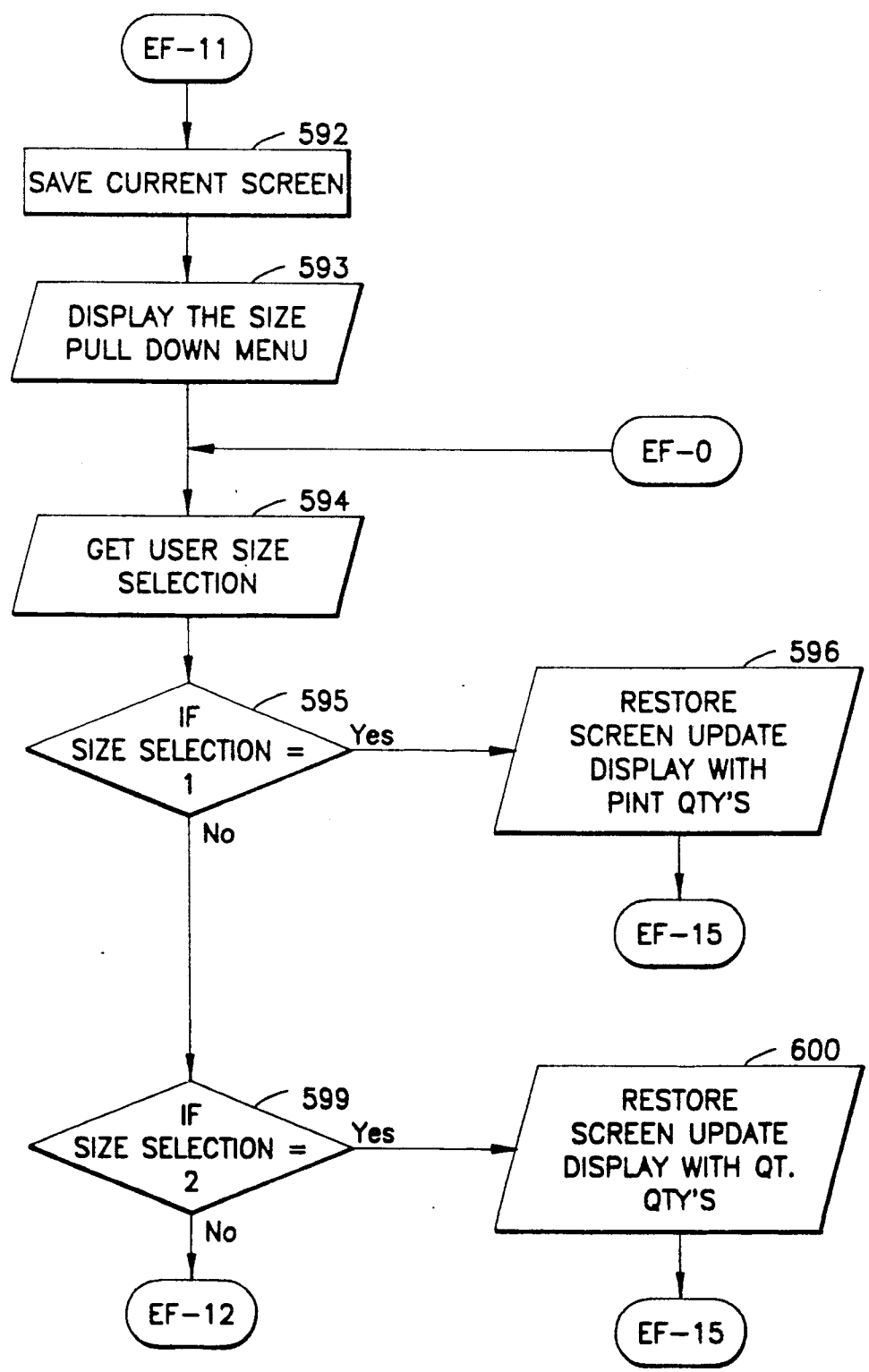
Figure 119G:
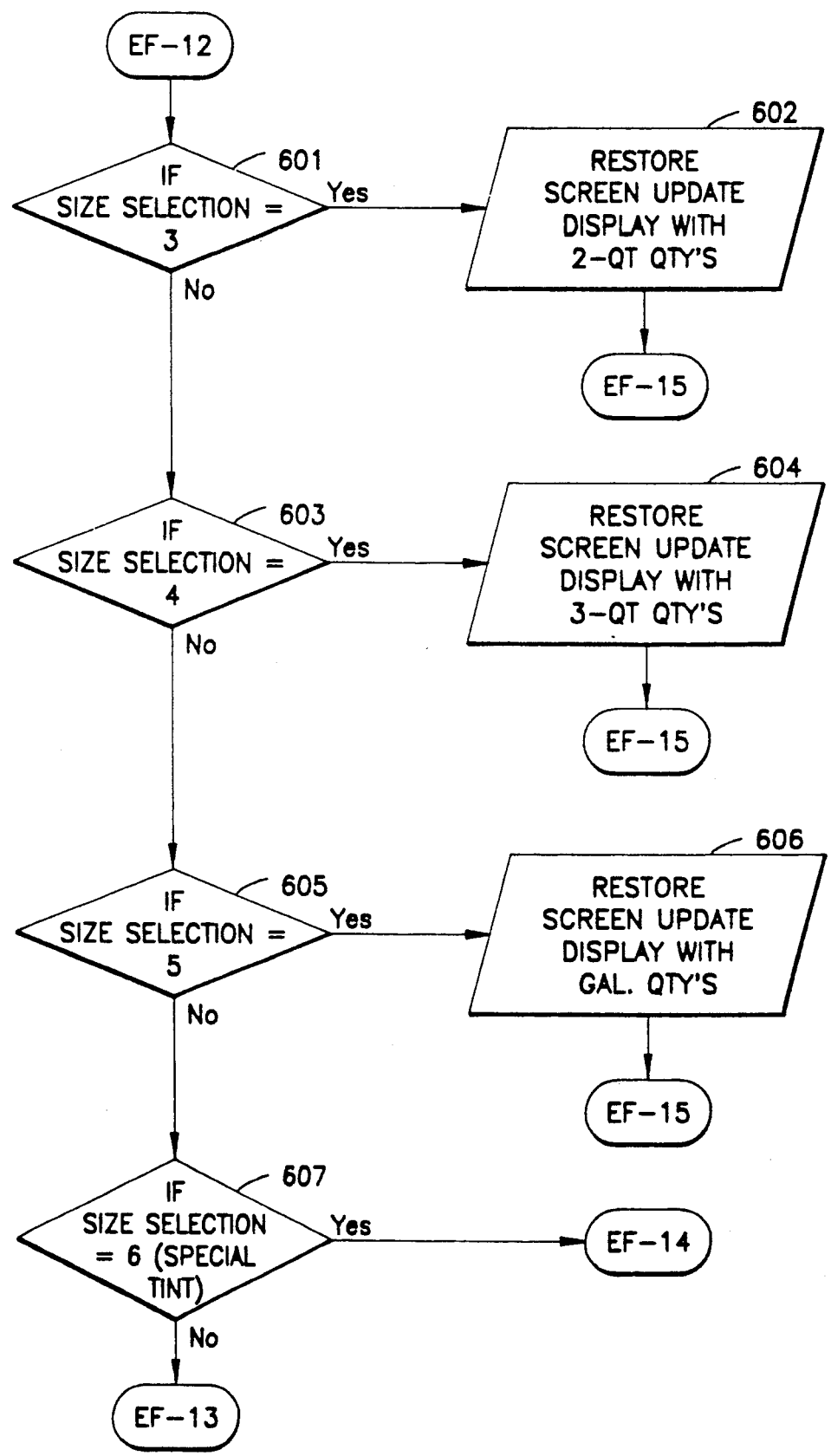
Figure 119H:
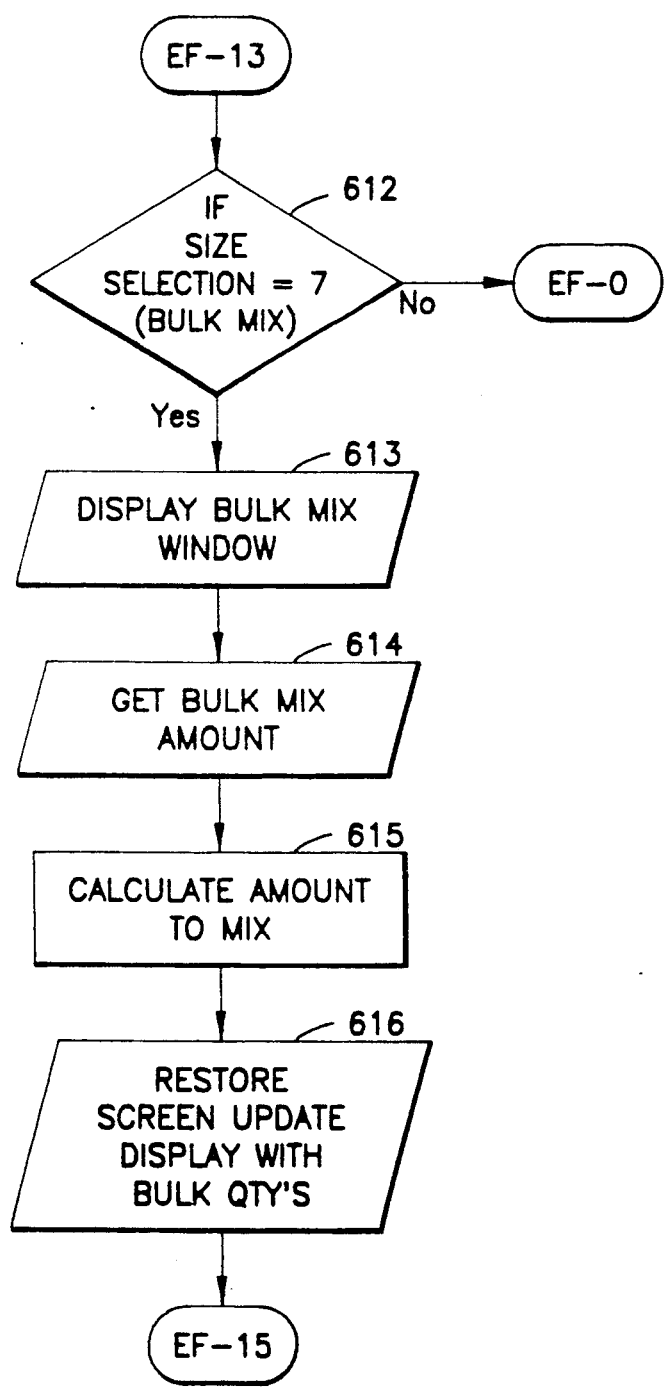
Figure 119J:
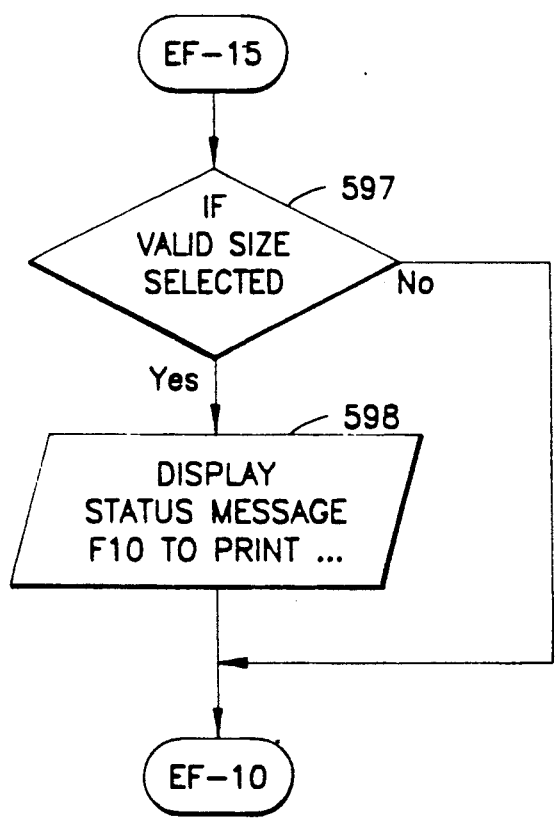
Figure 120A:
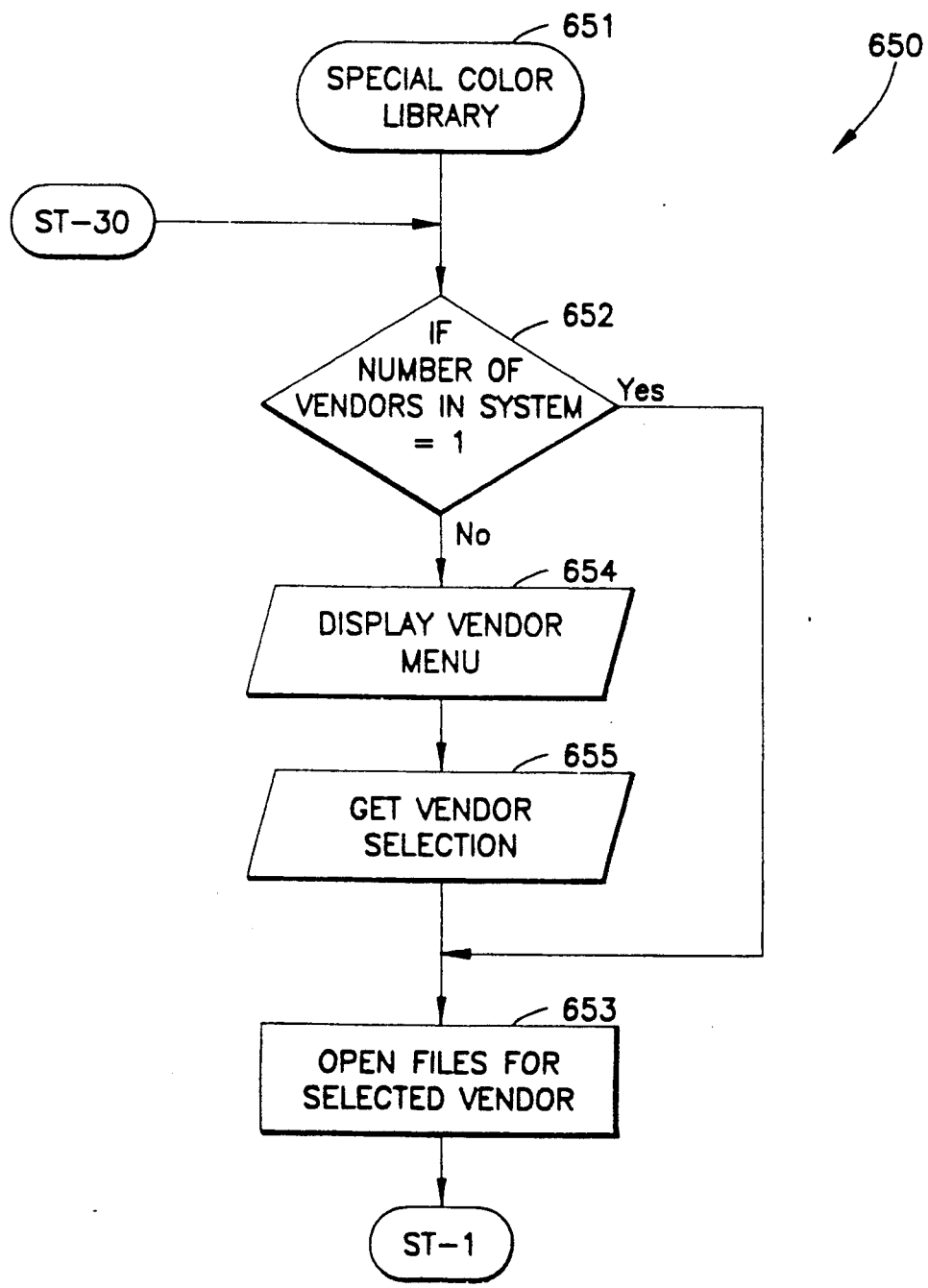
Figure 120B:
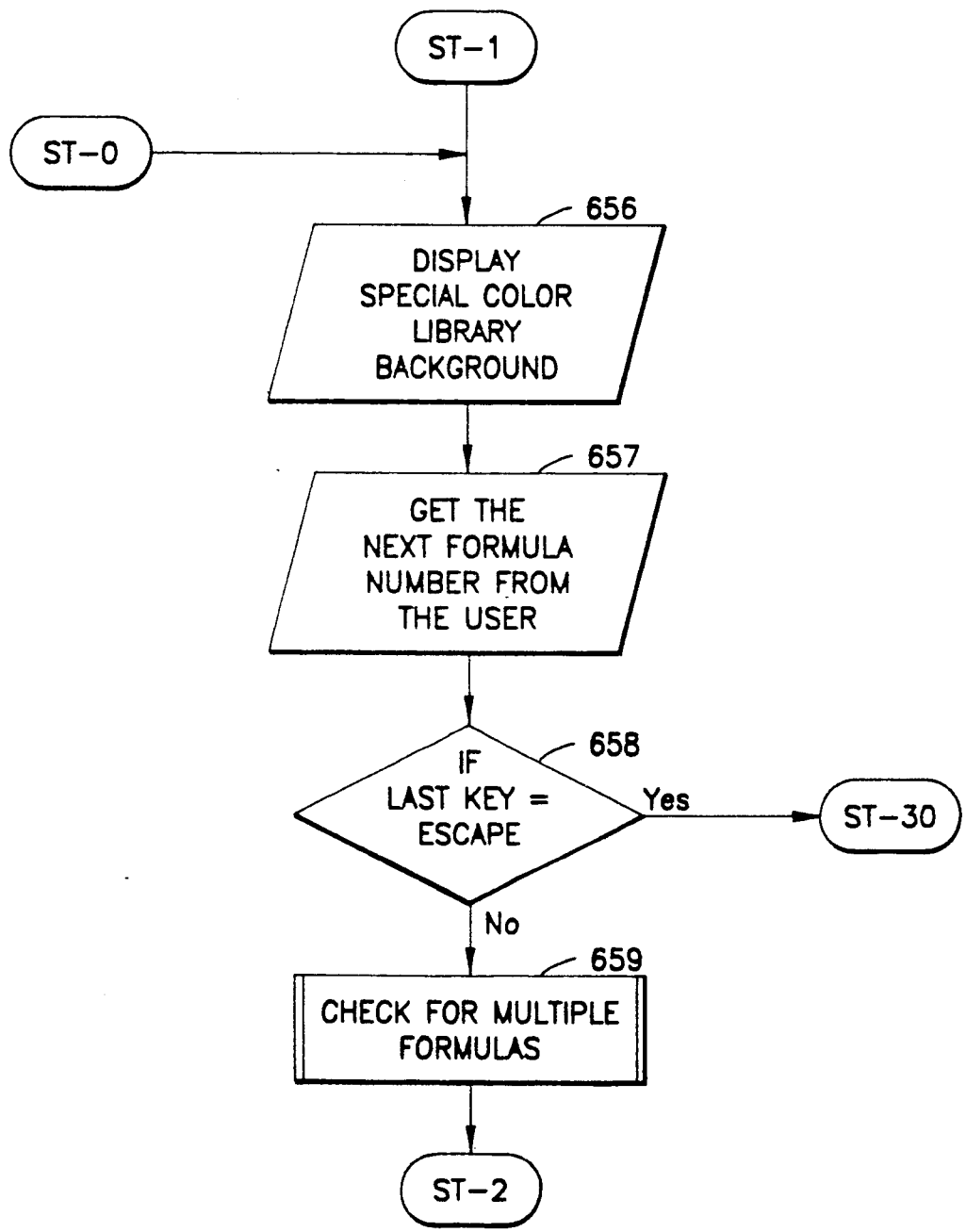
Figure 120C:
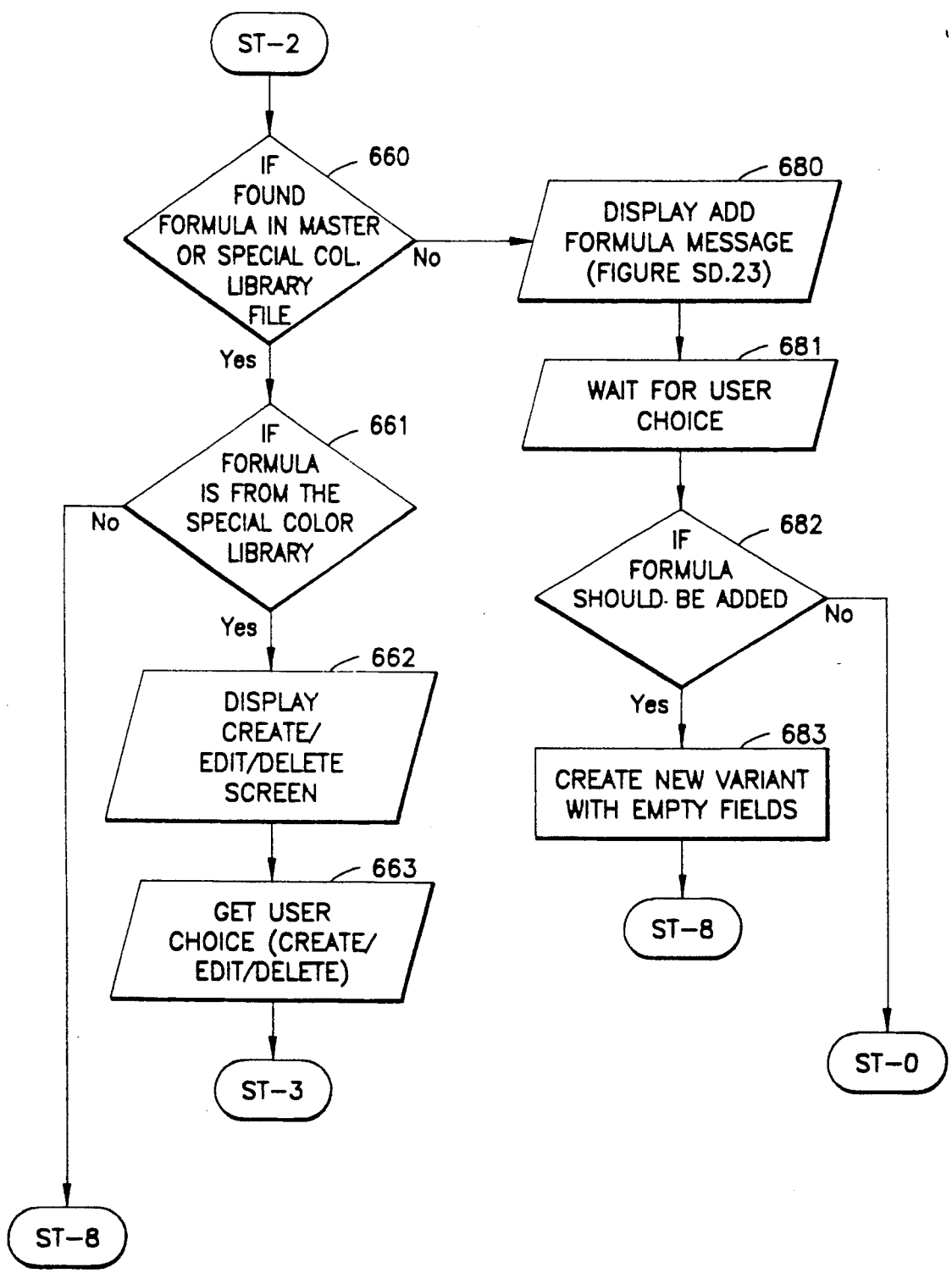
Figure 120D:
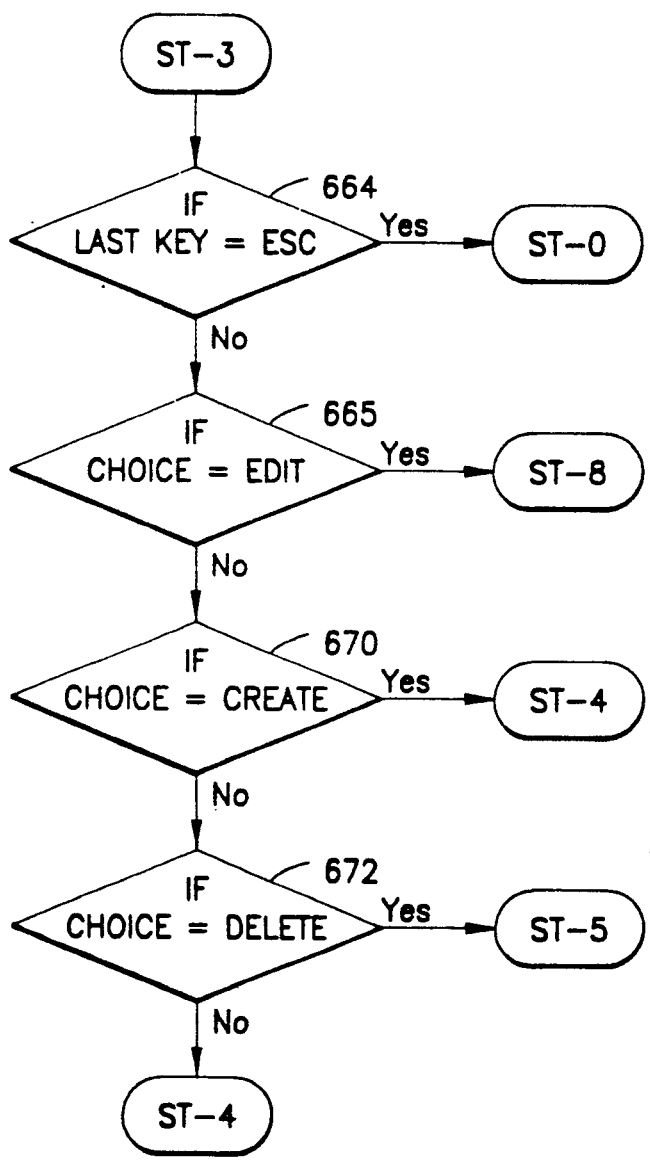
Figure 120E:
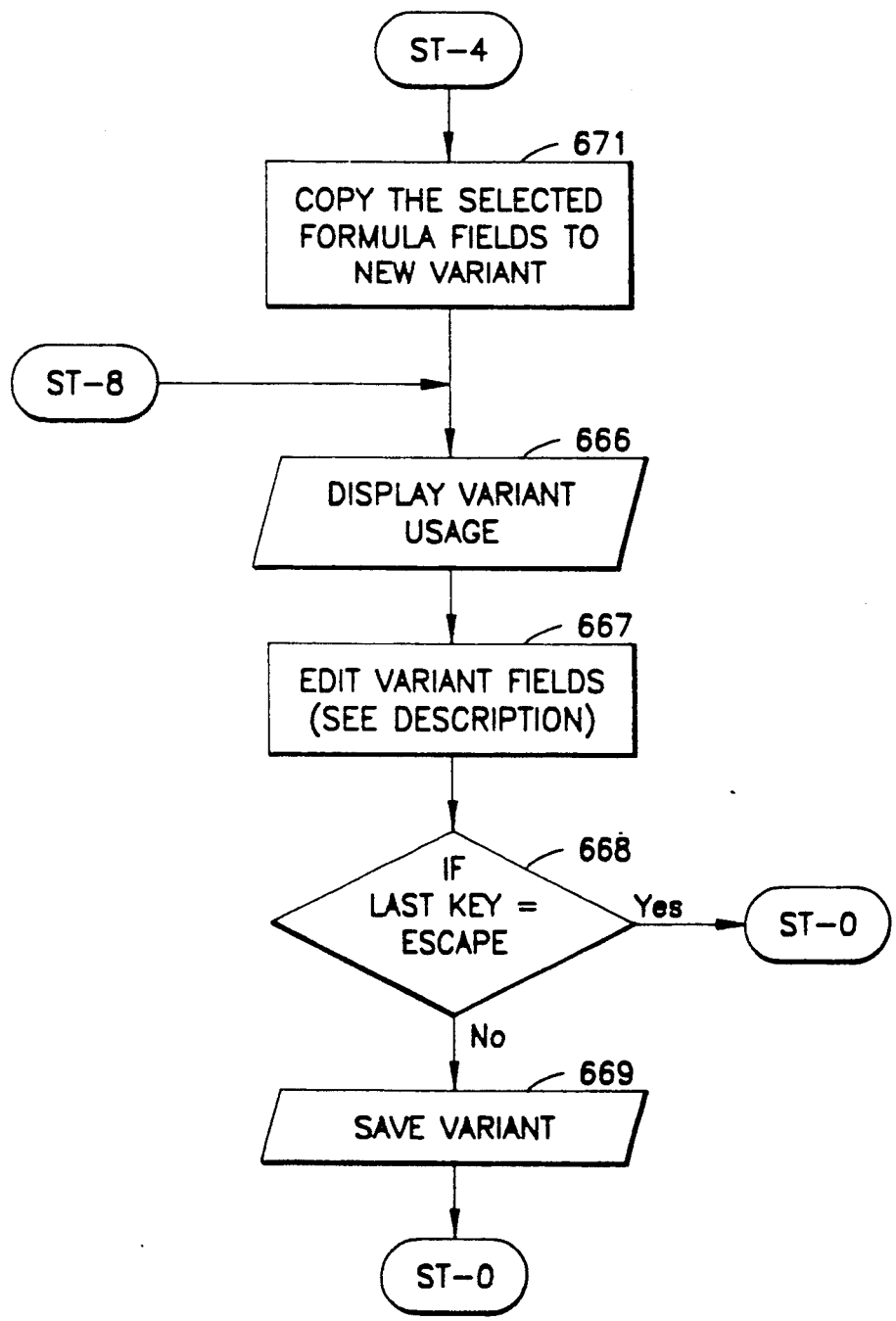
Figure 120F:
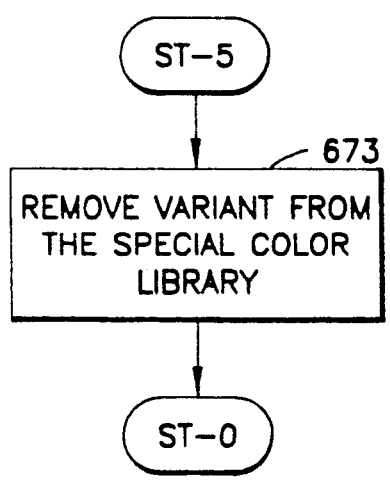
Figure 121A:
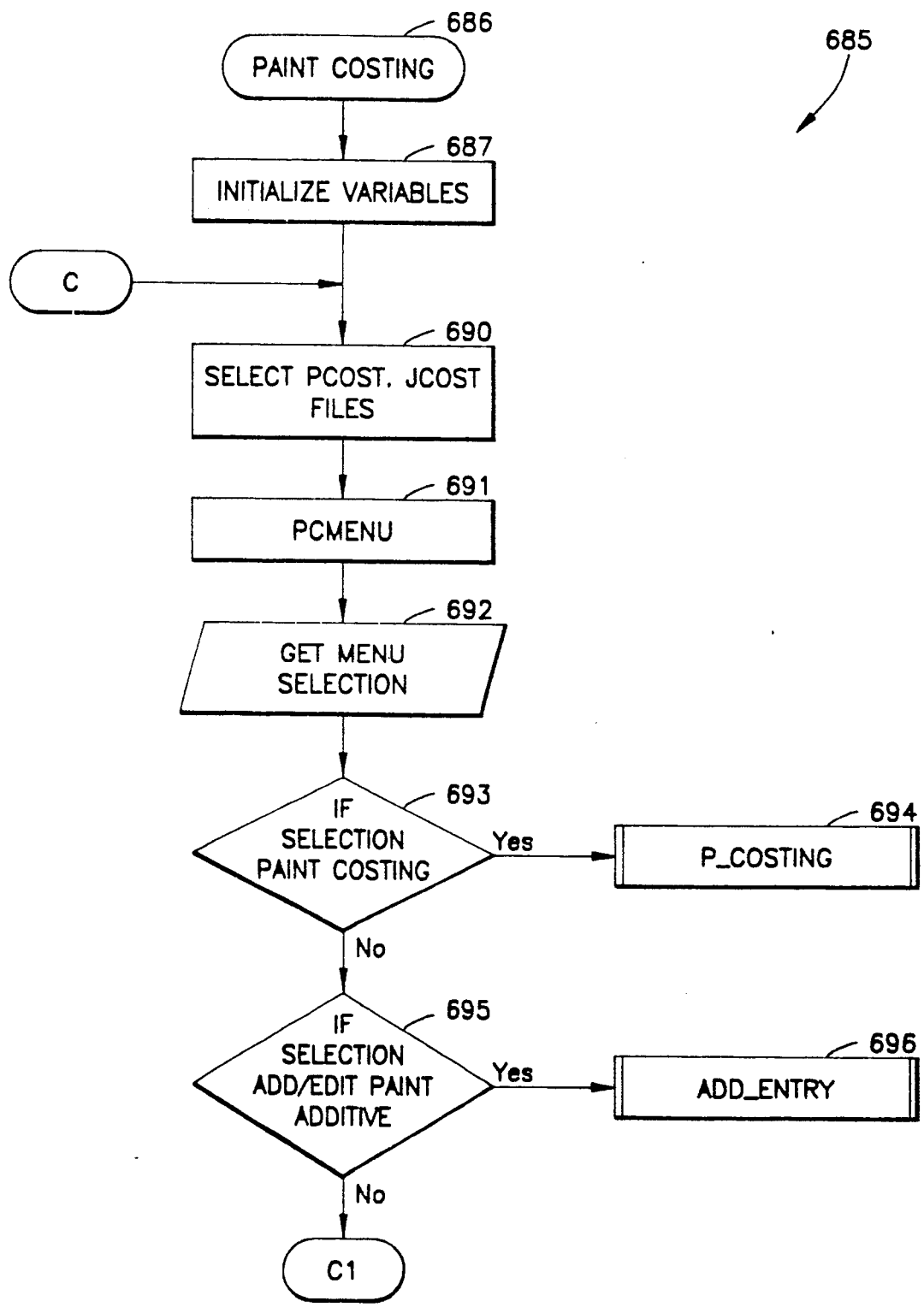
Figure 121B:
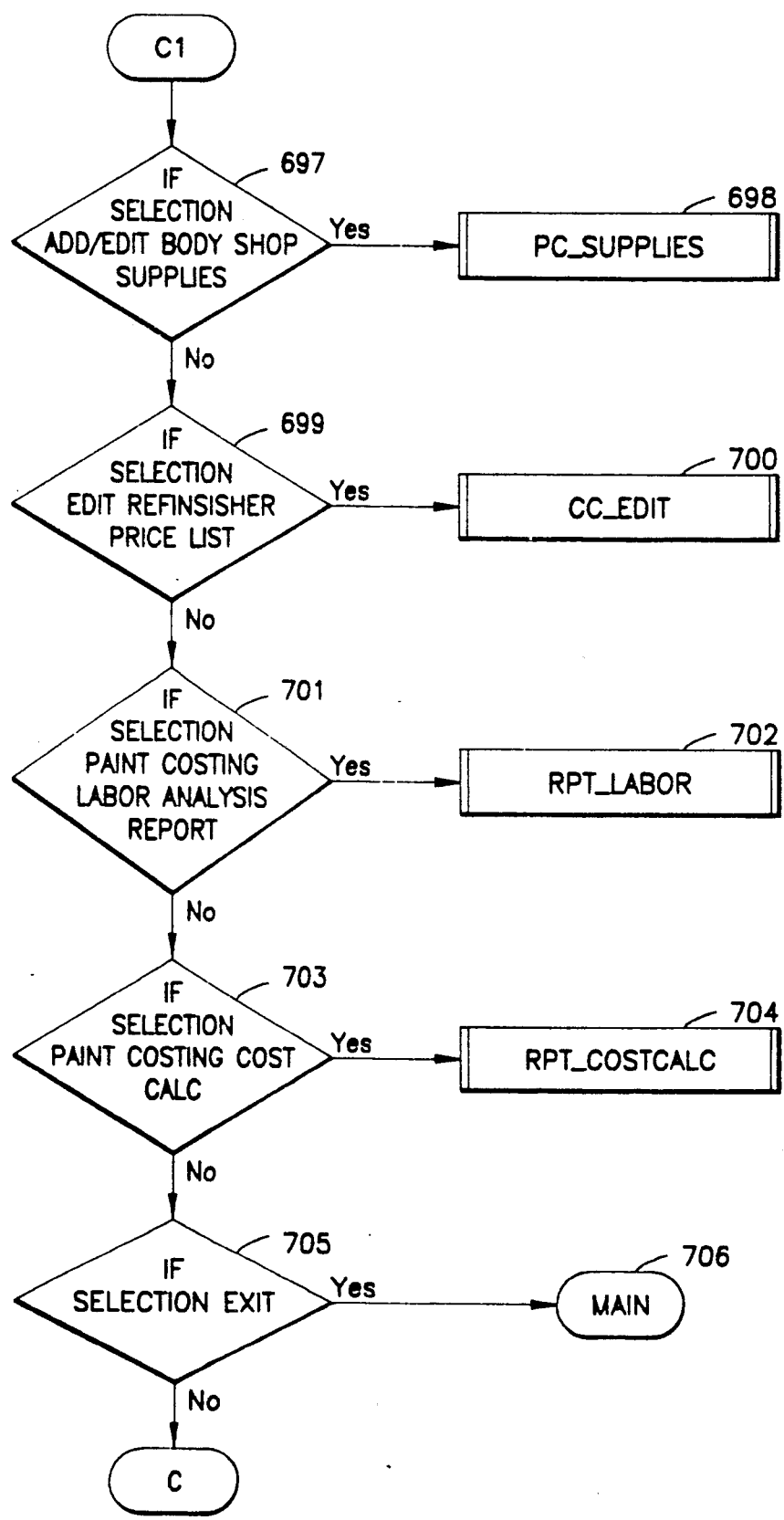
Figure 121C:
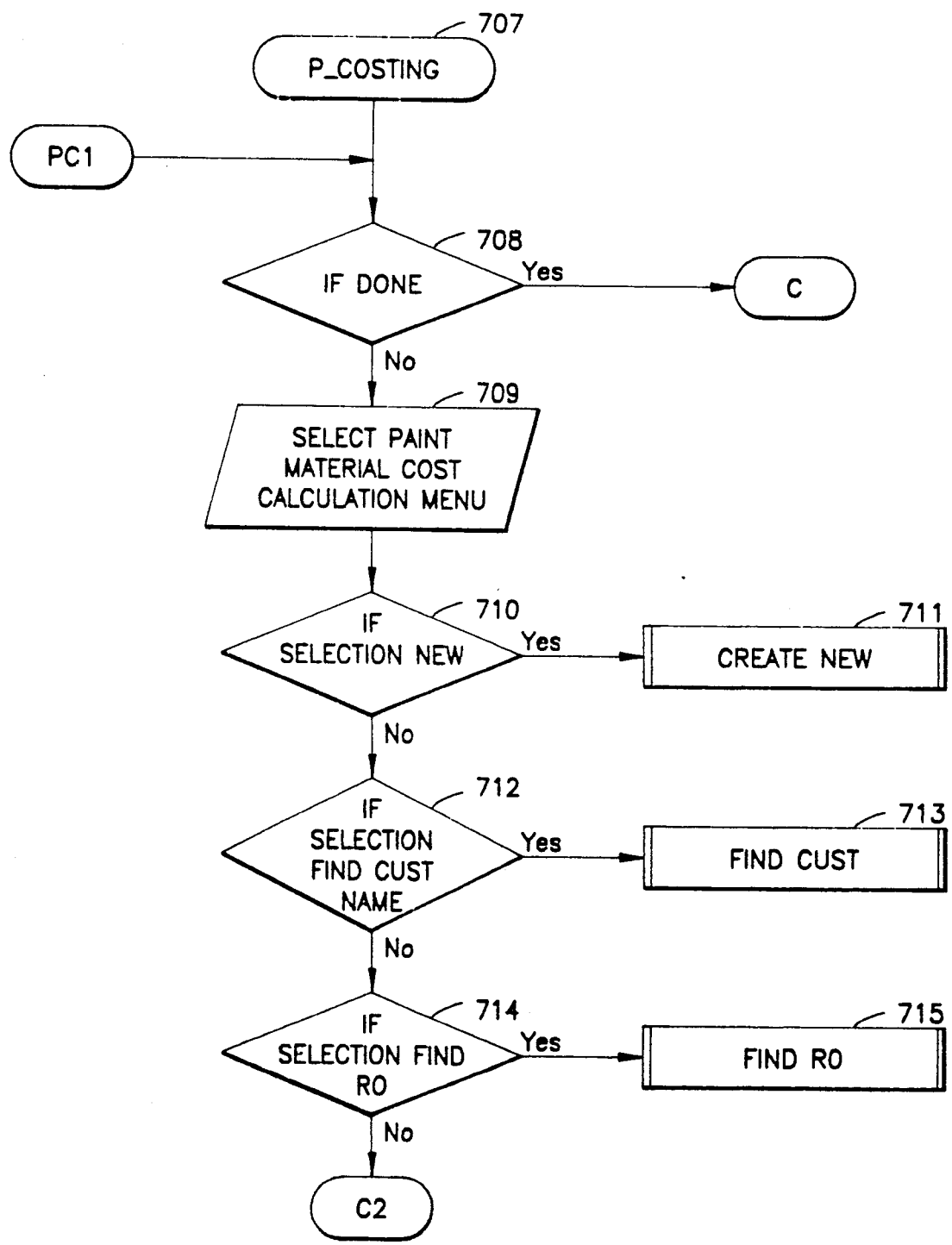
Figure 121D:
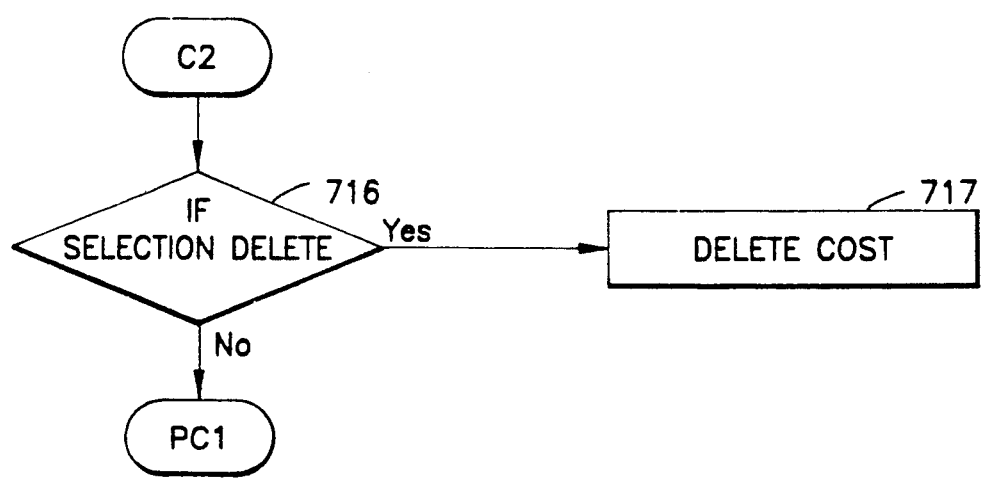
Figure 121E:
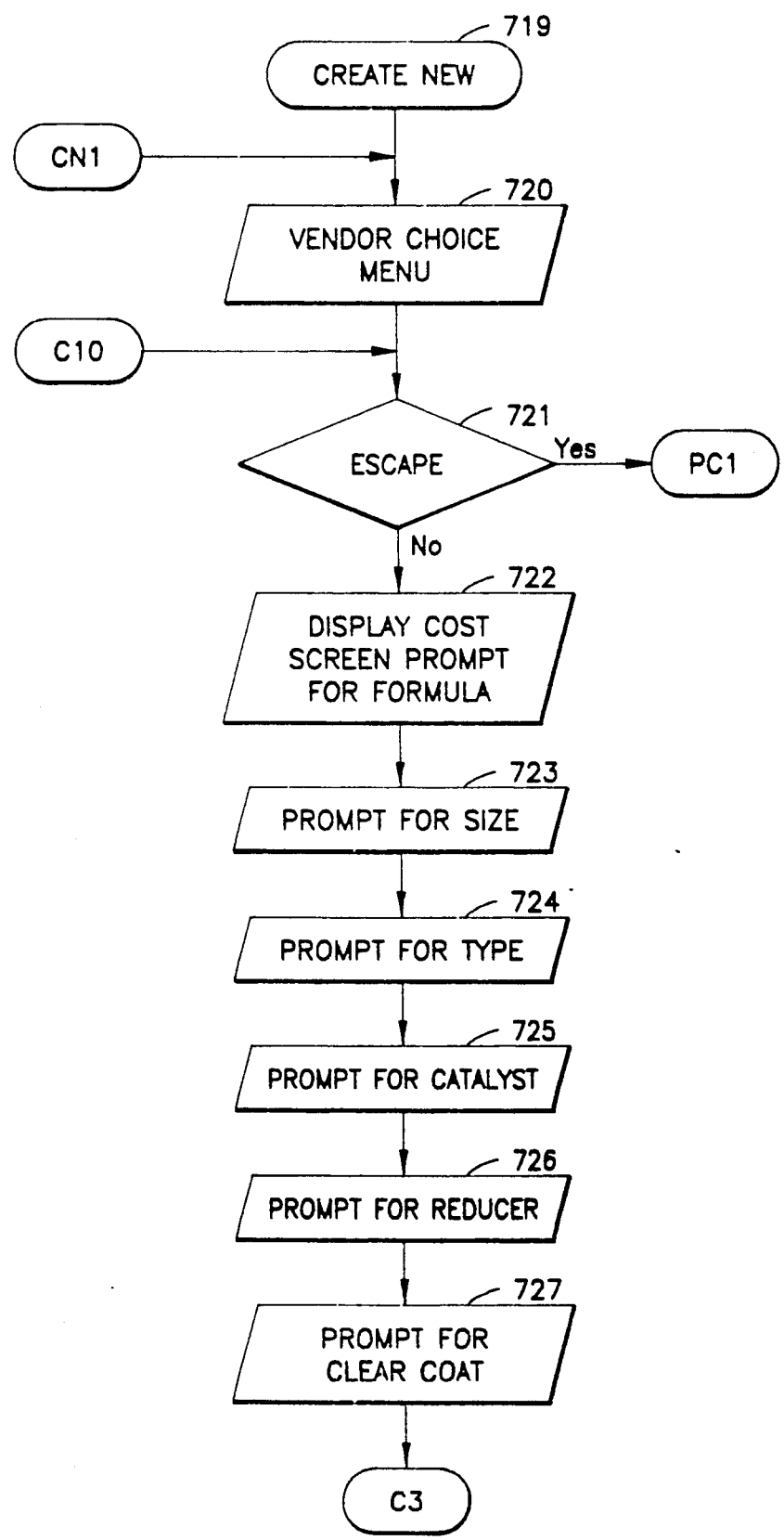
Figure 121F:
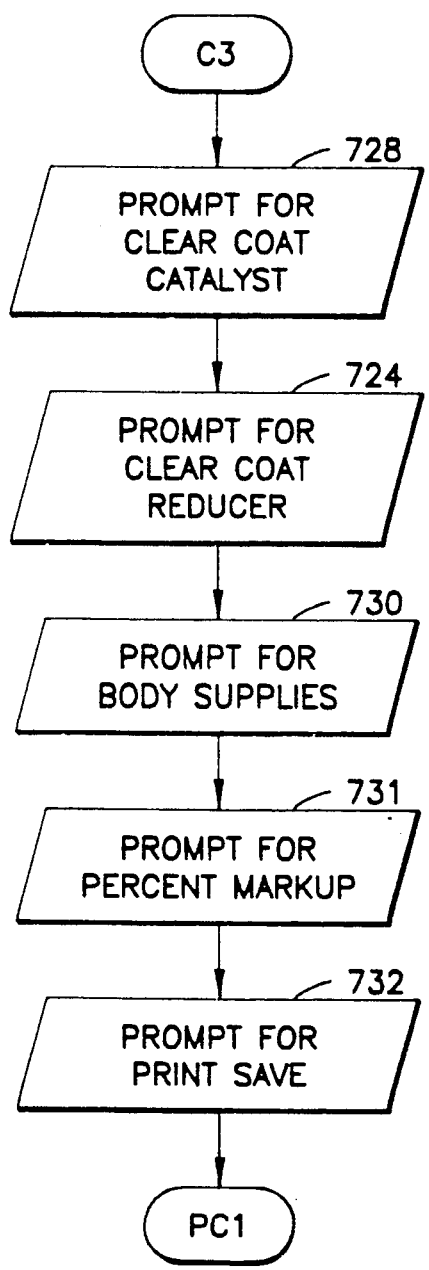
Figure 121G:
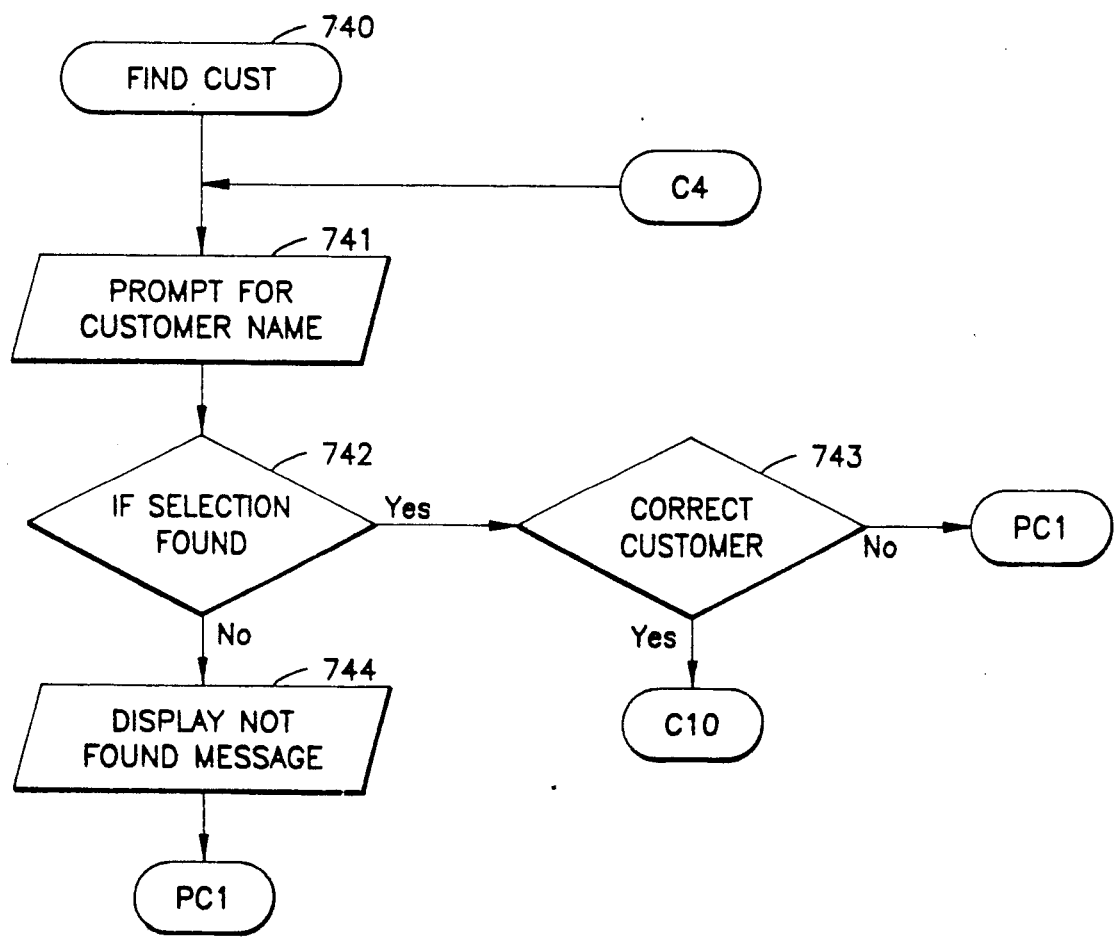
Figure 121H:
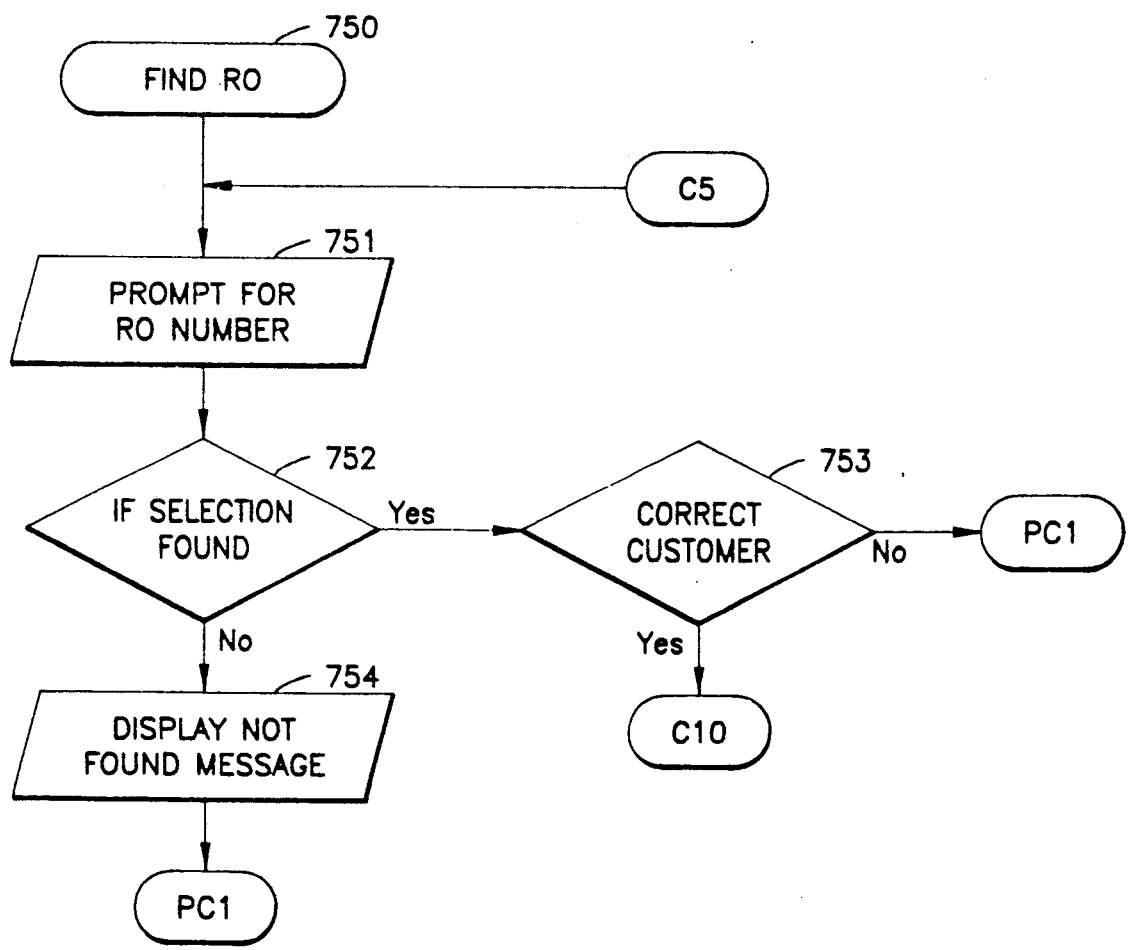
Figure 121I:
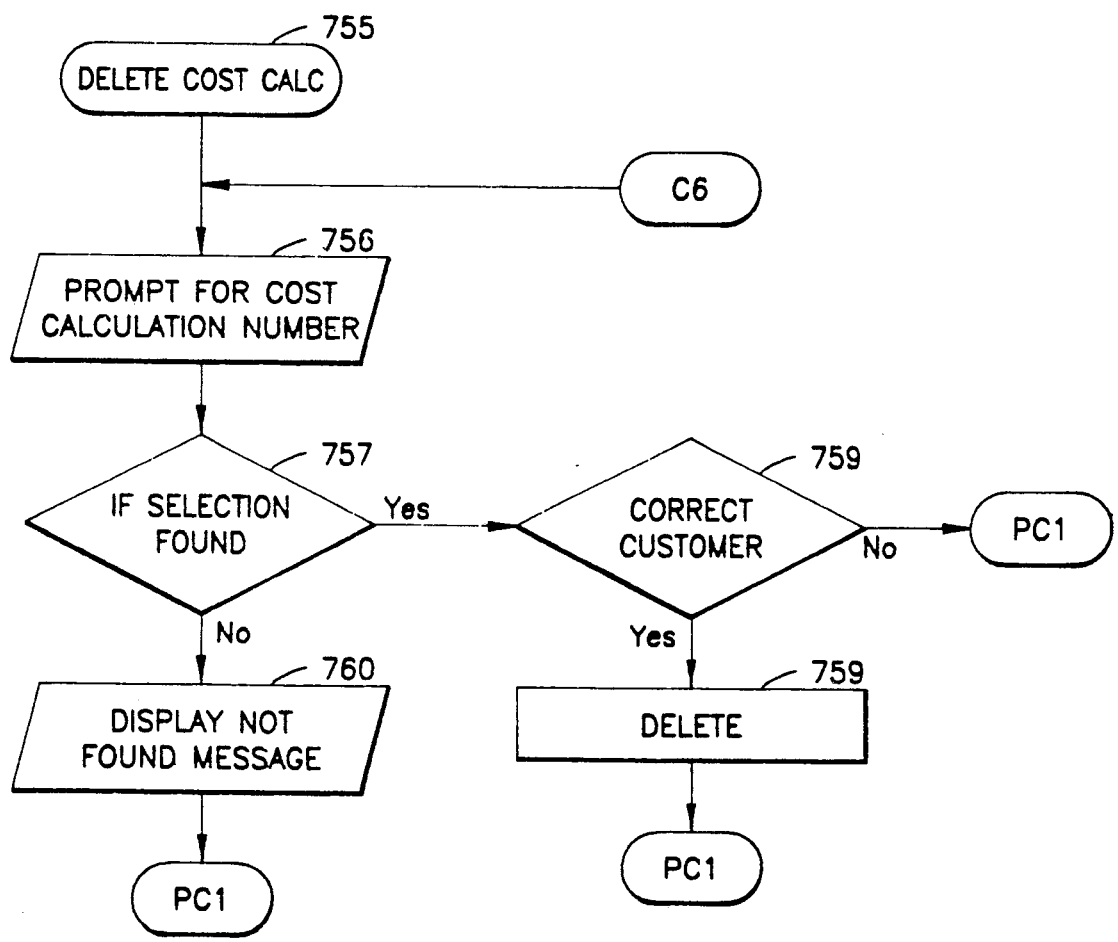
Figure 121J:
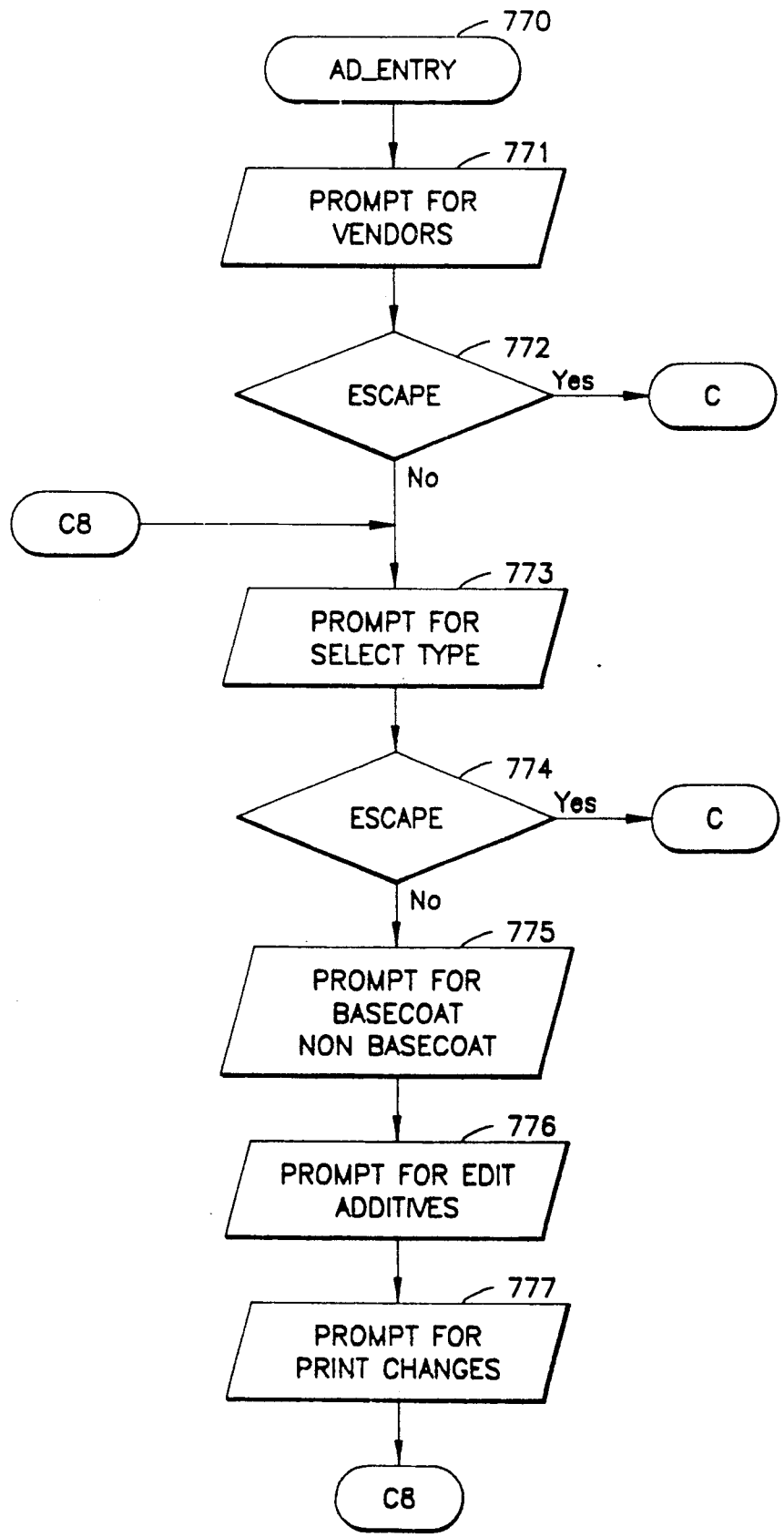
Figure 121K:
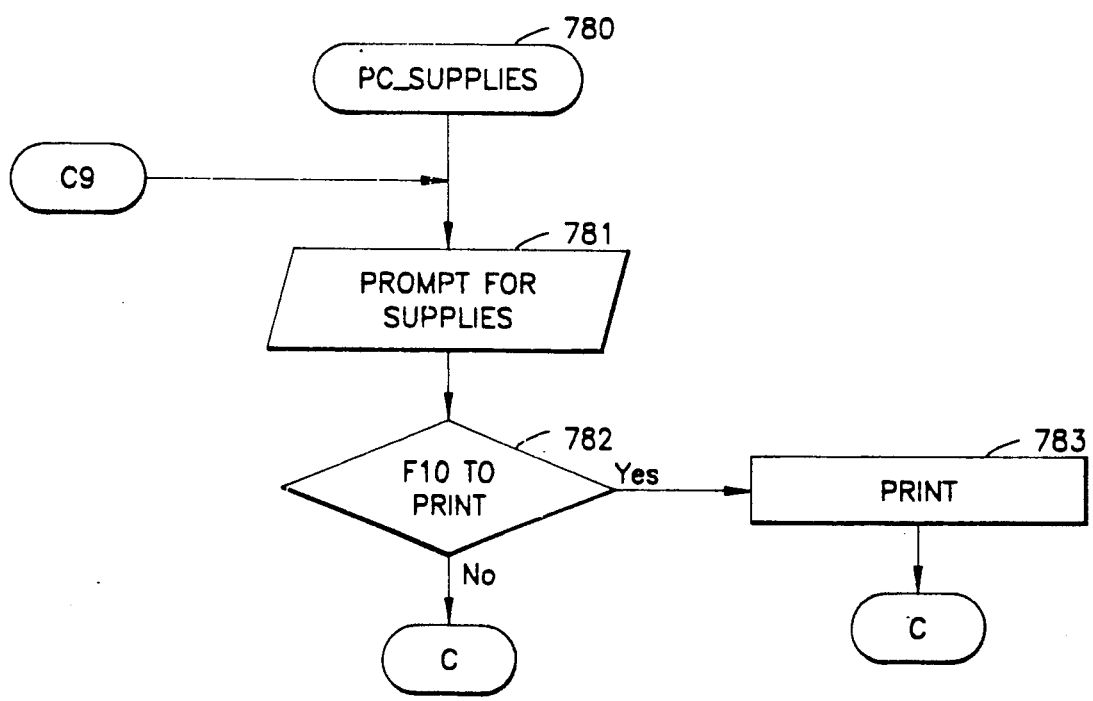
Figure 121L:
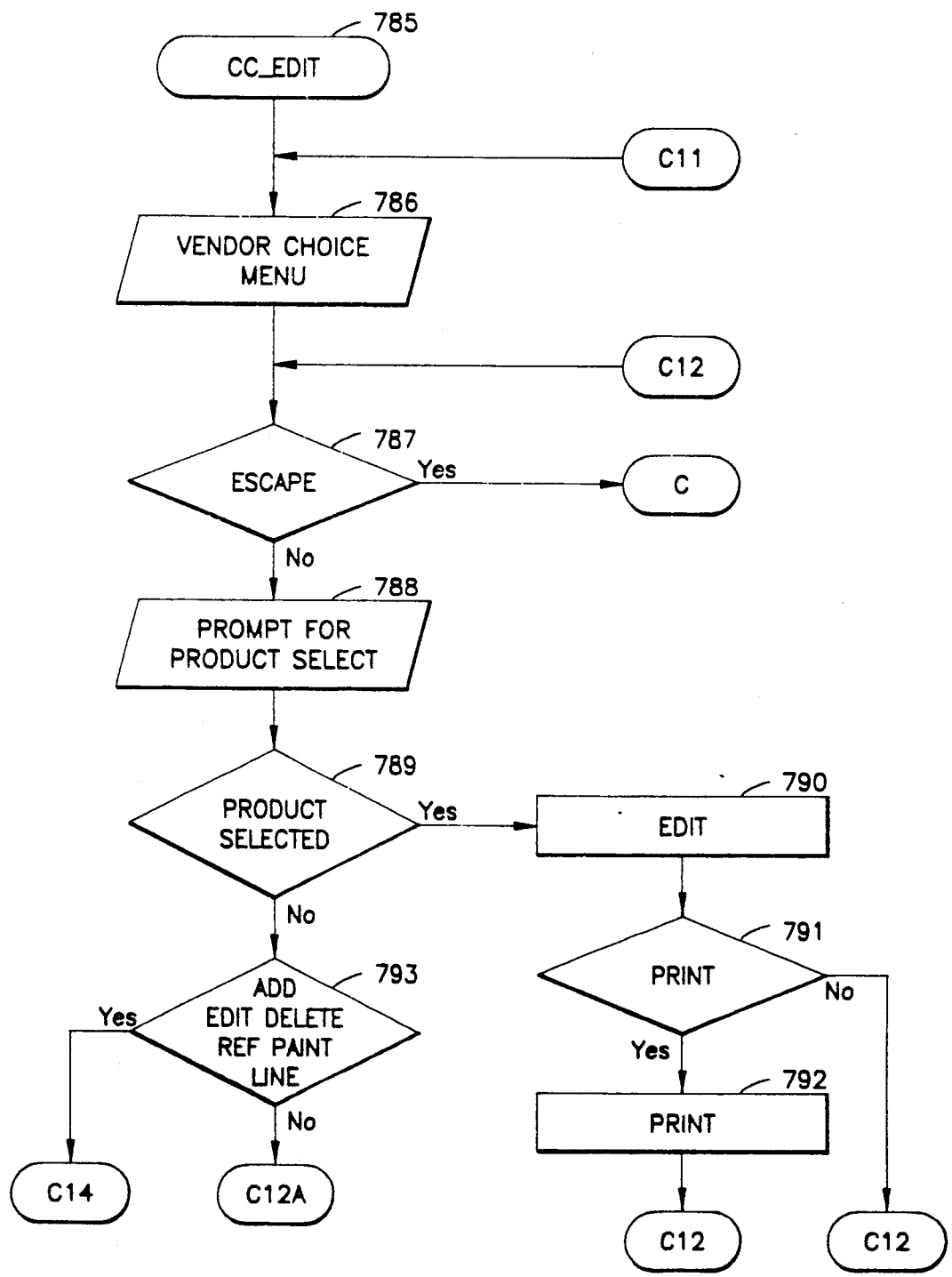
Figure 121M:
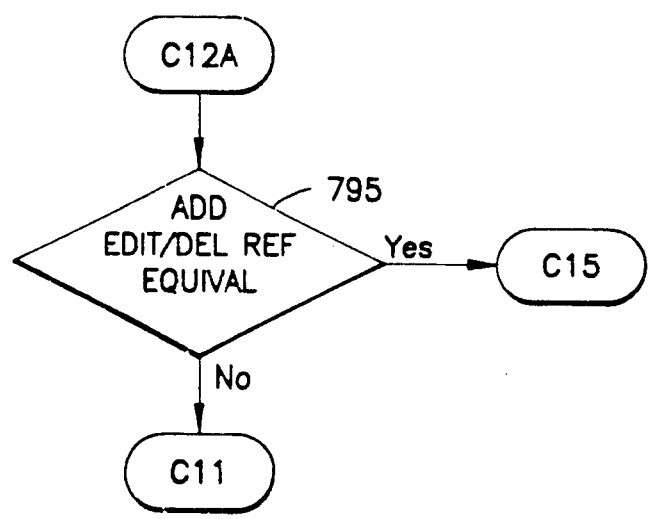
Figure 121N:
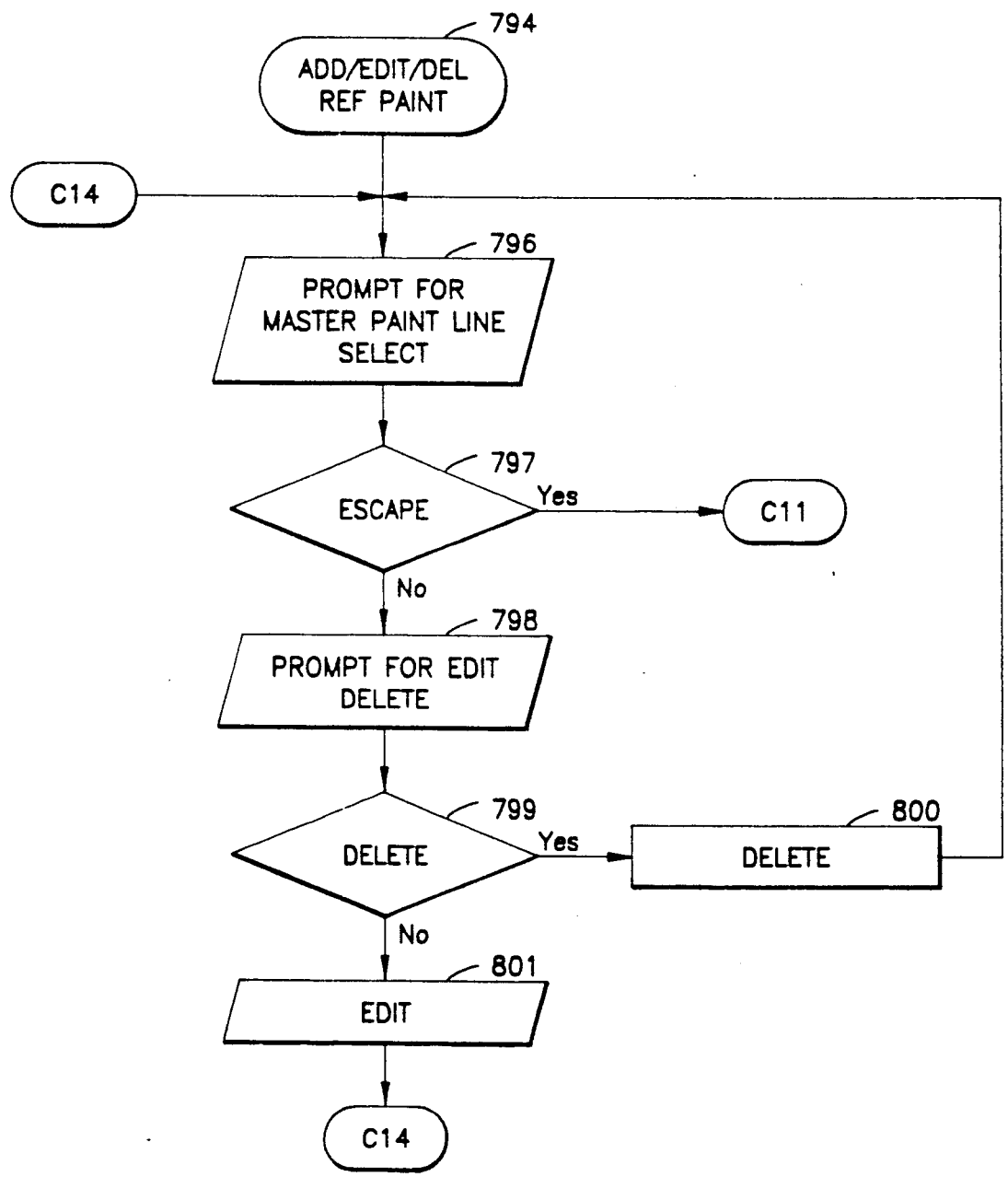
Figure 121P:
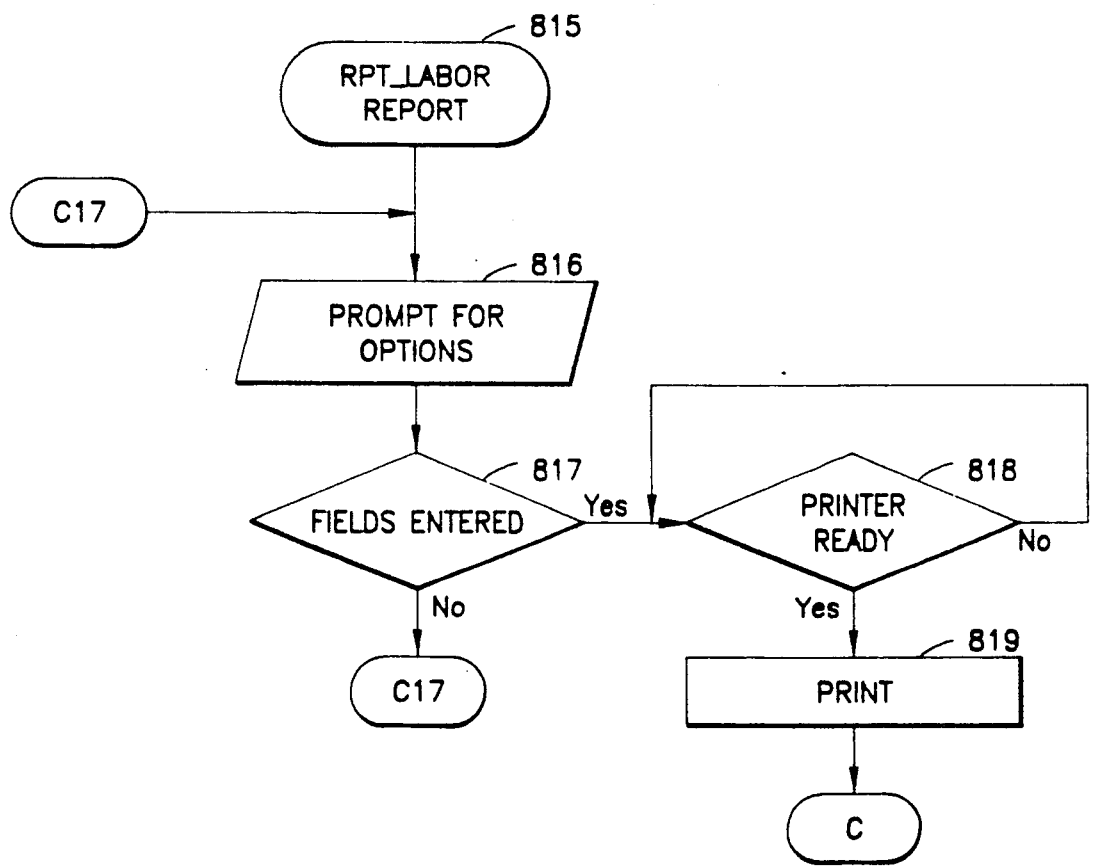
Figure 121Q:
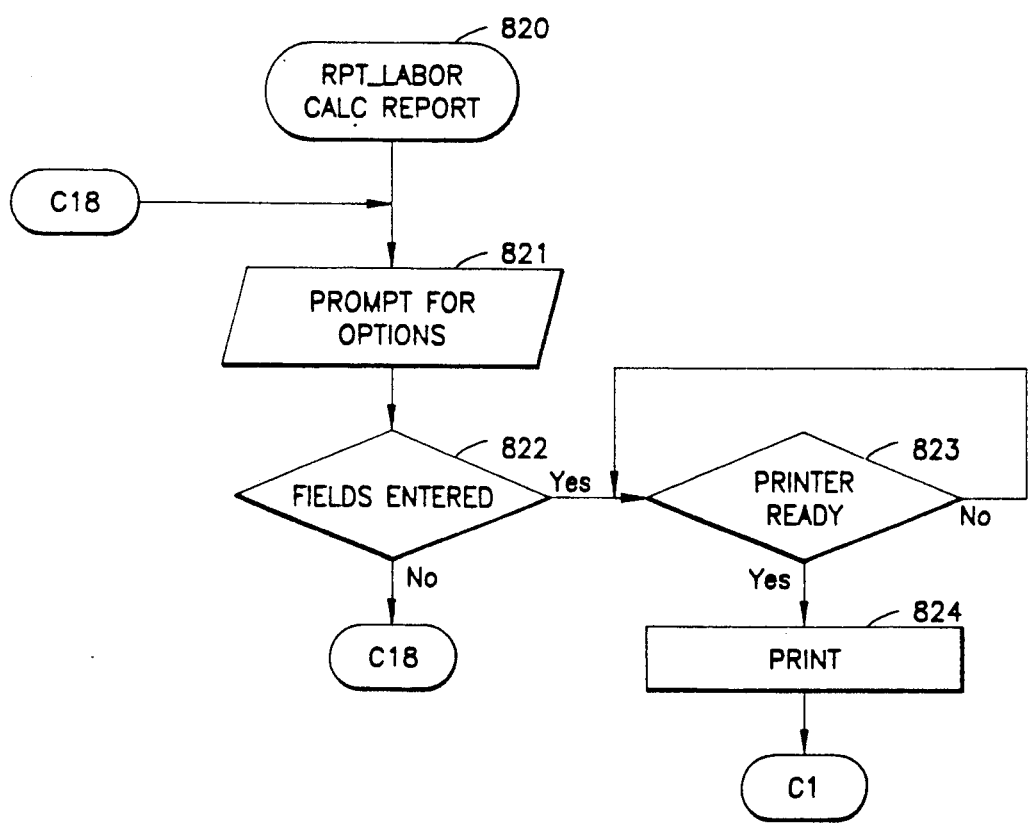
Figure 122A:
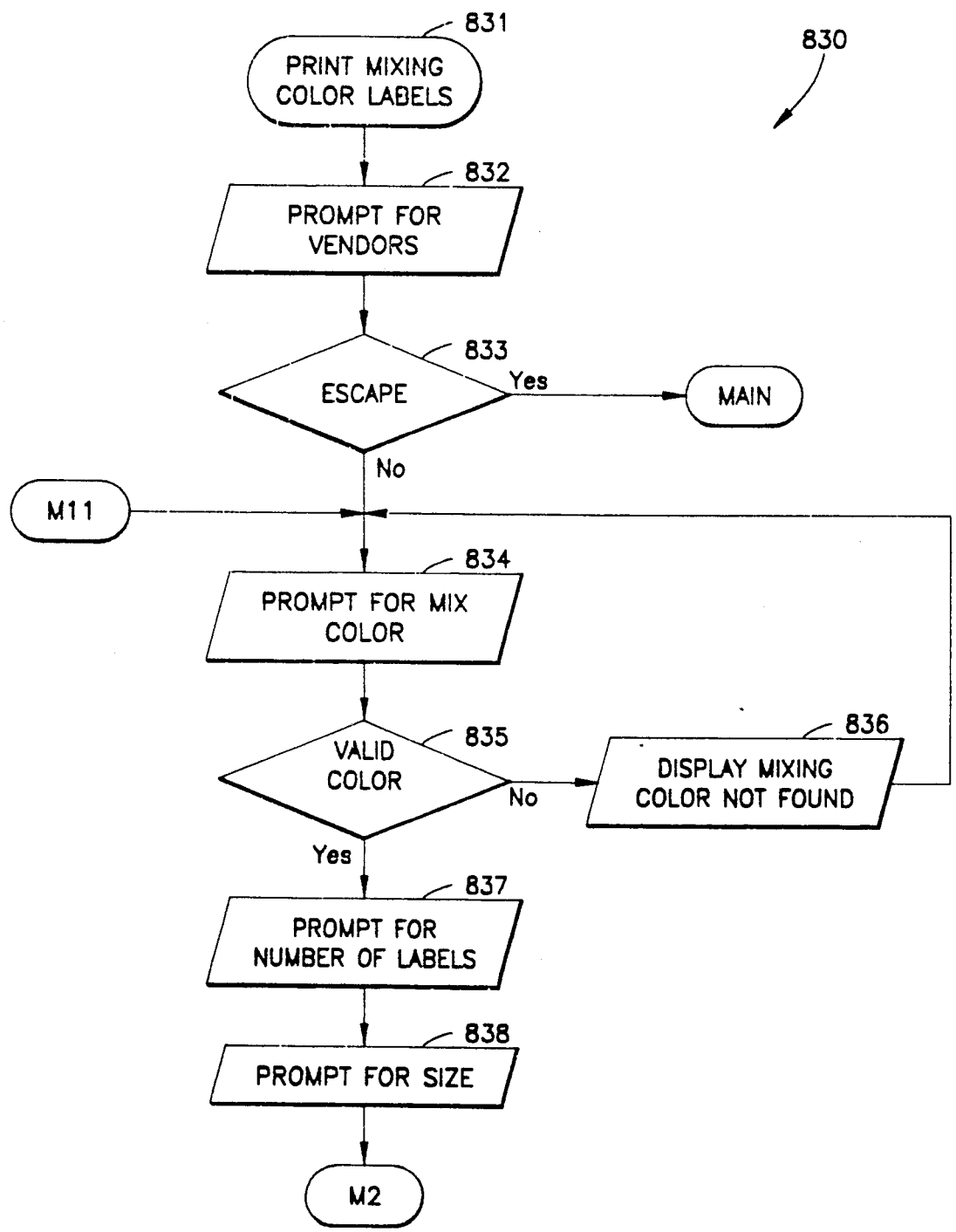
Figure 122B:
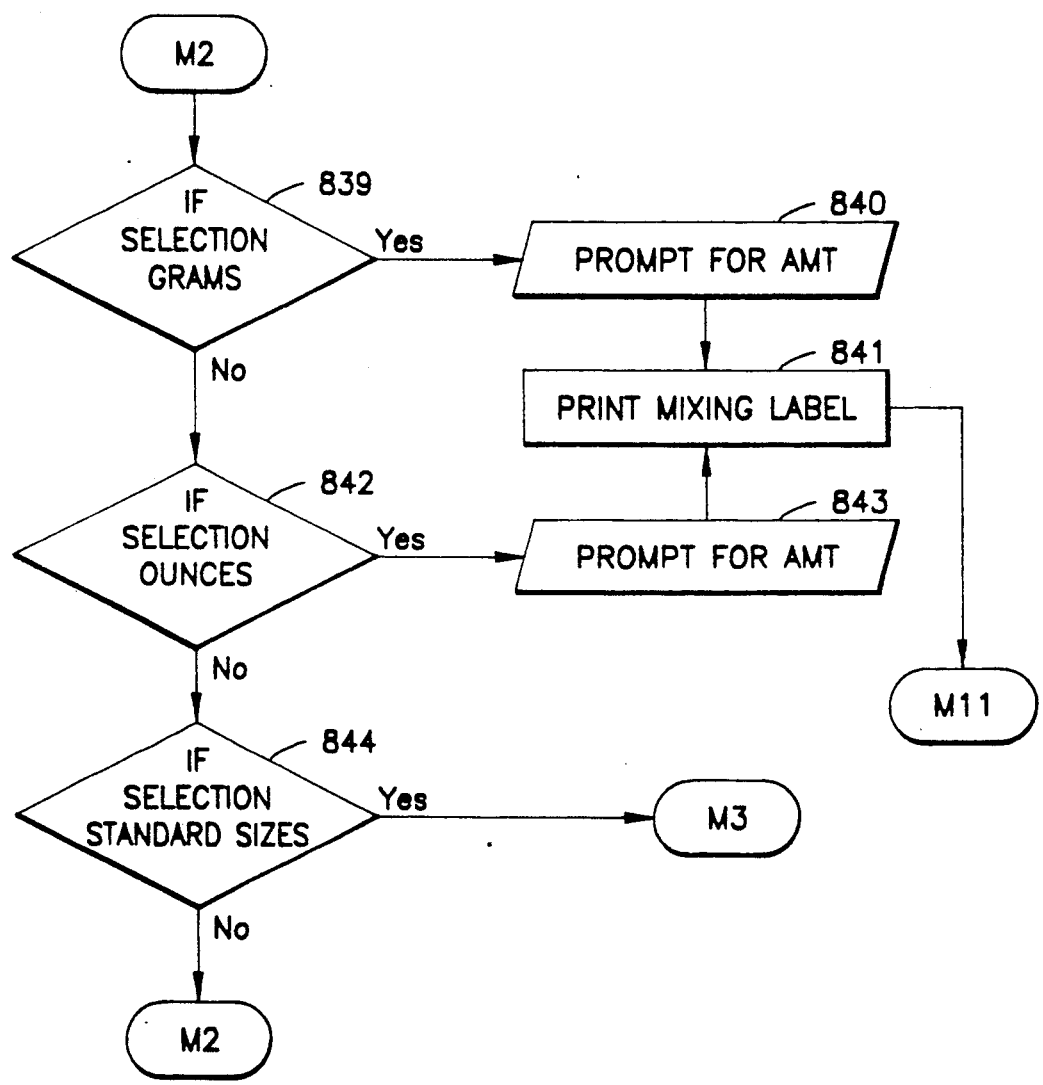
Figure 122C:
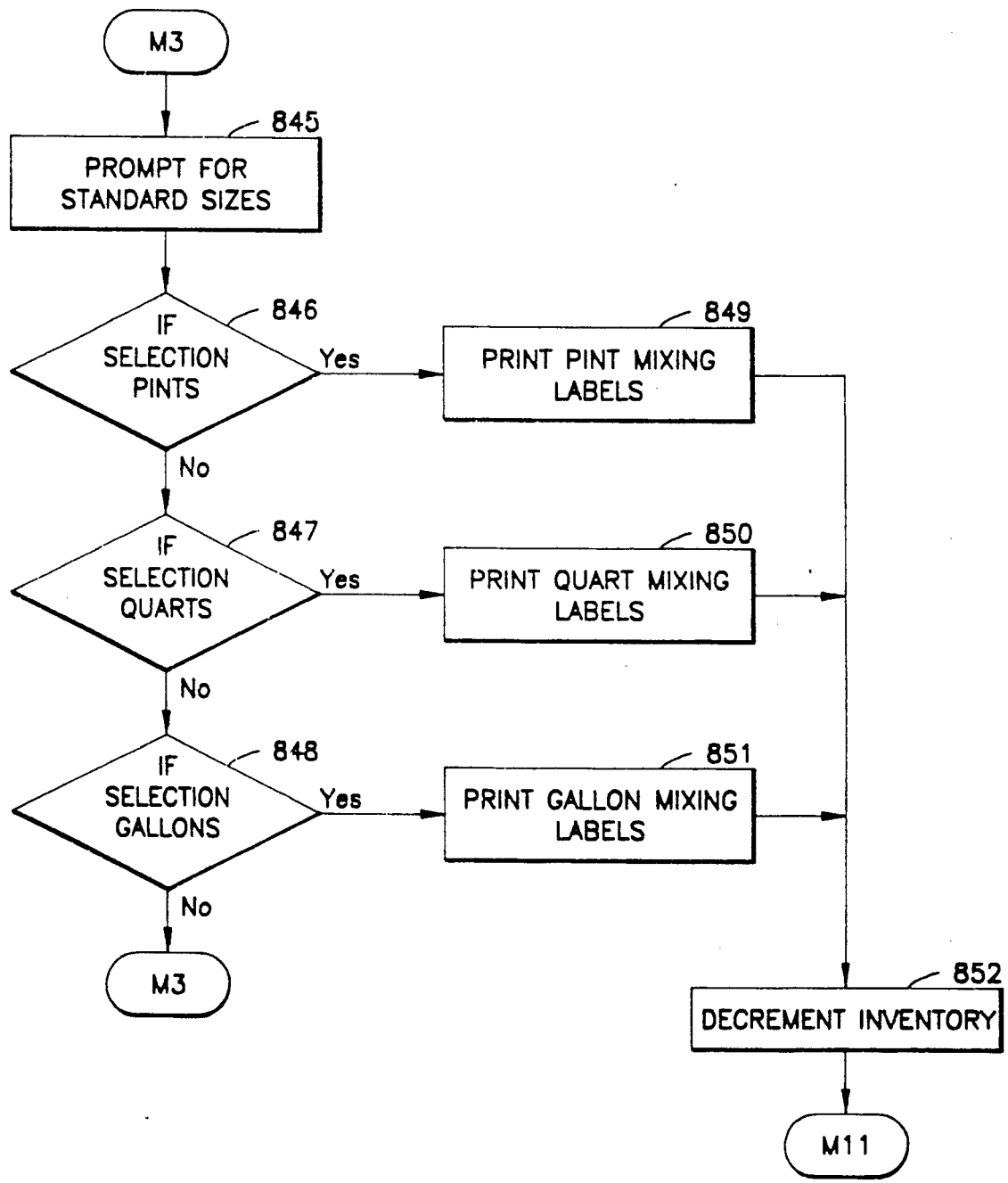
Figure 123A:
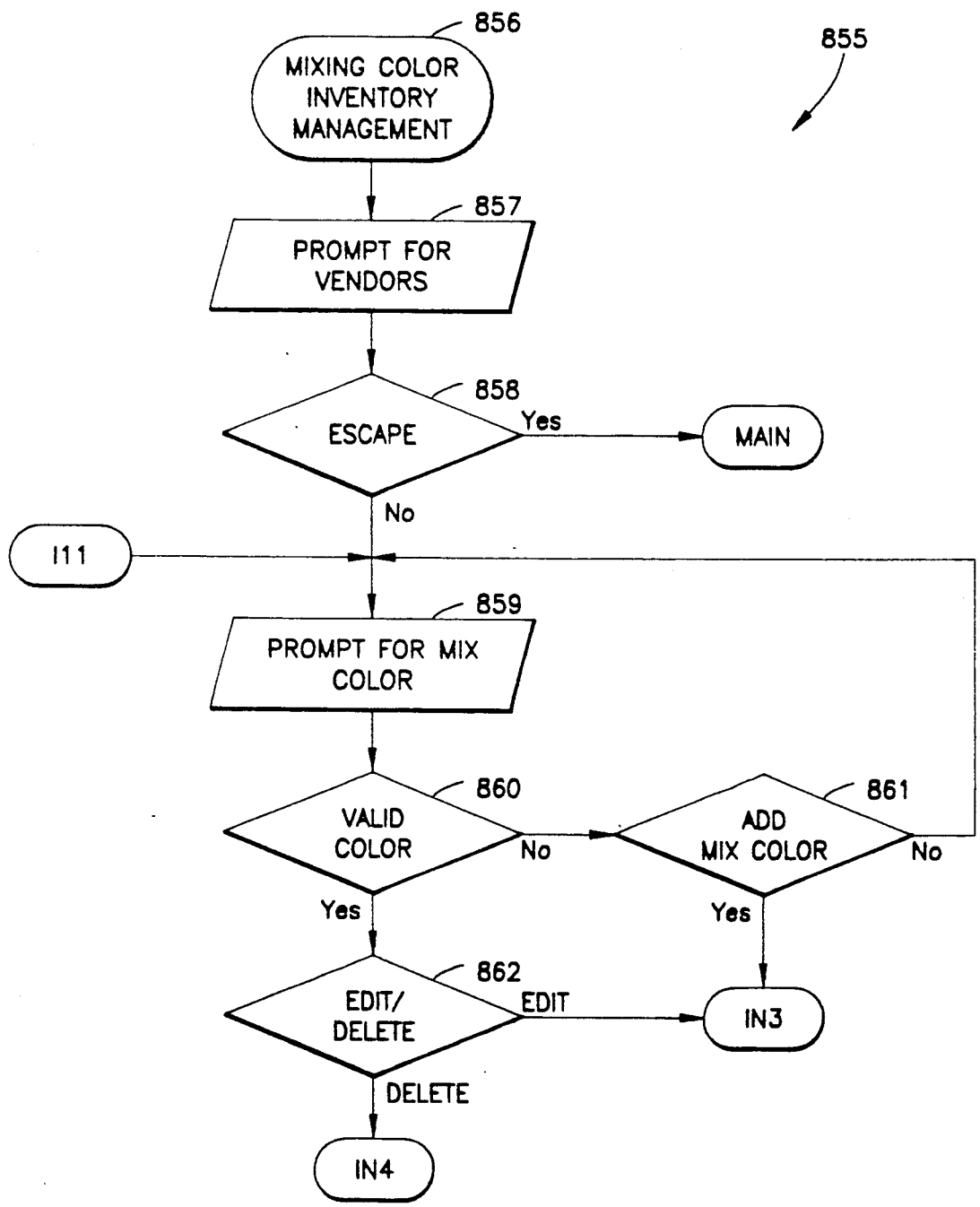
Figure 123B:
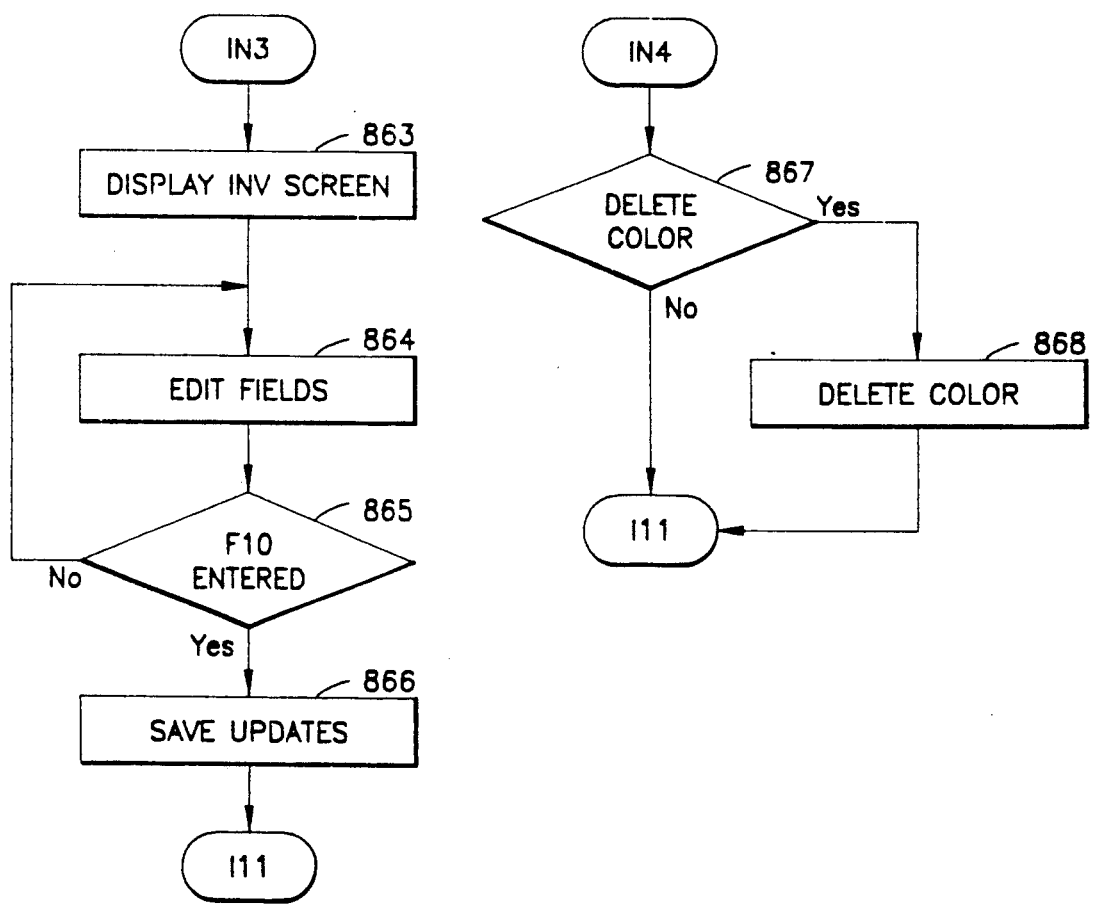
Figure 124:
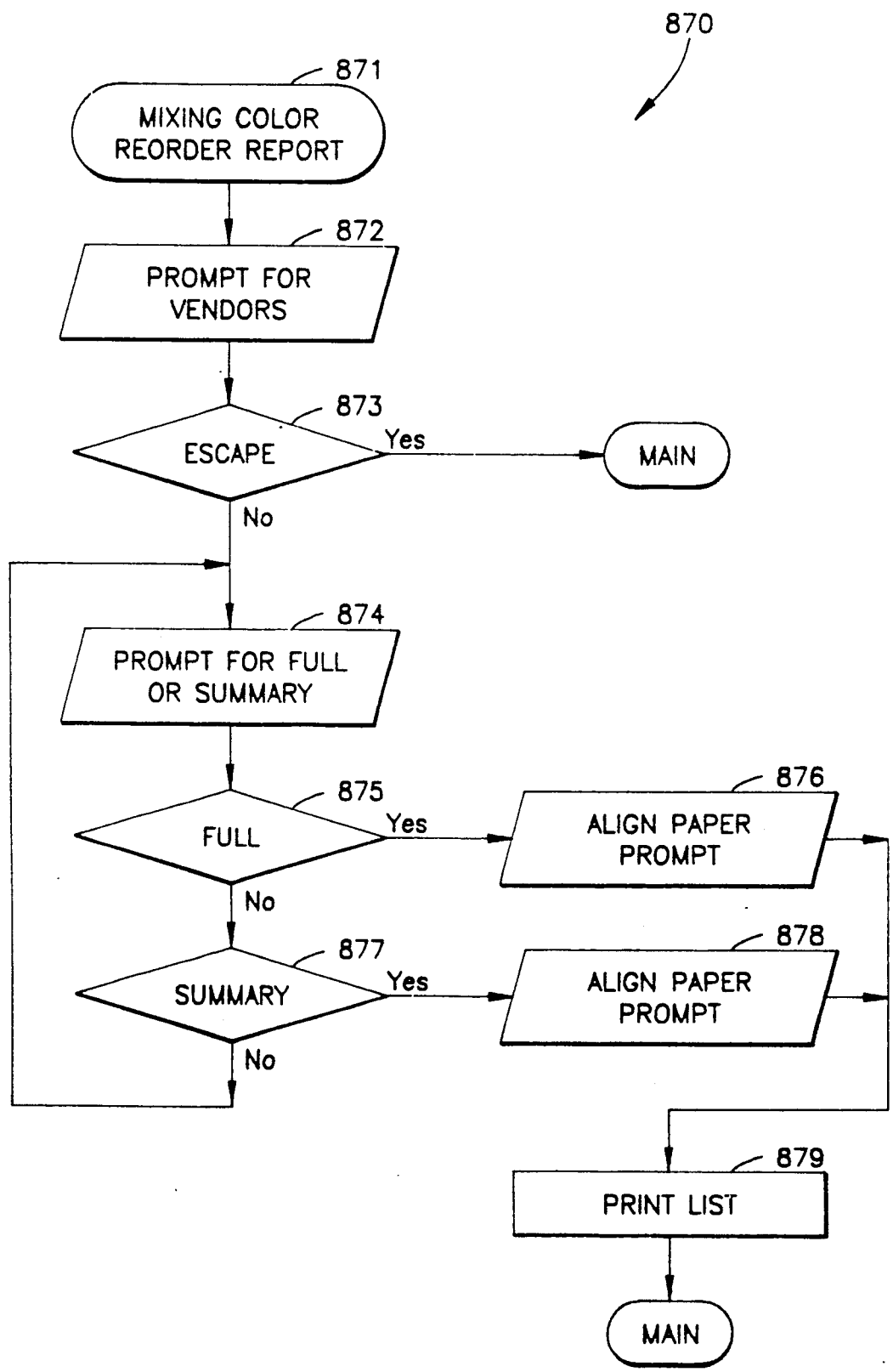
Figure 125:
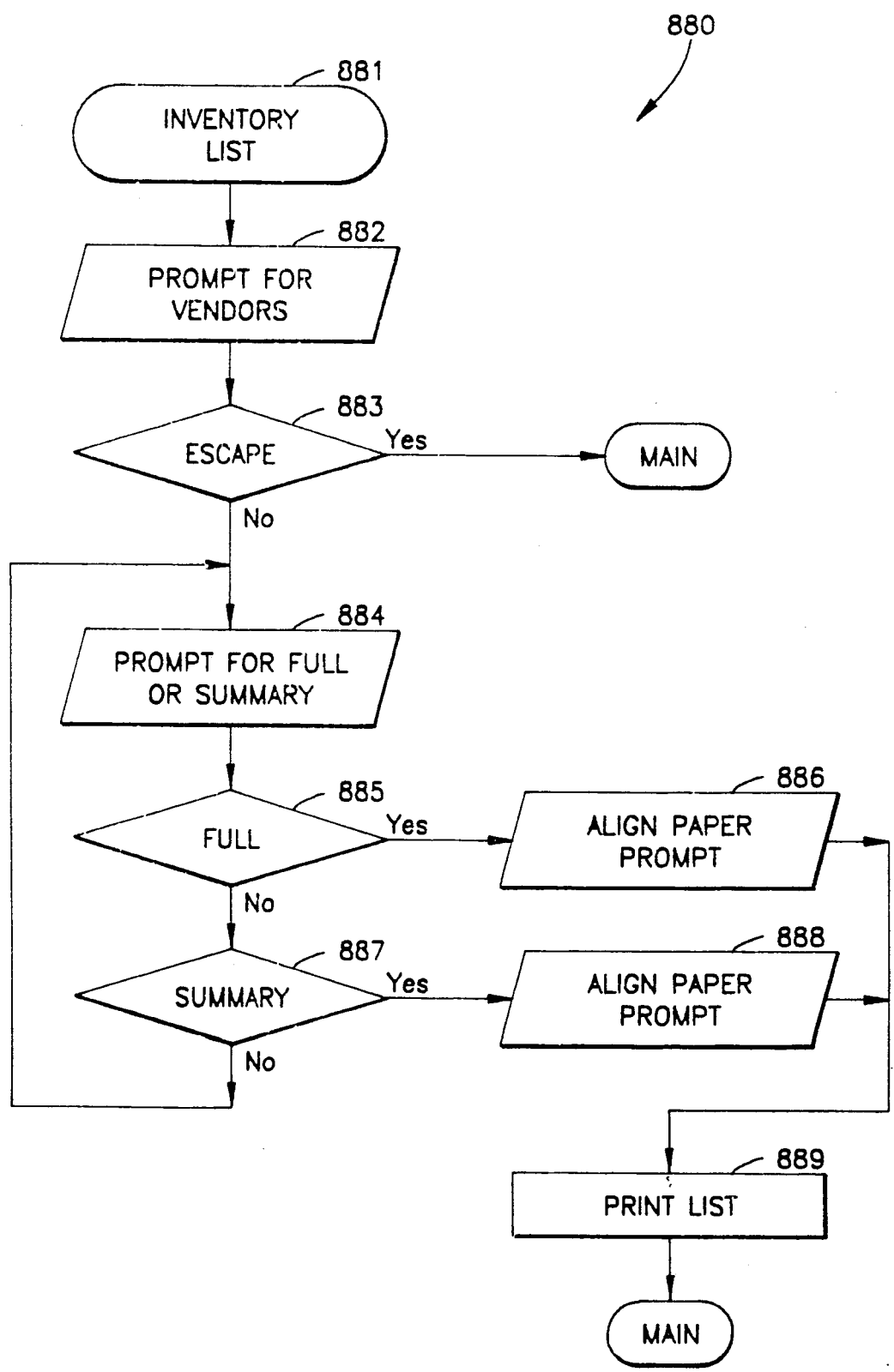
Figure 126:
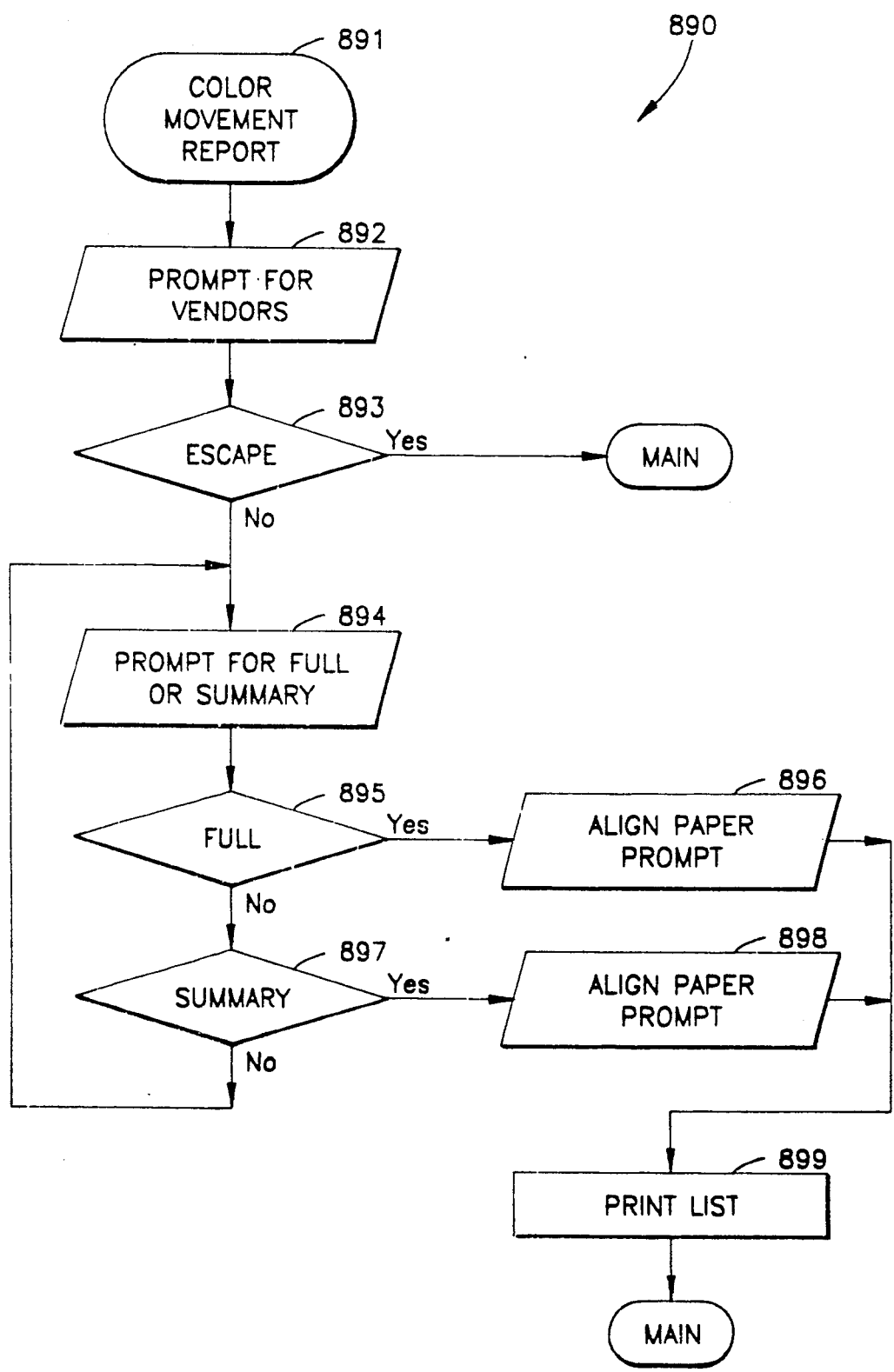
Figure 127A:
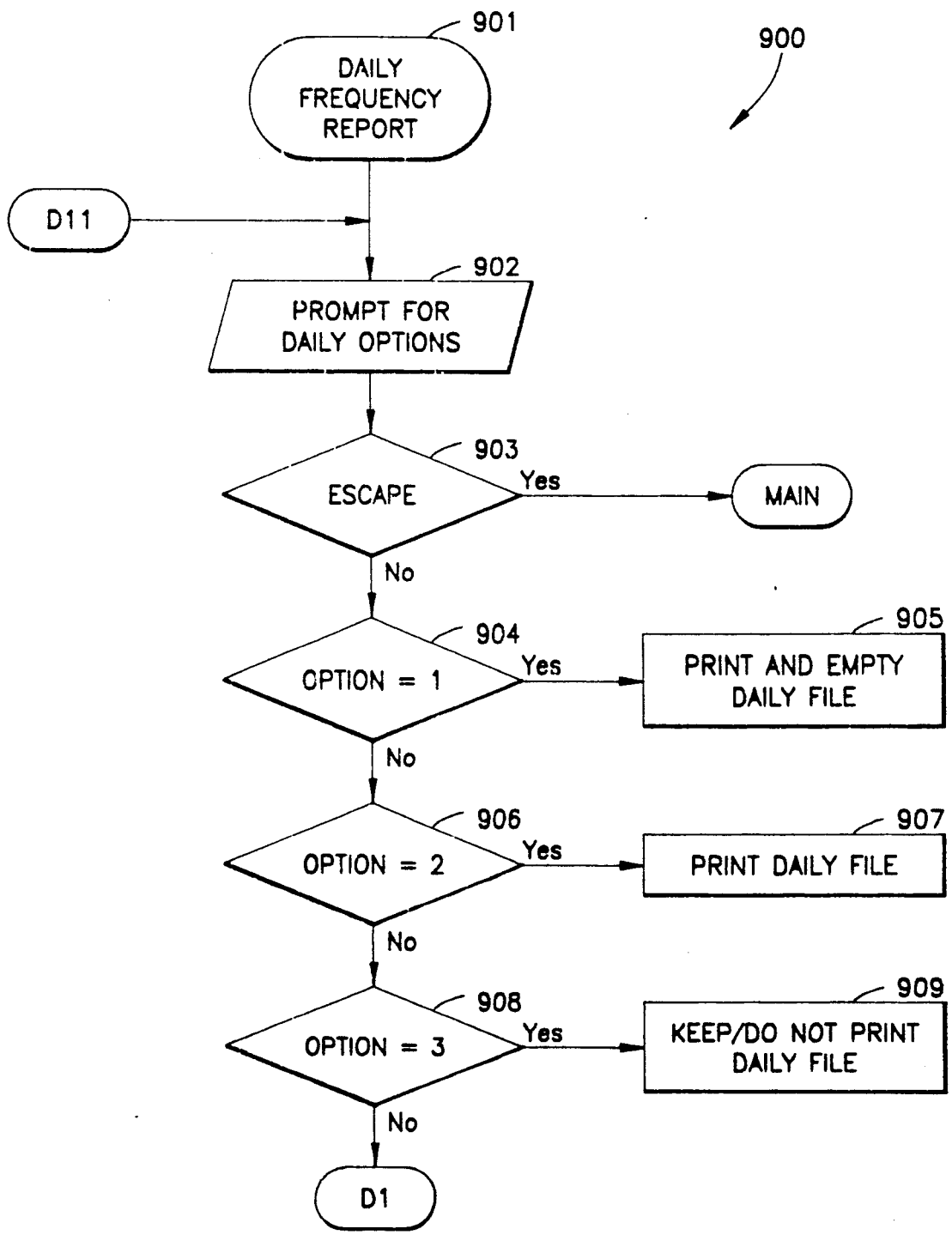
Figure 127B:
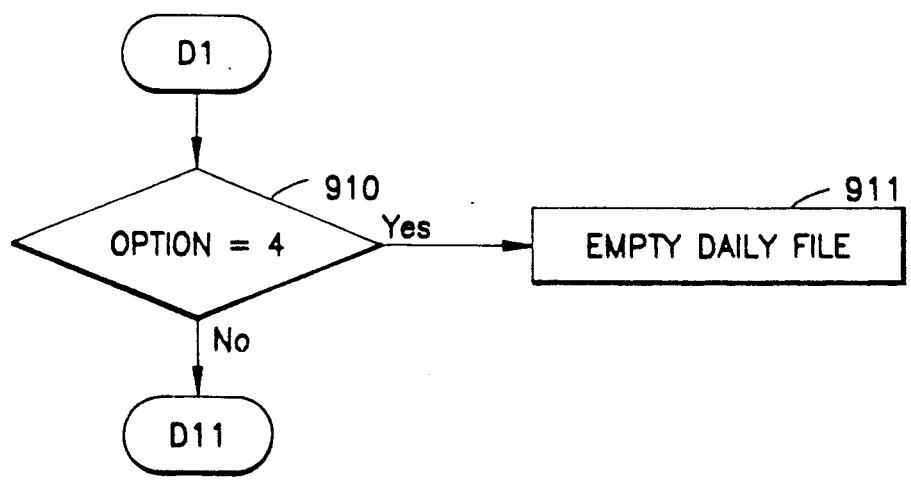
Figure 128:
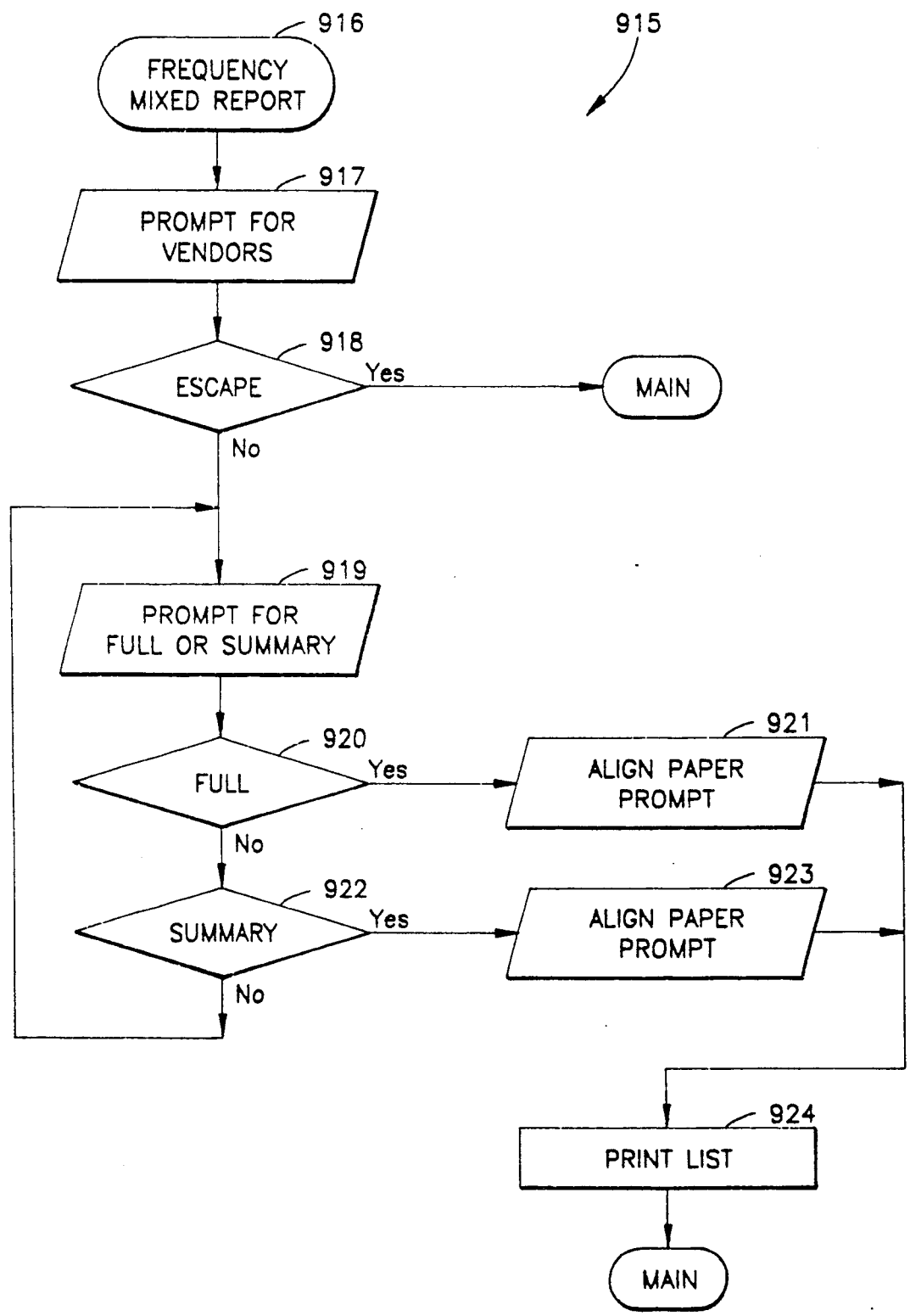
Figure 129:
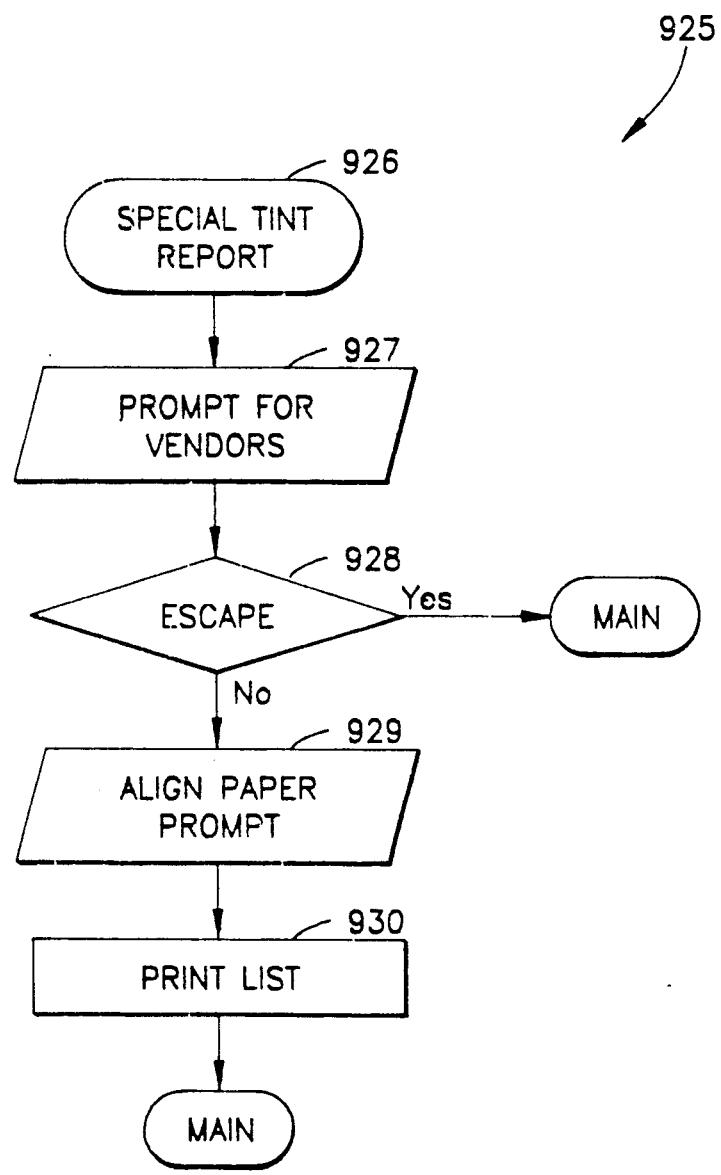
Figure 130:
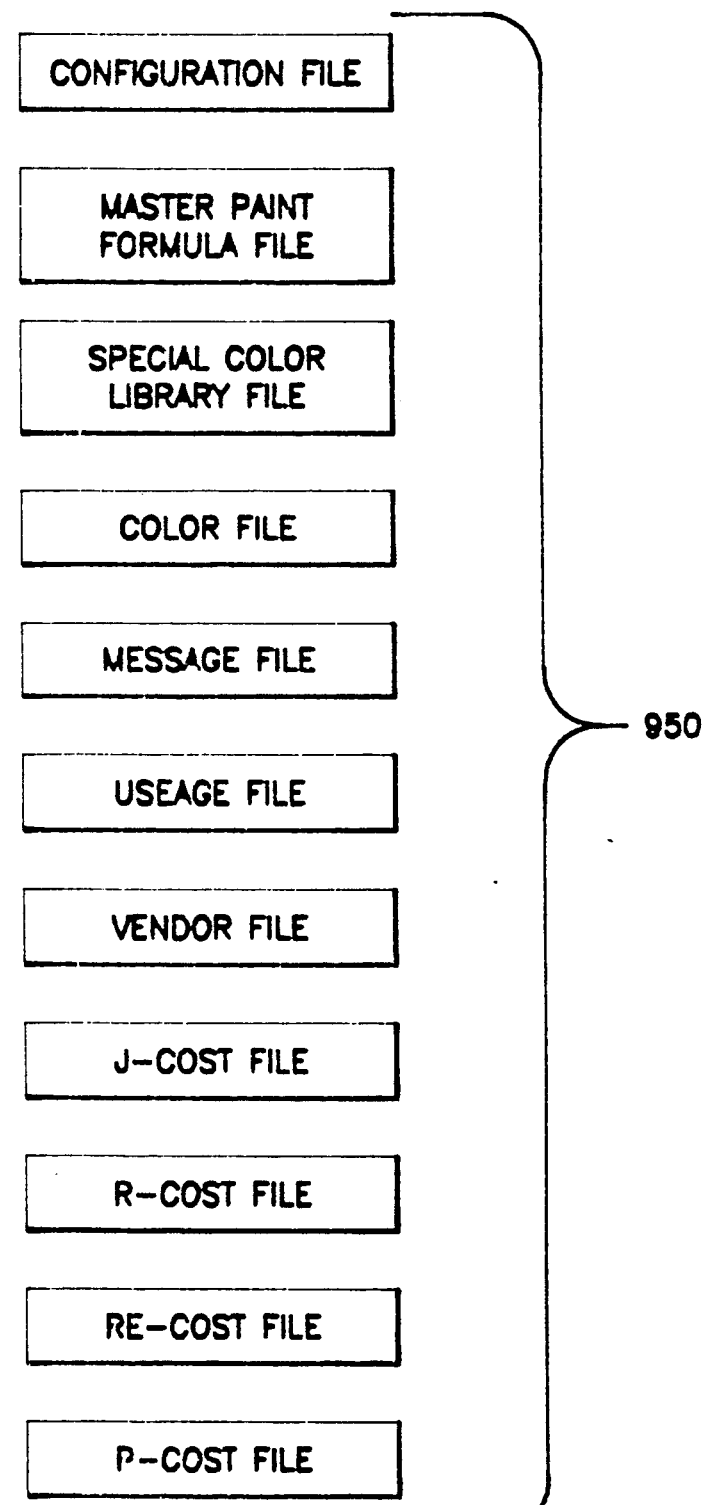

FIG. 33 s an embodiment of a vendor special formula tinting screen presentation;

FIG. 34 is an embodiment of a paint/material costing menu;

FIG. 35 is an embodiment of a select paint/material cost calculation screen presentation;

FIG. 36 is an embodiment of a paint and material costing select vendor screen presentation;

FIG. 37 is an embodiment of a paint formula and material costing screen presentation used for entry of customer information;

FIG. 38 is an embodiment of a paint/material costing screen presentation;

FIG. 39 is an embodiment of a select size screen presentation overlaying the paint/material costing screen presentation;

FIG. 40 is an embodiment of a select type screen presentation overlaying the paint/material costing screen presentation;

FIG. 41 is an embodiment of a catalyst selection menu screen presentation overlaying the paint/material costing screen presentation;

FIG. 42 is an embodiment of a reducer selection menu screen presentation overlaying the paint/material costing screen presentation;

FIG. 43 is an embodiment of a clear coat selection menu screen presentation overlaying the paint/material costing screen presentation;

FIG. 44 is an embodiment of a clear coat catalyst selection menu screen presentation overlaying the paint/material costing screen presentation;

FIG. 45 is an embodiment of a clear coat reducer selection menu screen presentation overlaying the paint/material costing screen presentation;

FIG. 46 is an embodiment of the paint/material costing screen presentation showing the calculated selling price minus any markup;

FIG. 47 is an embodiment of the paint/material costing screen presentation showing the selling price including a markup;

FIG. 48 is an embodiment of a save and print information screen presentation overlaying the paint/material costing screen presentation;

FIG. 49 is an embodiment of the paint/material costing labels;

FIG. 50 is an embodiment of a select paint/material cost calculation screen presentation overlaying the paint/material costing screen presentation;

FIG. 51 is an embodiment of a customer not found screen presentation overlaying the select paint/material cost calculation screen presentation;

FIG. 52 is an embodiment of a correct customer screen presentation overlaying the paint/material costing screen presentation;

FIG. 53 is a select paint/material cost calculation screen presentation overlaying the paint/material costing screen presentation;

FIG. 54 is an embodiment of a RO number not found screen presentation overlaying the select paint/material cost calculation screen presentation;

FIG. 55 is a found correct customer screen presentation overlaying the paint/material costing screen presentation;

FIG. 56 is an embodiment of a delete cost calculation screen presentation overlaying the select paint/material cost calculation screen presentation;

FIG. 57 is an embodiment of a no cost calculations found screen presentation overlaying the select paint/material cost calculation screen presentation;

FIG. 56 is an embodiment of a delete this cost calculation screen presentation overlaying the paint/material costing screen presentation;

FIG. 59 is an embodiment of a select type screen presentation overlaying the paint additives screen presentation;

FIG. 60 is an embodiment of a paint supplies rate method screen presentation overlaying the paint additives screen presentation;

FIG. 61 is a screen presentation of the paint additives;

FIG. 62 is an embodiment of a paint additive and clear coat listing screen presentation overlaying the paint additives screen presentation;

FIG. 63 is an embodiment of a paint and body supplies maintenance screen presentation;

FIG. 64 is an embodiment of a paint and body supplies listing screen presentation overlaying the paint and body supplies maintenance screen presentation;

FIG. 65 is an embodiment of a select product use screen presentation overlaying the refinisher price list maintenance screen presentation;

FIG. 66 is a refinisher price list screen presentation overlaying the refinisher price list maintenance screen presentation;

FIG. 67 is an embodiment of a refinisher price list report screen presentation overlaying the refinisher price list maintenance screen presentation;

FIG. 68 is an embodiment of an add/edit/delete refinisher paint lines enter master paint line type screen presentation overlaying the refinisher price list maintenance screen presentation;

FIG. 69 is an embodiment of an add/edit/delete refinisher paint lines edit or delete master prefix screen presentation overlaying the refinisher price list maintenance screen presentation;

FIG. 70 is an embodiment of an add/edit/delete refinisher paint lines cost codes screen presentation overlaying the refinisher price list maintenance screen presentation;

FIG. 71 is an embodiment of an add/edit/delete equivalent refinisher paint lines enter master point line type screen presentation overlaying the refinisher price list maintenance screen presentation;

FIG. 72 is an embodiment of an add/edit/delete equivalent refinisher paint line screen presentation overlaying a refinisher price list maintenance screen presentation;

FIG. 73 is an embodiment of a paint/material cost per labor hour report window screen presentation overlaying the paint/material costing menu;

FIG. 74 is an embodiment of a check paper alignment screen presentation overlaying the paint/material costing menu screen presentation;

FIG. 74A is an embodiment of a cost per labor hour report;

FIG. 75 is an embodiment of a cost calculations report window screen presentation overlaying the paint/material costing menu screen presentation;

FIG. 76 is an embodiment of a check paper alignment screen presentation overlaying the cost calculations report window screen presentation;

FIG. 76A is an embodiment of a cost calculations report;

FIG. 77 is an embodiment of a print mix base color labels select vendor screen presentation overlaying the print mix base color labels screen presentation;

FIG. 78 is an embodiment of a print vendor mixing color labels screen presentation;

FIG. 79 is an embodiment of a mixing color not found in mixing color data base screen presentation overlaying the print vendor mixing color labels screen presentation;

FIG. 80 is an embodiment of a print vendor mixing color labels (ounces) screen presentation;

FIG. 81 is an embodiment of a print vendor mixing color label (grams) screen presentation;

FIG. 82 is an embodiment of a print vendor mixing color label (standard sizes) screen presentation;

FIG. 83 is an embodiment of color labels;

FIG. 84 is an embodiment of a mixing color management select vendor screen presentation overlaying the mixing color inventory management screen presentation;

FIG. 85 is a vendor mixing color inventory management screen presentation;

FIG. 86 is an embodiment of a mixing color record does not exist screen presentation overlaying the vendor mixing color inventory management screen presentation;

FIG. 77 is an embodiment of an edit or delete mixing color screen presentation overlaying a vendor mixing color inventory management screen presentation;

FIG. 88 is an embodiment of a deletion of mixing color is irreversible screen presentation overlaying the edit or delete mixing color screen presentation;

FIG. 89 is an embodiment of a vendor mixing color inventory management screen presentation;

FIG. 90 is an embodiment of a mixing color reorder screen select vendor screen presentation;

FIG. 91 is an embodiment of a print full or summary report screen presentation overlaying a mixing color reorder report screen presentation;

FIG. 92 is an embodiment of a check paper alignment screen presentation overlaying a mixing color reorder report screen presentation;

FIG. 93 is an embodiment of a mixing color reorder report;

FIG. 94 is an embodiment of a mixing color inventory status report;

FIG. 95 is an embodiment of a mixing color inventory list select vendor screen presentation;

FIG. 96 is an embodiment of a set filter for mixing color inventory report screen presentation overlaying the mixing color inventory list screen presentation;

FIG. 97 is an embodiment of a check paper alignment screen presentation overlaying the mixing color inventory list screen presentation;

FIG. 98 is an embodiment of a mixing color movement report;

FIG. 99 is an embodiment of a mixing color movement report select vendor screen presentation;

FIG. 100 is an embodiment of a print full or summary report screen presentation overlaying the mixing color movement report screen presentation;

FIG. 101 is a check paper alignment screen presentation overlaying the mixing color movement report screen presentation;

FIG. 102 is an embodiment of a daily formula size frequency summary report;

FIG. 103 is an embodiment of a daily formula frequency report screen presentation overlaying the daily formula frequency report screen presentation;

FIG. 104 is an embodiment of a daily formula frequency data file is empty screen presentation overlaying the daily formula frequency report screen presentation;

FIG. 105 is an embodiment of a monthly frequency of formulas mixed report;

FIG. 106 is an embodiment of a monthly frequency of formulas mixed report select vendor screen presentation;

FIG. 107 is an embodiment of a print full or summary report screen presentation overlaying the monthly frequency of formulas mixed report;

FIG. 108 is an embodiment of the check paper alignment screen presentation overlaying the monthly frequency of formulas mixed report screen presentation;

FIG. 109 is an embodiment of a special tint formula report;

FIG. 110 is an embodiment of a special tint formula report select vendor screen presentation;

FIG. 111 is an embodiment of a check paper alignment screen presentation overlaying the special tint formula report screen presentation;

FIG. 112 is an embodiment of a required system file missing screen presentation;

FIGS. 113-115 show a logic flow diagram of an embodiment of a program for performing system start up;

FIG. 116, which is comprised of FIGS. 116A–116D, is a logic flow diagram of an embodiment of a program for performing user main menu selection;

FIG. 117 which is comprised of FIGS. 117A–117D, is a flow diagram of an embodiment of a program for performing paint formula retrieval;

FIG. 118 which is comprised of FIGS. 118A–118C, is a flow diagram of an embodiment of a program for performing checks for multiple formulas;

FIG. 119 which is comprised of FIGS. 119A–119J, is a logic flow diagram of an embodiment of a program for editing formula fields;

FIG. 120 which is comprised of FIGS. 120A–120F, is a logic flow diagram of an embodiment of a program for performing a special color library function;

FIG. 121 which is comprised of FIGS. 121A–121Q, is a logic flow diagram of an embodiment of a program for performing a paint costing function;

FIG. 122 which is comprised of FIGS. 122A–122C is a logic flow diagram for an embodiment of a program for performing the print mixing color labels function;

FIG. 123 which is comprised of FIGS. 123A–123B is a logic flow diagram for an embodiment of a program for performing mixing color inventory management;

FIG. 124 is a logic flow diagram for an embodiment of a program for providing the mixing color reorder reports;

FIG. 125 is a logic flow diagram of an embodiment of a program for providing the inventory list;

FIG. 126 is a logic flow diagram of an embodiment of a program for providing the color movement reports;

FIG. 127 which is comprised of FIGS. 127A–127B, is a logic flow diagram of an embodiment of a program for providing the daily frequency reports;

FIG. 128 is a logic flow diagram for an embodiment of a program for providing the monthly frequency mixed reports;

FIG. 129 is a logic flow diagram for an embodiment of a program providing the special tint reports; and FIG. 130 illustrates data base files present in a preferred embodiment.

DETAILED DESCRIPTION OF THE PREFERRED EMBODIMENT

Referring now to the Figures, there is illustrated a preferred embodiment of a paint formula retrieval and management system and method in accordance with the principles of the present invention.

Figure 2:
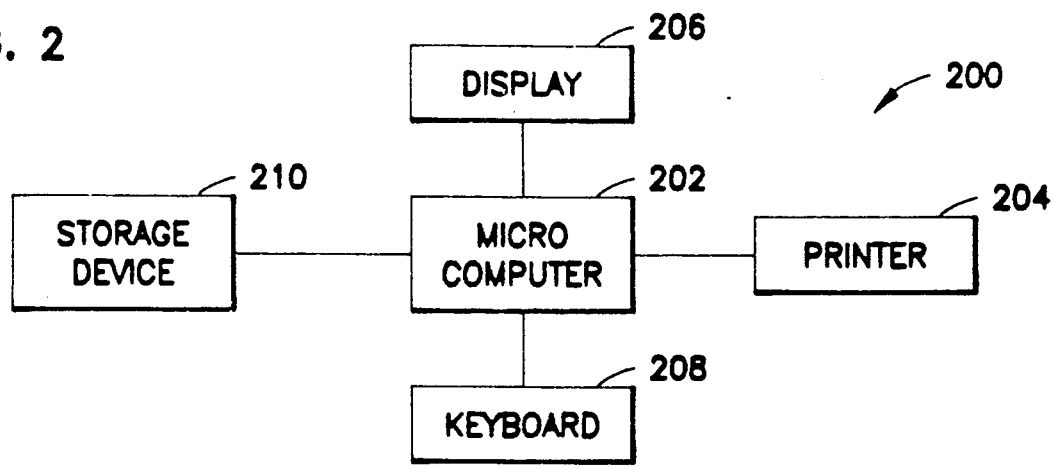
FIG. 2 is a block diagram of a computer system in accordance with the principles of the present invention.

FIG. 1 illustrates the basic functions present in a preferred embodiment of the present invention. The preferred embodiment of the present invention is implemented by use of a programmed computer system, an example of such a computer system being illustrated in FIG. 2 and generally referenced by the reference numeral 200. When programmed with a program in accordance with the principles of the present invention, the computer system 200 will perform the functions illustrated in FIG. 1. The computer system is shown as including a general purpose microcomputer 202 such as an IBM AT compatible, a dot matrix printer 204, a display device 206, a keyboard 208, and a storage device 210. The microcomputer might include a dual-speed 6/8 megahertz (MHz) 80286 central processing unit (CPU), the speed being hardware switch selectable. The display 206 will preferably have graphics capability and be driven by a suitable graphics card located in one of the expansion slots of the microcomputer. The storage device 210 might include both floppy drives, such as high density 1.2 megabyte (MB) drives and hard disks of several megabytes for storing paint formula files. In addition, the microcomputer will preferably include random access memory (RAM) for execution of a program in accordance with the principles of the present invention. In the preferred embodiment, there is one megabyte of RAM present. Further, in the preferred embodiment, a long life battery will be present for powering CMOS memory. The printer 204 is preferably a fairly high speed dot matrix printer; e.g., 200 characters per second in draft mode and 100 per second in near letter quality mode. The printer 204, in the preferred embodiment, is interconnected to the microcomputer by a parallel interface and includes a 2,000 byte buffer. A preferred embodiment of a program in accordance with the principles of the present invention runs under MS-DOS TM operating system software and can be used with applications/utility management software, both of which are commonly available. It will be appreciated that numerous types of computers and peripheral devices might be utilized in keeping with the principles of the present invention. The above-described preferred embodiment is but an example of one such computer system.

Figure 3:
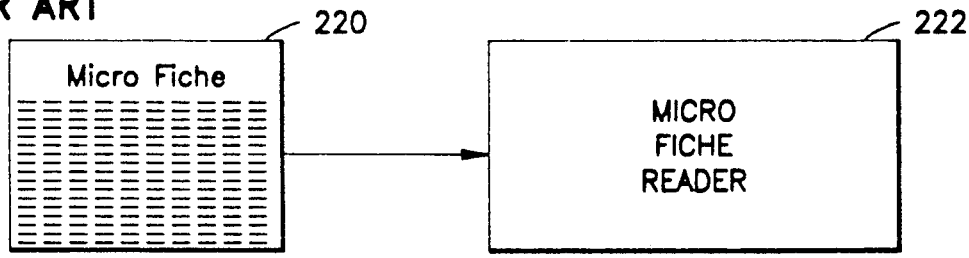
FIG. 3 is a diagrammatic illustration of the prior art illustrating a microfiche and microfiche reader.
Figure 4:
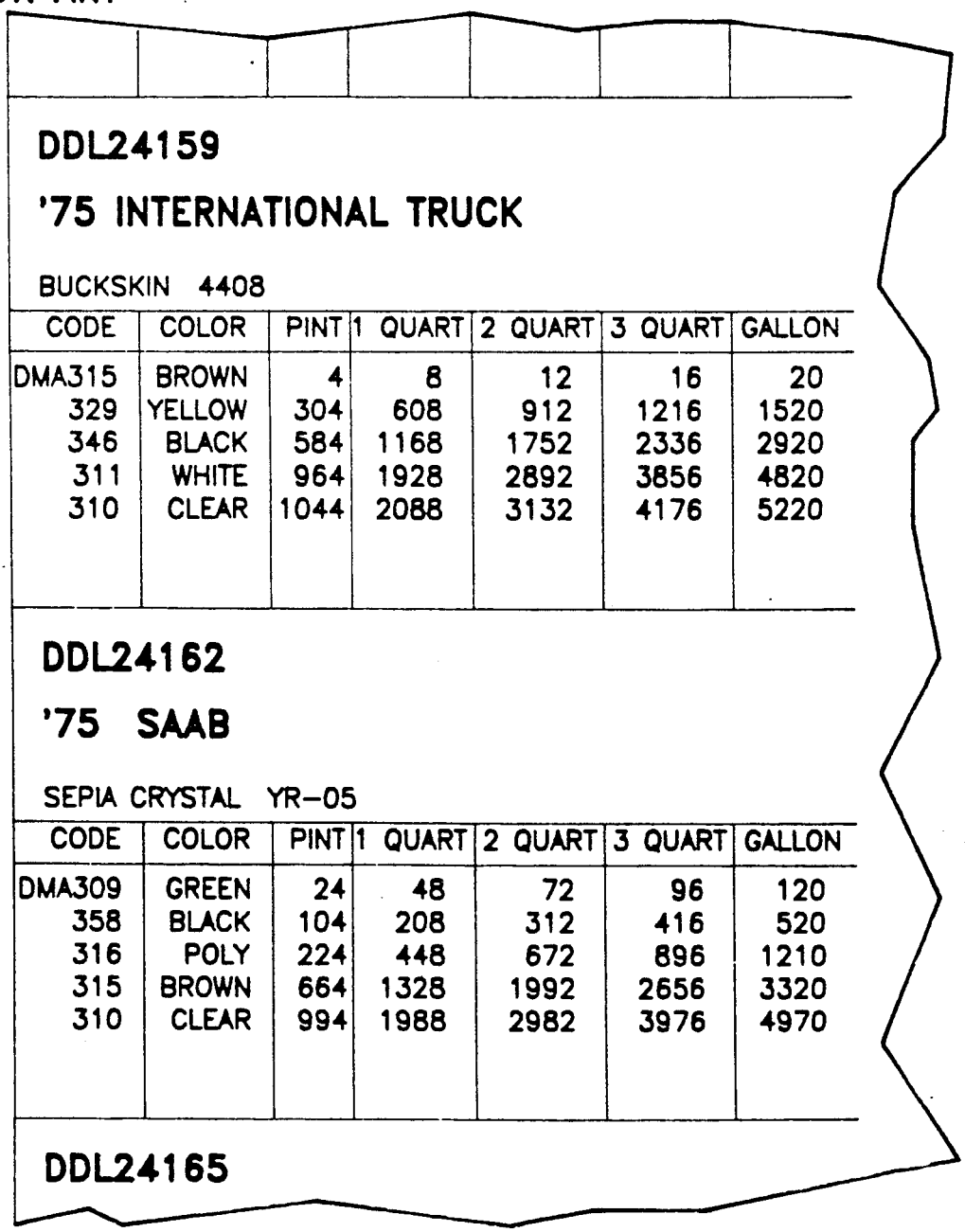
FIG. 4 is an enlarged fragmentary illustration of the microfiche in accordance with the prior art.

Illustrated in FIGS. 3 and 4 is the currently existing prior art method of retrieving paint formulas. Paint vendors provide microfiche 220 to body shops, jobbers, etc., which include their specific paint formulas and related information such as formula number, car type, code, year, cost code, etc. The specific format and information provided varies depending on the vendor. When the user wishes to retrieve a particular formula for a given size of paint container, a microfiche 220 is read using a microfiche reader 222. The user then notes the formula for the standard size container he/she desires and manually writes the formula down on a piece of paper for paint mixing purposes. FIG. 4 illustrates an enlarged fragmentary view of how such a microfiche might appear when being read from the microfiche reader. As generally illustrated, the microfiche will typically have color usage information on the upper half of the fiche and mixing base color amounts on the lower half of the fiche. The mixing base color information includes a color code, color designation and an amount in grams or ounces for selected standard sizes of paint containers. Not all paint vendors will have the same standard sizes for all paints.

As illustrated in FIG. 1, a preferred embodiment of the present invention provides the basic following functions:

1. Paint formula retrieval — This function will enable the user to retrieve paint formulas. When paint labels are printed, the inventory of each component mixing color is decremented by the appropriate amount for inventory purposes.
2. Special color library — This function will enable the user to record paint formula tinting information on variants of a formula as well as custom color formulations. This function allows for recording of three lines of message text identifying the tint for later retrieval and use.
3. Paint and material costing — This function will enable the user to record and calculate the paint and material costs associated with the use of a user specified amount of paint for a specific job.
4. Paint mixing color labels — This function will enable the user to print a mixing base color identification label for the sale or use of a mixing base color and decrement inventory. This is useful for over-the-counter sales.
5. Mixing color inventory management — This function will enable the user to update or enquire on the mixing base color inventory levels and track point sales, over-the-counter sales, and establish reorder levels based on number of units.
6. Mixing color reorder report — This function will enable the user to generate reports that will aid in the purchase of mixing base colors. This function allows the user to generate a list of only those mixing colors which may need to be reordered because the stock on hand has fallen below a user established reorder level.
7. Mixing color inventory status report — This function will enable the user to generate reports on the status/valuation of mixing base color inventory. A separate report can be generated for each vendor.
8. Mixing color movement report — This function will enable the user to generate reports on the usage of mixing base colors in selections 1 and 4. The amount of each mixing color used in formulas and the amount sold over the counter can be tabulated.
9. Daily formula frequency report — This function will enable the user to print a daily formula size frequency report.
10. Monthly formula frequency report — This function will enable the user to generate reports on the frequency of use of paint formulas during a reporting period (typically a month). For each formula, the number of times the formula was mixed and the sizes which were mixed are reported.
11. Special color library report — This function will enable a user to generate a listing of all the paint formulas that have special color tinting associated with them or to enter/modify a custom color formulation.
12. System utilities and configuration — This function will enable a user to custom configure the operation of the system and to perform system utility functions.

Blocks 230 and 256 in FIG. 1 represent the initiation and termination of the functions 23 through 254, respectively.

SYSTEM INITIATION

A preferred embodiment of a paint formula retrieval and management system program developed in accordance with the principles of the present invention is activated at the microcomputer by use of a conventional operating system command. (Throughout this disclosure, the paint formula retrieval and management system program will be referred to as the CATFRAMS TM program, CATFRAMS TM being a trademark of Yada Systems, Inc. TM ) In the preferred embodiment, applications/utility management software is utilized to display a master menu such as is illustrated in FIG. 5. The master menu enables a user to reset the date and/or time, call up the utility menu, install updates to the CATFRAMS TM program, load the CATFRAMS TM program, or exit to the operating system. Once the CATFRAMS TM program is loaded into the microcomputer RAM, the CATFRAMS TM program of the preferred embodiment displays a banner identifying the CATFRAMS TM program and providing various copyright, trademark, etc. notices. The user proceeds beyond this display by entering any key on the keyboard. In the preferred embodiment, this action results in a further display of various trademarks, trade names, etc. for the various paint vendors whose paint formulas are being referenced in the CATFRAMS TM program. The user, once again, can proceed past this display by entering any key from the keyboard.

Depending on how the system was configured, the system date, and the date of the first record in the daily formula size frequency file, one of the following situations will occur:

1. The user has not configured the system to track daily formula size frequency. In this case, the CATFRAMS TM program will proceed to display the CATFRAMS TM main menu as illustrated in FIG. 6.
2. The CATFRAMS TM program is configured to track daily formula size frequency and the current date is the same as the date of the first record in the daily formula size frequency file. In this case, the CATFRAMS TM program will proceed on to the display of the main menu as generally illustrated in FIG. 6.

3. The CATFRAMS TM program is configured to track daily formula size frequency and the current date is not the same as the date of the first record in the daily formula size frequency file; e.g., if a user had mixed some paints the day before and the CATFRAMS TM program was being started for the first time the following day. In this case, the CATFRAMS TM program will display a daily formula frequency report screen presentation as generally illustrated in FIG. 7. The user will enter one of the menu choices (1 through 4) and the CATFRAMS TM program will perform the associated processing. This processing is discussed when the daily formula frequency report is described.

Upon completion of the selected processing, the CATFRAMS TM program will display the CATFRAMS TM main menu as generally illustrated in FIG. 6. Each of the numbered selections on the CATFRAMS TM main menu correspond to one of the functions shown in FIG. 1, which the user can initiate. In the preferred embodiment, the CATFRAMS TM program can be initialized to display the user's name (body shop or jobber name) at the top of the main menu. The functions of the CATFRAMS TM program illustrated in FIG. 1 will now be discussed in more detail below.

PAINT FORMULA RETRIEVAL

The paint formula retrieval function of the CATFRAMS TM program includes:

1. Retrieval of user's selected formulas from the storage devices 210 where the paint formula and related information is stored.
2. Formula presentation on the display 206.
3. Formula size selection that allows the generation of non-standard sizes.
4. User editing via the keyboard 208 of formula header information.
5. Printing of paint formulation labels at the printer 204.
6. Tracking the frequency of formula usage.
7. Inventory tracking of mixing base colors based on their use in paint formulas.

Once the user has selected the paint formula retrieval function by entering a "1" and depressing a return key on the keyboard, the CATFRAMS TM program will determine the number of paint vendors supported by the user's CATFRAMS TM program. The CATFRAMS TM program maintains this information in a suitable data file. If the user's CATFRAMS TM program supports more than one vendor, a select vendor menu screen presentation will be displayed at the display 206 as generally illustrated in FIG. 8. The select vendor menu will overlay, as a window, a formula retrieval background screen presentation so as to allow the user to select the paint vendor for which formulations will be retrieved. The CATFRAMS TM program will wait for the user to select one of the vendors. In this particular menu, and typically throughout many of the menus of the CATFRAMS TM program, the user will indicate a selection by entry of the corresponding reference numeral and depressing a return key function on the keyboard 208. If the CATFRAMS TM program supports only one vendor, the CATFRAMS TM program will proceed as though the user selected the vendor from the vendor menu. After the vendor has been selected, the CATFRAMS TM program will display the formula retrieval background screen presentation, also referred to as the formulation screen as generally illustrated in FIG. 9 and wait for the user to enter a paint formula number. The field or location for entry of the paint formula number is highlighted by use of reverse video as represented by a rectangular area 260 outlined by a broken line. When the user enters a paint formulation number, which might be a vendor provided paint formulation number or a user created formulation number, the CATFRAMS TM program will perform the following checks:

1. If the last key the user entered was an "ESC" escape key, the system will return the user to the select vendor menu. The user can then select a new vendor or return to the system main menu by depressing the escape key. If the system supports only one vendor and the user has entered the escape key, the system will return to the main menu display. If the user returns to the vendor menu display, the user can return to the previous menu (usually the main menu) by entering a carriage return or the escape key.
2. The CATFRAMS TM program will determine the paint formula type. The paint formula type is used to determine the refinisher cost of the selected formula size and also to determine the master formula file.
3. The CATFRAMS program will search for the formulation in the paint type master formulation file and also in the special color library formulation file. Two main types of formula files or data bases are maintained by the CATFRAMS TM program. One type is the master formulation files which include the vendor's formulations and the other is a special color library formulation file of formula variants and custom formulas created by the user. If only one variant of the formulation exists, then the formulation is displayed on the screen for the user. If multiple formulas are found, the multiple formulas are displayed for the user and the user will select one of the formulas. FIG. 10 is an example of the display for a formulation that has more than one variant or formula.

If the formula was not in either the master formulation file or the special color library formulation file, then the system will display an informative message to the user indicating that the specified formulation does not exist/could not be found. The user will continue formula retrieval by entering any key on the keyboard. If the formulation was located, the system will display the formulation on the screen as generally indicated in FIG. 11. In the preferred embodiment, the paint vendor name is displayed at the top of the formulation screen.

The formulation screen of FIG. 11 is composed of a set of fields that contain information about the formula along with the amounts of mixing base color for mixing different standard sizes (pint/quart/two quarts/three quarts/gallon) of the formula. The CATFRAMS TM program of the preferred embodiment will display amounts for the standard sizes supported by the vendor (the sizes that have formulations on the paint vendor's microfiche supplied by the paint vendor). However, the CATFRAMS TM program will allow the user to select standard sizes not supported by the vendor, and will automatically calculate the formula for these sizes, referred to as non-standard sizes. For example, if the vendor doesn't provide a pint size, no mix base color quantities will appear when the formula information has been retrieved. However, if the user selects a pint size, then mix base color quantities will appear in the pint column. Once the formula has been retrieved and displayed for the user, the CATFRAMS TM program will then allow the editing of selected information on the formulation screen. Broken lines 260 indicate generally the fields or information which can be edited.

FIGS. 12A & B illustrate the formulation screen with brackets being shown to identify the beginning and end of each field of information. The number found within the brackets of each field is associated with the number found in the legend below the formulation display.

The bottom half of the formulation display, as illustrated in FIG. 12, will vary if the user selected a formula from the special color library file. Formulas from the special color library file will have only one standard size. The formulation will have up to twenty mixing base colors. FIG. 13 is an example of a formulation from the special color library.

Figure 15:
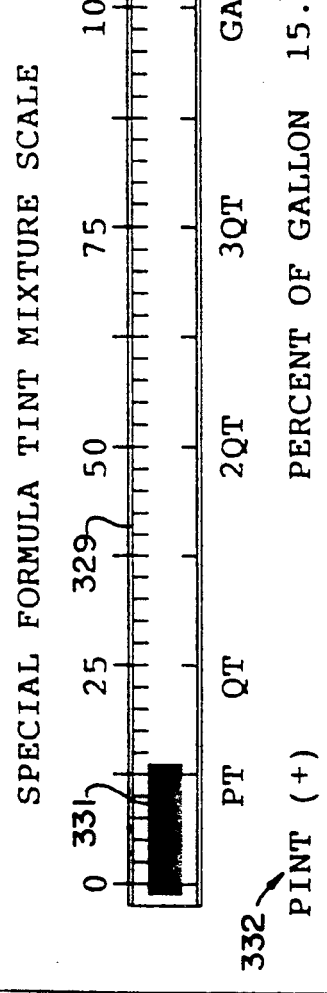
FIG. 15 is an embodiment of a special formula tint mixture scale screen presentation.

Once the formula information is displayed, the user will start field editing on the formula cost code field if the CATFRAMS TM program was configured to allow formula cost code editing, or will start on the number of labels to print (number of paint cans) field (quantity field) if formula cost code editing is not allowed. The user can selectively modify any of the fields that allow editing. The printing of labels can occur after the size of the formulation has been specified, or immediately if the user selected a formulation from the special color library. As soon as the required information to print the labels has been specified by the user, an informative status message is displayed at the bottom of the screen, as is generally illustrated in FIG. 13, indicating that labels can be printed. The status message text is: F10 to print label. The vendor formula retrieval display fields as generally illustrated in FIG. 12, are as follows:

1. Formula number 301 — This field will contain the formula number that the user selects. The user cannot edit this field once the formulation has been retrieved from its source file. It is for viewing purposes only at this point.
2. Formula cost code 302 — This field will contain the vendor cost (pricing) code. The cost code is used to determine the refinisher costs for the amount of paint that will be mixed. The user can edit this field if the CATFRAMS TM program was configured to allow formula cost code editing. Otherwise, it is displayed for viewing only.
3. Formula alternative number 303 — This field represents the variant or alternative number of the formulation. If there is only one version, then this field will typically be empty. This field, along with the formula number, will provide a unique identification for each formulation. The user cannot edit this field.
4. Number of labels to print 304 — This field is used to specify the number of paint identification label sets to print (number of paint cans). This also is used as a quantity count for the size of the formulation selected for inventory purposes. The inventory of mixing base colors is decremented by the quantity of each mixing base color used times the value entered for this field. The default value for this field is one. The user can edit this field.
5. Amount of paint to mix 305 — This field is used to specify the amount (pint/quart/two-quart/etc.) of paint that will be mixed. This field is also referred to as the size field. The user can select one of the standard sizes supported by the paint vendor or a non-standard size that is calculated by the CATFRAMS TM program. FIG. 14 illustrates an example of the pull-down menu that will appear to enable user size selection. The menu will appear when the cursor is positioned under the size field. In FIG. 14, options 1-5 are generally for standard mix sizes. Non-standard sizes can be selected by selecting a standard size from the list which is not provided by the vendor; e.g., the vendor does not provide a pint size, or selecting a special size. Selecting a special size allows the user to specify the mix amount in 2.5% increments of a gallon. When the special size option is selected, the user is presented with a display that represents an ingredient sliding scale 329 with ingredients in 2.5% of a gallon, as is generally illustrated in FIG. 15. As the user increases or decreases the amount by use of the left/right arrow keys, the inverse video portion 321 moves correspondingly along the scale 329. Also, the digital amount selected at 330, along with a status message at 332 indicating the closest standard size. The status message will indicate if the amount is exactly equal to a standard size or is more or less than the standard size using a plus or minus sign. Example status message descriptions are: pint (−), (pint (+), quart (+), etc. After the special tint size has been selected, the CATFRAMS TM program will update the display with the selected size, as is generally illustrated in FIG. 16. FIG. 16 shows the updated display after this size has been selected. The right-most quantity column contains the amounts of each mixing base color for the selected size and includes the header "*SPCL*" in inverse video as indicated by broken line 260. (Inverse video will be used to indicate the size selected even when standard sizes are selected.) This text message indicates that the amounts in the column are for a special tint. Under the size field, the word "special" appears along with a status message indicating the closest standard size. In calculating the non-standard sizes above, the system will use the following method:

a. If the paint vendor standard sizes are exact multiples of a gallon, then the percentage selected is multiplied by the gallon amounts. The standard sizes are exact multiples of a gallon when the gallon amounts are four times the quart amounts, etc.
b. If the standard sizes are not exact multiples of a gallon, then the smallest supported standard size amounts are converted to a gallon formulation. The selected percentage is then multiplied by the calculated gallon formulation. The result is the formulation for the selected size.

A non-standard size can also be selected by selecting a bulk mix. A bulk mix option allows the user to specify an amount to mix up to 99.99 gallons in increments of 1/100th of a gallon. This non-standard size option is generally used for calculating the quantity amounts for sizes in excess of one gallon. However, this also allows a user to request mix sizes less than a gallon in increments finer than the 2.5% of a gallon through the special tint option. FIG. 17 is an embodiment of the screen used for user input of the bulk mix selection, and FIG. 18 shows the display presented to the user after the size in FIG. 17 has been selected. The CATFRAMS ™ program will display the calculated amounts for the bulk mix in the right-most column and at the text message "*BULK*" above the right-most column indicating that the quantities are for a bulk mix. The user can also input four lines of mix instructions. The text generated here will be printed on the MSDS/Regulatory label. The CATFRAMS ™ program will calculate the bulk mix formulation by multiplying the gallon formulation times bulk mix amount selected. If a gallon formulation is not supported by the paint vendor, then the largest supported formulation is converted to a gallon formulation and the calculated gallon formulation is used.

After the user has selected the size, the CATFRAMS ™ program will determine the refinisher costs of the formulation. If the CATFRAMS ™ program is configured to display the refinisher costs, then costs will be displayed on the screen in the upper left hand corner as illustrated in FIGS. 16 and 18. The refinisher cost is based on the code found in the formula cost code field and the formulation size selected by the user. The system maintains a price schedule similar to the vendor refinished price sheet. If the user selected a non-standard size, the system will calculate the refinisher costs using the costs of the standard size that is the same or smaller than the selected size. If the price schedule does not include a price for a smaller size, the price for the next largest size is used. The cost per ounce of the refinisher is calculated from the price schedule for the corresponding size. The cost per ounce is then multiplied times the number of ounces in the selected size. The CATFRAMS ™ program will also add an additional mark up to the refinisher cost. The additional mark up is calculated by multiplying the special tint mark up percentage (that the user can figure the CATFRAMS ™ system with in the system utilities and configuration main menu option) times the calculated refinisher cost. This cost will then be displayed for the user. The user can edit this field.

6. Purchase or repair order 306 — This field indicates whether or not the customer ordered the formulation with a purchase order (value of "P" in this field) or a repair order (value of "R" in this field). The default value is "P". The user can edit this field.
7. Purchase or repair order number 307 — This field contains the customer purchase or repair order number. The default value is an empty field. The user can edit this field.
8. Formula additional information about the formula 308 — This field is used to display additional information about the formulation. This information is specific to each paint vendor. The user cannot edit this field.
9. Customer name 309 — This field specifies the name of the customer that ordered the formulation. This field will not be displayed unless the system has been configured to use customer names. If configured, the user can edit this field.
10. Rush order 310 — This field indicates the priority of the customer order. If the user enters a "Y" for this field, then the word "RUSH" will appear on the mix operator label. This is an indication to the person mixing the formulation that this order should supercede other orders that are not marked as priority formulations. The default value is "N". The user can edit this field.
11. Formula color 311 — This is the vendor color description for the formulation. The user cannot edit this field.
12. Formula OEM paint code 312 — This field specifies the OEM paint code used to identify the color. The user can edit this field.
13. Formula make of car 313 — This field specifies the make of the car for the formula. The user can edit this field.
14. Formula year of the card 314 — This field specifies the year(s) that the formulation was used for the car specified in the fomula make of the car field. The user can edit this field.
15. Formula message-1 315 — This field contains vendor specific information about the formula. The user can edit this field.
16. Formula message-2 316 — This field contains vendor specific information about the formula. The user can edit this field.
17. Formula message-3 317 — This field contains vendor specific information about the formula. The user can edit this field.
18. Formula standard sizes from vendor 318 — This field will display the standard sizes supported by the paint vendor for the formulation. The user cannot edit this field.
19. Formula mixing base colors 319 — This column contains the mixing base color numbers used in the formulation. The user cannot edit any of the mixing base color numbers in this column.
20. Formula mixing base color description 320 — This column contains the mixing base color descriptions for the mixing base color numbers. The user cannot edit the mixing base color descriptions in this column.
21. Formula pint quantities 321 — This field contains the mixing base color amounts used in a pint formulation. These amounts are typically provided in grams. The user cannot edit any of the mixing base color amounts in this column.
22. Formula quart quantities 322 — This field contains the mixing base color amounts used in a quart formulation. The user cannot edit any of the mixing base color amounts in this column.
23. Formula 2-quart quantities 323 — This field contains the mixing base color amounts used in a 2-quart formulation. The user cannot edit any of the mixing base color amounts in this column.
24. Formula 3-quart quantities 324 — This field contains the mixing base color amounts used in a 3-quart formulation. The user cannot edit any of the mixing base color amounts in this column.
25. Formula gallon quantities 325 — This field contains the mixing base color amounts used in a gallon formulation. This column also will contain the mixing base color quantities when the user selects a special tint or a bulk mix. The user cannot edit any of the mixing base color amounts in this column. This field is also used to display volume quantities when the vendor supports volume quantities and the user has selected a volume formulation. This system will display on the status line an indication if the formula is available in a volume formulation. The user can select a volume formulation by following the instructions in the message status area.

26. Message status area 326 — This area is used for displaying informative messages to the user. It is the last line on the display. The message(s) displayed are sensitive to the current field/function the user is performing.

The formulation screen provides a standard display format which remains the same regardless of the specific arrangement or format the vendor's information is in.

The user can abort the editing process by entering the "ESC" escape key at the keyboard 208 at any time. If the user does enter an escape key, the system will return the user to the formula number field and will wait for a new formulation number. When the user completes formula field editing, the system will update the mixing base color usage in the mixing base color inventory, update the formulation frequency of usage, and print appropriate labels. After the appropriate labels have been printed, the CATFRAMS TM program will return to the formula number field and will wait for a new formulation number.

Figure 19A:
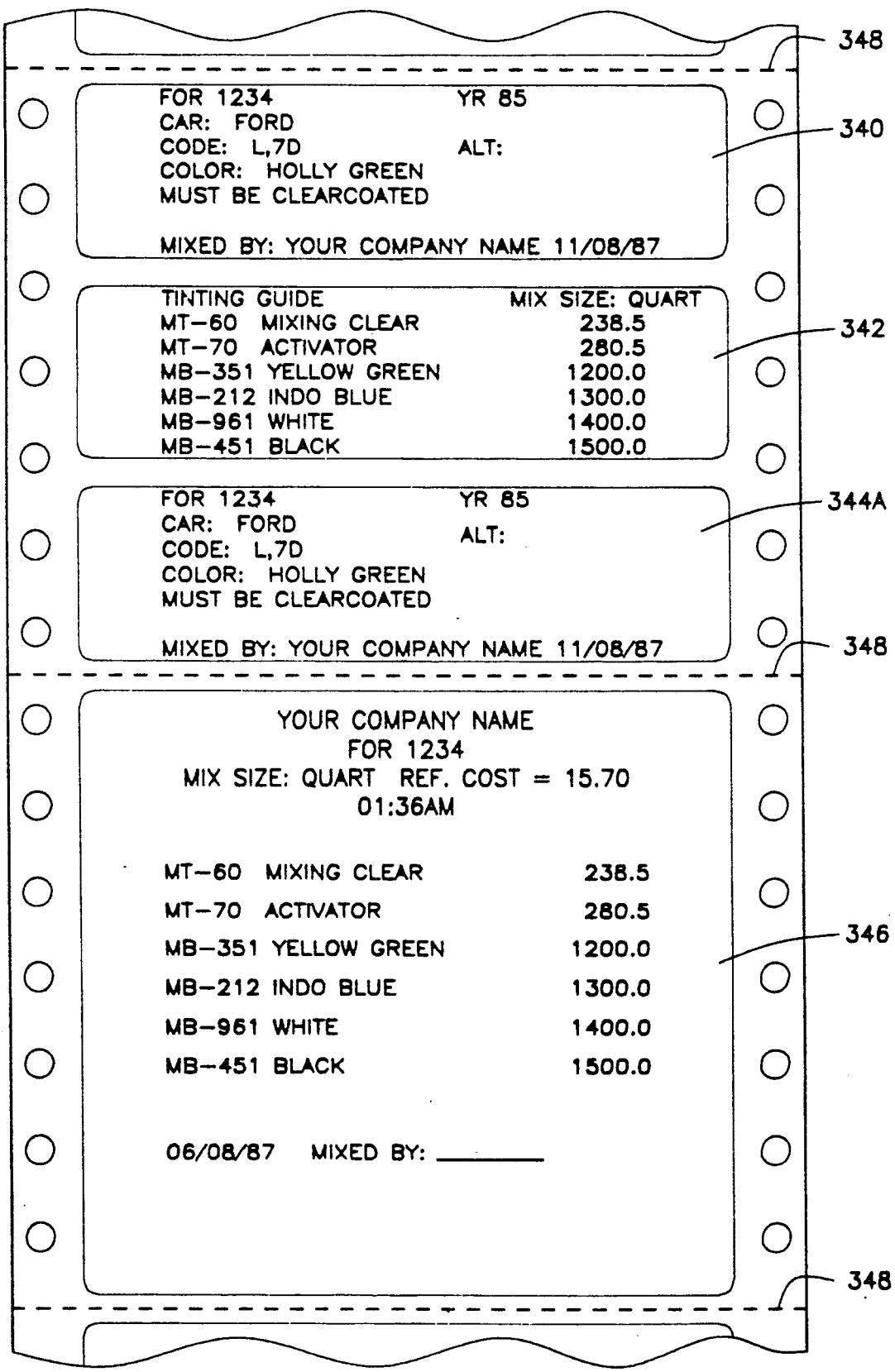
FIGS. 19A and 19B are embodiments of mixture labels.
Figure 19B:
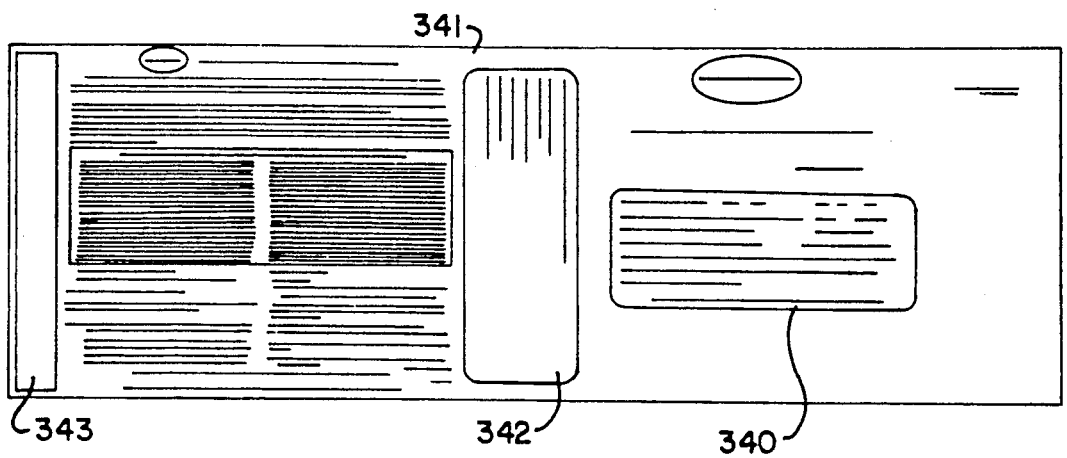
Figure 20B:
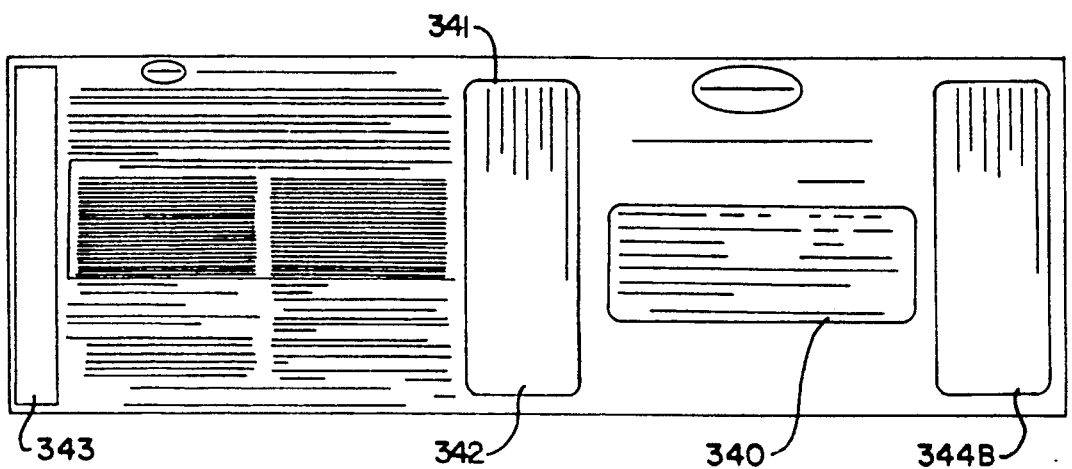
FIGS. 20A and 20B illustrate locations of the labels shown in FIGS. 19A and 19B on a vendor's paint label.
Figure 20A:
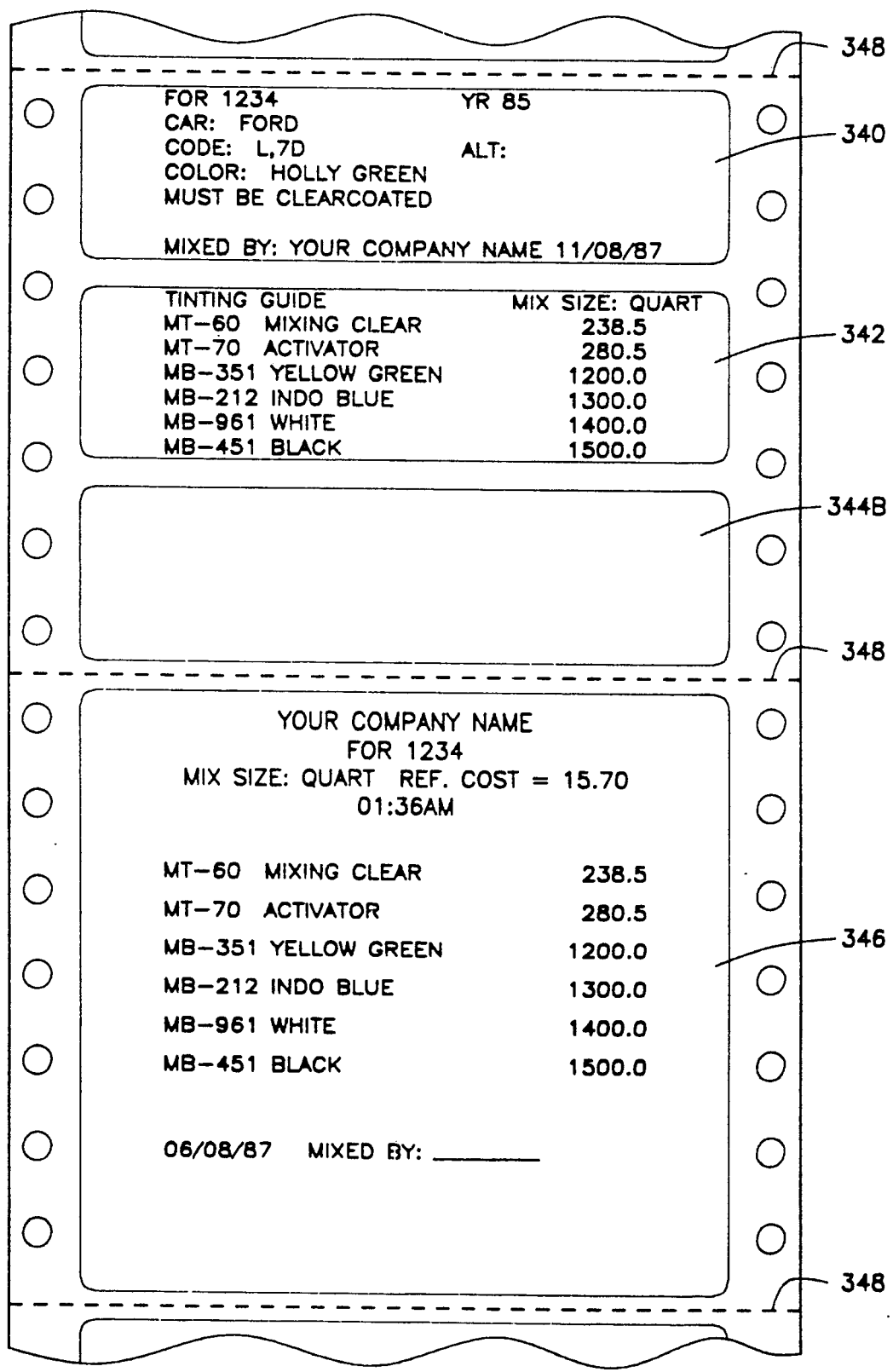

A preferred embodiment of the paint formula retrieval function of the present invention will provide for the printing of four different types of labels as generally illustrated in FIGS. 19A,B. Label 340 serves as a paint formula identification label. This label identifies the paint formula number and contains most of the information displayed in the upper half of FIG. 12. This label is placed on the front of the paint can as generally illustrated in FIG. 19B. Label 342 serves as a tinting guide label. This label contains the mixing base color numbers and amounts used for the amount of paint contained in the paint can. The purpose of this label is to provide the customer with a guide for tinting the paint. This label is preferably placed on a vendor's label 341 as generally illustrated in FIG. 19B. The vendor's label 341 is typically attached to a paint can by use of an adhesive strip 343. Label 344 as shown in FIG. 19A is a touch-up bottle label 344A. This label is used as an additional paint formula identification label that can be placed on a touch-up bottle. If there is material safety data sheet information and regulatory information to be printed, the label 344 can be replaced with a label 344B which contains material safety data sheet and other regulatory information. If the label 344B contains MSDS information, the label is attached to the paint container as shown in FIG. 20B.

Label 346 is a mix operator label. This label is used by the person that will mix the paint formulation. This label contains the mixing base colors and amounts for the selected size. This label preferably includes the company name, formula number, mix size, reference cost, time and/or rush status, date and a blank for signature by the person mixing the paint. A special message line might be included indicating any special tinting or the like. It will be noted that in the preferred embodiment, the labels 340 through 346 are self-adhesive labels placed on a tractor feed form. The label 346 is separated from the other three labels by a perforation/fold line 348 such that the mix operator label 348 can be readily separated from the other three labels 340 through 344. Moreover, in the preferred embodiment, the distance between the perforations 348 is the same such that the label 346 can be conveniently folded over onto the labels 340 through 344.

SPECIAL COLOR LIBRARY

The special color library function 234 performs the following subfunctions:
1. Catalogs modifications made by the user to vendor paint formulations.
2. Catalogs custom paint formulations.

When the special color library option is selected from the main menu by entering the number 2 and hitting the "ENTER" return key, the CATFRAMS TM program will search its data files to determine the number of paint vendors supported by the CATFRAMS TM program. If the CATFRAMS TM program supports more than one vendor, a select vendor menu screen presentation will be displayed in a window format overlaying the special color library background screen presentation as generally illustrated in FIG. 21. The vendor window menu allows the user to select the paint vendor for which formulations will be tinted or created. The CATFRAMS TM program will wait for the user to select one of the vendors. If the CATFRAMS TM program supports only one vendor, the system will proceed as though the user selected the vendor from the vendor menu. After the vendor has been selected, the CATFRAMS TM program will display the special color library background display as generally illustrated in FIG. 22 and wait for the user to enter a paint formulation number. Although not shown, fields modifiable by the user will appear in inverse video as in the formula retrieval function.

When the user enters the formulation number, the CATFRAMS TM program will perform the following checks:
1. If the last key the user entered was an escape key, the system will return the user to the vendor menu. The user can then select a new vendor or return to the system main menu. If the system supports only one vendor and the user has entered an escape, the system will return to the main menu display. If the user returns to the vendor display, the user can return to the main menu by entering a return or an escape key.
2. The CATFRAMS TM program will search for the formulation in the paint master formulation file and also in the special color library formulation file. If only one version of the formulation exists, then the information from the formulation is displayed on the screen as shown in FIG. 23 (the formulation amounts are not displayed until the user selects the size). Otherwise, the formulation variants are displayed for the user and the user will select one of the variants. An example of the variants display is illustrated in FIG. 10.

If the user selected a formulation that is in the special color library, a special tint formula records window will appear as generally illustrated in FIG. 24 providing the user with a choice of creating a new variant based on the selected formulation, editing the selected variant, or deleting the selected variant. Based on the user's input, one of the following will be performed:
1. If the user enters an escape key, the CATFRAMS TM program will return to the user back to the vendor special formula tinting display as generally illustrated in FIG. 22 for entry of a formulation.
2. If the user enters a carriage return, the CATFRAMS TM program will select the default action and edit the selected formulation.

3. If the user enters a "N", the CATFRAMS ™ program will make a copy of the existing variant and create a new variant in the special color library file.
4. If the user enters a "D", the CATFRAMS ™ program will delete the selected variant from the special color library.

If the formula was not found in either the master formulation file or the special color library, then the system will display an informative message to the user indicating that the specified formulation does not exist as is generally illustrated in FIG. 25. The user then has the choice of adding the formulation number to the special color library. If the user elects to add the formulation to the color library, the CATFRAMS ™ program will create a new formulation with empty data fields. If the user does not want to add the formulation, the CATFRAMS ™ program will return the user to the formulation number entry of FIG. 22.

Assuming the user has selected one of the above options that does not return to the formulation number entry, the system will begin allowing the user to enter data into the formulation fields of the vendor special formula tinting display as generally illustrated in FIG. 26.

The vendor special formula tinting formulation screen, also referred to as the special color library formulation screen, is composed of a set of fields that contain information about formulation usage along with the amounts of mixing base color for mixing a specific formula size (pint/quart/2-quarts/3-quarts/gallon). FIGS. 27A,B illustrate the formulation screen display of FIG. 26 with brackets defining the beginning and end of each field and an associated legend identifying each field. The user will start field editing on the formula cost code field. The user can selectively modify any of the fields that allow editing. As with the formula retrieval background screen presentation, the fields which can be edited will appear in inverse video, also referred to as reverse video. The function of each of the fields is described below:

1. Formula number field 351 — This field will contain the formula number that the user selected. The user cannot edit this field once the formulation has been retrieved from its source file. It is for viewing purposes only at this point.
2. Formula cost code field 352 — This field will contain the vendor cost (pricing) code. The cost code is used to determine the refinisher cost for the amount of paint that will be mixed. The user can add one of the cost codes that is in the refinisher price schedule (the refinisher price schedule is described in paint costing below). The user can edit this field.
3. Formula alternative number 353 — This field represents the variant or alternative number of the formulation. This field, along with the formula number, will provide a unique identification for the formulation. The user can edit this field.
4. Formula size 354 — This field is used to specify the size (pint/quart/2-quart/etc.) of the formulation. The user can select one of the standard sizes supported by the paint vendor, or a non-standard size that is calculated by the system. FIG. 28 illustrates the pull-down menu that will appear to allow user size selection. The user can edit this field. FIG. 29 represents a pint size selection. Non-standard sizes can be selected by selecting a standard size not provided by the vendor or selecting a special tint. In the first instance, the vendor does not support all the standard sizes in the size list that includes pint, quart, 2-quart, 3-quart, and gallon. The special tint selection allows the user to specify the mix amount in 2.5% increments of a gallon. The user is presented with a special formula tint mixture scale screen presentation display that is a gradient sliding scale with increments in 2.5% of a gallon as generally illustrated in FIG. 30. This display is similar to that of FIG. 15. As the user increases or decreases the amount, the system will display the digital amount selected location 330 along with a status message at 332 indicating the closest standard size. The status message will indicate if the amount is exactly equal to a standard size or is more or less than the standard size by use of a plus or minus sign. Example status message descriptions are pint ($-$), pint ($+$), quart ($+$), etc. After the special tint size has been selected, the system will update the display for the selected size as generally illustrated in FIG. 31. The CATFRAMS ™ program will use the following method for calculating a non-standard size: If the paint vendor's standard sizes are exact multiples of a gallon, then the percentage selected is multiplied by the gallon amounts. The standard sizes are exact multiples of a gallon and the gallon amounts are four times the quart amounts, etc. If the standard sizes are not exact multiples of a gallon, then the smallest supported standard size is converted to a gallon formulation. The selected percentage is then multiplied by the calculated gallon formulation. The result is the formulation for the selected size. If the no formula selection is selected, the user can create a special tint with no formulation size. This is often used to provide additional messages for a given formula.
5. Formula color field 355 — This is the color description for the formulation. The user can edit this field.
6. Formula color code field 356 — This field specifies the color code used to identify the color. The user can edit this field.
7. Formula make of car 357 — This field specifies the make of the car that the formulation is for. The user can edit this field.
8. Formula year of car 358 — This field specifies the year(s) that the formulation was used for the car specified in the formula make of car field. The user can edit this field.
9. Formula message-1 field 359 — This field contains information about the formula. The user can edit this field.
10. Formula message-2 field 360 — This field contains information about the formula. The user can edit this field.
11. Formula message-3 field 361 — This field contains information about the formula. The user can edit this field.
12. Formula standard sizes from vendor 362 — This field will display the standard sizes supported by the paint vendor for the formulation. The user cannot edit this field.
13. Formula mixing base colors 363 — This column contains the mixing base color numbers used in the formulation. The user can edit any of the mixing base color numbers in this column.

14. Formula mixing base color description 364 — This column contains the mixing base color descriptions for the mixing base color numbers. The user cannot edit the mixing base color descriptions in this column.
15. Formula mixing base color amounts 365 — This field contains the mixing base color amounts used in the formulation. These color amounts are provided in whatever units the vendor formulates his/her formula (grams, pounds, ounces, pints). The user can edit any of the mixing base color amounts in this column. There are several ways that a user can tint an existing variant. The following is a description of two techniques that can be used:
    a. Adjust the existing mixing base color amounts by the amount of the mixing base color added for tinting purposes. If the mixing base color was not in the formulation, add the amount to the last amount in the list to arrive at the weight for the new mixing base color. FIG. 32 is an example of a formulation that was tinted using this technique.
    b. For each of the colors used in tinting the formulation, add the mixing base color and the tinting amount at the end of the mixing base color list. This method assumes that the mixing scale will be reset to zero prior to adding any of the tinting quantities. FIG. 33 shows an example of a formulation that was tinted using this technique.
16. Message status area 366 — This area is used for displaying informative messages to the user. It is the last line on the display. The message(s) displayed are sensitive to the current field/function the user is performing. An example of such a message is "F10 to save special tint" as is illustrated in FIG. 32.

The user has the option of editing any or all of the fields described above as being user modifiable (can be edited by the user). The user can abort the editing process by entering the escape key at any time. If the user does enter the escape key, the system will return the user to the formula number field and will wait for a new formulation number. When the user completes formula field editing, the CATFRAMS TM program will update the special color library with the formula and return the user to the formula number field 351 as generally shown in FIG. 22, the formula number field 351 being displayed in inverse video.

PAINT AND MATERIAL COSTING

The paint and material costing feature performs the function of accurately tracking the paint and materials cost associated with painting automotive vehicles. When this function is selected from the main menu of FIG. 6, a menu of options as generally illustrated in FIG. 34 is presented on the display screen. The CATFRAMS TM program will then wait for a user menu selection. Each of the numbered selections on the CATFRAMS TM paint and material costing menu represents an action the user can request. A brief description of what action will occur for each of the selections is provided below:

1. Return to CATFRAMS TM menu — This selection will return control to the main CATFRAMS TM menu shown in FIG. 6. The user will select this option to exit the paint/material costing function.
2. Paint/material cost calculations — This selection will start the paint/material cost function. The user will select this option to enter a new paint/materials cost calculation or edit an existing calculation.
3. Paint additives and clear coat maintenance — This selection will start the paint additives and clear coat maintenance function. The user will select this option to add to, edit, or print the list of available product numbers and the unit cost for paint and clear coat additives for each type of paint.
4. Paint and body supplies maintenance — This selection will start the paint and body supplies maintenance module. The user will select this option to add, edit, or print body shop supply items and their per unit cost.
5. Refinisher price list maintenance — This selection will start the refinisher price list maintenance function. The user will select this option to add to, edit, and modify the refinisher price list.
6. Paint/material cost per labor hour report — This selection will start the paint/material cost per labor hour report function. The user will select this option to obtain a labor analysis of completed work.
7. Cost calculation report — This selection will start the cost calculation report function. The user will select this option to obtain reports on specific cost calculations.

The paint/material cost calculations portion of the CATFRAMS TM program performs the function of creation and editing of cost calculations. Upon selection of this feature, a paint/material costing presentation screen as generally illustrated in FIG. 35 appears on the display. Only eight lines are shown in FIG. 35, but the user may scroll up or down to other lines by use of the direction keys. This screen presentation provides options for retrieval by line number, customer name, and repair order number (RON). An additional option is provided for creating/deleting cost calculations. After the initial screen presentation is displayed, the CATFRAMS TM program will wait for input from the user. Depending on the user response, the following actions will occur.

1. Create new cost calculation — When a user selects a new cost calculation by entering an "N" at the enter selection field, the user is immediately prompted for a paint vendor selection by use of a screen presentation as generally illustrated in FIG. 36. If the user has only one paint vendor, this screen presentation is bypassed and a name/address screen presentation as generally illustrated in FIG. 37 is displayed. The name/address screen presentation contains information on the customer's name, car, repair order number, work and home phone, etc. The user is prompted for additional information field by field on the screen until he enters the F10 special function key on the keyboard or enters the last field on the screen presentation, which is the completion date field. Next, a costing screen presentation is displayed as generally illustrated in FIG. 38, the formula field appearing in inverse video. The user is prompted for a formula number and the entered formula number is retrieved from the appropriate data base. The user is then prompted for a paint size, by use of a screen presentation as generally illustrated in FIG. 39. Upon selection of the appropriate paint size, the cost is calculated. If the cost is based on the refinisher price, the cost reflects the cost defined on the vendor refinisher's price list. If the user has the "calculate refinisher price option" set to "A" for actual cost, the cost is calculated on the actual amount and cost of each mix color used in the paint formula. (If the user has formulated a special tint, the actual cost option will provide the exact cost of the special tint.) The user is then prompted for a paint type, paint catalyst, paint reducer, clear coat, clear coat catalyst, and clear coat reducer by use of screen presentations as generally illustrated in FIGS. 40, 41, 42, 43, 44, and 45, which appear sequentially after each selection is made by the user. The user is then presented with eighteen items that are typically used when painting automotive vehicles by the appearance of the screen presentation as generally illustrated in FIG. 46. These items and their corresponding amounts represent the findings of a 3M study on point costing and therefore represent a close approximation of the costs. The expense type (P=paint, B=body shop items, O=other items, C=clean-up), a description of the item, quantity of item used per gallon of paint (F=fixed cost, P=proportional cost), and the items' cost are displayed. The user is allowed to change each item or can enter the "F10" special function key to save or print the cost calculation. The CATFRAMS TM program will wait for the user to edit any of the eighteen items, enter the "PG-DN" page down key or enter the "F10" special function key. If the user enters the page down key or edits the last item in the paint and body supplies, the user will be prompted for the desired mark up by use of a screen presentation as generally illustrated in FIG. 47. After entering the mark up and depressing the "F10" special function key, the user will immediately be prompted by a "save and print information" screen presentation as generally illustrated in FIG. 48, if the user wants to save the cost calculation or print the cost calculation. The costing information is printed on a label configuration as shown in FIG. 49, similar to that of FIG. 19 with a label 343 containing the costing information and labels 341 containing customer information. The body shop name is printed on the label 343. Once the user has made an appropriate selection, the select paint/material cost calculation window screen presentation as generally illustrated in FIG. 35 is again presented at the display.

2. Find customer — When a "C" is entered at the "select paint/material cost calculation" menu presentation, the user is prompted for the customer name on the cost calculation he/she desires to retrieve by use of a screen presentation as generally illustrated in FIG. 50. The CATFRAMS TM program will search for the first name in the data base that matches as many characters as the user entered. If the name was not found, a customer not found message will be displayed by a screen presentation as generally shown in FIG. 51. If a matching customer name was found, a screen presentation as generally illustrated in FIG. 52 will be displayed providing information on that customer and asking if this is the correct customer. If the user enters a yes response, editing of the cost calculation will proceed in the same method as described in a new calculation with the exception that data fields will contain information retrieved from the customer's file. If the user enters a no response, the CATFRAMS TM program will continue to search for matches until no more can be found, at which time the screen presentation shown in FIG. 51 will be displayed indicating that no customer matches could be found.

3. Find RO number — When a "R" is entered at the "select paint/material cost calculation" menu screen presentation, the user is prompted for the repair order number on the cost and calculation he/she desires to retrieve as generally illustrated in FIG. 53. The CATFRAMS TM program will search for the RO number in the data base. If the RO number is not found, a screen presentation as generally illustrated in FIG. 54 will be displayed indicating that the RO number could not be found. If the RO number was found, editing of the cost calculation will proceed in the same method as described in a new calculation with the exception that data fields will contain information retrieved from the repair order file, an example of such a screen presentation being illustrated in FIG. 55.

4. Delete cost calc — When a "D" is entered at the "select paint/material cost calculation" screen presentation menu, the user is prompted for the cost calculation number on the cost calculation he desires to delete by use of a screen presentation as generally illustrated in FIG. 56. The CATFRAMS TM program will search for the cost calculation number in the data base. If the cost calculation number is not found, a cost calculation not found message will be displayed via a screen presentation as generally shown in FIG. 57. If the cost calculation number was found, an additional screen presentation will be displayed as generally illustrated in FIG. 58 to ensure that the cost calculation should be deleted. Control is then returned to the "select paint/material cost calculation" screen presentation menu.

The paint additives and clear coat maintenance selection illustrated in the screen presentation of FIG. 34 performs the function of creation and editing of available product numbers and the unit costs for paint and clear coat additives for each type of paint. The screen presentation illustrated in FIG. 36 provides options for selecting one of the supported paint vendors. The CATFRAMS TM program will wait unit a paint vendor is selected, a return key is entered with no selection or an escape key is pressed. A return without a selection or the escape key will return control to the "paint/material costing" screen presentation menu of FIG. 34. After selecting a paint vendor, a screen presentation as generally illustrated in FIG. 59 is presented prompting the user for the type of paint. A screen presentation as generally illustrated in FIG. 60 is next presented prompting the user for the paint supply rate method (basecoat/non-basecoat). If a basecoat paint is selected, then twice the normal amount of supplies must be calculated since a basecoat paint will go twice as far. The user can then edit the paint catalyst, paint reducer, clear coat, clear coat catalyst, and clear coat reducer amounts. The edited values are displayed in a screen presentation as generally illustrated in FIG. 61. Upon pressing the "F10" special function key, a window screen presentation as generally illustrated in FIG. 62 is presented prompting the user for whether or not the paint additive and clear coat list is to be printed. Control is then returned to the "paint/material costing" screen presentation menu.

The paint and body supplies maintenance selection performs the function of creation and editing of body shop supply items and their per unit cost. Up to eighteen items can be stored in the data base. Upon selection of this feature, an initial screen presentation, as generally illustrated in FIG. 63, is presented at the display enabling the user to edit the expense type, description, percent of unit used per gallon of paint, flat or percent ratio, and the unit cost for each of the eighteen items. Upon completion of the editing process, the user presses the "F10" special function key which will result in a screen presentation as generally illustrated in FIG. 64 prompting the user for whether or not the paint and body supplies listing is to be printed. Control is returned to the "paint/material costing" menu following the entry of the last item, the escape key, or entering the "F10" special function key. The escape key entry will abort all changes.

The refinisher price list maintenance selection performs the function of creation and editing of the refinisher price list as supplied by various paint vendors. Upon selection of this option from the paint/material costing screen presentation menu, as illustrated in FIG. 34, the vendor select screen presentation will be displayed as generally illustrated in FIG. 36. The CATFRAMS TM program will wait until a user selects a paint vendor, a return key is entered with no selection, or an escape key is pressed. A return key without a selection or the escape key will return control to the "paint/material costing" screen presentation menu as generally illustrated in FIG. 34. Following vendor selection, control passes to the "select product used" screen presentation menu as generally illustrated in FIG. 65. This screen presentation menu provides the user with the ability to select the product used for editing, the ability to add/edit/delete refinisher cost types, and the ability to add/edit/equivalent refinisher cost types. The CATFRAMS TM program will wait until a selection is made, a return key is entered with no selection or an escape key is pressed. A return key without a selection or the escape key will return control to the screen presentation illustrated in FIG. 36. Once a product has been selected, a vendor refinisher price list screen presentation as generally illustrated in FIG. 66 is displayed The CATFRAMS TM program will wait for user editing of the pint, quart, and gallon price fields, the "F10" special function, or the escape key being pressed. The "F10" special function key will save the changes and prompt the user for printing by use of a window screen presentation as generally illustrated in FIG. 67. The escape key will return control to the menu screen presentation of FIG. 36. If the user had selected the "add/edit/delete refinisher cost types" in the screen presentation of FIG. 65, a screen presentation as generally shown in FIG. 68 is displayed. The CATFRAMS TM program will wait until a master paint line type selection is made, a return key is entered with no selection, or an escape key is pressed. A return without a selection or the escape key will return control to the "select product" menu screen presentation of FIG. 65. When a selection has been made, the user is prompted to edit or delete the selection by display of a screen presentation as generally shown in FIG. 69. If deleting is selected, the master paint line type is deleted. If editing is selected, the present cost codes are displayed by use of a screen presentation as generally illustrated in FIG. 70 and editing is allowed one field at a time. The "F10" special function key will save the edited information.

When the ∂add/edit/delete equivalent refinisher cost types" selection is made from the screen presentation shown in FIG. 65, control is passed to the "add/edit/delete equivalent refinisher cost types" menu screen presentation as generally illustrated in FIG. 71. The CATFRAMS TM program will wait until a master paint line type selection is made, a return key is entered with no selection, or an escape key is pressed. The paint line types available may vary from vendor to vendor. The return key without a selection or the escape key will return to the screen presentation illustrated in FIG. 65. When a selection has been made, the user is prompted to edit or delete equivalences by use of a screen presentation a generally shown in FIG. 72. The equivalences are displayed and editing/adding/deleting is allowed. The "F10" special function key will save the edited information and control is returned to the screen presentation of FIG. 65.

The material/paint cost per labor hour report selection of the screen presentation shown in FIG. 34, provides the capability to obtain printed reports and labor costs for cost calculations based on date ranges, original cost calculations, cost calculations with work in progress, and completed cost calculations. Selections are made by use of a screen presentation shown in FIG. 73, which appears when the material/paint cost per labor hour report selection is made. The CATFRAMS TM program will wait until the selections are made or an escape key is pressed. The escape key will return control to the screen presentation of FIG. 34. Following these selections, the user is prompted by use of a screen presentation as illustrated in FIG. 74 to make sure paper is in the printer and the top of form is set. FIG. 74A represents a sample paint/material cost per labor hour report. Control is then returned to the "paint/material costing" menu screen presentation illustrated in FIG. 34.

The cost calculation report selection of the "paint/material costing" menu screen presentation illustrated in FIG. 34, provides the capability to obtain printed reports and cost calculations based on date ranges, original cost calculations, cost calculations with work in progress, and completed cost calculations. Output can be sorted by customer name, cost calculation number, or RO number. Upon selection of the cost calculation report feature, a "cost calculation report window" screen presentation is displayed as generally illustrated in FIG. 75 The CATFRAMS TM program will wait until the selections are made or an escape key pressed. The escape key will return control to the "paint/material costing" menu screen presentation shown in FIG. 34. Following the user selections, a screen presentation as generally illustrated in FIG. 76 is displayed prompting the user to make sure the paper is in the printer and the top of form is set. FIG. 76A represents a sample cost calculations report. Control is then returned to the "paint/material costing" menu illustrated in FIG. 34.

PRINT MIXING COLOR LABELS

The print mixing color labels feature performs the functions of printing labels for mixed colors sold directly over the counter and maintaining inventory control of mixed colors sold over the counter. Upon selection of this feature from the "main menu" screen presentation as illustrated in FIG. 6, a screen presentation as generally illustrated in FIG. 77 is displayed providing for selection of the desired paint vendor. Control will return to the main menu shown in FIG. 6 if an "ESC" escape key is entered. Following selection of a paint vendor, a screen presentation is displayed as generally shown in FIG. 78 prompting the user for a mixing color. Two possibilities exist when a mixed color is entered. If the mixed color is not found in the data base, a mixing color not found message is displayed by use of a screen presentation as generally illustrated in FIG. 79. Upon pressing any key, the screen presentation of FIG. 78 is again displayed prompting the user for a mixing color. If the mixing color is found, a prompt is provided for the number of labels required for the printing. Following the number of labels entry, a prompt is provided for the type of color amount (grams, ounces, or standard sizes). A selection of ounces produces a screen presentation as generally shown in FIG. 80 and a selection of grams produces a screen presentation as generally shown in FIG. 81 prompting for the number of ounces or grams desired. If standard sizes are selected, a screen presentation as generally shown in FIG. 82 is displayed prompting the user to select pint, quart, or gallon sizes. Once the size and amount has been selected, the mixed labels are printed and the inventory is decremented. Illustrated in FIG. 83 is an example of the color labels which are printed by a preferred embodiment of the present invention. The printing of the color labels is accomplished on the same labels used for the mix instructions as illustrated in FIG. 19. The label portion 346 is not used for the color labels. This allows the same tractor feed adhesive form paper to be used for both types of printouts which results in a cost savings and facilitates ease of use.

MIXING COLOR INVENTORY MANAGEMENT

The mixing color inventory management selection of the main menu shown in FIG. 6 provides the user interface to inventory status of the color data base and updating of the mixed color data base. An interface is provided to establish and adjust reorder levels, reorder amounts, stock size, stock price, stock weight, stock description, quantity on hand, last order date, last order quantity, physical count quantity, and physical count date. Upon selection of the "mixing color inventory management" selection from the main menu of FIG. 6, a screen presentation as generally illustrated in FIG. 84 is displayed providing the user with options for selecting the desired paint vendor. Control will return to the main menu screen presentation of FIG. 6 if the "ESC" escape key is pressed. Following selection of a paint vendor, a screen presentation is displayed as generally illustrated in FIG. 85 prompting the user for a mix color. Two possibilities exist when a mix color is entered. If the mix color is not found in the data base, a mixing color not found screen presentation as generally illustrated in FIG. 86 is displayed and a prompt is provided to see if the color should be added to the mix color data base. If the color should be added, control will pass to the edit portion of this feature. The new color will then be handled the same as though editing an existing color. If the color was found in the data base, a screen presentation as generally illustrated in FIG. 87 is displayed prompting the user to see if the color should be deleted or edited. If the color should be deleted, a screen presentation as generally illustrated in FIG. 88 is displayed indicating the irreversibility of the deletion action. If the color should be edited, a screen presentation as generally illustrated in FIG. 89 is displayed enabling the user to edit the information fields discussed above. As with other field entry screens, the direction keys and return key are used to move through a data entry screen. When the last field is entered or the "F10" special function key is entered, the new information is saved and control is transferred to the main menu as illustrated in FIG. 6.

MIXING COLOR REORDER REPORT

The mixing color reorder report selection of the main menu illustrated in FIG. 6, provides the capability to obtain printed output of only those mixing colors which, according to the data in the CATFRAMS TM program data base, may need to be reordered. Reordering is based on the quantity on hand and the reorder point for that color. The reorder report will include the following information:
 a) quantity on hand
 b) stock size
 c) reorder level
 d) reorder quantity
 e) order cost Upon selecting the "mixing color reorder report" option of the main menu illustrated in FIG. 6, a screen presentation as generally shown in FIG. 90 is displayed providing for selection of the desired paint vendor. Control will return to the main menu illustrated in FIG. 6 if the "ESC" escape key is entered. Following selection of a paint vendor, a screen presentation is displayed as generally shown in FIG. 91 inquiring of the use if the mixing color reorder report is to be printed for all mixing colors (F) or only those mixing colors in which the quantity on hand is less than or equal to the reorder level and the reorder level is not zero (S). The full option will print all mixed colors while the summary option will list only those mixed colors with an order quantity greater than zero. A paper alignment screen presentation as generally shown in FIG. 92 is then displayed reminding the user to ensure that the paper is aligned correctly. Upon completion of this function, the CATFRAMS TM program will return to the main menu illustrated in FIG. 6. A sample of the report provided is illustrated in FIG. 93.

MIXING COLOR INVENTORY STATUS LIST

The mixing color inventory status selection of the main menu shown in FIG. 6 provides the capability to obtain printed output on the status of the mixing color inventory. Items included in the report are:
 a) quantity on hand
 b) stock size
 c) stock cost
 d) stock value
 e) grams per gallon
 f) reorder level
 g) reorder quantity
 h) date and amount of last purchase
 i) date and count of last physical inventory
 j) shortage amounts A sample of such a report is illustrated in FIG. 94. Upon selection of the "mixing color inventory status list" option of the main menu in FIG. 6, a screen presentation as generally illustrated in FIG. 95 for selection of the desired paint vendor. Control returns to the main menu if the "ESC" escape key is entered. Following selection of a paint vendor, a screen presentation as generally illustrated in FIG. 96 is displayed inquiring if a summary or full report is to be printed. The full report option will print all mixed colors while the summary report option will list only those mixed colors with an order quantity greater than zero. Upon selection of the report option, a screen presentation as generally represented in FIG. 97 will be displayed, reminding the user to ensure that the paper is aligned correctly. Upon completion of the mixing color inventory status list function, control will return to the main menu illustrated in FIG. 6.

MIXING COLOR MOVEMENT REPORT

The mixing color movement report selection of the main menu shown in FIG. 6 provides printed output for the amount of each mixing color used in the color formulas, the amount sold as mixing color, and the total amount of movement. The data is tabulated to provide a yearly history of mixing color movement, an example of such a report being illustrated in FIG. 98. Upon selecting the "mixing color movement report" option, a screen presentation as generally illustrated in FIG. 99 is displayed providing for selection of the desired paint vendor. Control will return to the main menu illustrated in FIG. 6 if the "ESC" escape key is entered. Following selection of a paint vendor, a screen presentation as generally illustrated in FIG. 100 is displayed prompting the user to select a summary or a full report. The full report option will print all mix colors while the summary report option will list only those mix colors with movement. Upon selection of the report option, a screen presentation as generally illustrated in FIG. 101 will be displayed reminding the user to align the paper correctly. Upon completion of the mixing color movement report function, the CATFRAMS TM program will return to the main menu illustrated in FIG. 6.

DAILY FORMULA FREQUENCY REPORT

The daily formula frequency report option of the main menu as illustrated in FIG. 6 provides printed output on formulas mixed the previous day or days. The information is provided in summary form and is printed on the standard CATFRAMS TM program label. Upon selection of the "daily formula frequency report" option, a screen presentation as generally illustrated in FIG. 103 is displayed providing the following options:
 1. Print and empty the daily formula frequency file.
 2. Print the daily formula frequency file and keep the data.
 3. Keep but do not print the formula frequency data.
 4. Empty the formula frequency file.

Control will return to the main CATFRAMS TM program menu illustrated in FIG. 6 if the "ESC" escape key is entered or after a selection has been completed. If the daily formula frequency is empty, a screen presentation as generally illustrated in FIG. 104 is displayed. Upon completion of the daily formula frequency report function, the CATFRAMS TM program will return control to the main menu illustrated in FIG. 6. An example of the daily size frequency summary report is shown in FIG. 102.

MONTHLY FREQUENCY OF FORMULAS MIXED REPORT

The monthly frequency of formulas mixed report option of the main menu illustrated in FIG. 6 provides printed output on the number and size of each mix that has been made. A sample report is shown in FIG. 105. Information is maintained by formula number as labels are printed during formula retrieval. Upon selection of the "monthly formula frequency report" option from the main menu in FIG. 6, a screen presentation as generally illustrated in FIG. 106 is displayed providing for user selection of the desired paint vendor. Control will return to the main CATFRAMS TM program menu illustrated in FIG. 6 if the "ESC" escape key is entered. Following selection of a paint vendor, a screen presentation as shown in FIG. 107 is displayed inquiring if a summary report or a full report is required. The full report option will print all formulas while the summary report option will list the total number of mixes and gallons. Upon selection of the report option, a screen presentation 108 will be displayed reminding the user to align the paper. Upon completion of the frequency of formulas mixed report function, the CATFRAMS TM program will return to the main menu illustrated in FIG. 6.

SPECIAL COLOR REPORT

The special color report option of the main menu illustrated in FIG. 6 provides printed output for formulas entered in the special color library. Upon selection of the "special color report", a screen presentation as generally illustrated in FIG. 110 will be displayed providing for vendor selection. Control will return to the main CATFRAMS TM program menu illustrated in FIG. 6 if the "ESC" escape key is entered. Upon selection of the vendor, a screen presentation as generally illustrated in FIG. 111 is displayed reminding the user to align the paper correctly. An example of the special color report is illustrated in FIG. 109. Upon completion of the special color report function, control is returned to the main menu illustrated in FIG. 6.

If, at anytime during operation, the CATFRAMS TM program detects a missing file, a screen presentation as generally shown in FIG. 112 alerting the user to this fact is displayed.

PROGRAM STRUCTURE

The program structure will now be described in terms of a plurality of logic flow diagrams. It will be appreciated that the logic flow diagrams provided are that of a preferred embodiment and that numerous other program structures might be utilized in keeping with the principles of the present invention. Illustrated in FIGS. 113-115 is a logic flow diagram 400 representative of a program structure for performing system start-up, also referred to as system initiation in accordance with the principles of the present invention. Block diagram 402 represents user activation of the program. In the preferred embodiment, this is done from the master menu by selecting the CATFRAMS TM program option. At 404, the CATFRAMS TM program declares and initializes its global variables. At 406, the CATFRAMS TM program generates a specified company name from encrypted name data. At 408, the CATFRAMS TM program configures operating parameters. At 410, the CATFRAMS TM program will display a preselected system banner identifying the program. At 412, after displaying the system banner screen presentation at the display, the CATFRAMS TM program will wait for user input via depression of any key on the keyboard 208. Upon receiving this input, the CATFRAMS TM program will discard the input and at 414, display a trademark banner screen presentation identifying various trademarks used throughout the program, such trademarks typically being the trademarks of the various paint vendors whose formulas are used in the system. At 416, the CATFRAMS ™ program waits for user input and once this input is received, discards the input. The input is simply used to inform the program when it can delete the display trademark banner screen presentation and proceed to the next part of the program. At 418, if the daily summary report has been requested, then at 420 the daily summary procedure is called which, in turn, displays the daily frequency summary report as illustrated in FIG. 7. The daily summary frequency report procedure is then performed based on the user input received. After processing the daily summary frequency report, at 422 the CATFRAMS ™ program will display the main menu screen presentation as generally illustrated in FIG. 6. At 424, the CATFRAMS ™ program will wait for user selection of a menu option. Upon receipt of the user menu selection, at 424 the CATFRAMS ™ program will check if the action selected is zero. If the action detected is zero, at 428 the CATFRAMS ™ program will close all files and terminate system operation at 430. If the user menu selection was something other than zero, at 432 the CATFRAMS ™ program will process the user selection. After having processed the user menu selection, the CATFRAMS ™ program will return to displaying the main menu at 422.

FIG. 116 illustrates a logic flow diagram 440 for an embodiment of a program in accordance with the principles of the present invention for processing the user menu selection. The user menu selection processing is illustrated as beginning at 442. At 441, the user selection is compared to a "1". If the user selection equals a "1" at 444 control is transferred to a paint formula retrieval module for processing this user selection. At 446, if the user selection is found to be equal to "2", control is transferred to a special color library program module at 448. If at 450, the user selection is found to be equal to "3", control is transferred to a paint and material costing program module at 452. If, at 454, the user selection is found to be equal to "4", control is transferred to a program module for processing of the print mixing color labels function at 456. If at 458 the user selection is found to be "5", control is transferred to a mixing color inventory management module at 460. If at 462, the user selection is found to be equal to "6", control is transferred to a mixing color reorder report module at 464. If at 466, the user selection is found to be equal to "7", control is transferred to a mixing color inventory status list program module at 468. If at 470, the user selection is found to be equal to "8", control is transferred to a mixing color movement report program module at 472. If at 474, the user selection is found to be equal to "9", control is transferred to a daily formula frequency report program module at 476. If at 478, the user selection is found to be equal to "10", control is transferred to a monthly formula frequency report program module at 480. If at 482, the user selection is found to be equal to "11", control is transferred to a special color library report program module at 484. If at 486, the user selection is found to be equal to "12", control is transferred to a system utilities and configuration program module at 488. At 490, the program is returned to the system start-up flow diagram 400 such that the main menu screen presentation is displayed and the program awaits further user input.

FIG. 117 illustrates a program logic flow diagram 500 representative of an embodiment of a program structure in accordance with the principles of the present invention for performing the paint formula retrieval function. The paint formula retrieval program module begins at 502. If, at 504, it is determined that the number of vendors in the system equals "1", then at 506 the files for the selected vendor are opened. If the number of vendors present in the paint formula data file is greater than "1", at 508 the vendor select window screen presentation is displayed as generally illustrated in FIG. 8. At 510, the program obtains the user vendor selection and at 506 opens the files for the selected vendor. At 512, the programs displays the paint formula retrieval background screen presentation as generally illustrated in FIG. 9. At 514, the program receives the user formula entered on the paint formula retrieval background screen presentation followed by the user hitting the "ENTER" return key. At 516, the program checks if the last keyboard entry was the "ESC" escape key. If the last key entered was the escape key, at 518 the program returns to the previous screen presentation. By repetitively repeating the escape key, the user can return back through the previous screen presentations to the main menu screen presentation. This is generally true of the program regardless of where the user is in the screen presentation procedure. If at 516 the last key detected was not the escape key, then at 520 the program transfers control to a program which checks for the presence of any formulas present in the master formula file and the special color library file that matched the formula number entered by the user. Upon return from this program module, at 522 the program checks if any valid formulas were found. If no valid formulas were found, then at 524 the program displays the formula not found message screen presentation as generally illustrated in FIG. 25. At 526, the program enters an idle state waiting for any user entry from the keyboard. Upon detecting such an entry, the program returns to displaying the paint formula retrieval background screen presentation as generally illustrated in FIG. 9. If at 522, it was determined that a valid formula was found, then at 528 the formula is displayed on the formula retrieval background screen presentation. At 530, the program performs editing of the formula fields as specified by user editing of the fields of the editable fields present in the formula retrieval background screen presentation. At 532, a check is made to see if the last key entry was the escape key. If the last key entry is the escape key then the program control is returned to 512 where the display paint formula retrieval background screen presentation is displayed as generally illustrated in FIG. 9. If the last editable field has been entered or the "F10" special function key has been entered, program control is transferred to 534 wherein the paint formula labels generally illustrated in FIGS. 19a,b are printed. Thus, the user has two ways in which to print labels. Either he can edit all of the editable fields by sequential depression of the return key, or he can depress the "F10" special function key.

Illustrated in FIG. 118 is an embodiment of a logic flow diagram 540 in accordance with the principles of the present invention for performing multiple formula checks. The program module begins at 542. At 544, the program counts the formulas in the master formula file and the special color library file that match the user entered formula number entered by the user in the formula number field of the formula background screen presentation as generally illustrated in FIG. 9. At 546, a check is made to see if the formula count equals zero. If the formula count equals zero, at 548 the program sets a flag indicating no formulas were found and at 550 the program returns to the paint formula retrieval module. At 552, the formula count is compared to "1". If the formula count is equal to "1", then at 554 the formula is read from the master formula file or the special color library file stored on the disk storage device. If, at 552, the formula count was determined to be greater than "1", at 556 the program displays the multiple formula background screen presentation of FIG. 10. At 558, the program checks for any formulas located in the master formula data file. At 560, a check is made if any formulas are found in the master formula file. If the formulas are found in the master formula file at 560, then at 562 the formulas are displayed. If no formulas were found in the master formula file at 560 and after any formulas found have been displayed at 562, at 564 then program checks for any formulas in the special color library. At 566, a check is made if any formulas were found in the special color library. At 568, any formulas located in the special color library are displayed on the multiple formula background screen presentation. At 570, the program obtains the user formula selection from the multiple formula background screen presentation. At 572, the paint formula retrieval function returns to location 522. FIG. 119 is an embodiment of a logic flow diagram 580 representative of a program structure in accordance with the principles of the present invention. The logic flow diagram 580 represents the program module for editing formula fields present on the formula background screen presentation of FIG. 9. The module entry is at 581. At 582, the program displays the formula data including header identifiers and quantities. At 583, the edit field is set to the cost code field. At 584, a check is made to see if the edit field is equal to the cost code field and if the cost code edit is configured. If the edit field is equal to the cost code field and the cost code edit is configured, then at 585 the cost code field is edited. At 586, a check is made to see if the last key entry is the escape or "F10" print label key. If the last key is equal to the escape or print label key, then at 587 the program returns and displays the formula background screen presentation as generally illustrated in FIG. 9 awaiting user input of the formula number. If the last key was not the escape key or the print label key, then at 588 the next field to edit is set based on the last key entered by the user at the keyboard. At 589, a check is made to see if the edit field is equal to the number of labels to print field. If the edit field is equal to the number of labels to print field, then at 590 the number of labels is edited and control is returned to location 586 in the logic flow diagram. At 591, a check is made to see if the edit field equals the formula size field. If the edit field is equal to the formula size field, then at 592 the current screen presentation is saved. At 593, the size pull-down menu screen presentation is displayed as generally illustrated in FIG. 14. At 594, the user size selection is obtained. At 595, the size selection is compared to "1". If the size selection is equal to "1", then at 596 the formula background screen presentation is updated with pint quantities at 596. At 597, a check is made if a valid size is selected. If a valid size is not selected, then control is returned to location 586. If a valid size is selected, then at 598, the status message "F10 to print label" is displayed on the formula background screen presentation and control is returned to location 586. At 599, a check is made to see if the size selection is equal to "2". If the size selection is equal to "2", then at 600 the screen presentation is updated with quart quantities. When the specific quantities are updated at locations 596,600 and other locations in the program, the quantity header is highlighted in inverse video between asterisk signs so as to readily draw the user's attention to the selected quantity. Further, if a quantity is selected which is not provided on the vendor's microfiche, the program of the present invention will automatically compute the paint formula based on the formula information that is provided from the vendor's microfiche. At 601, the size selection is compared to "3". If the size selection is equal to "3", the screen presentation is updated at 602 with 2-quart quantities and program control is transferred to location 597. At 603, a check is made if the size selection is equal to "4". If the size selection is equal to "4", then at 604 the screen presentation is updated with 3-quart quantities and control is passed to location 597. At 605, a check is made if the size selection is equal to "5". If the size selection is equal to "5", then at 606 the screen presentation is updated with gallon quantities and control is transferred to location 597. At 607, the size selection is compared to "6". If the size selection is equal to "6", then at 608 the special tint mixing scale window screen presentation is displayed as generally shown in FIG. 15. At 609, the special tint amount is obtained based on the user entry. At 610, the special tint quantities are calculated. At 611, the screen presentation is updated with the special quantities as generally illustrated in FIG. 16 and control is transferred to location 597. At 612, the size selection is compared to "7". If the size selection is not equal to "7", then control is passed to 584. At 613, the bulk mix window screen presentation as generally illustrated in FIG. 17 is displayed. At 614, the bulk mix user entry is obtained. At 615, the program calculates the amount to mix. At 616, the program restores the screen presentation with the bulk quantities as generally illustrated in FIG. 18. At 620, the program checks if the edit field is equal to the purchase repair order field. If the edit field is equal to the purchase/repair order field, at 621 the purchase/repair order field is edited and control is transferred to 586. At 622, the edit field is compared to the purchase/repair order number field. If the two are equal, then at 623, the purchase/repair order number field is edited and control is transferred to 586. At 624, the edit field is compared to the customer field and customer is configured. If the edit field is equal to the customer field, then at 625, the customer field is edited and control is transferred to 586. At 626, the edit field is compared to the rush order field. If the edit field is equal to the rush order field, at 627 the edit rush order field is updated and control is transferred to 586. At 628, the edit field is compared to the code field and if the edit field is equal to the code field at 629 the code field is edited and control is transferred to 586. At 630, the edit field is compared to the car field and if the edit field is equal to the car field, then at 631 the car field is edited and control is transferred to 586. At 632, the edit field is compared to the year field and if the edit field is equal to the year field, then at 633 the year field is edited and control is transferred to 586. At 634, the edit field is compared to the message 1 field and if the edit field is equal to the message 1 field, at 635 the message 1 field is edited and control is transferred to 586. At 636, the edit field is compared to the message 2 field and if the edit field is equal to the message 2 field, then at 637 the message 2 field is edited and control is transferred to 586. At 638, the edit field is compared to the message 3 field and if the edit field is equal to the message 3 field, control is passed to 639 where the message 3 field is edited. Control is then transferred to location 586 in the flow diagram.

Illustrated in FIG. 120 is a flow diagram 650 representative of a special color library program in accordance with the principles of the present invention. At location 651 in the flow diagram, the special color library program module is initiated. At 652, a check is made to see if the number of paint vendors whose paint formulas are entered into the master paint formula file is greater than "1". If the number of vendors is equal to "1", then at 653 the master formula and special color library files are opened. If the number of vendors is greater than "1", then at 654 the vendor menu screen presentation is displayed as generally illustrated in FIG. 12. At 655, the program obtains the user input via the keyboard of the vendor selection. Once the files have then been opened at 653, at 656 the special color library background screen presentation as generally illustrated in FIG. 22 is displayed. At 657, the formula number entry made by the user on the special color library background screen presentation is obtained by the program. At 658, the program checks if the last keyboard entry by the user was the "ESC" escape key. If the last keyboard entry was the escape key, the program control transfers to location 652. At 659, the program calls the module which checks for multiple formulas. At 660, a check is made to see if the formula entered by the user on the special color library background screen presentation has been found. If the formula has been found, then at 661 a check is made to see if the formula is from the special color library. If the formula is from the special color library, then at 662 the create/edit/delete screen presentation as generally illustrated in FIG. 24 is displayed. The program at 663 then obtains the user choice of create, edit, or delete. At 664, the program checks if the last entry from the keyboard was the "ESC" escape key. If the last key entry made by the operator was the escape key, then the program control returns to location 656 of the flow diagram. At 665, a check is made if the user has selected the edit option. If the edit option has been selected, then program control transfers to location 666 where the program displays the variant usage screen presentation as generally illustrated in FIG. 29. At 667, the program edits the variant fields per the user entries from the keyboard. At 668, the program checks that the last key entered was the escape key. If so, program control is transferred to location 656. At 669, the program saves the variant formula entered by the user. Control then transfers to location 656 of the program. If at location 665 the user selection was found to not equal the edit function, then at 670 the program checks if the user has selected the create function. If the user has selected the create function, then control passes to location 671 where the program copies the selection formula fields to the formula data base as a new variant of the formula. If at 670 the user selection was found not to be equal to the create function, then at 672 the user selection is compared to the delete function. If the user selection is the delete function, then control transfers to 673 where the program removes the formula variant from the special color library. Program control is then transferred to location 656. If at location 660 the formula was not found in the master or special color library formula files, then at 680 the program displays the add formula message screen presentation as generally shown in FIG. 25. At 681, the program waits for the user choice. At 682, a check is made if the user has chosen to have the formula added. If the user has chosen to have the formula added, at 683 a new formula variant is created with empty fields. Control is then transferred to location 666 where the variant usage screen presentation as generally illustrated in FIG. 26 is displayed, no field values being shown as the user has chosen to add a new formula.

FIG. 121 illustrates a logic flow diagram 685 of an embodiment of a program in accordance with the principles of the present invention for performing the paint costing function. The program module starts at 686. At 687, the program initializes various variables used throughout the program. At 690, the program loads paint costing (PCOST) and material costing (JCOST) files. At 691, the program displays the paint/material costing menu screen presentation as generally illustrated in FIG. 34. At 692, the program obtains the user menu selection. At 693, a check is made if the user menu selection is paint/material cost calculations. If it is, then program control transfers to the paint costing module at 694. At 695, a check if the user selection is the paint additives and clear coat maintenance selection. If it is, then control transfers to the program module at 696 responsible for this function. If at 697, the user selection is found to be the paint and body supplies maintenance, then control is transferred to the appropriate program module at 698. At 699, if the selection is determined to be the refinisher price list maintenance, then control is transferred to the appropriate program module at 700. If at 701, the selection is determined to be the paint/material cost per labor hour report selection, then at 702 control is transferred to the appropriate program module. If at 703 the user selection is determined to be the cost calculation report, then at 704 control is transferred to the appropriate program module. If at 705 the user selection is determined to be the user selection "0", that is, return to the main program menu, or the user selection is the "ESC" escape key, then control is transferred at 706 to location 422 of the system start-up routine such that the main menu as generally illustrated in FIG. 6 is displayed. If the user enters an inappropriate entry, program control is transferred to location 690. Location 707 indicates the beginning of the paint/material cost calculation module. At 708, the program checks if the user is finished with the paint/material costing. If the user is finished, control is transferred to location 690. At 709, the paint/material costing menu screen presentation is displayed as generally illustrated in FIG. 35. If at 710, it is determined that the user wishes a new selection as indicated by entry of the letter "N" from the keyboard, then control is transferred to the program module at 711 responsible for creating the new selection. If at 712, it is determined that the user entered a "C" for finding a customer, then at 713 control is passed to the appropriate module. If at 714, it is determined that the user entered the letter "R" to find the repair order number, then at 715 control is transferred to the appropriate module. If at 716, it is determined that the user entered the letter "D" for deleting the cost calculation, then control is transferred to the appropriate module at 717. If the user enters none of these selections or an inappropriate letter, the paint/material costing screen presentation as generally illustrated in FIG. 35 remains displayed. If the user enters the "ESC" escape key, control is returned to the paint/material costing menu screen presentation as generally shown in FIG. 34. Location 720 marks the beginning of the program module responsible for creating the new cost calculation. If there are paint formulas in the master paint formula file and the special color library file for more than one vendor, the select vendor screen presentation is displayed as generally illustrated in FIG. 36 once the user has selected the new cost calculation option. At 721, the program checks to see if the user has entered the escape key. If the user has entered the escape key, the program returns to the paint/material cost calculation menu screen presentation as generally shown in FIG. 35. If the escape key is not pressed, the program then provides screen presentation prompts for paint formula, size, type, catalyst, reducer, clear coat, clear coat catalyst, clear coat reducer, body supplies, and percent markup as generally represented by locations 722 through 731, respectively. The screen presentations providing these prompts are displayed in FIGS. 38 through 47. Once all of the user selections have been made, at 732 the program presents the screen presentation inquiring if the user wishes to print the cost calculations as generally illustrated in FIG. 48. Upon completion of the printing task, control is returned to location 708 and the paint/material costing menu screen presentation as generally shown in FIG. 35 is again displayed. Location 740 represents the start of the program module for finding the customer name as requested by the user at the paint/material costing menu screen presentation generally shown in FIG. 35. At 741, the program provides a screen presentation as generally shown in FIG. 50 prompting the user for the customer's name. At 742, the program determines if the customer name was found in the paint formula data bases. If the customer name was found, then at 743 a screen presentation as generally illustrated in FIG. 52 is displayed asking the user to indicate if the correct customer has been found. At 744, the program displays a customer not found screen presentation as generally illustrated in FIG. 51 if the customer name was not found. 750 represents the beginning of the program module for finding the repair order number in the paint formula data base. The program flow of the repair order function is very similar to that of the customer function previously discussed. At 751, the program prompts the user for the repair order number with a screen presentation as generally shown in FIG. 53. If at 752 the repair order number is found in the data base, at 753 the program prompts the user with a screen presentation as generally shown in FIG. 55 inquiring whether or not this is the correct customer. At 754, the program displays a screen presentation as generally shown in FIG. 54 indicating that the repair order was not found. Location 755 marks the beginning of the delete cost calculation function. At 756, the program prompts the user for the cost calculation number by use of a screen presentation as generally shown in FIG. 56. If at 757 the cost calculation number is found, then at 758 the program inquires of the user if this is the correct customer by use of a screen presentation as generally illustrated in FIG. 58. If the user indicates it is the correct customer, then at 759 the program deletes that cost calculation from the data base. At 760, the program displays a screen presentation as generally illustrated in FIG. 57 indicating that the cost calculation number was not found. Location 770 marks the beginning of the add entry function. At 771, the program displays the vendor select window menu screen presentation as generally shown in FIG. 36. If at 772 the escape key is detected, then control is transferred to the program location for displaying the paint/material cost calculation as generally illustrated in FIG. 35. If the escape key is not detected as being pressed, then the program prompts the user to select the type of paint as generally illustrated in FIG. 59. At 774, the program checks if the escape key has been pressed. If the escape key has been pressed, control is transferred to the previous screen presentation. At 775, the program prompts the user for whether or not the paint is a base coat or a non-base coat by use of a screen presentation as generally illustrated in FIG. 60, since the base coat must be calculated at a greater rate. At 776, the program prompts the user to edit the paint additives by use of a screen presentation as generally shown in FIG. 61. At location 777, the program prompts the user to see if he/she wishes to print the changes by use of the window screen presentation as generally shown in FIG. 62. Location 780 marks the beginning of the program module responsible for costing supplies. At 781, the program prompts the user for supplies costing by use of the screen presentation as generally illustrated in FIG. 63. The program then displays the window screen presentation shown in FIG. 64 and if, at 782, it is determined that the user has selected the print function, at 783 the print function is performed. 785 indicates the beginning of the program module responsible for the edit function. At 786, the program provides the vendor choice menu screen presentation as generally illustrated in FIG. 36. At 787, a check is made to see if the user has entered the escape key, and if so, control is returned to the previous menu. At 788, the program prompts the user for the product used by use of the screen presentation shown in FIG. 65. If at 789 it is determined that a product was selected then at 790 the program displays the edit screen presentation as generally shown in FIG. 66. At 791, the program displays the print screen presentation as generally shown in FIG. 67 and checks if the user wishes to print. If the user wishes to print, then at 792 the program prints the refinisher price list report. At 793, the program checks if the user selected the add/edit/delete reference paint line. If the user did, control is transferred to the add/edit/delete reference paint line module which starts at 794. At 795, the program checks if the user has entered the add/edit/delete equivalent refinisher cost types. 794 represents the beginning of the add/edit/delete refinisher cost types. At 796, the program prompts the user for the master paint line type by use of the screen presentation generally shown in FIG. 68. At 797, a check is made to see if the escape key was entered. At 798, the program prompts the user to edit or delete the master prefix by use of a screen presentation as generally shown in FIG. 64. At 799, the program checks if the user wishes to delete the master prefix. If so, the master prefix is deleted at 800. At 801, the program displays the edit screen presentation as generally shown in FIG. 70. 805 represents the beginning of the program module for the add/edit/delete equivalent refinisher cost types entry from the screen presentation of FIG. 65. At 806, the program prompts the user for the master paint line type. At 807, the program checks if the escape key has been entered. At 808, the program prompts the user with a screen presentation as generally shown in FIG. 72. At 809, the program checks if the user has entered the "F10" special function key to save the record. If so, at 810 the program saves the record. 815 marks the beginning location of the labor hour report. At 816, the program prompts the user by use of the screen presentation as generally shown in FIG. 73. At 817, the program checks if the fields are entered and, if so, at 818 the program prompts the user by use of a screen presentation shown in FIG. 74 to make sure that the printer is ready. If the printer is ready, at 819 the program prints the labor report. 820 is the beginning location of the cost calculation report. At 821, the program prompts the user by use of a screen presentation shown in FIG. 75. At 822, the program checks if the fields have been entered and, if they have, at 823 the program displays the screen presentation shown in FIG. 76 to make sure that the user has the printer ready for printing. Upon the user pressing any key, the program will print the report at 824 if the printer is in a ready condition.

FIG. 122 illustrates a logic flow diagram 830 illustrating a program structure in accordance with the principles of the present invention for providing the print mixing color labels function from the main menu illustrated in FIG. 6. 831 marks the start location of this program module. At 832, the program prompts the user for vendor selection by presentation of the select vendor window screen presentation generally shown in FIG. 77 if there are multiple vendors present in the data base. At 833, the program checks if the escape key has been pressed and, if it has, control is transferred back to the main menu screen presentation shown in FIG. 6. At 834, the program provides the prompt for user selection of mixed color by use of the screen presentation as generally shown in FIG. 78. If at 835 it is determined that the color selection is not a valid color, then the program at 836 will display the screen presentation generally shown in FIG. 79. If a valid color was selected at 835, at 837 the program will prompt the user for a number of labels by use of a screen presentation shown in FIG. 81. At 838, the program will also prompt the user for the proper size as illustrated in the screen presentation of FIG. 78. At 839, if it is determined that the user has selected grams, then at 840 the user is prompted for the amount by use of a screen presentation shown in FIG. 81. At 841, the program prints the mixing color label. At 842, if it is determined that the selection is in ounces, then at 843 the program prompts the user for the amount by use of the screen presentation as generally shown in FIG. 80. If at 844 it is determined that the selection is a standard size, then at 845 the program prompts the user for the standard size by use of a screen presentation shown in FIG. 82. At 846, 847, and 848 the program determines the standard size selection and at 849, 850, and 851 prints the corresponding standard size label. At 852, the paint inventory is decremented to reflect the fact that this quantity of paint has been removed from inventory.

FIG. 123 is a flow diagram 855 of an embodiment of a program structure in accordance with the principles of the present invention which performs the mixing color inventory management option of the main menu illustrated in FIG. 6. The program module starts at 856 and at 857 prompts the user for the vendor desired by use of a screen presentation as generally shown in FIG. 84. At 858, a check is made for entry of an escape code and at 859 the program prompts the user for the mix color by use of the screen presentation shown in FIG. 85. At 860, if it is determined that the color selected is a valid color, then at 862 the program checks if the user wants to edit or delete the color. If the color selected is not a valid color, at 861 the user is prompted by use of the screen presentation shown in FIG. 86 if they want to add a color to the inventory. At 863, the program displays the inventory screen presentation as generally shown in FIG. 85. At 864, the user is allowed to edit fields and at 865 the program checks if the user has entered the "F10" special function key. If the user has entered the "F10" key at 866, the program updates the inventory file. At 867, the program displays the screen presentation shown in FIG. 88 and asks the user if it is okay to delete the mixing color record. If it is okay, at 868 the mixing color record is deleted.

Illustrated in FIG. 124 is a logic flow diagram 870 representing an embodiment of a program structure in accordance with the principles of the present invention for performing the mixing color reorder report on the main menu shown in FIG. 6. The program starts at 871 and at 872 prompts the user for vendor selection if multiple vendors are present by use of the vendor window menu screen presentation generally shown in FIG. 90. At 873, a check is made if the user has entered the escape key. At 874, the program prompts the user for a full or summary report by use of the screen presentation as generally shown in FIG. 91. At 875, if it is determined that the user wishes a full report, the program prompts the user for proper paper alignment by use of the screen presentation shown in FIG. 92. Similarly, at 877, if it is determined that the user wishes a summary report, the program at 878 prompts the user for proper paper alignment by use of the screen presentation shown in FIG. 92. At 879, the program prints the color reorder report.

FIG. 125 illustrates a logic flow diagram 880 which represents an embodiment of a program structure for performing the mixing color inventory status list function of the main menu illustrated in FIG. 6. The program starts at 881 and is very similar in logic flow to that of the logic flow diagram 870 for the mixing color reorder report function. Indeed, locations 881 through 889 roughly correspond to locations 871 through 879.

FIG. 126 illustrates a logic flow diagram 890 representative of an embodiment of a program structure in accordance with the principles of the present invention for performing the mixing color movement report function of the main menu shown in FIG. 6. A flow diagram 890 corresponds generally to the flow diagrams 870 and 880. Similarly, locations 891 through 899 correspond roughly to locations 881 through 889 and 871 through 879.

FIG. 127 illustrates a logic flow diagram 900 representative of an embodiment of a program in accordance with the principles of the present invention for performing the daily formula frequency report function of the main menu shown in FIG. 6. The program module starts at 901 and at 902 prompts the user for the daily options as generally illustrated in the screen presentation shown in FIG. 103. At 903, the program checks if the user has entered the "ESC" escape key. At 904, 906, 908, and 910, the program checks for the option entered by the user and at 905, 907, 909, and 911 takes the appropriate action. The daily formula frequency report screen presentation of FIG. 103 is displayed at the beginning of the day the first time the system is started if formula mixing activity occurred prior to the beginning of the day and the daily formula file has not been deleted. Thus, the user can get a quick printout of the activity from the day before. Of course, using the main menu illustrated in FIG. 6, the user can obtain this printout at any time.

FIG. 128 illustrates a logic flow diagram 915 representative of a program's structure for performing the monthly formula frequency report function of the main menu shown in FIG. 6. The program starts at 916 and at 917 displays the screen presentation prompt shown in FIG. 107. At location 918, the program checks if the escape key has been pressed. At 919, the program prompts the user for a full or summary report selection by use of the screen presentation illustrated in FIG. 108. At 920 through 924, the program performs the printing function according to whether a full or summary report is required.

FIG. 129 illustrates a logic flow diagram 925 representative of a program structure in accordance with the principles of the present invention for performing the special color library report function of the main menu shown in FIG. 6. The special color library report program module, also referred to as the special tint report module, starts at 926 and at 927 prompts the user for a vendor selection by use of the screen presentation shown in FIG. 110. At location 928, the program checks once again for the escape key function and at location 929 the program prompts the user for proper paper alignment via use of the screen presentations shown in FIG. 111.

A preferred embodiment of some data file structures 950 as generally shown in FIG. 130 will now be discussed although it will be appreciated that the data file structure may have numerous embodiments and still be in keeping with the principles of the present invention. Paint formula information supplied by each paint vendor is saved in a master paint formula file(s). In the preferred embodiment, there is one master paint formula file for each line of paint supplied by a vendor. A vendor file will contain the list of vendors for whom there are master paint formula files and identify those master paint formula files which are to be used. Whenever a paint vendor updates its formulas, the master paint formula file must also be updated as well as the vendor file if a new line of paint is added. The master paint formula file contains much of the information appearing in the screen presentation of FIGS. 12A,B as well as additional information. The master paint formula file includes the formula number, the cost code, the alternate number, the color, make of car, year of car, additional information which the vendor might provide, an identification of the standard sizes which are present, the quantity (typically in weight such as ounces, grams, pounds, etc.) of each mixing base color present in the formula for up to ten mixing base colors present in the formula. The quantity is provided for each of the standard sizes provided by the vendor; however, if the standard sizes are proportional to the gallon size, only the gallon size is stored. The master paint formula file contains unique message line index numbers which refer to a message file containing each of the three messages which may be present for each formula. The master paint formula file includes unique mixing color identifiers which are used to index or refer to a color file.

The color file contains the mixing base color identifiers and the mixing base color descriptions. In addition, the color file contains inventory information fields including paint unit size, paint unit cost, reorder level (number of units), reorder quantity (number of units), and total quantity of paint (total parts or weight) in inventory. Many of these fields can be modified by the user. For example, the user might decide that when a particular mixing base color falls to ten pints, that it is time to reorder. The user might set the reorder quantity at twenty pints. Whenever functions one or four of the main menu are performed and labels are printed, the quantity on hand is decremented to reflect the sales from inventory. Monthly unit quantity amounts are saved for colors used in formulas and in over the counter sales so as to separately reflect these uses.

A usage file contains formula number, alternate number, cost code number, and paint unit size fields. Every time a formula mix is printed, the usage file is updated such that for each unit or container mixed there is an entry in this table. This file provides the monthly formula usage information. Typically, this file is cleared out every month or on some other periodic basis. This file also includes a special unit field and a field identifying the amount of the special mix. In the preferred embodiment, there is a similar file for daily formula usage information.

In addition there are four costing files, referred to as JCOST, RCOST, RECOST, and PCOST. The JCOST file includes customer information. The RCOST file includes cost codes for each of the paint lines provided by a vendor. The cost codes identify the cost per unit of a vendors paint regardless of the mixing base colors used. The CATFRAMS ™ program allows for modification of the cost codes since the cost of a formula variant or customized color may vary from the original cost code if a different selection of colors are mixed. The cost codes refer to a costing table where the actual costs are stored. The RECOST file includes lists of master and equivalent paint types. Thus a user can readily find equivalent paint types and cost codes to establish costs. The PCOST file contains the paint and body supplies type, description, percent per gallon, rate, and unit cost fields as generally illustrated in FIG. 64. These fields can be modified by the user either permanently or on an individual use basis on each cost calculation.

A master configuration file will include configuration information such as the user's encrypted name, etc. In addition this file includes conversion information which allows the user to convert from one vendor's quantity of measurement such as grams to another vendor's quantity such as parts.

In addition to the master paint formula file, a special color library file will be used to store formula variants and custom formulas. The special color library file includes all the various fields of information which individual vendors might have. This allows the formula information to be displayed in a standard screen presentation with information fields being displayed in predetermined locations. The master formula files are subsets of the special color library file. The special color library file contains its own message fields for storing the three lines of information. In addition, the special color library file contains up to twenty different mixing base colors per formula and a vendor field identifying the vendor whose formula has been varied. This provides the user with much flexibility in creating variants or formulas or customizing formulas.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. An automated paint formula retrieval system comprising:
   (a) a computer including a processor and associated electronic memory;
   (b) user input means operatively interconnected to the computer for inputting user commands to the computer;
   (c) display means interconnected to the computer for displaying information output from the computer;
   (d) storage means interconnected to the computer for storing paint formula mix data, paint formula mix related cost data including cost of paint formula mix colors, reducers, catalysts, and inventory data including inventory of paint formula mix colors;
   (e) printer means interconnected to the computer for printing labels;
   (f) program means including first program means responsive to user commands for instructing the computer to retrieve a user-designated paint formula mix from the storage means and for displaying the paint formula mix according to standard sizes of paint formula mix, second program means responsive to user commands for creating and displaying a nonstandard paint formula mix not previously stored on the storage means and for storing the nonstandard paint formula mix on the storage means, third program means responsive to user commands for creating a paint formula mix for a nonstandard size of formula as designated by the user, the third program means including means for presenting on the display means a ruled scale representation including a bar portion extendable along the ruled scale representation, the ruled scale representation being scaled with actual paint sizes, the movement of the bar portion being controlled by user commands received from the input device, a leading edge of the bar portion representing the paint formula mix size selected, fourth program means responsive to user commands for retrieving paint formula mix related cost data from the storage means and for calculating the cost of a paint formula mix, fifth program means responsive to user commands for updating the inventory data in the storage means as paint is removed from inventory, sixth program means responsive to user commands for printing a paint formula mix label at the printer means, and seventh program means responsive to user commands for tracking paint formula size usage data in the storage means, and for retrieving the paint formula size usage data from the storage means and displaying the paint formula size usage data on a display means in response to user commands; and
   (g) display presentation program means for displaying a standard formula retrieval background screen presentation on a display of the display means in response to a user command received from the user input means, the paint formula retrieval background screen presentation including a lower screen presentation comprising multiple columns, and an upper screen presentation including headers designating the location of various paint formula information including paint formula mixes, and customer information.

2. A paint formula retrieval system in accordance with claim 1, wherein the paint formula size usage data displayed at the display means includes a presentation of total volume percentage represented by size of paint formula mixed and a percentage of total number of paint formula mixes represented by size and paint formula mixed.

3. A paint formula retrieval system in accordance with claim 1, including label program means for printing a first paint formula mix label including identifying the paint formula mix, a first tinting guide label identifying the paint formula mix colors and their respective amounts, a third label, and a fourth mix operator label identifying the paint formula mix colors and the respective amounts, the labels being disposed on a continuous web of paper, the first, second, and third labels being disposed on a first length of the web of paper equal to a second length of the web of paper occupied by the fourth label, the first and second lengths being interconnected end for end by preformatted fold lines whereby the continuous web of paper can be fan folded.

4. An automated paint formula retrieval system comprising:
   (a) a computer including a processor and associated electronic memory;
   (b) user input means operatively interconnected to the computer for inputting user commands to the computer;
   (c) display means interconnected to the computer for displaying information output from the computer;
   (d) storage means interconnected to the computer for storing paint formula mix data, paint formula mix related cost data including cost of paint formula mix colors, reducers, catalysts, and inventory data including inventory of paint formula mix colors;
   (e) printer means interconnected to the computer for printing labels;
   (f) program means including first program means responsive to user commands for instructing the computer to retrieve a user-designated paint formula mix from the storage means and for displaying the paint formula mix according to standard sizes of paint formula mix, second program means responsive to user commands for creating and displaying a nonstandard paint formula mix not previously stored on the storage means and for storing the nonstandard paint formula mix on the storage means, third program means responsive to user commands for creating a paint formula mix for a nonstandard size of formula as designated by the user, the third program means including means for presenting on the display means a ruled scale representation including a bar portion extendable along the ruled scale representation, the ruled scale representation being scaled with actual paint sizes, the movement of the bar portion being controlled by user commands received from the input device, a leading edge of the bar portion representing the paint formula mix size selected, fourth program means responsive to user commands for retrieving paint formula mix related cost data from the storage means and for calculating the cost of a paint formula mix, fifth program means responsive to user commands for updating the inventory data in the storage means as paint is removed from inventory, sixth program means responsive to user commands for printing a paint formula mix label at the printer means, and seventh program means responsive to user commands for tracking paint formula size usage data in the storage means, and for retrieving the paint formula size usage data from the storage means and displaying the paint formula size usage data on a display means in response to user commands; and (g) display presentation program means for displaying a standard formula retrieval background screen presentation on a display of the display means in response to a user command received from the user input means, the paint formula retrieval background screen presentation including a lower screen presentation comprising multiple columns, and an upper screen presentation including headers designating the location of various paint formula information including paint formula identifier, paint formula mix size, quantity of paint formula mixes, and customer information, the display presentation program means further including formula variant presentation program means for displaying multiple variants of a formula selected by the user on the display of the display means if there are multiple variants of the paint formula selected by the user.

5. A paint formula retrieval system in accordance with claim 4, wherein the paint formula size usage data displayed at the display means includes a presentation of total volume percentage represented by size of paint formula mixed and a percentage of total number of paint formula mixes represented by size and paint formula mixed.

6. A paint formula retrieval system in accordance with claim 4, wherein the third program means includes means for presenting on the display means a ruled scale representation including a bar portion extendable along the ruled scale, the movement of the bar portion being controlled by user commands received from the input device, a leading edge of the bar representing the paint formula mix size selected.

7. A paint formula retrieval system in accordance with claim 4, including label program means for printing a first paint formula mix label including identifying the paint formula mix, a first tinting guide label identifying the paint formula mix colors and their respective amounts, a third label as desired, and a fourth mix operator label identifying the paint formula mix colors and the respective amounts, the labels being disposed on a continuous web of paper, the first, second, and third labels being disposed on a first length of the web of paper equal to a second length of the web of paper occupied by the fourth label, the first and second lengths being interconnected end for end by preformated fold lines whereby the continuous web of paper can be fan folded.

8. A paint formula retrieval system comprising:
(a) a computer including a processor and associated electronic memory;
(b) user input means operatively interconnected to the computer for inputting user commands to the computer;
(c) display means interconnected to the computer for displaying information output from the computer;
(d) storage means interconnected to the computer for storing paint formula mix data, paint formula mix related cost data including cost of paint formula mix colors, reducers, catalysts, and inventory data including inventory of paint formula mix colors;
(e) printer means interconnected to the computer for printing labels;
(f) program means including first program means responsive to user commands for instructing the computer to retrieve a user-designated paint formula mix from the storage means and for displaying the paint formula mix according to standard sizes of paint formula mix, second program means responsive to user commands for creating and displaying a nonstandard paint formula mix not previously stored on the storage means and for storing the nonstandard paint formula mix on the storage means, third program means responsive to user commands for creating a paint formula mix for a nonstandard size of formula as designated by the user, fourth program means responsive to user commands for retrieving paint formula mix related cost data from the storage means and for calculating the cost of a paint formula mix, fifth program means responsive to user commands for updating the inventory data in the storage means as paint is removed from inventory, sixth program means responsive to user commands for printing a paint formula mix label at the printer means, and seventh program means responsive to user commands for tracking paint formula size usage data in the storage means, and for retrieving the paint formula size usage data from the storage means and displaying the paint formula size usage data on a display means in response to user commands, the seventh program means including means for determining if the program means is being started for the first time in a given day and if paint formulas have been mixed the day before, the seventh program means further includes means for displaying a menu of paint formula size usage reporting options, selectable by the user; and (g) display presentation program means for displaying a standard formula retrieval background screen presentation on a display of the display means in response to a user command received from the user input means, the paint formula retrieval background screen presentation including a lower screen presentation comprising multiple columns, and an upper screen presentation including headers designating the location of various paint formula information including paint formula identifier, paint formula mix size, quantity of paint formula mixes, and customer information.

9. A paint formula retrieval system in accordance with claim 8, wherein the paint formula size usage data displayed at the display means includes a presentation of total volume percentage represented by size of paint formula mixed and a percentage of total number of paint formula mixes represented by size and paint formula mixed.

10. A paint formula retrieval system in accordance with claim 8, wherein the third program means includes means for presenting on the display means a ruled scale representation including a bar portion extendable along the ruled scale, the movement of the bar portion being controlled by user commands received from the input device, a leading edge of the bar representing the paint formula mix size selected.

11. A paint formula retrieval system in accordance with claim 8, including label program means for printing a first paint formula mix label including identifying the paint formula mix, a first tinting guide label identifying the paint formula mix colors and their respective amounts, a third label as desired, and a fourth mix operator label identifying the paint formula mix colors and the respective amounts, the labels being disposed on a continuous web of paper, the first, second, and third labels being disposed on a first length of the web of paper equal to a second length of the web of paper occupied by the fourth label, the first and second lengths being interconnected end for end by preformated fold lines whereby the continuous web of paper can be fan folded.

* * * * *